United States Patent
Shiraishi

[11] Patent Number: 5,903,276
[45] Date of Patent: May 11, 1999

[54] IMAGE GENERATING DEVICE WITH ANTI-ALIASING FUNCTION

[75] Inventor: Naoto Shiraishi, Toyonaka, Japan

[73] Assignee: Ricoh Company, Ltd., Tokyo, Japan

[21] Appl. No.: 08/614,595

[22] Filed: Mar. 13, 1996

[30] Foreign Application Priority Data

Mar. 14, 1995 [JP] Japan ................................. 7-083364
Feb. 29, 1996 [JP] Japan ................................. 8-043356

[51] Int. Cl.⁶ .................................................. G06T 11/40
[52] U.S. Cl. ......................... 345/431; 345/432; 345/136
[58] Field of Search .................................. 345/431, 441, 345/443, 432, 136, 138

[56] References Cited

U.S. PATENT DOCUMENTS

| | | | |
|---|---|---|---|
| 5,321,513 | 6/1994 | Kondo et al. | 348/691 |
| 5,448,690 | 9/1995 | Shiraishi et al. | 345/441 |
| 5,455,900 | 10/1995 | Shiraishi et al. | 345/433 |
| 5,475,493 | 12/1995 | Yamana | 356/404 |
| 5,487,142 | 1/1996 | Nakayama et al. | 345/443 |
| 5,519,823 | 5/1996 | Barkans | 345/443 |

FOREIGN PATENT DOCUMENTS 3-139774  6/1991  Japan  ........................... G06F 15/68

*Primary Examiner*—Mark K. Zimmerman
*Attorney, Agent, or Firm*—Cooper & Dunham LLP

[57] ABSTRACT

A device for generating an image comprising polygons having polygon edges and a reduced aliasing effect on the polygon edges. The device includes a drawing processing unit for obtaining a color of a given dot, an area size occupied by one of the polygons in the given dot, and a direction code indicating a direction of an adjacent dot relative to the given dot, a frame-memory unit for storing the color, the area size, and the direction code for each dot of the image, and a display processing unit for combining the color of the given dot and a color of the adjacent dot indicated by the direction code with a ratio corresponding to the area size to obtain a color to be displayed for the given dot in the image.

45 Claims, 80 Drawing Sheets

DIRECTION 4
SLOPE 3

DIRECTION 5
SLOPE 3

FIG. 6
| DIRECTION VECTOR | 0 | 1 | 2 | 3 | 4 | 5 | 6 | 7 |
|---|---|---|---|---|---|---|---|---|
| LEFT EDGE / RIGHT EDGE | RIGHT | RIGHT | RIGHT | RIGHT | LEFT | LEFT | LEFT | LEFT |
FIG. 7A  FIG. 7B
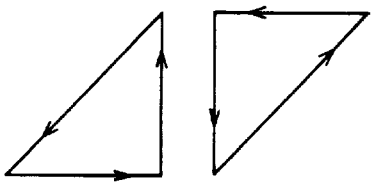
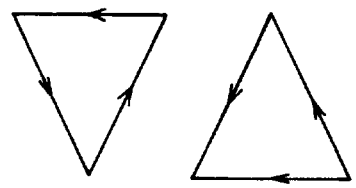
FIG. 7C
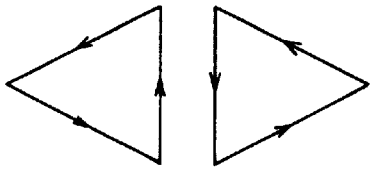
FIG. 8A  FIG. 8B
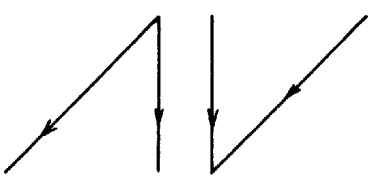
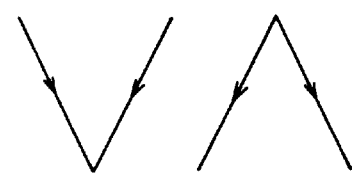
FIG. 8C
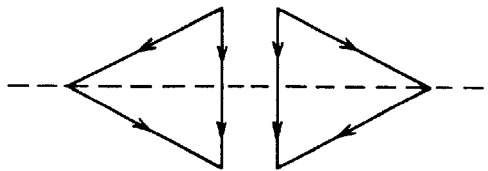

F I G. 9

| DIRECTION VECTOR BEFORE REVERSING | 0 | 1 | 2 | 3 | 4 | 5 | 6 | 7 |
|---|---|---|---|---|---|---|---|---|
| DIRECTION VECTOR AFTER REVERSING | 6 | 7 | 4 | 5 | 4 | 5 | 6 | 7 |
| LEFT EDGE / RIGHT EDGE | RIGHT | RIGHT | RIGHT | RIGHT | LEFT | LEFT | LEFT | LEFT |

FIG. 10

| | LEFT EDGE | | | | | | | RIGHT EDGE | | | | | | COLOR |
|---|---|---|---|---|---|---|---|---|---|---|---|---|---|---|
| | Xs | Ys | Zs | Xe | Ye | Ze | DIRECTION ATTRIBUTE VECTOR | Xs | Ys | Zs | Xe | Ye | Ze | DIRECTION ATTRIBUTE VECTOR | |
| 0 | | | | | | | | | | | | | | | |
| 1 | | | | | | | | | | | | | | | |

FIG. 15
|  | LEFT EDGE | | | RIGHT EDGE | | |
|--|---|---|---|---|---|---|
|  | X | Z | COLOR | X | Z | COLOR |
|  |  |  |  |  |  |  |
FIG. 16
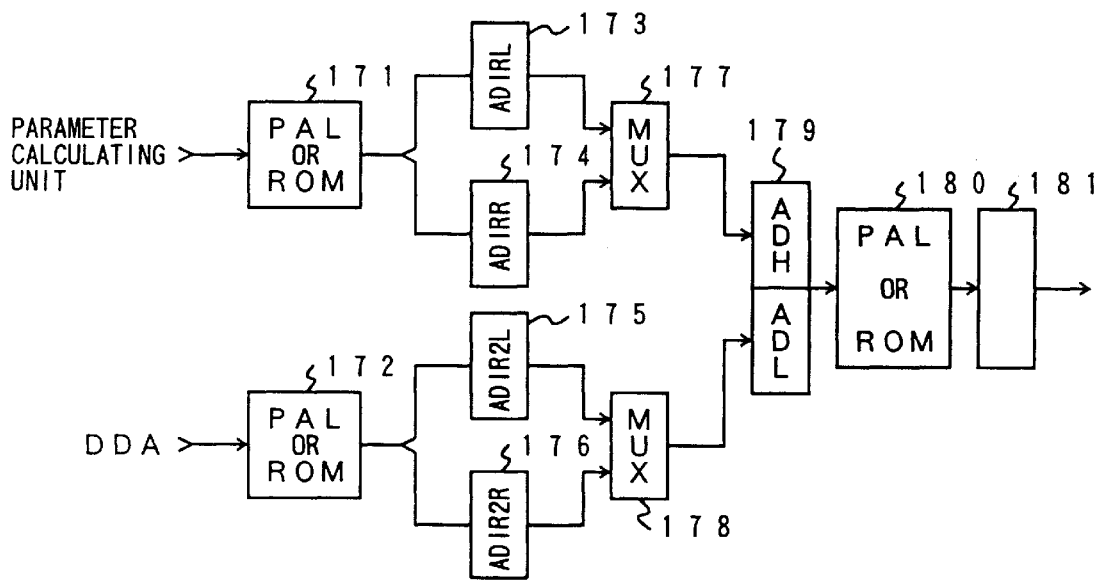
FIG. 17
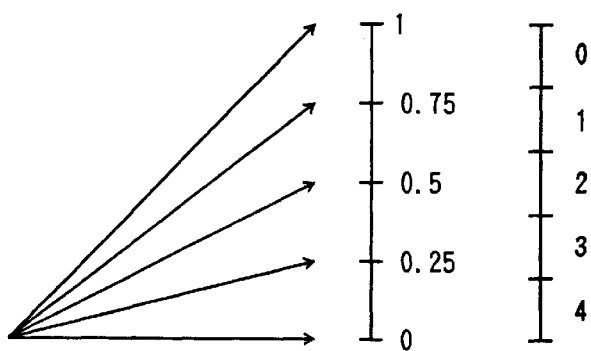

| L \ INTERSECTION | 0.125 | 0.25 | 0.375 | 0.5 | 0.625 | 0.75 | 0.875 | 1.0 |
|---|---|---|---|---|---|---|---|---|
| 0 | 0 | 1 | 2 | 3 | 4 | 5 | 6 | 7 |
| 1 | 7 | 6 | 5 | 4 | 3 | 2 | 1 | 0 |

| DIRECTION | 0 | 1 | 2 | 3 | 4 | 5 | 6 | 7 |
|---|---|---|---|---|---|---|---|---|
| M | 1 | 1 | 0 | 0 | 0 | 0 | 1 | 1 |
| L | 1 | 0 | 0 | 1 | 1 | 0 | 0 | 1 |

| SLOPE CODE \ INTERSECTION CODE | 0 | 1 | 2 | 3 | 4 | 5 | 6 | 7 |
|---|---|---|---|---|---|---|---|---|
| 0 | 63.5 | 62 | 59.5 | 58 | 51.5 | 46 | 39.5 | 32 |
| 1 | 63.2 | 61 | 58 | 54 | 46.5 | 40 | 32 | 24 |
| 2 | 63 | 60 | 55 | 48 | 40 | 32 | 24 | 16 |
| 3 | 62 | 56 | 48 | 40 | 32 | 24 | 16 | 8 |
| 4 | 56 | 48 | 40 | 32 | 24 | 16 | 8 | 0 |

| SLOPE CODE \ INTERSECTION CODE | 0 | 1 | 2 | 3 | 4 | 5 | 6 | 7 |
|---|---|---|---|---|---|---|---|---|
| 0 | 0.5 | 2 | 4.5 | 6 | 12.5 | 18 | 24.5 | 32 |
| 1 | 0.8 | 3 | 6 | 10 | 18.5 | 24 | 32 | 40 |
| 2 | 1 | 4 | 9 | 16 | 24 | 32 | 40 | 48 |
| 3 | 2 | 8 | 16 | 24 | 32 | 40 | 48 | 56 |
| 4 | 8 | 16 | 24 | 32 | 40 | 48 | 56 | 64 |

DIRECTION = 1

DIRECTION = 5

DIRECTION 1
SLOPE 2

DIRECTION 0
SLOPE 1

DIRECTION 3
SLOPE 3

DIRECTION 2
SLOPE 2

DIRECTION 4
SLOPE 3

DIRECTION 5
SLOPE 3

DIRECTION 6
SLOPE 1

DIRECTION 7
SLOPE 2

FIG. 29A  FIG. 29B
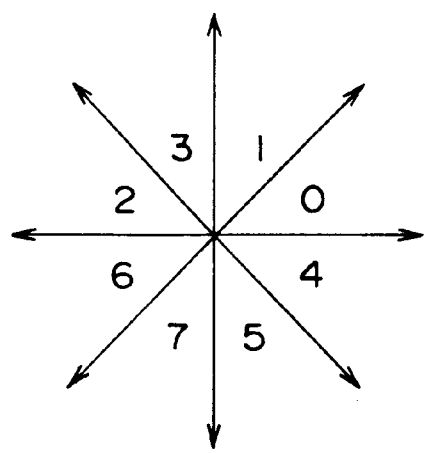
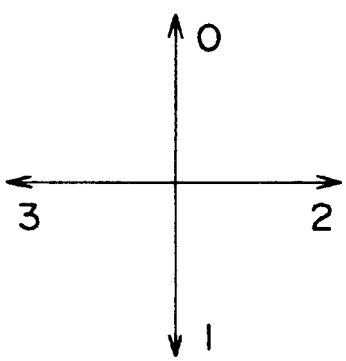
FIG. 30
| DIRECTION | 0 | 1 | 2 | 3 | 4 | 5 | 6 | 7 |
|---|---|---|---|---|---|---|---|---|
| PROCESSING DIRECTION | 1 | 2 | 0 | 2 | 1 | 3 | 0 | 3 |

F I G. 3 2
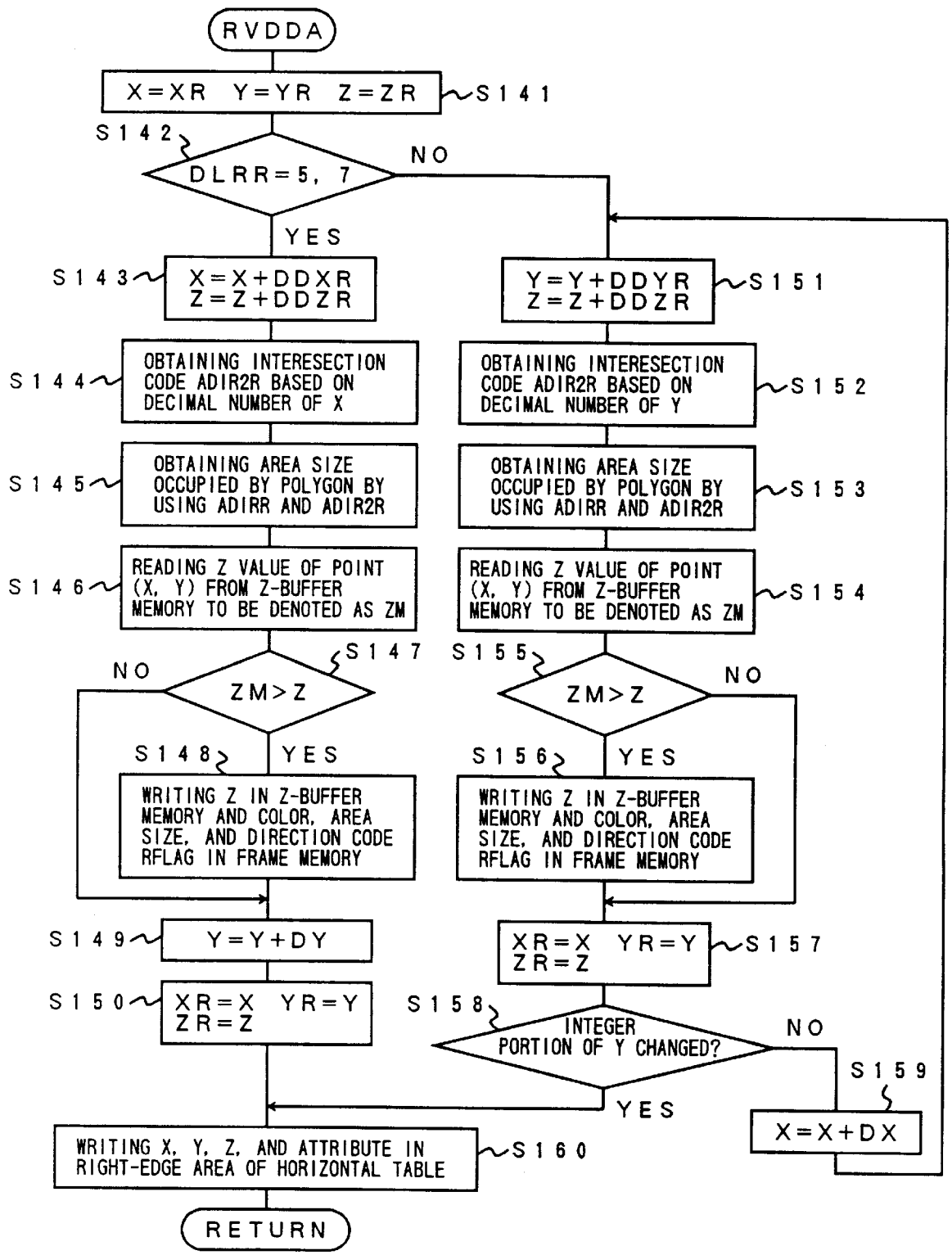

COLOR = (B COLOR × 0.84) + (A COLOR × 0.16)

COLOR = (B COLOR × 0.75) + (A COLOR × 0.25)

F I G. 5 6

| | LEFT EDGE | | | | | | | | RIGHT EDGE | | | | | | | |
|---|---|---|---|---|---|---|---|---|---|---|---|---|---|---|---|---|
| | Xs | Ys | MXs | MYs | Xe | Ye | MXe | MYe | DIRECTION ATTRIBUTE VECTOR | Xs | Ys | MXs | MYs | Xe | Ye | MXe | MYe | DIRECTION ATTRIBUTE VECTOR |
| 0 | | | | | | | | | | | | | | | | | | |
| 1 | | | | | | | | | | | | | | | | | | |

F I G. 6 2

| | LEFT EDGE | | | | RIGHT EDGE | | | |
|---|---|---|---|---|---|---|---|---|
| | X | MX | MY | DIRECTION VECTOR | X | Y | MX | MY | DIRECTION VECTOR | ATTRIBUTE |
| ODD NUMBER | | | | | | | | | |
| EVEN NUMBER | | | | | | | | | |

DIRECTION 0
SLOPE 1
B COLOR=(B COLOR×0.75)+(A COLOR×0.25)

DIRECTION 1
SLOPE 2
B COLOR=(B COLOR×0.25)+(A COLOR×0.75)

FIG. 81

| | LEFT EDGE | | | | | | | | | RIGHT EDGE | | | | | | | | |
|---|---|---|---|---|---|---|---|---|---|---|---|---|---|---|---|---|---|---|
| | Xs | Ys | MXs | MYs | Xe | Ye | MXe | MYe | Is | Ie | DIRECTION ATTRIBUTE VECTOR | Xs | Ys | MXs | MYs | Xe | Ye | MXe | MYe | Is | Ie | DIRECTION ATTRIBUTE VECTOR |
| 0 | | | | | | | | | | | | | | | | | | | | | | |
| 1 | | | | | | | | | | | | | | | | | | | | | | |

FIG. 88

| | LEFT EDGE | | | | | RIGHT EDGE | | | | |
|---|---|---|---|---|---|---|---|---|---|---|
| | X | MX | MY | I | DIRECTION VECTOR | X | Y | MX | MY | I | DIRECTION VECTOR | ATTRIBUTE |
| ODD NUMBER | | | | | | | | | | |
| EVEN NUMBER | | | | | | | | | | |

IMAGE GENERATING DEVICE WITH ANTI-ALIASING FUNCTION

BACKGROUND OF THE INVENTION

1. Field of the Invention

The present invention generally relates to image processing devices, and particularly relates to an image processing device having a function of removing the aliasing generated through sampling of an image.

2. Description of the Prior Art

A wide variety of application fields using computer image generation include designs, games, arts, commercial films, cartoons, simulations, etc. In these application fields, realism is pursued so that a generated image should be as realistic as possible.

Computer-generated images typically have a problem of aliasing, which is generated by digital sampling of an image at a time of model generation or at a time of display on a screen. In the computer-generated images, the aliasing appears as stair-stepped contours of image objects, i.e., so called "jaggies".

Generally, image processing or image generation is carried out at a predetermined coordinate in each pixel of an image. Since a pixel occupies an area of a certain size, processing only at a predetermined coordinate in each pixel will lose some information about the image. For example, a pixel is assigned to a dark tone when the predetermined coordinate in that pixel is dark, even if there is a bright portion in that pixel. This causes the aliasing.

There are various anti-aliasing algorithms for removing the aliasing.

A super-sampling method assigns a plurality of dots such as 4×4 dots, 8×8 dots, or the like of a frame buffer to one pixel of a CRT to draw a picture in the frame buffer. This frame buffer has a memory size 16 times greater, 64 times greater, etc. Then, this method uses an average value of the plurality of dots for a corresponding dot of the CRT.

A filtering method removes the aliasing by filtering images.

Other methods include a method of calculating an area occupied by a given object in a given pixel by clipping the object within the pixel, and a method of calculating area proportions of objects in a given pixel by using auxiliary scan lines called sub scan lines.

Further another anti-aliasing method is disclosed in the Japanese Patent Laid-Open Application No.3-139774. This anti-aliasing method applies a filtering operation to discontinuity regions in a Z buffer, thereby avoiding blurring of an entire image. Namely, this method is an augmented version of the filtering method described above.

Also, there are anti-aliasing methods used in texture mapping. These methods include a method of integrating colors of mapping patterns in one dot of the screen, a method of sampling a plurality of mapping-pattern colors with equal intervals for one dot of the screen, and a method of sampling a plurality of mapping-pattern colors at random for one dot of the screen.

The super-sampling method described above generates a high-quality image at an expense of device costs. That is, when one dot is comprised of 8×8 dots, for example, the memory volume of the frame buffer becomes 64 times as large. Such an increase in the memory volume makes the image processing device costly.

The filtering method has a problem in that an entire image is blurred through the filtering process.

The method of applying a filtering operation to a Z buffer needs a mask memory for storing the discontinuity regions detected in the Z buffer. The use of the mask memory leads to an increase in the cost. Also, a differential filter needs to be applied to the entire image to detect the discontinuity regions, so that a performance in terms of a drawing speed is deteriorated.

Accordingly, there is a need for an image generation device which can remove the aliasing without an increase in memory and a decrease in a drawing speed.

SUMMARY OF THE INVENTION

Accordingly, it is a general object of the present invention to provide an image generation device which can satisfy the need described above.

Also, it is another and more specific object of the present invention to provide an image generation device which can remove the aliasing without an increase in memory and a decrease in a drawing speed.

In order to achieve the above objects according to the present invention, a device for generating an image comprising polygons having polygon edges and a reduced aliasing effect on the polygon edges is provided. The device includes a drawing processing unit for obtaining a color of a given dot, an area size occupied by one of the polygons in the given dot, and a direction code indicating a direction of an adjacent dot relative to the given dot, a frame-memory unit for storing the color, the area size, and the direction code for each dot of the image, and a display processing unit for combining the color of the given dot and a color of the adjacent dot indicated by the direction code with a ratio corresponding to the area size to obtain a color to be displayed for the given dot in the image.

In the above device, the drawing processing unit includes a unit for obtaining a slope and the direction code of one of the polygon edges, a DDA calculating unit for obtaining a coordinate of an intersection where the one of the polygon edges crosses one of edges of the given dot, and a dot-area processing unit for obtaining the area size of the given dot based on the slope and the coordinate of the intersection.

In the device according to the present invention, the area size of the given dot is obtained by using the slope and the coordinate of the intersection. The slope and the coordinate of the intersection can be quantized and converted into codes. Then, a table storing different area sizes calculated for different codes in advance can be used to quickly obtain an area size without requiring extraneous computation. Thus, the present invention can provide an image generation device which can remove the aliasing without an increase in memory and a decrease in a drawing speed.

Other objects and further features of the present invention will be apparent from the following detailed description when read in conjunction with the accompanying drawings.

BRIEF DESCRIPTION OF THE DRAWINGS

FIG. 6 is a table used for classifying each edge of a polygon into either a right edge or a left edge;

FIGS. 7A through 7C are illustrative drawings showing examples of polygons;

FIGS. 8A through 8C are illustrative drawings showing pairs of polygon edges with vectors directed upward being reversed;

FIG. 9 is a table of the vectors shown with respect to the reversing of a direction and a classification into the right edge or the left edge;

FIG. 10 is an illustrative drawing showing a data format of an edge storing table of FIG. 2;

FIG. 15 is a chart showing an example of a structure of a horizontal table of FIG. 2;

FIG. 16 is a circuit diagram of an example of a dot-area processing unit of FIG. 2;

FIG. 17 is an illustrative drawing showing an example of the quantizing and coding of slopes;

FIGS. 22A and 22B are tables for obtaining an area size based on the slope code and the intersection code;

FIGS. 29A and 29B are illustrative drawings showing direction vectors and direction codes, respectively;

FIG. 30 is a table showing a relation between the direction vectors (directions of vectors) and the direction codes (direction of anti-aliasing);

FIG. 32 is a flowchart of a subroutine process RVDDA;

FIG. 56 is a chart showing a configuration of an edge storing table of FIG. 54;

FIG. 62 is a chart showing an example of a structure of a horizontal table of FIG. 54;

FIG. 81 is a chart showing a configuration of an edge storing table of FIG. 79;

FIG. 88 is a chart showing an example of a structure of a horizontal table of FIG. 79;

DESCRIPTION OF THE PREFERRED EMBODIMENTS

In the following, embodiments of the present invention will be described with reference to the accompanying drawings.

Figure 1:
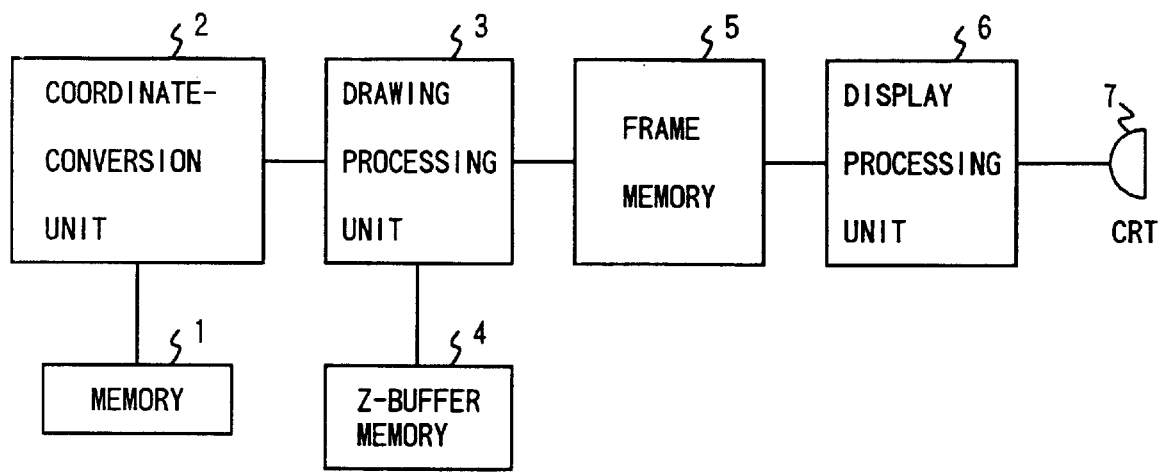
FIG. 1 is a block diagram of an image generation device according to a first embodiment of the present invention.

FIG. 1 is a block diagram of an image generation device according to a first embodiment of the present invention.

The image generation device of FIG. 1 includes a memory 1, a coordinate-conversion unit 2, a drawing processing unit 3, a Z-buffer memory 4, a frame memory 5, a display processing unit 6, and a CRT 7.

The memory 1 stores apexes and normal vectors of polygons constituting objects to be drawn. The data of the polygons is provided from the memory 1 to the coordinate-conversion unit 2. The coordinate-conversion unit 2 includes a CPU (central processing unit) or a DSP (digital signal processor), and calculates rotation, enlargement, contraction, etc. of the objects to arrange the objects in the world coordinates. Then, the coordinate-conversion unit 2 performs the view conversion to project the objects on to a screen. Data of the polygons projected onto the screen by the coordinate-conversion unit 2 is supplied to the drawing processing unit 3.

The drawing processing unit 3 carries out a hidden-surface processing by comparing Z values of the polygons with Z values of dots stored in the Z-buffer memory 4. Also, the drawing processing unit 3 calculates an area size occupied by the polygons in each dot, and stores the area size in the frame memory 5.

Figure 2:
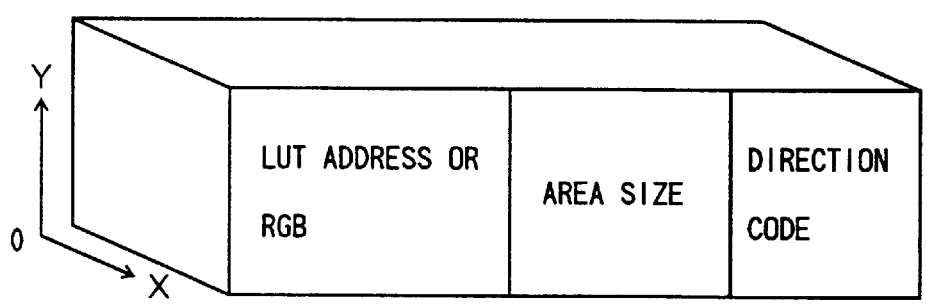
FIG. 2 is an illustrative drawing showing data stored in frame memory of FIG. 1.

FIG. 2 is an illustrative drawing showing data stored in the frame memory 5. As shown in FIG. 2, the frame memory 5 stores color components (R, G, B) or a corresponding address of a LUT (look up table), a dot-area size, and a direction code representing a direction of the anti-aliasing for each dot. The direction code representing a direction of the anti-aliasing is determined based on a direction vector of each edge of the polygons.

The display processing unit 6 determines the color of a dot based on the colors or the LUT addresses, the dot-area size, and the direction code stored in the frame memory 5, and sends the obtained color to the CRT 7. The CRT 7 displays an image.

Figure 3:
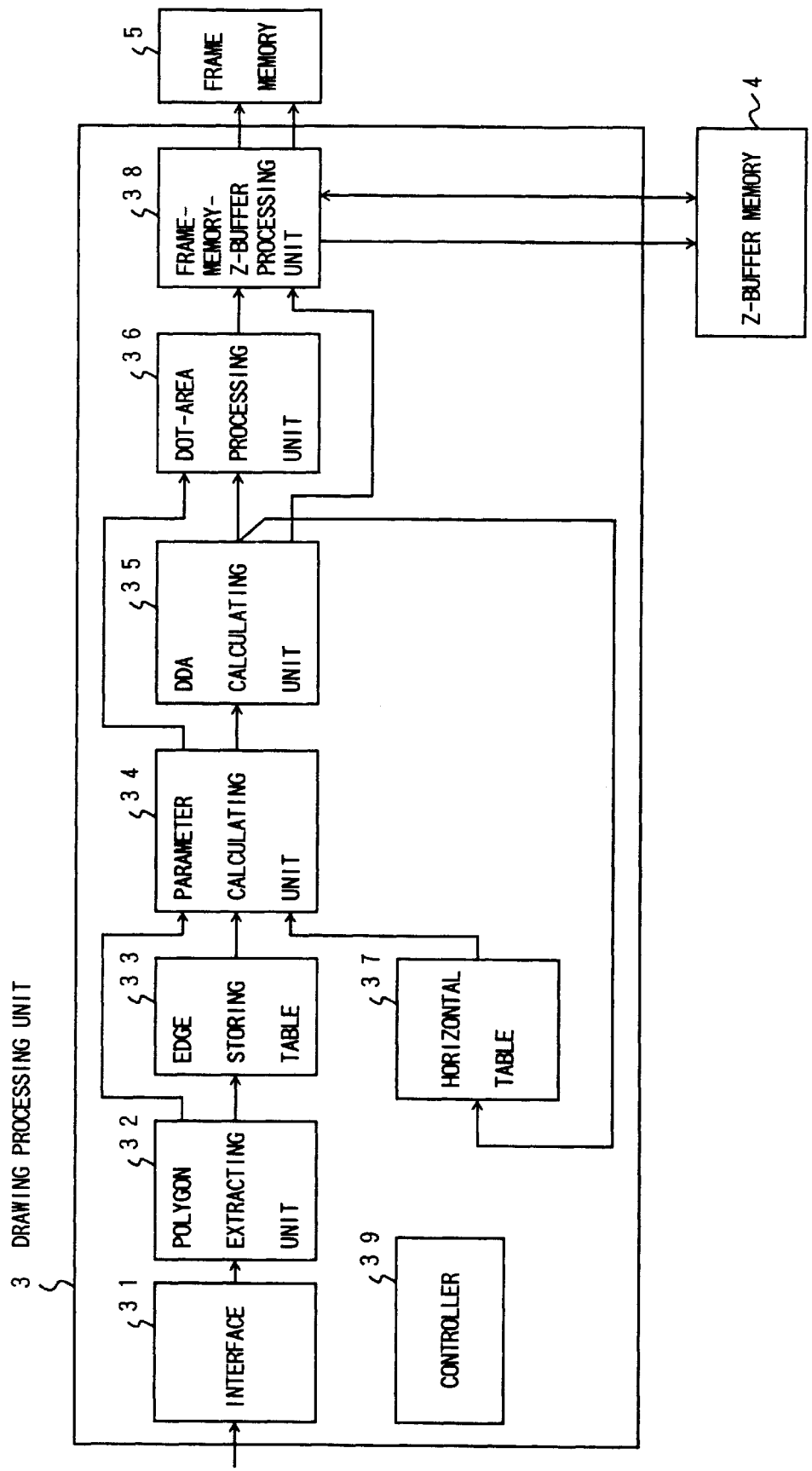
FIG. 3 is a block diagram of an example of a drawing processing unit of FIG. 1.

FIG. 3 is a block diagram of an example of the drawing processing unit 3. The drawing processing unit 3 includes an interface 31, a polygon extracting unit 32, an edge storing table 33, a parameter calculating unit 34, a DDA calculating unit 35, a dot-area processing unit 36, a horizontal table 37, a frame-memory-Z-buffer processing unit 38, and a controller 39.

The interface 31 receives data such as X, Y, and Z coordinates of apexes of the polygons from the coordinate-conversion unit 2. That is, the interface 31 handles the data transfer between the coordinate-conversion unit 2 and the drawing processing unit 3. The data provided from the coordinate-conversion unit 2 is supplied to the polygon extracting unit 32 via the interface 31.

The polygon extracting unit 32 modifies and rearranges information about the polygon edges for convenience of later processing, and stores the modified and rearranged information in the edge storing table 33.

Figure 4:
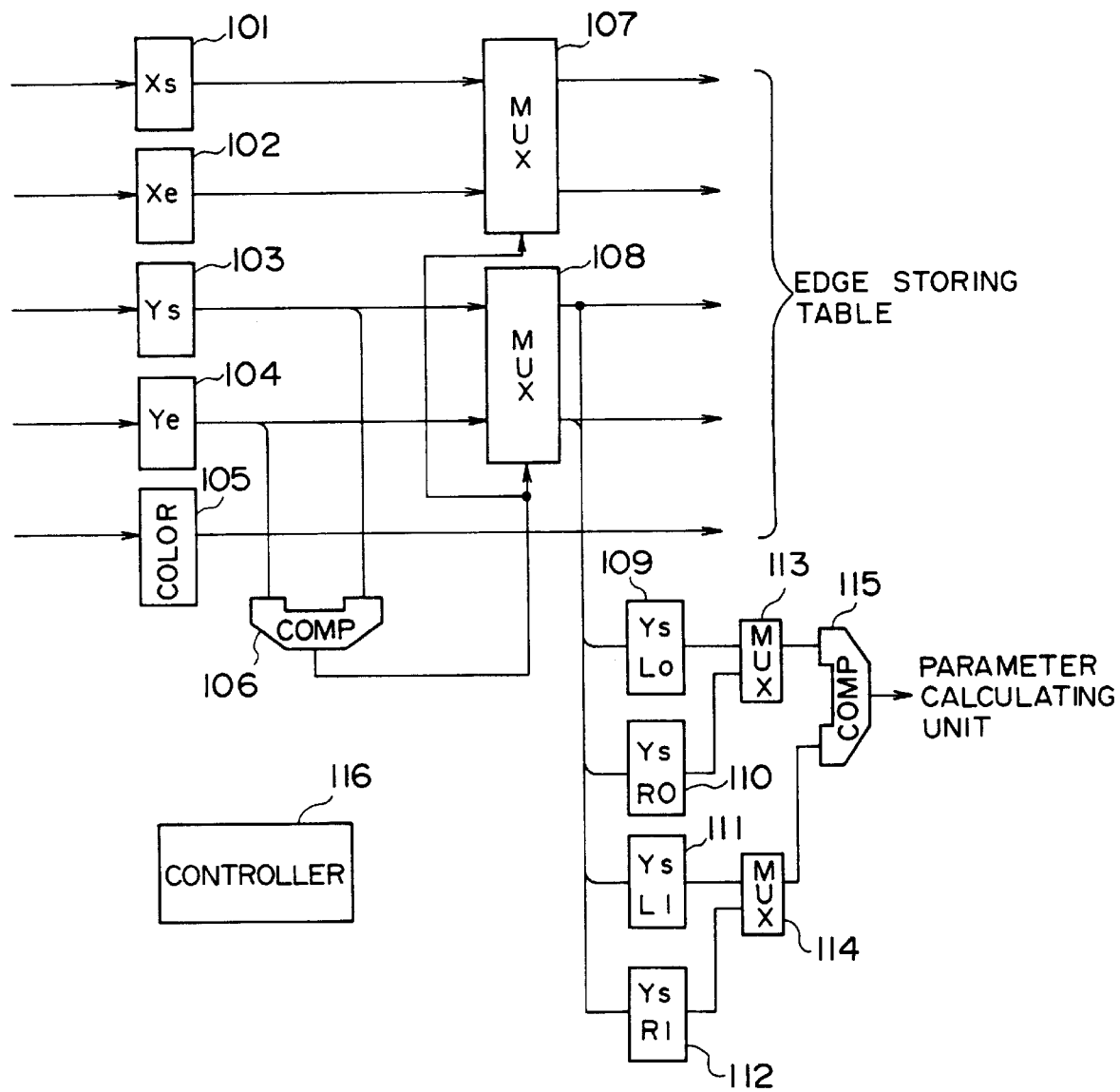
FIG. 4 is a circuit diagram of an example of a polygon extracting unit of FIG. 2.

FIG. 4 is a circuit diagram of an example of the polygon extracting unit 32.

The polygon extracting unit 32 receives X, Y, and Z coordinates, colors, attributes, etc., of the apexes of the polygons from the interface 31. Each edge of the polygons defined by these apexes has an X-start point (X coordinate of the start point) Xs, a Y-start point (Y coordinate of the start point) Ys, X-end point (X coordinate of the end point) Xe, and a Y-end point (Y coordinate of the end point) Ye. The X-start point Xs, the X-end point Xe, the Y-start point Ys, and the Y-end point Ye are stored in registers 101 through 104, respectively. Also, a color or an LUT address of a corresponding edge is stored in a color register 105.

Figure 5:
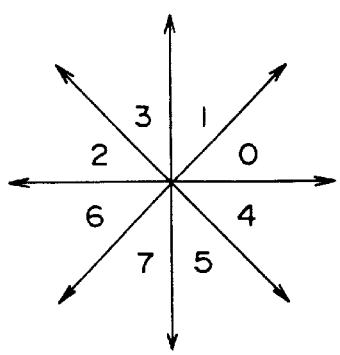
FIG. 5 is an illustrative drawing showing directions of vectors.

A controller 116 determines which direction is indicated by a vector representing each edge of the polygon. FIG. 5 is an illustrative drawing showing directions of the vector. Based on the direction of the vector, the controller 116 determines whether the corresponding edge of the polygon is the right edge or the left edge. FIG. 6 is a table used for classifying each edge of the polygon into either the right edge or the left edge.

In the first embodiment, processing is carried out with an assumption that all vectors are directed downward. Thus, polygons shown in FIGS. 7A and 7B are processed to obtain pairs of vectors shown in FIGS. 8A and 8B, with vectors directed upward being reversed. As for polygons as shown in FIG. 7C, the polygons are divided such that two pairs of vectors are obtained as shown in FIG. 8C, with vectors directed upward being reversed.

The reversing process of vectors is carried out as follows. Ys and Ye stored in the registers 103 and 104, respectively, are provided to a comparator 106. The comparator 106 compares Ys with Ye, and controls multiplexers 107 and 108 based on a result of the comparison. That is, the multiplexers 107 and 108 are controlled based on whether the edge should be reversed. When the edge should be reversed, the multiplexers 107 and 108 exchange the start point with the end point to send the data of the edge to the edge storing table 33. When there is no need to reverse the edge, the multiplexer 107 and 108 send to the edge storing table 33 the data provided from the interface 31 without changing the data.

FIG. 9 is a table of the vectors shown with respect to the reversing of the direction and the classification into the right edge or the left edge. As shown in the figure, even when a vector directed upward is reversed by exchanging the start point with the end point, the classification of either the right edge or the left edge will not change.

The multiplexers 107 and 108 are also controlled by the controller 116 such that edges are classified into either the right edge or the left edge when stored in the edge storing table 33. FIG. 10 is an illustrative drawing showing a data format of the edge storing table 33. As shown in the figure, right edges and left edges are stored separately in the edge storing table 33.

Still referencing to FIG. 4, the Y-start point Ys of an edge, to be stored at left-edge address 0 in the edge storing table 33, is stored in a register 109 from the multiplexer 108. The Y-start point Ys of an edge, to be stored at right-edge address 0 in the edge storing table 33, is stored in a register 110 from the multiplexer 108. The Y-start point Ys of an edge, to be stored at left-edge address 1 in the edge storing table 33, is stored in a register 111 from the multiplexer 108. Also, the Y-start point Ys of an edge, to be stored at right-edge address 1 in the edge storing table 33, is stored in a register 112 from the multiplexer 108.

The Y-start points stored in the registers 109 and 110, which are stored in left-edge address 0 and right-edge address 0 of the edge storing table 33, respectively, are supplied to a comparator 115 via a multiplexer 113. Also, the Y-start points stored in the registers 111 and 112, which are stored in left-edge address 1 and right-edge address 1 of the edge storing table 33, respectively, are supplied to the comparator 115 via a multiplexer 114. With respect to either one of the right edge or the left edge according to control of the multiplexers 113 and 114, the comparator 115 compares the Y-start point of address 0 with the Y-start point of address 1. Thus, the comparator 115 determines which one of the two edges stored in address 0 and address 1 is higher in the Y coordinate, and provides a result of the comparison to the parameter calculating unit 34. The above-mentioned elements of FIG. 4 are controlled by the controller 116.

The parameter calculating unit 34 also receives data from the edge storing table 33 and the horizontal table 37. A detailed description of the horizontal table 37 will be provided later.

Figure 11:
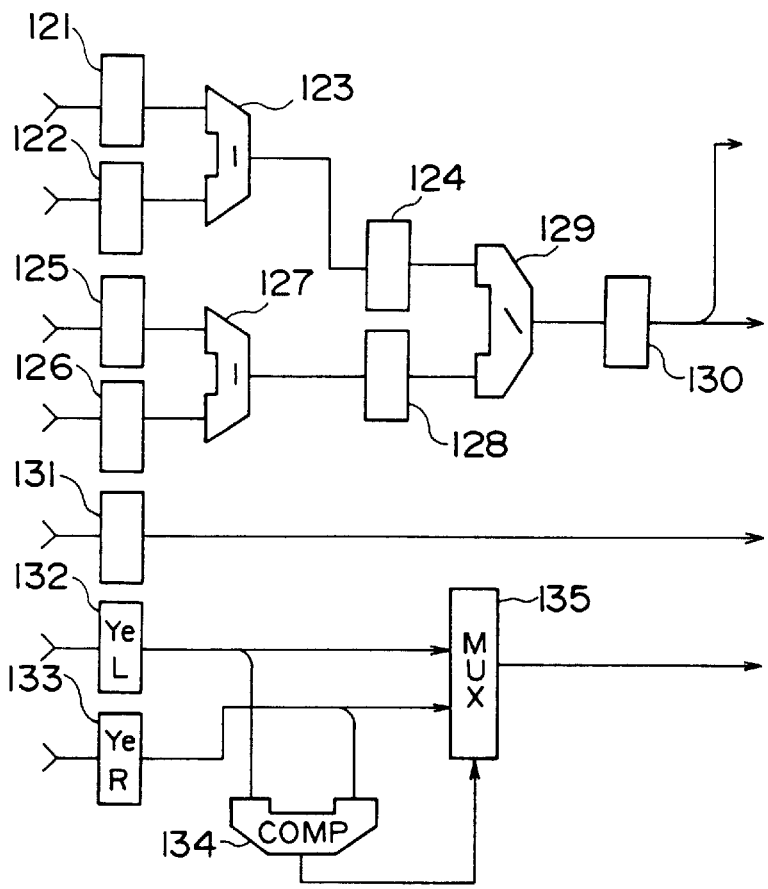
FIG. 11 is a circuit diagram of an example of a parameter calculating unit of FIG. 2.

The parameter calculating unit 34 calculates slopes of the right edges and the left edges of the polygons, and calculates slopes of Z values at intersections of a scan line with the right edges and the left edges. These slopes are used as parameters in the DDA (digital differential analysis) by the DDA calculating unit 35. FIG. 11 is a circuit diagram of an example of the parameter calculating unit 34.

The parameter calculating unit 34 may be used for calculating an X slope for a major axis Y (dx/dy), a Z slope for a major axis Y (dz/dy), a Y slope for a major axis X (dy/dx), or a Z slope for a major axis X (dz/dx). What is calculated by the parameter calculating unit 34 for a given edge depends on a direction and a classification (right edge or left edge) of the edge. The following description will be provided by using a term "slope axis" for an axis for which the slope is to be calculated (e.g., the X axis is the slope axis when an X slope is to be calculated).

In the parameter calculating unit 34 of FIG. 11, registers 121 and 122 store a slope-axis coordinate of a start point and a slope-axis coordinate of an end point, respectively, of a given edge provided from the edge storing table 33. A subtracter 123 receives the slope-axis coordinate of the start point and the slope-axis coordinate of the end point from the registers 121 and 122, respectively, to calculate a difference between the two slope-axis coordinates. The difference of the given edge is supplied to a register 124.

Registers 125 and 126 store a major-axis coordinate of the start point and a major-axis coordinate of the end point of the given edge provided from the edge storing table 33. A subtracter 127 receives the major-axis coordinate of the start point and the major-axis coordinate of the end point from the registers 125 and 126, respectively, to calculate a difference between the two major-axis coordinates. This difference is provided for a register 128.

A divider 129 receives these differences from the register 124 and the register 128, and divides the difference in the slope axis by the difference in the major axis to obtain a slope of the given edge. The slope thus obtained is stored in a register 130, and, then, sent to the DDA calculating unit 35.

A register 132 stores the Y-end point of a left edge, and a register 133 stores the Y-end point of a right edge. The Y-end points stored in the registers 132 and 133 are sent to a comparator 134 and a multiplexer 135. The comparator 134 compares the Y-end points between the left edge and the right edge, and controls the multiplexer 135 based on a result of the comparison. The multiplexer 135 sends to the DDA calculating unit 35 the smallest one of the Y-end point of the left edge and the Y-end point of the right edge.

A register 131 stores various parameters sent from the edge storing table 33. These parameters are supplied to the DDA calculating unit 35.

Some of the parameters calculated by the parameter calculating unit 34 as described above are sent to the dot-area processing unit 36 as well as to the DDA calculating unit 35.

The DDA calculating unit 35 calculates X, Y, and Z values of the polygon edges through the digital differential analysis (DDA). For example, the DDA calculating unit 35 calculates X values of a left edge and a right edge through the DDA each time a Y value is incremented (or decreased). After carrying out the DDA for the left edge, the DDA calculating unit 35 stores the values calculated for the left edge in the horizontal table 37. Then, the DDA calculating unit 35 carries out the DDA for the right edge to store the calculated values in the horizontal table 37. The horizontal table 37 also stores other parameters such as colors or LUT addresses, attributes, etc.

Figure 12:
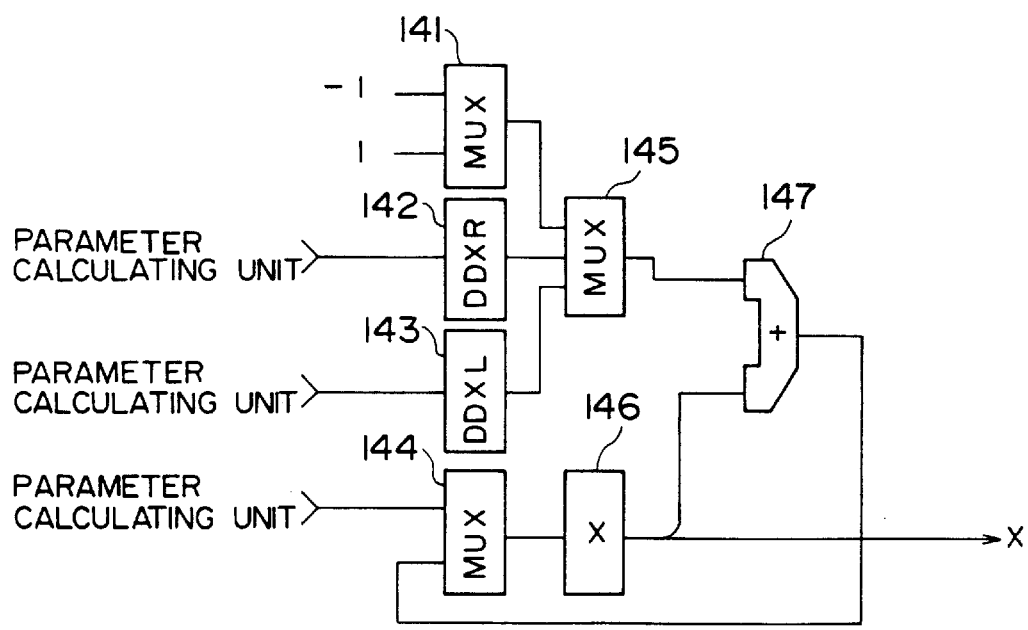
FIG. 12 is a circuit diagram of an example of a DDA calculating unit 35 of FIG. 2 when the X axis is a slope axis.
Figure 13:
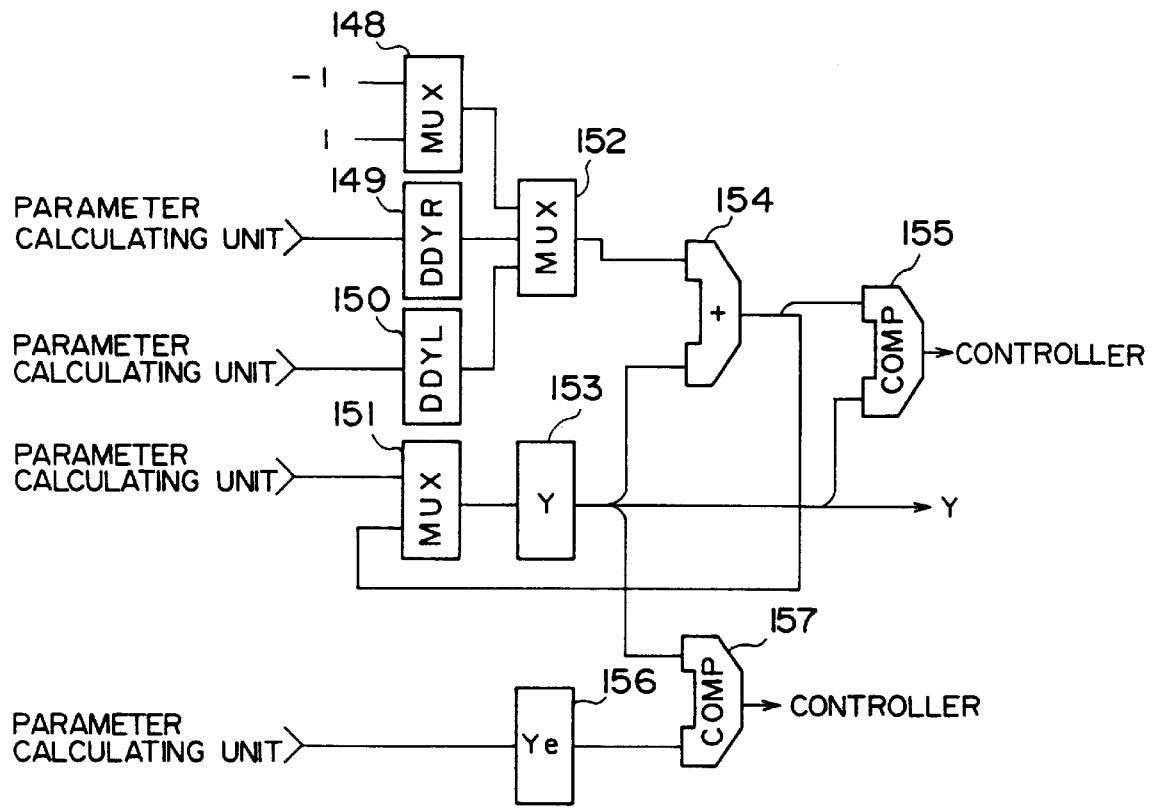
FIG. 13 is a circuit diagram of an example of the DDA calculating unit when the Y axis is a slope axis.
Figure 14:
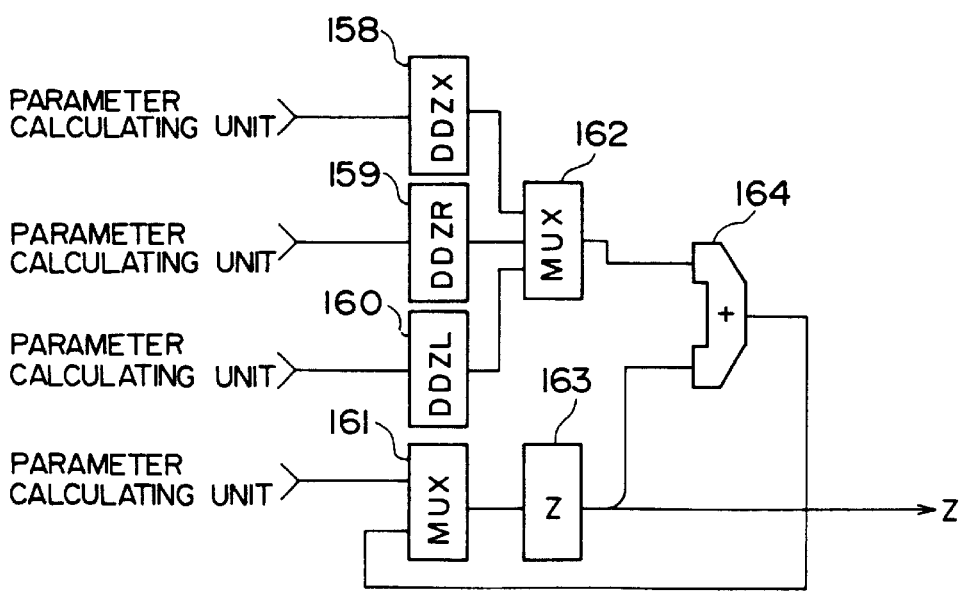
FIG. 14 is a circuit diagram of an example of the DDA calculating unit when the Z axis is a slope axis.

FIG. 12 is a circuit diagram of an example of the DDA calculating unit 35 when the X axis is the slope axis. FIG. 13 is a circuit diagram of an example of the DDA calculating unit 35 when the Y axis is the slope axis. FIG. 14 is a circuit diagram of an example of the DDA calculating unit 35 when the Z axis is the slope axis.

In the DDA calculating unit 35 of FIG. 12 used for the X slope, a multiplexer 141 is provided with data of −1 and 1. Either one of −1 or 1 is provided from the multiplexer 141 to a multiplexer 145. A register 142 stores the X slope of a right edge provided from the parameter calculating unit 34, and a register 143 stores the X slope of a left edge provided from the parameter calculating unit 34. The multiplexer 145 selects one of the multiplexer 141, the register 142, and the register 143 to supply an output thereof to an adder 147. The output from the multiplexer 141 is selected when the X axis is a major axis. Either one of the X slope of the left edge or the X slope of the right edge is selected when the DDA is applied to an X value.

A multiplexer 144 receives an X value sent from the parameter calculating unit 34 and an X value calculated by the adder 147. One of these X values is selected by the multiplexer 144 to be stored in a register 146. The adder 147 adds either one of −1 or 1 or the X slope provided from the multiplexer 145 to the X value stored in the register 146. In this manner, the X values of various points along the left edge or the right edge are calculated successively. The X value stored in the register 146 is supplied to the dot-area processing unit 36.

In the DDA calculating unit 35 of FIG. 13 used for the Y slope, a multiplexer 148 is provided with data of −1 and 1. Either one of −1 or 1 is provided from the multiplexer 148 to a multiplexer 152. A register 149 stores the Y slope of a right edge provided from the parameter calculating unit 34, and a register 150 stores the Y slope of a left edge provided from the parameter calculating unit 34. The multiplexer 152 selects one of the multiplexer 148, the register 149, and the register 150 to supply an output thereof to an adder 154. The output of the multiplexer 148 is selected when the Y axis is a major axis. Either one of the Y slope of the left edge or the Y slope of the right edge is supplied to the adder 154.

A multiplexer 151 receives a Y value sent from the parameter calculating unit 34 and a Y value calculated by the adder 154. One of these Y values is selected by the multiplexer 151 to be stored in a register 153. The adder 154 adds either one of −1 or 1 or the Y slope provided from the multiplexer 152 to the Y value stored in the register 153. In this manner, the Y values of various points along the left edge or the right edge are calculated successively. The Y value stored in the register 153 is supplied to the dot-area processing unit 36.

A register 156 stores the Y value of the end point obtained by the parameter calculating unit 34 for a pair of the left edge and the right edge. A comparator 157 compares the Y value stored in the register 156 with the Y value stored in the register 153. A result of the comparison is sent to a controller for controlling the DDA process. Based on the result of the comparison, it is determined whether to continue or to end the DDA process.

A comparator 155 compares the Y value stored in the register 153 with the output of the adder 154. The comparator 155 sends a result of the comparison to the controller. Based on the result of the comparison, it is determined whether the last integer digit of the Y value is changed.

In the DDA calculating unit 35 of FIG. 14 used for the Z slope, a register 158 stores a Z slope for the major axis X. A register 159 stores the Z slope of a right edge provided from the parameter calculating unit 34, and a register 160 stores the Z slope of a left edge provided from the parameter calculating unit 34. The multiplexer 162 selects one of the registers 158 through 160 to supply an output thereof to an adder 164. That is, one of the Z slope for the major axis X, the Z slope of the left edge, and the Z slope of the right edge is supplied to the adder 164.

A multiplexer 161 receives a Z value sent from the parameter calculating unit 34 and a Z value calculated by the adder 164. One of these Z values is selected by the multiplexer 161 to be stored in a register 163. The adder 164 adds the Z slope provided from the multiplexer 162 to the Z value stored in the register 163. In this manner, the Z values of various points along the left edge or the right edge are calculated successively. The Z value stored in the register 163 is supplied to the dot-area processing unit 36.

The data calculated by the parameter calculating unit 34 and the DDA calculating unit 35 is supplied to the dot-area processing unit 36. The dot-area processing unit 36 receives the slopes of the right edges and the left edges from the parameter calculating unit 34, and receives the X values and the Y values from the DDA calculating unit 35. Based on the slopes and the X and Y values, the dot-area processing unit 36 calculates an area size occupied by a polygon in each dot.

FIG. 15 is a chart showing an example of a structure of the horizontal table 37. As shown in the figure, the horizontal table 37 temporarily stores an X value, a Z value, and a color for each of the left edge and the right edge. These values of the left edge and the right edge are those at intersections of a current scan line with the left edge and the right edge. When all the data is stored in the horizontal table 37, the data is sent to the parameter calculating unit 34 to calculate parameters needed for DDA calculations in a horizontal direction.

FIG. 16 is a circuit diagram of an example of the dot-area processing unit 36. The dot-area processing unit 36 in FIG.

16 includes quantizing circuits 171 and 172, registers 173 through 176, multiplexers 177 and 178, a register 179, a quantizing circuit 180, and a register 181.

Figures 18, 19, 20:
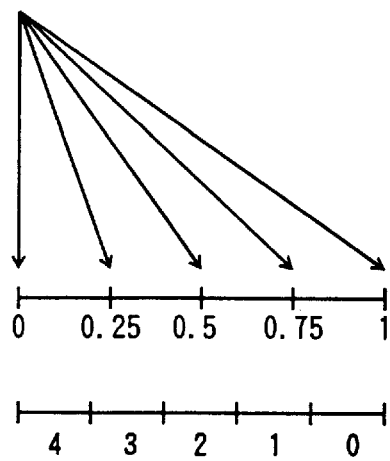
FIG. 18 is an illustrative drawing showing another example of the quantizing and coding of the slopes.
FIG. 19 is a table showing a relation between decimals of an X or Y value and codes assigned thereto.
FIG. 20 is a table showing flags used for calculating an area occupied by a polygon in a given dot.

The slopes sent from the parameter calculating unit 34 are provided for the quantizing circuit 171 comprising PAL (programmable arrayed logic) or ROM (random access memory). The quantizing circuit 171 quantizes the slopes of polygon edges to assign slope codes to the slopes. FIG. 17 is an illustrative drawing showing an example of the quantizing and coding of the slopes. FIG. 18 is an illustrative drawing showing another example of the quantizing and coding of the slopes. In FIG. 17, when a slope is 0.1, for example, the slope code for this slope is 4. The slope code for the left edge is stored in the register 173, and the slope code for the right edge is stored in the register 174.

The quantizing circuit 172 comprising a PAL or a ROM receives decimal numbers of the X and Y values from the DDA calculating unit 35. Here, each dot on the screen is a rectangle having a unit area size, i.e., an area size of 1×1. Thus, the decimal numbers of the X values calculated for a given polygon edge indicate where the given polygon edge intersects X edges of dots. For example, when a decimal number of the given polygon edge is 0.5 for a given dot, the given polygon edge crosses an X edge of the given dot at a half point thereof. In the same manner, the decimal numbers of the Y values calculated for a given polygon edge indicate where the given polygon edge intersects Y edges of dots. For example, when a decimal number of the given polygon edge is 0.2 for a given dot, the given polygon edge crosses a Y edge of the given dot at a point dividing the Y edge in a ratio of 0.2 to 0.8.

The quantizing circuit 172 quantizes and encodes the intersections of the polygon edges with the edges of the dots. FIG. 19 is a table showing a relation between decimals of an X or Y value and codes assigned thereto. Two coding schemes are provided in FIG. 19, as indicated by a flag L taking a value 0 or 1. One of these two coding schemes is used depending on a direction of a given polygon edge. FIG. 20 is a table showing flags used for calculating an area occupied by a polygon in a given dot. Two flags M and L are provided for each of the directions of polygon edges, and the flag L is used in FIG. 19 for determining the coding scheme.

Meanings of the two flags M and L will be explained below. FIGS. 21A through 21I are illustrative drawings for explaining combinations of the slope code and the intersection code.

Figure 21A:
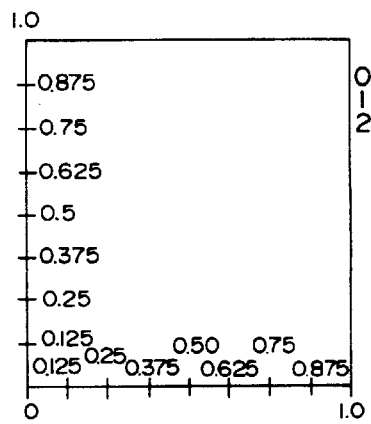
FIGS. 21A through 21I are illustrative drawings for explaining combinations of a slope code and an intersection code.
Figure 21B:
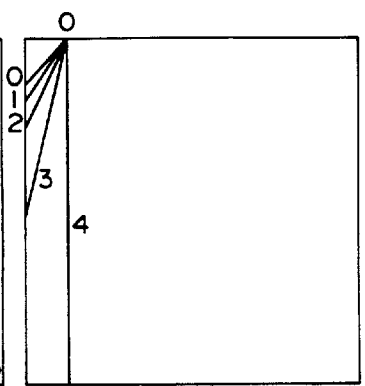

As shown in FIG. 21A, each side of a dot has a range between 0.0 and 1.0, and the intersection codes of FIG. 19 are assigned in this range with equal intervals. FIGS. 21B through 21I show various combinations of the slope code and the intersection code. In FIGS. 21B through 21I, a coding scheme of FIG. 19 corresponding to L equal to 1 is used. In FIGS. 21B, the intersection code is 0 as indicated by a numeral at the top of a dot square, and five different slopes are shown inside the dot square. Each of the five different slopes has a slope code shown nearby. FIGS. 21C through 21I are the same as FIG. 21B, but correspond to the intersection codes of 1 through 7, respectively.

By using the combinations of the slope code and the intersection code, tables for obtaining the area size based on these two codes are calculated. FIGS. 22A and 22B are the tables for obtaining the area size based on the slope code and the intersection code. The table of FIG. 22A is used when the flag M is 0, and the table of FIG. 22B is used when the flag M is 1.

The table of FIG. 22A is obtained by calculating an area size on the right side of a given slope. That is, when the intersection code is 0, for example, an area size on the right side of the slope having a slope code of 0 in FIG. 21B is calculated as 63.5. (A size of one dot is assumed to be 64 for simplicity of explanation.) This area size 63.5 is shown in the table of FIG. 22A for an intersection code of 0 and a slope code of 0. In the same manner, an area size on the right side of each slope in FIG. 21B is calculated, and is shown in the table of FIG. 22A for an intersection code of 0 and slope codes of 0 through 4. By using FIGS. 21B through 21I, all the entries in the table of FIG. 22A are calculated.

On the other hand, the table of FIG. 22B is obtained by calculating an area size on the left side of a given slope. That is, when the intersection code is 0, for example, an area size on the left side of the slope having a slope code of 0 in FIG. 21B is calculated as 0.5. This area size 0.5 is shown in the table of FIG. 22B for an intersection code of 0 and a slope code of 0. In the same manner, an area size on the left side of each slope in FIG. 21B is calculated, and is shown in the table of FIG. 22B for an intersection code of 0 and slope codes of 0 through 4. By using FIGS. 21B through 21I, all the entries in the table of FIG. 22B are calculated.

As described above, the tables of FIGS. 22A and 22B list area sizes obtained by using the combinations of the slope code and the intersection code without taking into account a direction of a given edge. However, these tables can be used for an edge of any direction by using the two flags M and L.

Figure 21F:
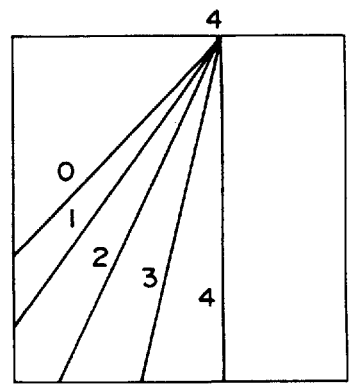
Figure 21C:
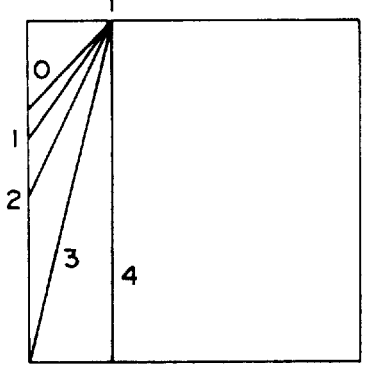
Figure 23A:
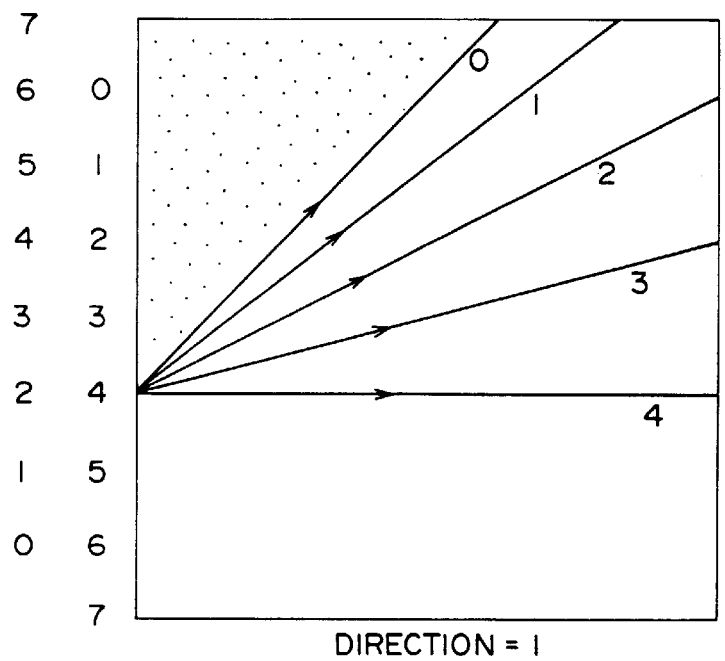
FIGS. 23A and 23B are illustrative drawings showing calculations of dot areas for a direction of 1 and a direction of 5, respectively.
Figure 23B:
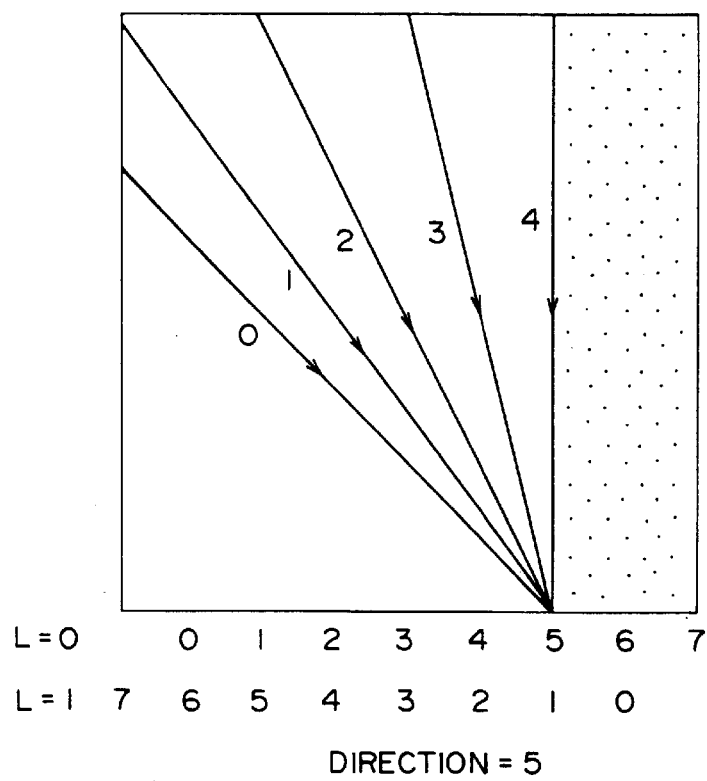

FIGS. 23A and 23B are illustrative drawings showing calculations of dot areas for a direction of 1 and a direction of 5, respectively. In FIG. 23A, five different slopes for the direction of 1 are shown. Since an edge having the direction of 1 is an edge on the right-hand side of a polygon, an area for an area-size calculation must be on the left-hand side of the slopes. Thus, when a slope code is 0, for example, an area size shown by a dotted region in FIG. 23A should be calculated. Among FIGS. 21B through 21I, a combination of the slope code and the intersection code corresponding to that of FIG. 23A is FIG. 21F. In FIG. 21F, the area size equivalent to that of the dotted region of FIG. 23A is the area on the left side of the slope with a slope code of 0. Thus, the flag M is 1, and the table of FIG. 22B is used for obtaining the area size. As can be seen by comparing FIG. 23A with FIG. 21F, the flag L should be 1 so that the intersection code becomes 4 in FIG. 23A as in FIG. 21F. The selection of the flag L depends on whether FIG. 23A is a mirror image of FIG. 21F. If it is a mirror image, the flag L should be 1 as in this case.

Figure 21G:
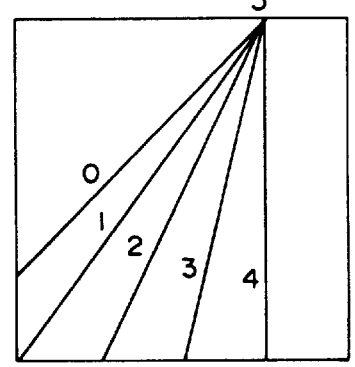
Figure 21D:
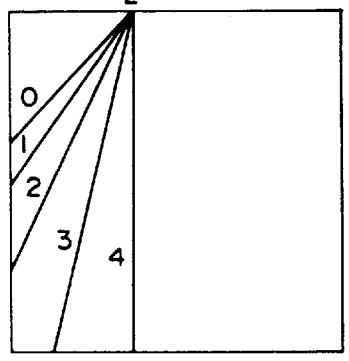
Figure 21H:
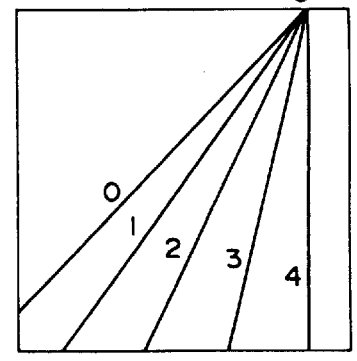
Figure 21E:
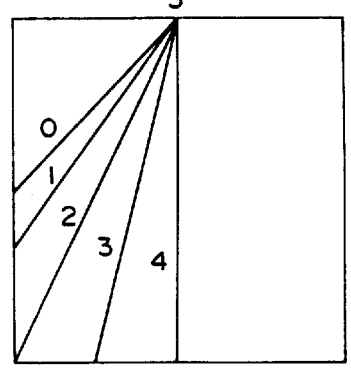
Figure 21I:
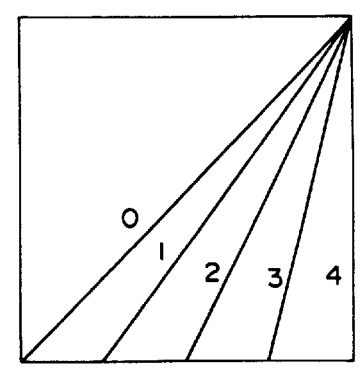

In FIG. 23B, five different slopes for the direction of 5 are shown. Since an edge having the direction of 5 is an edge on the left-hand side of a polygon, an area for an area-size calculation must be on the right-hand side of the slopes. Thus, when a slope code is 4, for example, an area size shown by dotted region in FIG. 23B should be calculated. Among FIGS. 21B through 21I, a combination of the slope code and the intersection code corresponding to that of FIG. 23B is FIG. 21G. In FIG. 21G, the area size equivalent to that of the dotted region of FIG. 23B is the area on the right side of the slope with a slope code of 4. Thus, the flag M is 0, and the table of FIG. 22A is used for obtaining the area size. As can be seen by comparing FIG. 23B with FIG. 21G, the flag L should be 0 so that the intersection code becomes 5 in FIG. 23B as in FIG. 21G.

As described above, both of the flags M and L are 1 for the direction of 1, and both of the flags M and L are 0 for the direction of 5. In the same manner, the flags M and L can be determined for each direction as shown in FIG. 20, and a coding scheme corresponding to the flag L is used as shown in FIG. 19. In this manner, the tables of FIGS. 22A and 22B can be used for an edge of any direction.

With reference to FIG. 16 again, the intersection code for the left edge is stored in the register 175, and the intersection code for the right edge is stored in the register 176.

The slope codes stored in the registers 173 and 174 are provided for the multiplexer 177, and the intersection codes stored in the registers 175 and 176 are supplied to the multiplexer 178. The multiplexers 177 and 178 are switched to select one of the two inputs each time the processing is switched between the right edge and the left edge. The register 179 receives a slope code and an intersection code from the multiplexers 177 and 178, respectively. The register 179 provides the quantizing circuit 180 comprising a PAL or a ROM with the slope code and the intersection code as an address thereof. The quantizing circuit 180 stores the tables of area sizes (FIGS. 22A and 22B) for providing an area size occupied by a polygon in a given dot according to the slope code and the intersection code.

Area sizes for the left edge and the right edge are read from the quantizing circuit 180, and supplied to the register 181. The register 181 sends the area sizes to the frame-memory-Z-buffer processing unit 38.

FIGS. 24A through 24D are illustrative drawings showing examples of the slope codes and the intersection codes when an edge crosses dots.

Figure 24A:
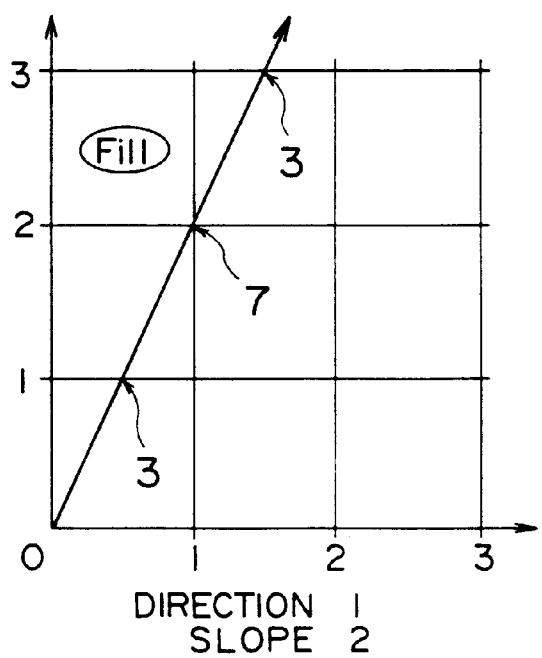
FIGS. 24A through 24D are illustrative drawings showing examples of slope codes and intersection codes when an edge crosses dots.

FIG. 24A shows a case in which a polygon edge has a direction of 1 and a slope code of 2. In this figure, a dot indicated as "Fill" is completely inside the polygon. Dots around the "Fill" dots are subjected to the anti-aliasing. In the example of FIG. 24A, intersection codes are obtained as 3, 7, and 3. Based on these intersection codes and the slope code, area sizes occupied by the polygon in the dots are obtained.

Figure 24B:
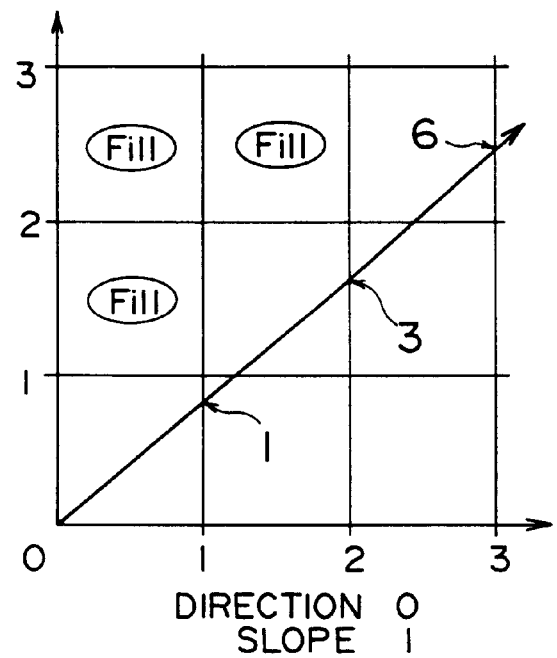

FIG. 24B shows a case in which a polygon edge has a direction of 0 and a slope code of 1. In this example, intersection codes are obtained as 1, 3, and 6.

Figure 24C:
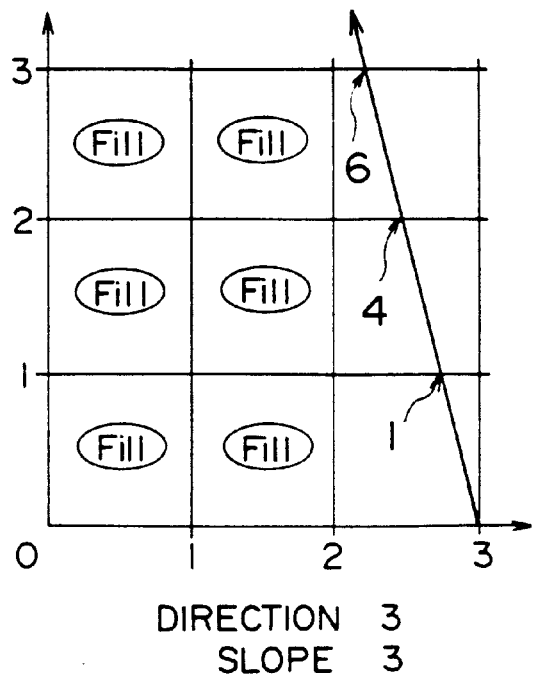

FIG. 24C shows a case in which a polygon edge has a direction of 3 and a slope code of 3. In this example, intersection codes are obtained as 1, 4, and 6.

Figure 24D:
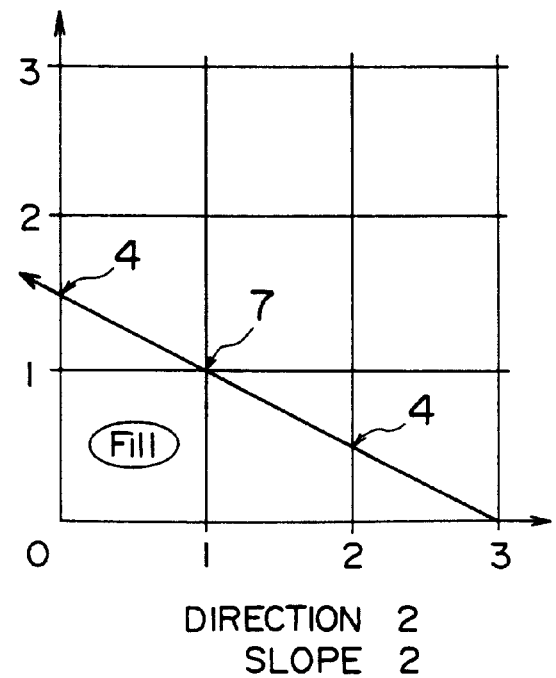

FIG. 24D shows a case in which a polygon edge has a direction of 2 and a slope code of 2. In this example, intersection codes are obtained as 4, 7, and 4.

FIGS. 25A through 25D are illustrative drawings of further examples of the slope codes and the intersection codes when an edge crosses dots.

Figure 25A:
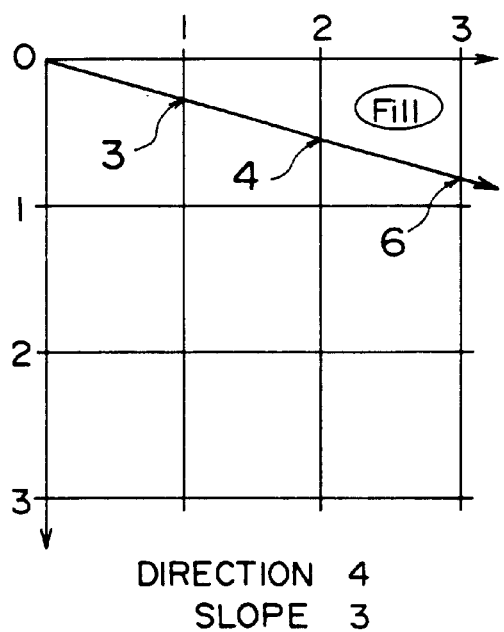
FIGS. 25A through 25D are illustrative drawings of further examples of the slope codes and the intersection codes when an edge crosses dots.

FIG. 25A shows a case in which a polygon edge has a direction of 4 and a slope code of 3. In this example, intersection codes are obtained as 3, 4, and 6.

Figure 25B:
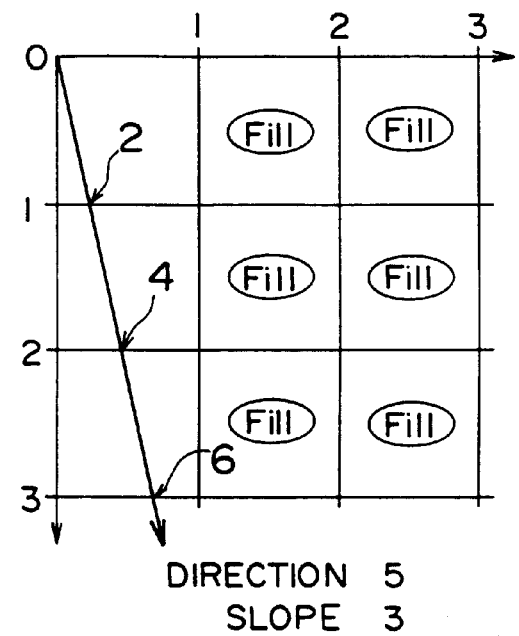

FIG. 25B shows a case in which a polygon edge has a direction of 5 and a slope code of 3. In this example, intersection codes are obtained as 2, 4, and 6.

Figure 25C:
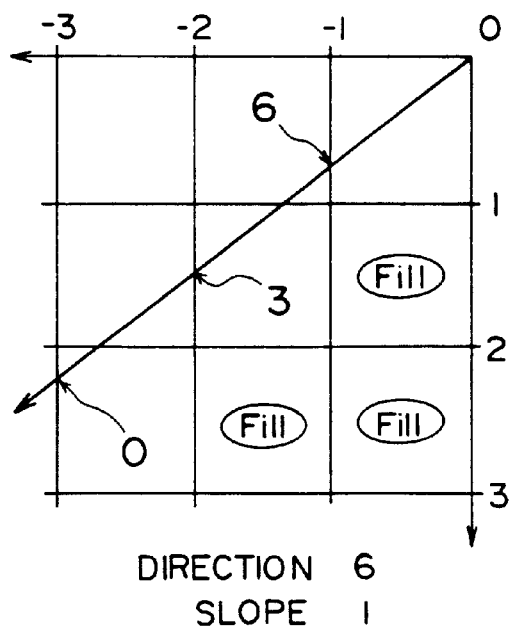

FIG. 25C shows a case in which a polygon edge has a direction of 6 and a slope code of 1. In this example, intersection codes are obtained as 6, 3, and 0.

Figure 25D:
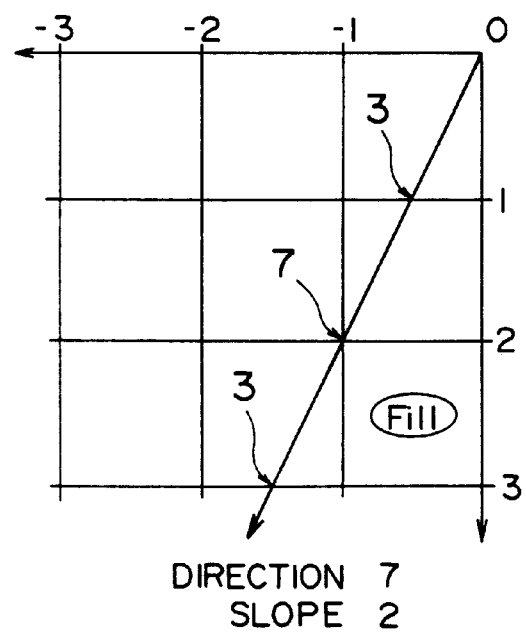

FIG. 25D shows a case in which a polygon edge has a direction of 7 and a slope code of 2. In this example, intersection codes are obtained as 3, 7, and 3.

The data from the dot-area processing unit 36 and the DDA calculating unit 35 is provided for the frame-memory-Z-buffer processing unit 38. The frame-memory-Z-buffer processing unit 38 receives the area size for each dot from the dot-area processing unit 36, and receives the X, Y, and Z values and color data from the DDA calculating unit 35. Then, the frame-memory-Z-buffer processing unit 38 obtains an address of the Z-buffer memory 4 and an address of the frame memory 5, and compares the Z value of a given pixel with the Z value stored in the Z-buffer memory 4. When the Z value of the given pixel is smaller than that of the Z-buffer memory 4, the frame-memory-Z-buffer processing unit 38 updates the Z value of the Z-buffer memory 4, and stores the color or the LUT address, the area size, and the direction code in the frame memory 5.

Figure 26:
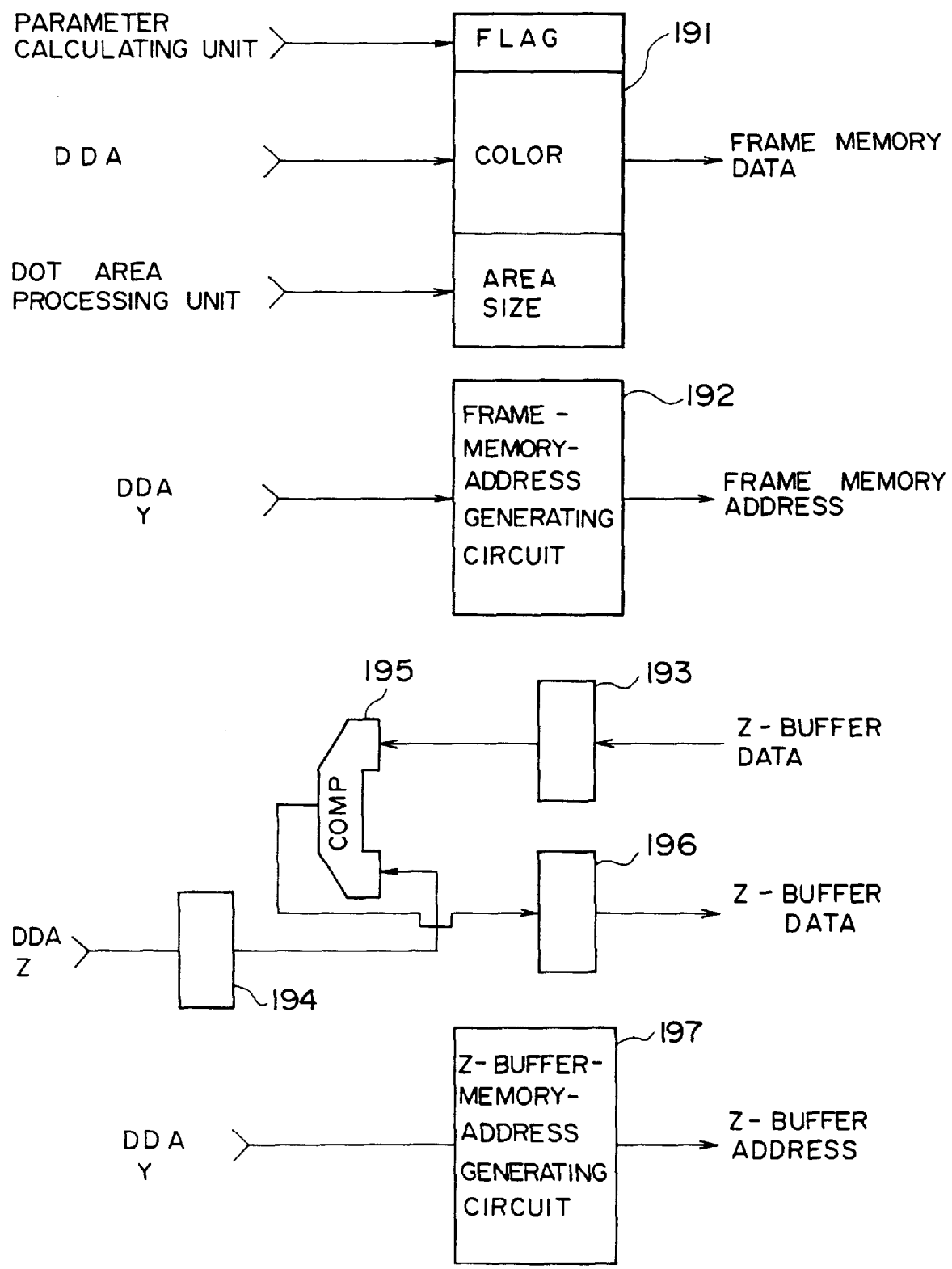
FIG. 26 is a block diagram of an example of a frame-memory-Z-buffer processing unit of FIG. 2.

FIG. 26 is a block diagram of an example of the frame-memory-Z-buffer processing unit 38. The frame-memory-Z-buffer processing unit 38 includes a register 191, a frame-memory-address generating circuit 192, registers 193 and 194, a comparator 195, a register 196, and a Z-buffer-memory-address generating circuit 197.

The register 191 stores the data provided from the parameter calculating unit 34 in a flag area thereof, stores the color data provided from the DDA calculating unit 35 in a color area thereof, and stores the area-size data provided from the dot-area processing unit 36 in an area-size area thereof. All the data stored in the register 191 is sent to the frame memory 5.

The Y values are provided for the frame-memory-address generating circuit 192 from the DDA calculating unit 35. The frame-memory-address generating circuit 192 generates a frame-memory address, and provides it for the frame memory 5 as an address thereof.

The Z values provided from the Z-buffer memory 4 are stored in the register 193. The Z values provided from the DDA calculating unit 35 are stored in the register 194. The comparator 195 compares the Z value stored in the register 193 with the Z value stored in the register 194. If the Z value provided from the Z-buffer memory 4 is larger, the Z value sent from the DDA calculating unit 35 is stored in the register 196 to update the Z value in the Z-buffer memory 4.

The Y values from the DDA calculating unit 35 are also supplied to the Z-buffer-memory-address generating circuit 197. The Z-buffer-memory-address generating circuit 197 generates a Z-buffer-memory address, and provides it for the Z-buffer memory 4 as an address thereof.

Each unit of the drawing processing unit 3 described above is controlled by the controller 39 of FIG. 3. The control of each unit is carried out based on processes described below.

Figure 27A:
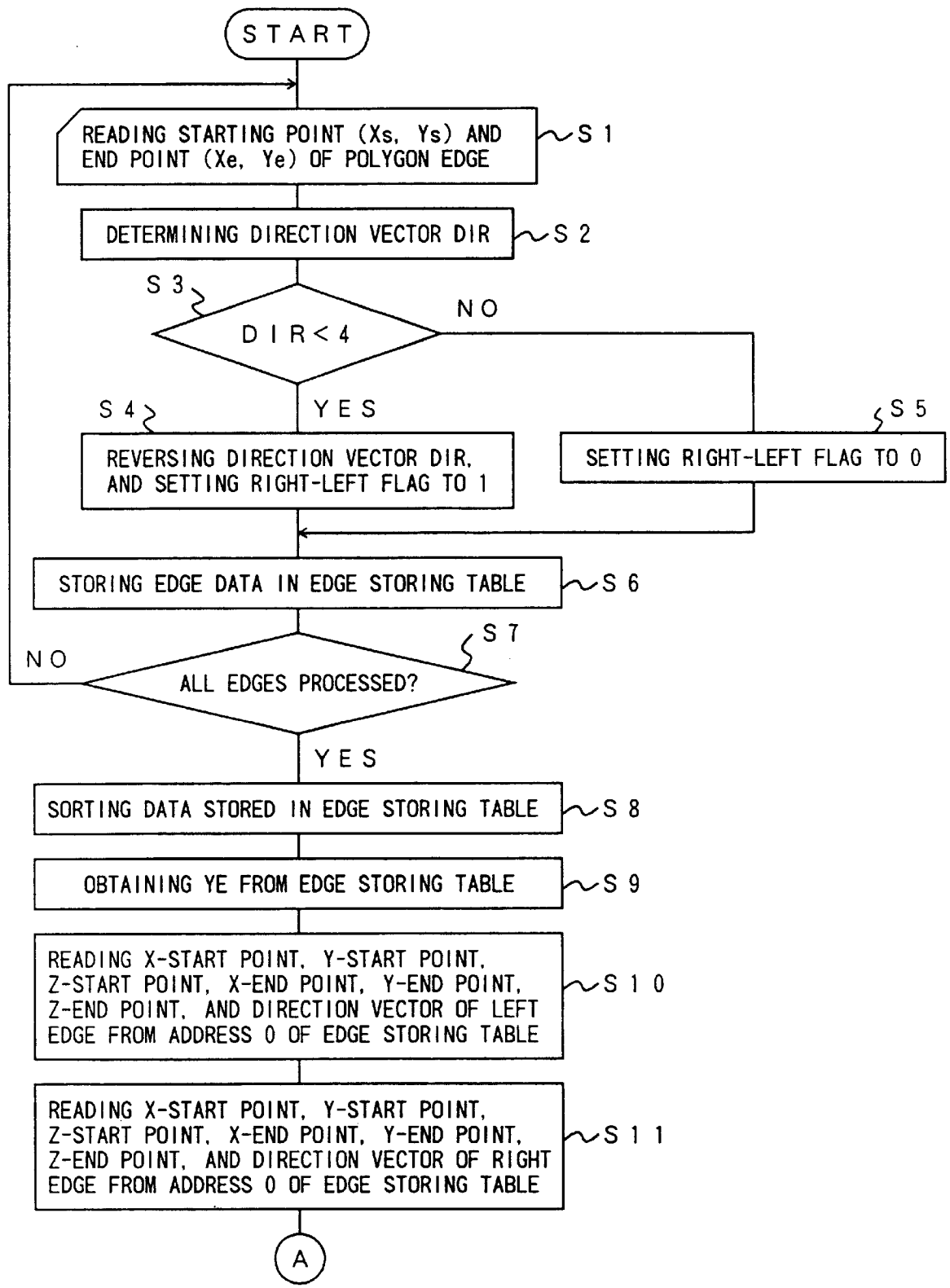
FIGS. 27A and 27B are a flowchart of a process of the anti-aliasing carried out by the drawing processing unit.
Figure 27B:
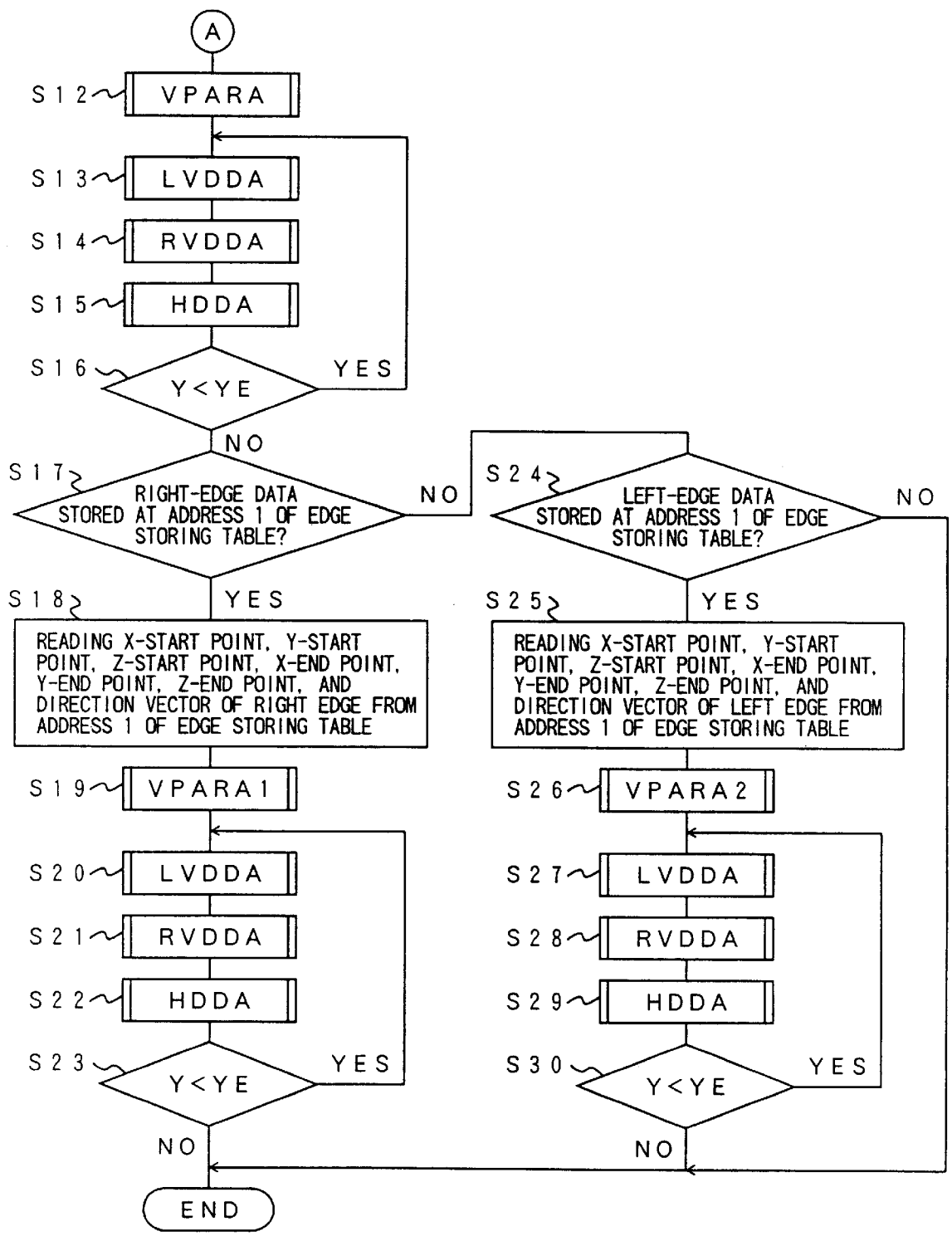

FIGS. 27A and 27B are a flowchart of a process of the anti-aliasing carried out by the drawing processing unit 3.

At a step S1, a starting point (Xs, Ys) and an end point (Xe, Ye) of a polygon edge are read from the coordinate-conversion unit 2.

At a step S2, it is examined in which direction a vector of the polygon edge is directed, and a direction vector DIR is determined.

At a step S3, a check is made whether the direction vector DIR is smaller than 4. In the first embodiment, as previously described, the process is carried out under a condition that all vectors are represented as vectors directed downward. This step is carried out to determine if the vector is directed downward. If the direction vector DIR is smaller than 4, the procedure goes to a step S4. If the direction vector is not smaller than 4, the procedure goes to a step S5.

At the step S4, the direction vector DIR is reversed since the vector is upward (see FIG. 5), and a right-left flag is set to 1. Here, the right-left flag indicates whether the edge is a right edge (i.e., the right-left flag being 1) or a left edge (i.e., the right-left flag being 0) (see FIG. 6).

At the step S5, the right-left flag is set to 0. Since the vector is downward (see FIG. 5), it is not reversed.

At a step S6, the data representing the edge is stored in the edge storing table 33.

At a step S7, a check is made whether all the edges of all the polygons are processed. If they are, the procedure goes to a step S8. If there is an edge yet to be processed, the procedure goes back to the step S1 to repeat the above steps.

At the step S8, the data stored in the edge storing table 33 is sorted.

At a step S9, the Y coordinate which is to be at the end of the process is selected from the Y coordinates stored in the edge storing table 33. Here, the Y coordinate thus obtained is denoted as YE.

At a step S10, an X-start point, a Y-start point, a Z-start point, an X-end point, a Y-end point, a Z-end point, and a direction vector of a left edge stored at address 0 of the edge storing table 33 are read.

At a step S11, an X-start point, a Y-start point, a Z-start point, an X-end point, a Y-end point, a Z-end point, and a direction vector of a right edge stored at address 0 of the edge storing table 33 are read.

Then, subroutine processes VPARA, LVDDA, RVDDA, and HDDA are carried out at steps S12, S13, S14, and S15. The subroutine process VPARA is a process for the parameter calculation. The subroutine process LVDDA is a process for the DDA calculation and the dot-area calculation of the left edge. The subroutine process RVDDA is a process for the DDA calculation and the dot-area calculation of the right edge. Finally, the subroutine process HDDA is a process for the DDA calculation in a horizontal direction parallel to the scan line.

These subroutine processes will be described below.

Figure 28:
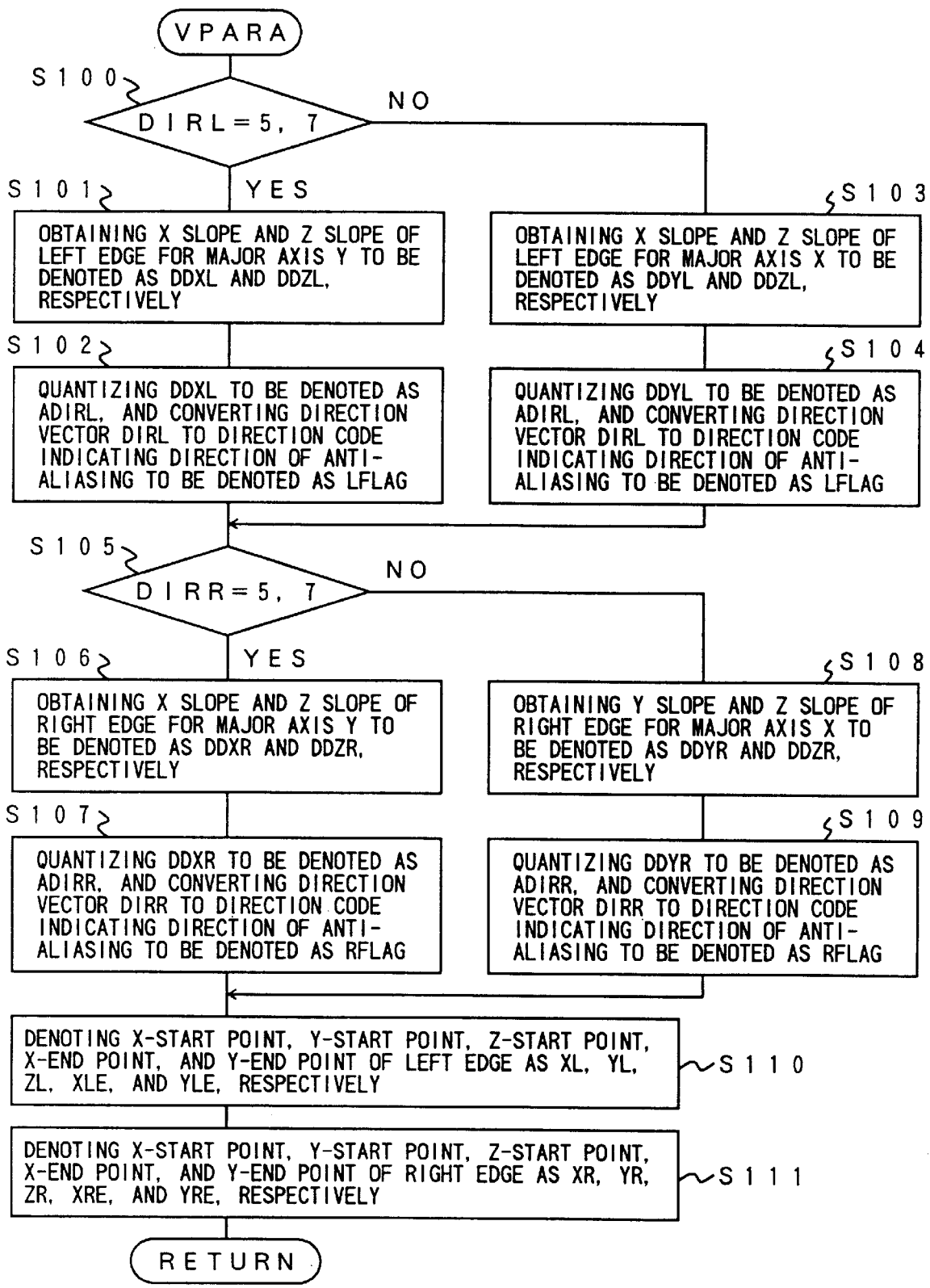
FIG. 28 is a flowchart of a subroutine process VPARA.

FIG. 28 is a flowchart of the subroutine process VPARA.

At a step S100, a check is made whether a direction vector DIRL of the left edge read from the edge storing table 33 is 5 or 7. If it is, the procedure goes to a step S101. If the direction vector DIRL is not 5 or 7, the procedure goes to a step S103.

At the step S101, an X slope and a Z slope for a major axis Y are obtained. Here, the X slope is denoted as DDXL, and the Z slope is denoted as DDZL.

At a step S102, DDXL is quantized as shown in FIG. 17 and FIG. 18 to be denoted as ADIRL, and the direction vector DIRL is converted to a direction code indicating a direction of the anti-aliasing to be denoted as LFLAG. FIGS. 29A and 29B are illustrative drawings showing the direction vectors and the direction codes, respectively. FIG. 30 is a table showing a relation between the direction vectors (directions of vectors) and the direction codes (direction of the anti-aliasing). The conversion of the direction vector DIRL into the direction code LFLAG is carried out by using the table of FIG. 30.

At the step S103, a Y slope and a Z slope for a major axis X are obtained. Here, the Y slope is denoted as DDYL, and the Z slope is denoted as DDZL.

At a step S104, DDYL is quantized as shown in FIG. 17 and FIG. 18 to be denoted as ADIRL, and the direction vector DIRL is converted to a direction code indicating a direction of the anti-aliasing to be denoted as LFLAG.

At a step S105, a check is made whether a direction vector DIRR of the right edge read from the edge storing table 33 is 5 or 7. If it is, the procedure goes to a step S106. If the direction vector DIRR is not 5 or 7, the procedure goes to a step S108.

At the step S106, an X slope and a Z slope for a major axis Y are obtained. Here, the X slope is denoted as DDXR, and the Z slope is denoted as DDZR.

At a step S107, DDXR is quantized as shown in FIG. 17 and FIG. 18 to be denoted as ADIRR, and the direction vector DIRR is converted by using the table of FIG. 30 to a direction code indicating a direction of the anti-aliasing to be denoted as RFLAG.

At the step S108, a Y slope and a Z slope for a major axis X are obtained. Here, the Y slope is denoted as DDYR, and the Z slope is denoted as DDZR.

At a step S109, DDYR is quantized as shown in FIG. 17 and FIG. 18 to be denoted as ADIRR, and the direction vector DIRR is converted by using the table of FIG. 30 to a direction code indicating a direction of the anti-aliasing to be denoted as RFLAG.

At a step S110, the X-start point, the Y-start point, the Z-start point, the X-end point, and the Y-end point of the left edge are denoted as XL, YL, ZL, XLE, and YLE, respectively.

At a step S111, the X-start point, the Y-start point, the Z-start point, the X-end point, and the Y-end point of the right edge are denoted as XR, YR, ZR, XRE, and YRE, respectively. This ends the procedure for the subroutine process VPARA.

After the end of the subroutine process VPARA of the step S12, the subroutine process LVDDA of the DDA calculation and the dot-area calculation of the left edge is carried out at the step S13.

Figure 31:
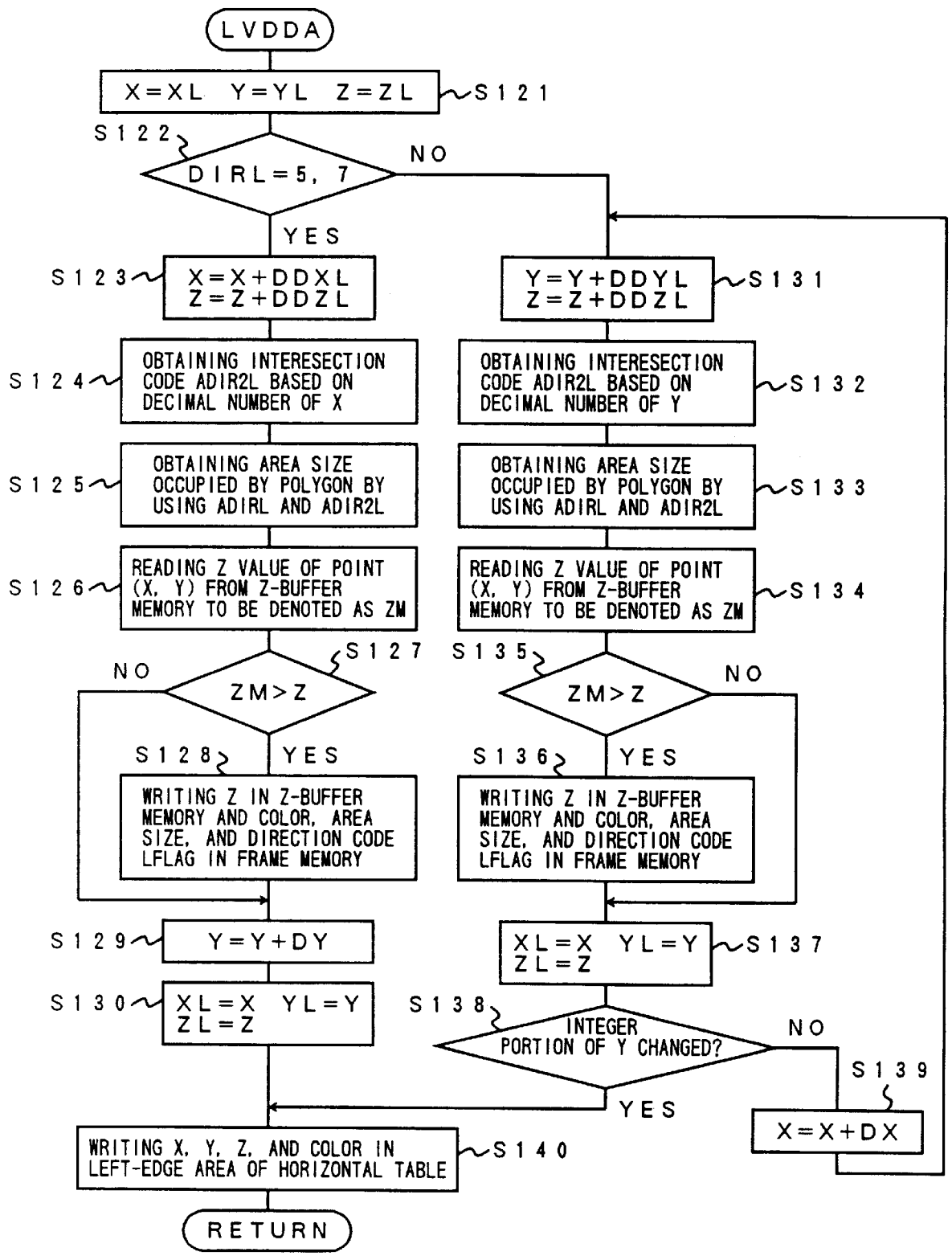
FIG. 31 is a flowchart of a subroutine process LVDDA.

FIG. 31 is a flowchart of the subroutine process LVDDA.

At a step S121, XL, YL, and ZL are denoted as X, Y, and Z, respectively.

At a step S122, a check is made whether the direction vector DIRL of the left edge is 5 or 7. If it is, the procedure goes to a step S123. If the direction vector DIRL is not 5 or 7, the procedure goes to a step S131.

At the step S123, the DDA is applied to X and Z (i.e., X=X+DDXL and Z=Z+DDZL).

At a step S124, an intersection code ADIR2L is obtained based on the decimal number of X and the table of FIG. 19.

At a step S125, an area size occupied by the polygon is obtained by using ADIRL, ADIR2L, and the tables of FIG. 22 and FIG. 23.

At a step S126, a Z value of a point (X, Y) is read from the Z-buffer memory, and is represented as ZM.

At a step S127, a check is made whether ZM is larger than Z. If it is, the procedure goes to a step S128. Otherwise the procedure skips the step S128.

At the step S128, Z is written in the Z-buffer memory, and the color, the area size, and the direction code LFLAG are written in the frame memory.

At a step S129, Y=Y+DY is calculated.

At a step S130, newly obtained X, Y, and Z are denoted again by XL, YL, and ZL, respectively. Then, the procedure goes to a step S140.

At the step S131, the DDA is applied to Y and Z (i.e., Y=Y+DDYL and Z=Z+DDZL).

At a step S132, an intersection code ADIR2L is obtained based on the decimal number of Y and the table of FIG. 19.

At a step S133, an area size occupied by the polygon is obtained by using ADIRL, ADIR2L, and the tables of FIG. 22 and FIG. 23.

At a step S134, a Z value of a point (X, Y) is read from the Z-buffer memory, and is represented as ZM.

At a step S135, a check is made whether ZM is larger than Z. If it is, the procedure goes to a step S136. Otherwise the procedure skips the step S136.

At the step S136, Z is written in the Z-buffer memory, and the color, the area size, and the direction code LFLAG are written in the frame memory.

At a step S137, X, Y, and Z are denoted again by XL, YL, and ZL, respectively.

At a step S138, a check is made whether the integer portion of Y was changed. If it was, the procedure goes to the step S140. Otherwise, the procedure goes to a step S139.

At the step S139, X=X+DX is calculated, and, then, the procedure goes back to the step S131 to repeat the steps S131 through S138.

At the step S140, X, Y, Z, and the color are written in the left-edge area of the horizontal table. This ends the procedure.

After the completion of the subroutine process LVDDA of the step S14 (FIG. 27B), the subroutine process RVDDA of the DDA calculation and the dot-area calculation of the right edge is carried out at the step S15.

FIG. 32 is a flowchart of the subroutine process RVDDA.

At a step S141, XR, YR, and ZR are denoted as X, Y, and Z, respectively.

At a step S142, a check is made whether the direction vector DIRR of the right edge is 5 or 7. If it is, the procedure goes to a step S143. If the direction vector DIRR is not 5 or 7, the procedure goes to a step S151.

At the step S143, the DDA is applied to X and Z (i.e., X=X+DDXR and Z=Z+DDZR).

At a step S144, an intersection code ADIR2R is obtained based on the decimal number of X and the table of FIG. 19.

At a step S145, an area size occupied by the polygon is obtained by using ADIRR, ADIR2R, and the tables of FIG. 22 and FIG. 23.

At a step S146, a Z value of a point (X, Y) is read from the Z-buffer memory, and is represented as ZM.

At a step S147, a check is made whether ZM is larger than Z. If it is, the procedure goes to a step S148. Otherwise the procedure skips the step S148.

At the step S148, Z is written in the Z-buffer memory, and the color, the area size, and the direction code RFLAG are written in the frame memory.

At a step S149, Y=Y+DY is calculated.

At a step S150, newly obtained X, Y, and Z are denoted again by XR, YR, and ZR, respectively. Then, the procedure goes to a step S160.

At the step S151, the DDA is applied to Y and Z (i.e., Y=Y+DDYR and Z=Z+DDZR).

At a step S152, an intersection code ADIR2R is obtained based on the decimal number of Y and the table of FIG. 19.

At a step S153, an area size occupied by the polygon is obtained by using ADIRR, ADIR2R, and the tables of FIG. 22 and FIG. 23.

At a step S154, a Z value of a point (X, Y) is read from the Z-buffer memory, and is represented as ZM.

At a step S155, a check is made whether ZM is larger than Z. If it is, the procedure goes to a step S156. Otherwise the procedure skips the step S156.

At the step S156, Z is written in the Z-buffer memory, and the color, the area size, and the direction code RFLAG are written in the frame memory.

At a step S157, X, Y, and Z are denoted again by XR, YR, and ZR, respectively.

At a step S158, a check is made whether the integer portion of Y was changed. If it was, the procedure goes to the step S160. Otherwise, the procedure goes to a step S159.

At the step S159, X=X+DX is calculated, and, then, the procedure goes back to the step S151 to repeat the steps S151 through S158.

At the step S160, X, Y, Z, and the color are written in the right-edge area of the horizontal table. This ends the procedure.

After the end of the subroutine process RVDDA of the step S14 (FIG. 27B), the subroutine process HDDA of the DDA calculation in a horizontal direction parallel to the scan line is carried out at the step S15.

Figure 33:
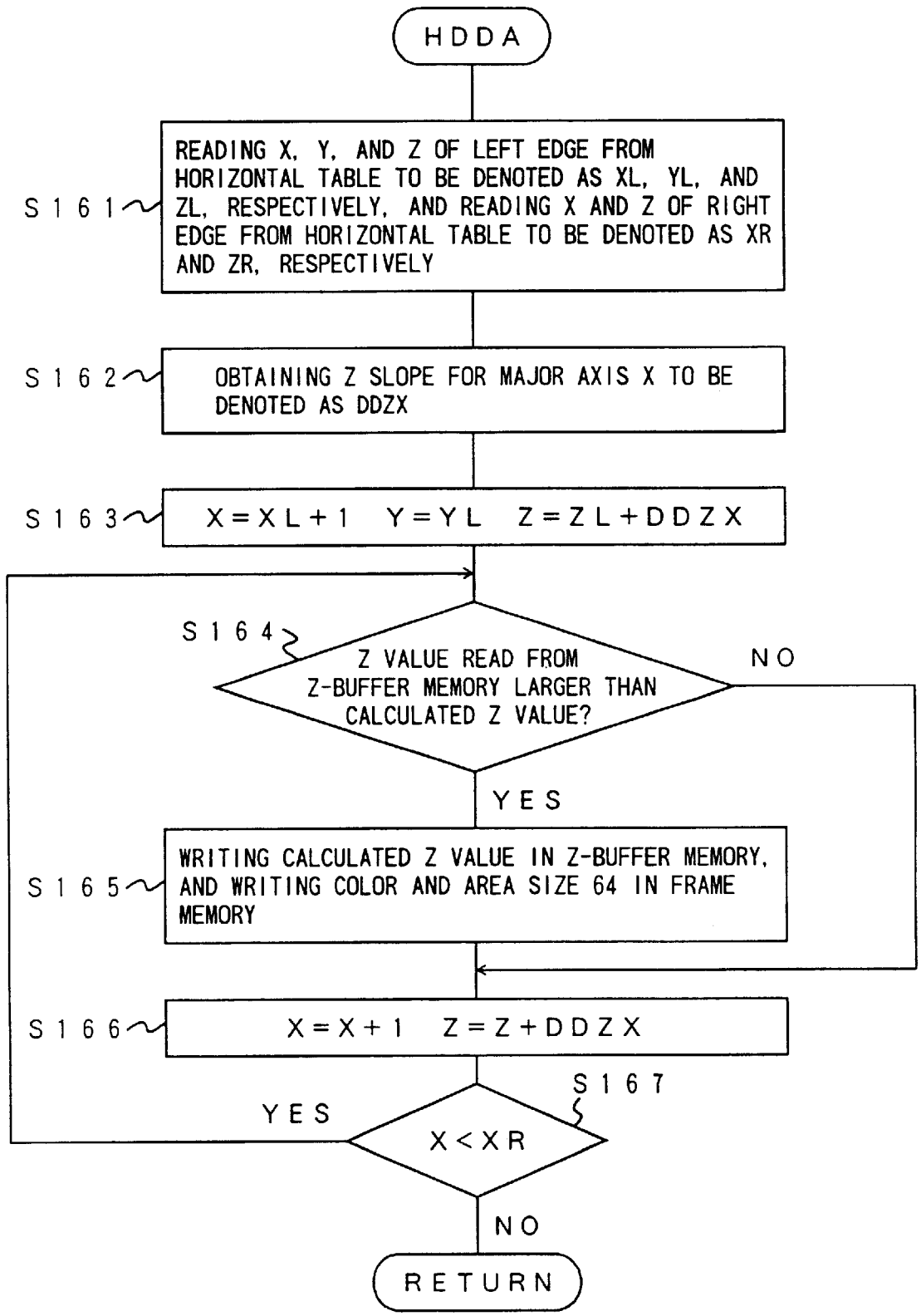
FIG. 33 is a flowchart of a subroutine process HDDA.

FIG. 33 is a flowchart of the subroutine process HDDA.

At a step S161, X, Y, and Z of the left edge read from the horizontal table are denoted as XL, YL, and ZL, respectively, and X and Z of the right edge read from the horizontal table are denoted as XR and ZR, respectively.

At a step S162, a slope Z for a major axis X is obtained to be denoted as DDZX.

At a step S163, X=XL+1, Y=YL, and Z=ZL+DDZX are calculated.

At a step S164, a Z value of a point (X, Y) is read from the Z-buffer memory, and a check is made whether the Z value read from the Z-buffer memory is larger than a Z value calculated at the step S163. If it is larger, the procedure goes to a step S165. Otherwise, the procedure skips the step S165.

At a step S165, the Z value calculated at the step S163 is written in the Z-buffer memory, and the color and an area size 64 (maximum area size) are written in the frame memory.

At a step S166, X=X+1 and Z=Z+DDZX are calculated.

At a step S167, a check is made whether X is smaller than XR. If it is, the procedure goes back to the step S164 to repeat the steps S164 through S167. Otherwise, the procedure ends.

With reference to FIG. 27B again, after the end of the subroutine process HDDA of step S15, the procedure goes to a step S16.

At the step S16, a check is made whether Y is smaller than YE. If it is smaller, the procedure goes back to the step S13 to repeat the subroutine processes LVDDA, RVDDA, and HDDA. It Y is greater than or equal to YE, the procedure goes to a step S17.

At the step S17, a check is made whether there is right-edge data stored at address 1 of the edge storing table. If there is, the procedure goes to a step S18. Otherwise, the procedure goes to a step S24.

At the step S18, an X-start point, a Y-start point, a Z-start point, an X-end point, a Y-end point, a Z-end point, and a direction vector of a right edge stored at address 1 of the edge storing table 33 are read.

Then, a subroutine process VPARA1, and the subroutine processes LVDDA, RVDDA, and HDDA are carried out at steps S19, S20, S21, and S22, respectively. The subroutine processes LVDDA, RVDDA, and HDDA have been already described with reference to FIGS. 31 through 33, respectively.

Figure 34:
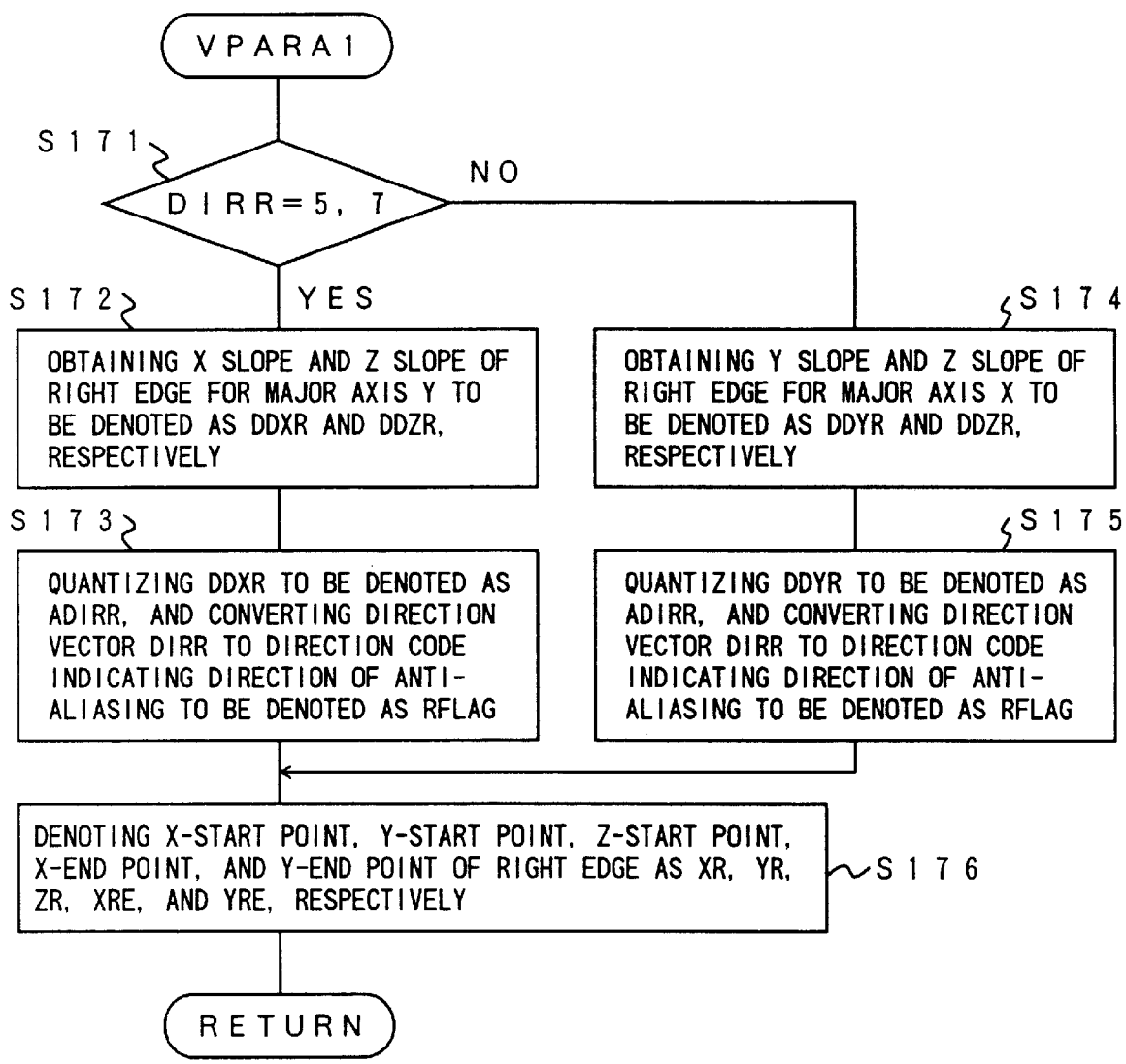
FIG. 34 is a flowchart of a subroutine process VPARA1.

FIG. 34 is a flowchart of the subroutine process VPARA1.

At a step S171, a check is made whether the direction vector DIRR of the right edge read from address 1 of the edge storing table 33 is 5 or 7. If it is, the procedure goes to a step S172. If the direction vector DIRR is not 5 or 7, the procedure goes to a step S174.

At the step S172, an X slope and a Z slope for a major axis Y are obtained. Here, the X slope is denoted as DDXR, and the Z slope is denoted as DDZR.

At a step S173, DDXR is quantized as shown in FIG. 17 and FIG. 18 to be denoted as ADIRR, and the direction vector DIRR is converted by using the table of FIG. 30 to a direction code indicating a direction of the anti-aliasing to be denoted as RFLAG.

At the step S174, a Y slope and a Z slope for a major axis X are obtained. Here, the Y slope is denoted as DDYR, and the Z slope is denoted as DDZR.

At a step S175, DDYR is quantized as shown in FIG. 17 and FIG. 18 to be denoted as ADIRR, and the direction vector DIRR is converted by using the table of FIG. 30 to a direction code indicating a direction of the anti-aliasing to be denoted as RFLAG.

At a step S176 after the step S173 or S175, the X-start point, the Y-start point, the Z-start point, the X-end point, and the Y-end point of the right edge are denoted as XR, YR, ZR, XRE, and YRE, respectively. This ends the procedure of the subroutine process VPARA1.

With reference to FIG. 27B again, after the subroutine process VPARA1 of the step S19, the subroutine processes LVDDA, RVDDA, and HDDA are calculated at the steps S20 through S22 as described before.

At a step S23, a check is made whether Y is smaller than YE. If it is, the procedure goes back to the step S20 to repeat the subroutine processes LVDDA, RVDDA, and HDDA. If Y is greater than or equal to YE, the procedure ends.

At the step S24 following the step S17, a check is made whether there is left-edge data stored at address 1 of the edge storing table. If there is, the procedure goes to a step S25. Otherwise, the procedure ends.

At the step S25, an X-start point, a Y-start point, a Z-start point, an X-end point, a Y-end point, a Z-end point, and a direction vector of a left edge stored at address 1 of the edge storing table 33 are read.

Then, a subroutine process VPARA2, and the subroutine processes LVDDA, RVDDA, and HDDA are carried out at steps S26, S27, S28, and S29, respectively. The subroutine processes LVDDA, RVDDA, and HDDA have been already described with reference to FIGS. 31 through 33, respectively.

Figure 35:
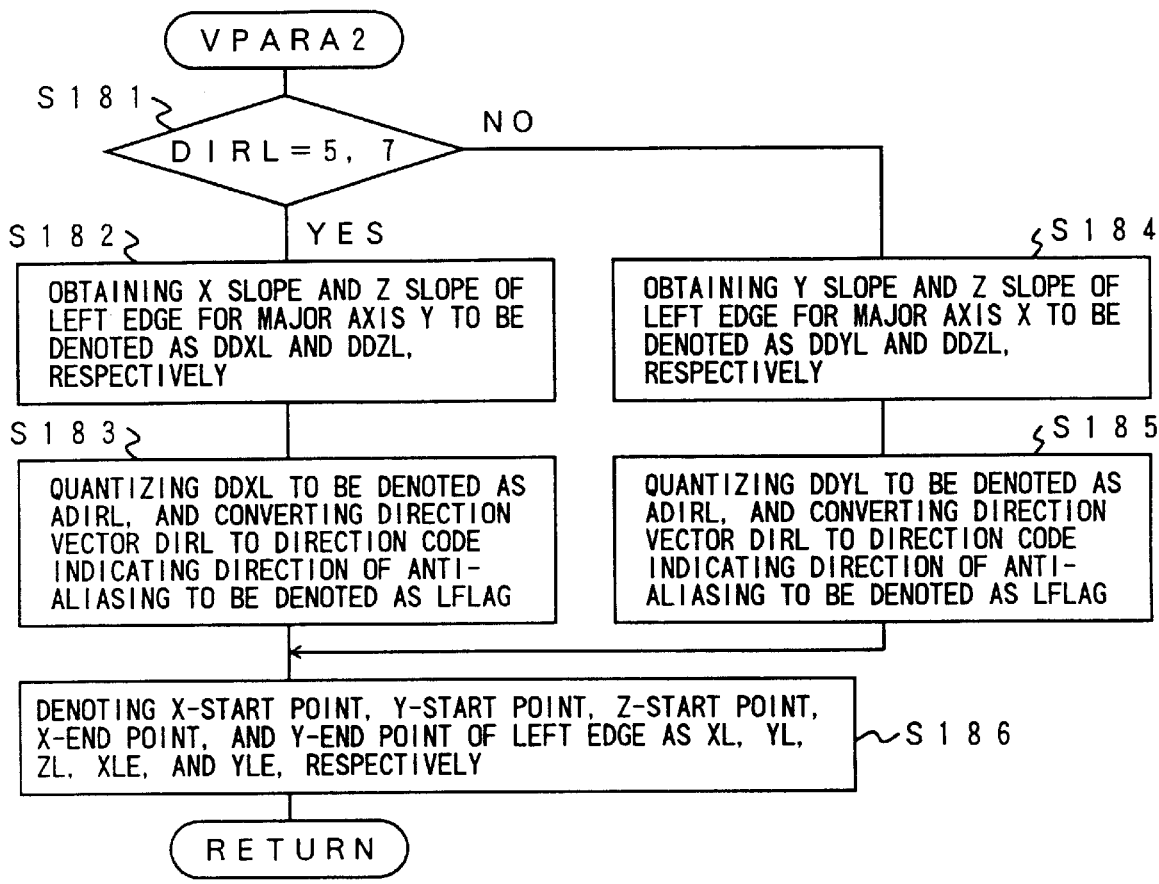
FIG. 35 is a flowchart of a subroutine process VPARA2.

FIG. 35 is a flowchart of the subroutine process VPARA2.

At a step S181, a check is made whether the direction vector DIRL of the left edge read from address 1 of the edge storing table 33 is 5 or 7. If it is, the procedure goes to a step S182. If the direction vector DIRL is not 5 or 7, the procedure goes to a step S184.

At the step S182, an X slope and a Z slope for a major axis Y are obtained. Here, the X slope is denoted as DDXL, and the Z slope is denoted as DDZL.

At a step S183, DDXL is quantized as shown in FIG. 17 and FIG. 18 to be denoted as ADIRL, and the direction vector DIRL is converted by using the table of FIG. 30 to a direction code indicating a direction of the anti-aliasing to be denoted as LFLAG.

At the step S184, a Y slope and a Z slope for a major axis X are obtained. Here, the Y slope is denoted as DDYL, and the Z slope is denoted as DDZL.

At a step S185, DDYL is quantized as shown in FIG. 17 and FIG. 18 to be denoted as ADIRL, and the direction vector DIRL is converted by using the table of FIG. 30 to a direction code indicating a direction of the anti-aliasing to be denoted as LFLAG.

At a step S186 after the step S183 or S185, the X-start point, the Y-start point, the Z-start point, the X-end point, and the Y-end point of the left edge are denoted as XL, YL, ZL, XLE, and YLE, respectively. This ends the procedure of the subroutine process VPARA2.

With reference to FIG. 27B again, after the subroutine process VPARA2 of the step S26, the subroutine processes LVDDA, RVDDA, and HDDA are calculated at the steps S27 through S29 as described before.

At a step S30, a check is made whether Y is smaller than YE. If it is, the procedure goes back to the step S27 to repeat the subroutine processes LVDDA, RVDDA, and HDDA. If Y is greater than or equal to YE, the procedure ends.

The data processed by the drawing processing unit 3 is stored in the frame memory 5.

Figure 36:
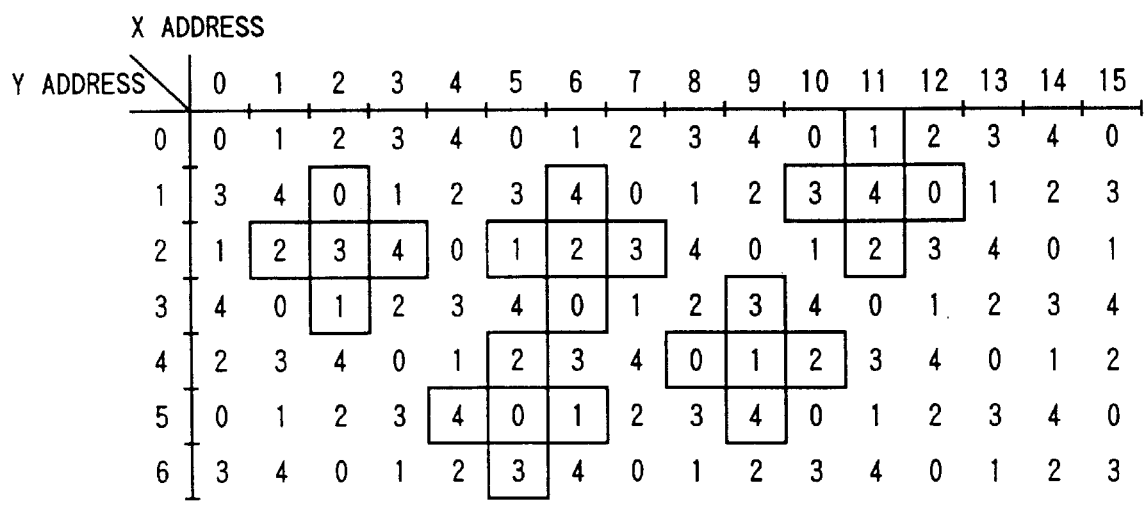
FIG. 36 is an illustrative drawing showing an example of a configuration of a frame memory of FIG. 1.

FIG. 36 is an illustrative drawing showing an example of a configuration of the frame memory 5. In FIG. 36, a number written in each address indicates a frame memory to which data of that address is stored. The number ranges from 0 to 4 indicating five different frame memories used in this embodiment. As shown in FIG. 36, a given dot and four adjacent dots arranged in a cross shape are stored separately in the five different frame memories, so that these five dots can be read in parallel from these memories.

Figure 37:
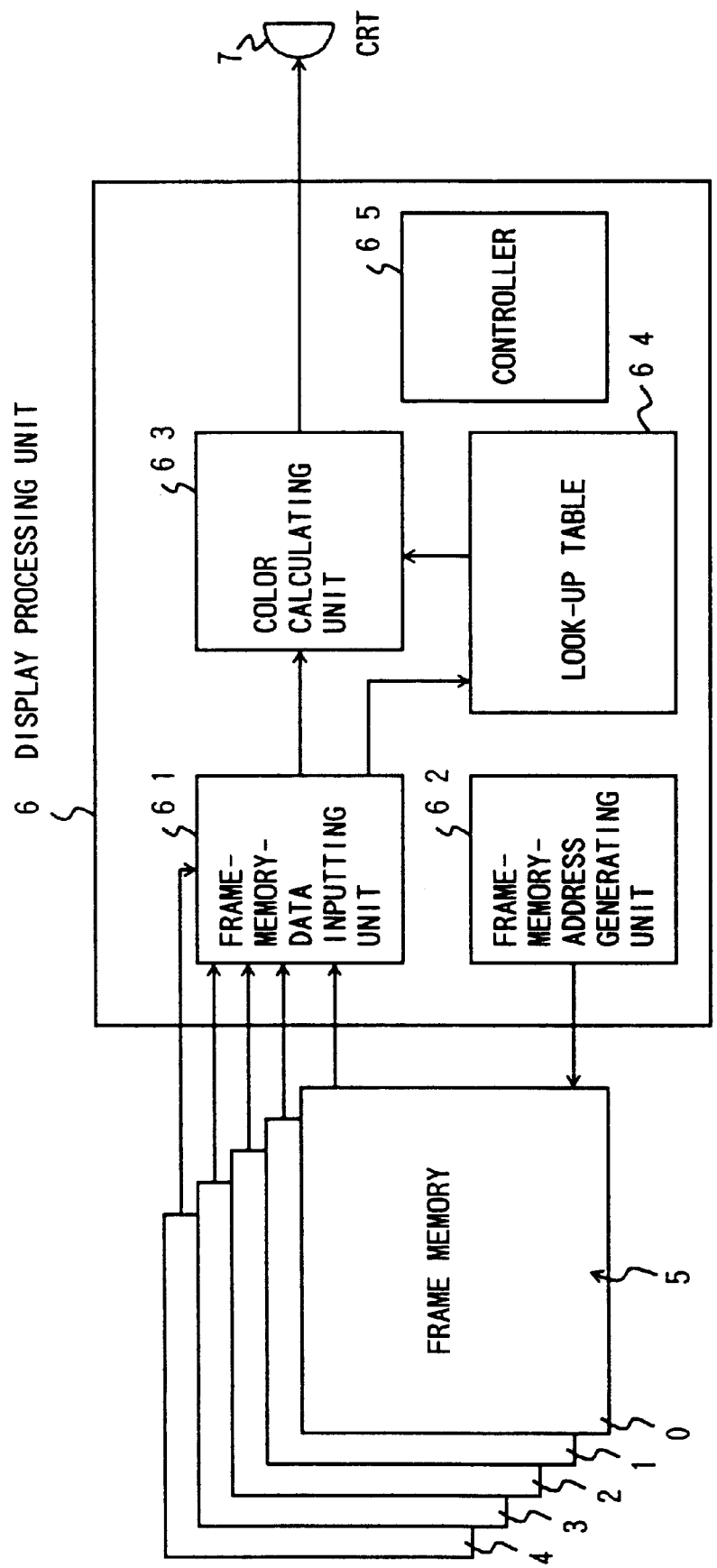
FIG. 37 is a block diagram showing an example of a configuration of a display processing unit of FIG. 1.

FIG. 37 is a block diagram showing an example of a configuration of the display processing unit 6. The display processing unit 6 of FIG. 37 includes a frame-memory-data inputting unit 61, a frame-memory-address generating unit 62, a color calculating unit 63, a look-up table 64, and a controller 65 controlling the above elements.

As described above, the frame memory 5 includes five frame memories, so that a given dot and four adjacent dots arranged in a cross shape are read in parallel from the frame memory 5. The data read in parallel from the frame memory 5 is supplied to the frame-memory-data inputting unit 61.

The frame-memory-data inputting unit 61 receives data of a given dot to be processed (current dot) and of four adjacent dots, and selects one dot from the four adjacent dots based on the direction code of the given dot. Then, the frame-memory-data inputting unit 61 sends LUT addresses of the given dot and the selected dot to the look-up table 64. The color information of these two dots is sent from the look-up table 64 to the color calculating unit 63. In the case where color information is stored in the frame memory 5, the color information of these two dots is sent to the color calculating unit 63 via the frame-memory-data inputting unit 61.

When the frame memory 5 is accessed, an address of the frame memory 5 is generated by the frame-memory-address generating unit 62.

The color calculating unit 63 receives an area size occupied by a polygon from the frame-memory-data inputting unit 61 in addition to the color information from the look-up table 64. Then, the color calculating unit 63 calculates a color of the current dot by using the area size of the current dot and the color information of the current dot and the selected dot. Namely, the color of the current dot is calculated by combining the color of the current dot and the color of the selected dot arranged in the anti-aliasing direction with a ratio indicated by the area size. The color calculating unit 63 sends the calculated color of the current dot to the CRT 7.

Figure 38:
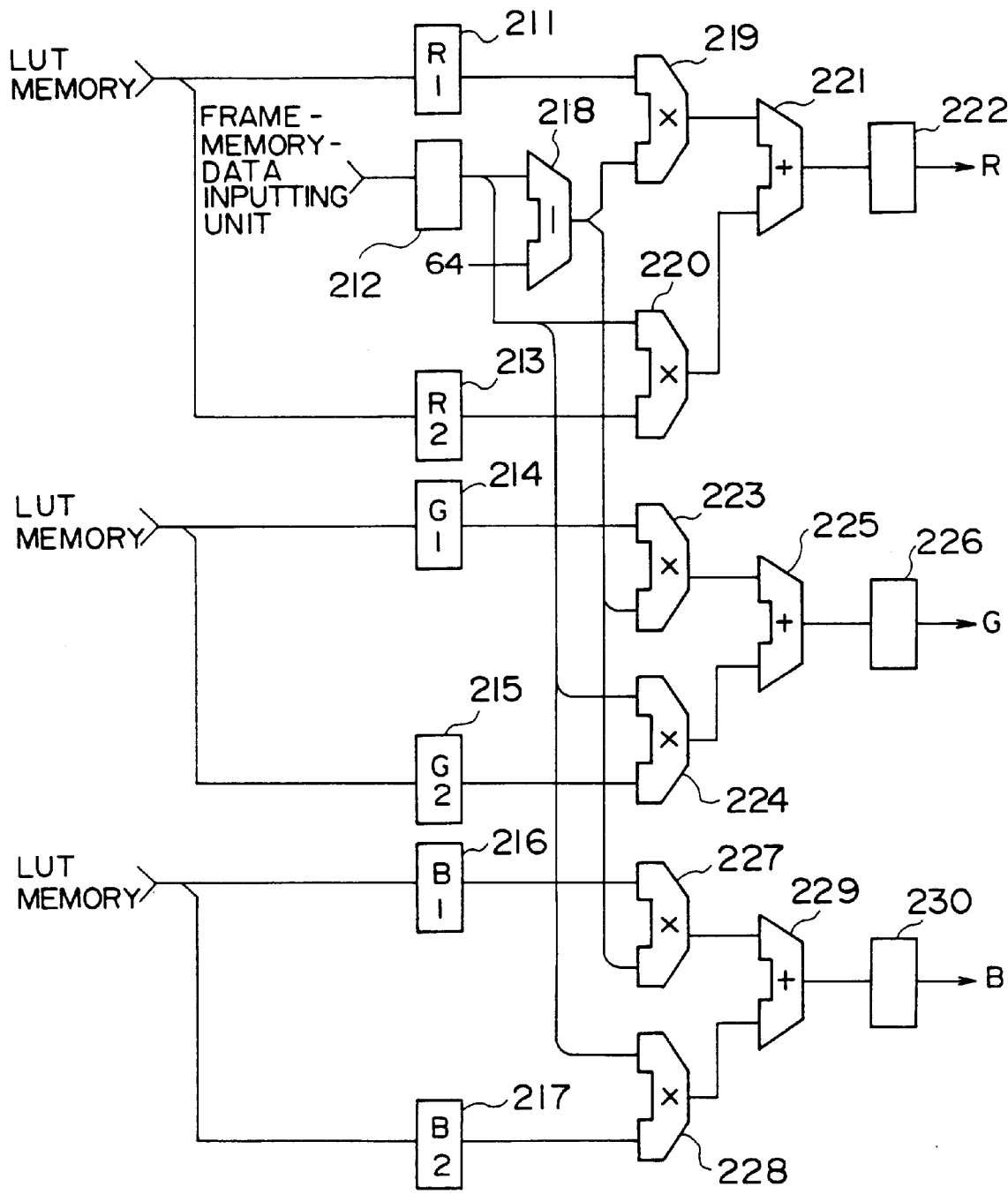
FIG. 38 is a circuit diagram of an example of a color calculating unit of FIG. 37.
Figure 39A:
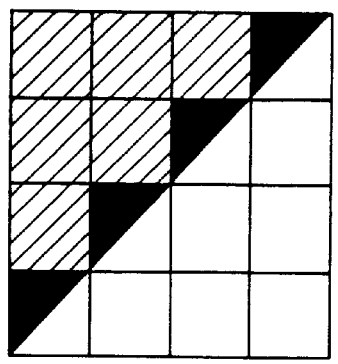
FIGS. 39A through 39E are illustrative drawings showing examples of drawn polygons according to the first embodiment.
Figure 39D:
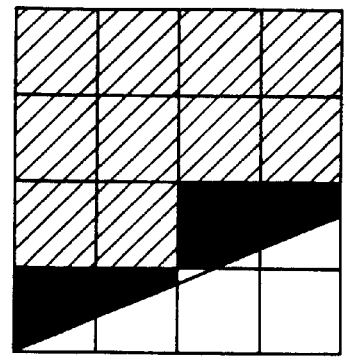
Figure 39B:
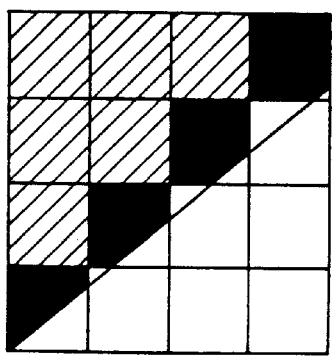
Figure 39E:
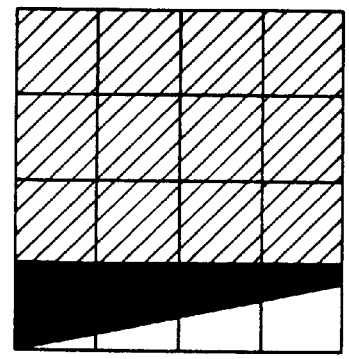
Figure 39C:
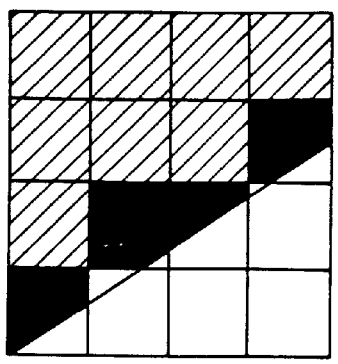
Figure 40A:
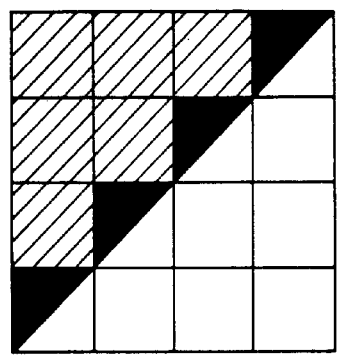
FIGS. 40A through 40E are illustrative drawings showing other examples of drawn polygons according to the first embodiment.
Figure 40D:
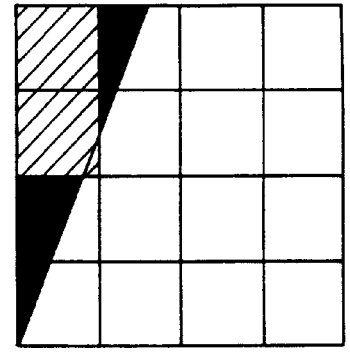
Figure 40B:
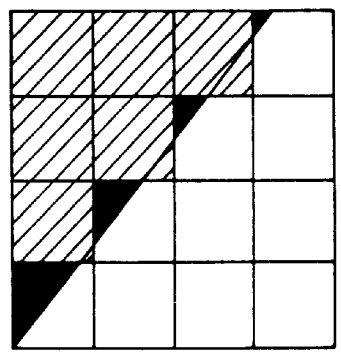
Figure 40E:
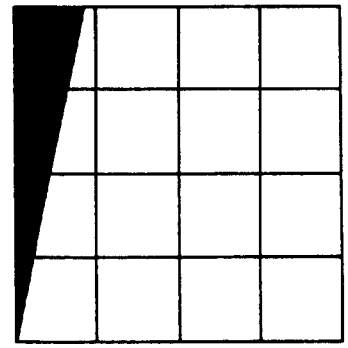
Figure 40C:
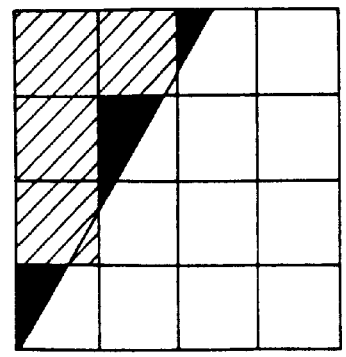
Figure 41A:
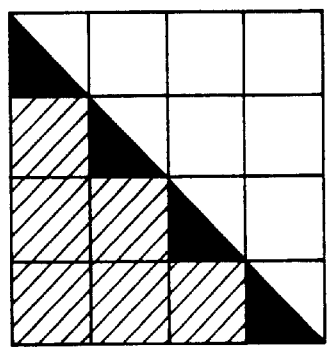
FIGS. 41A through 41E are illustrative drawings showing other examples of drawn polygons according to the first embodiment.
Figure 41D:
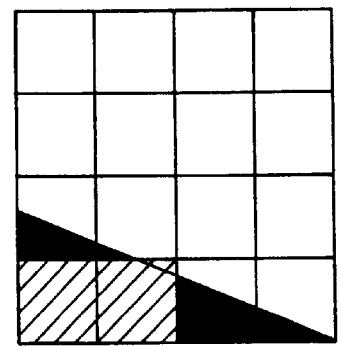
Figure 41B:
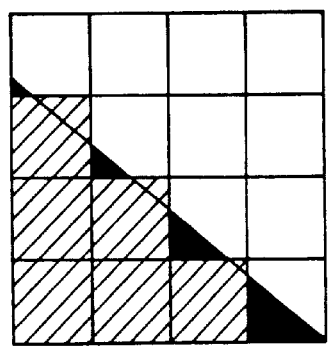
Figure 41E:
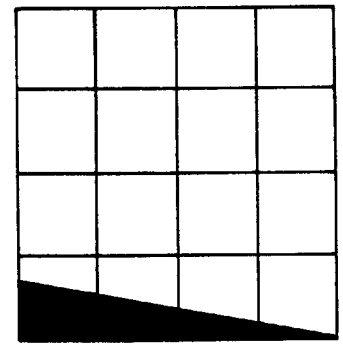
Figure 41C:
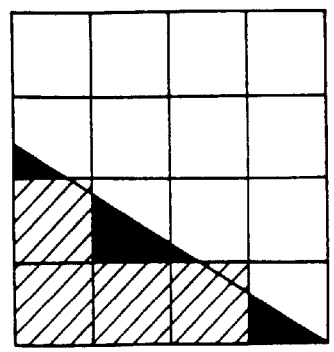
Figure 42A:
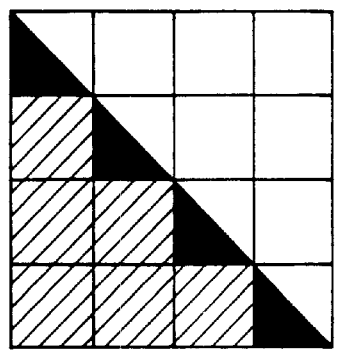
FIGS. 42A through 42E are illustrative drawings showing other examples of drawn polygons according to the first embodiment.
Figure 42D:
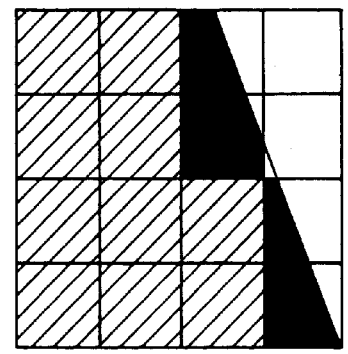
Figure 42B:
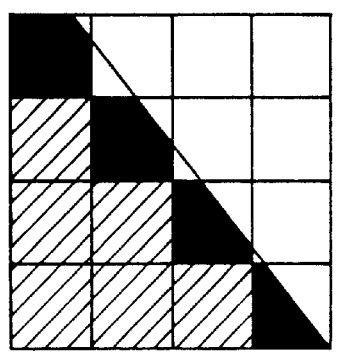
Figure 42E:
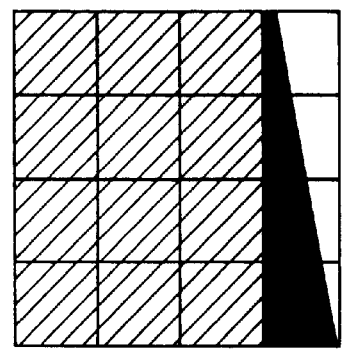
Figure 42C:
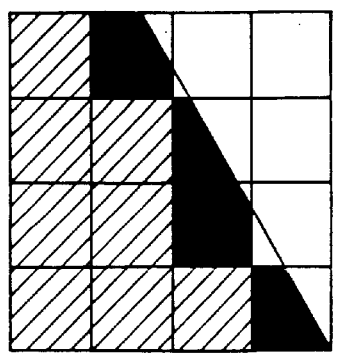
Figure 43A:
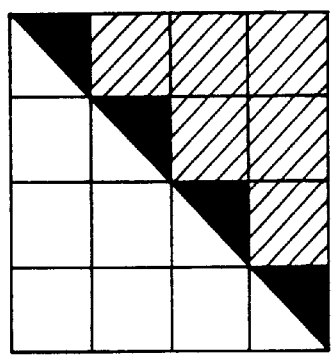
FIGS. 43A through 43E are illustrative drawings showing other examples of drawn polygons according to the first embodiment.
Figure 43D:
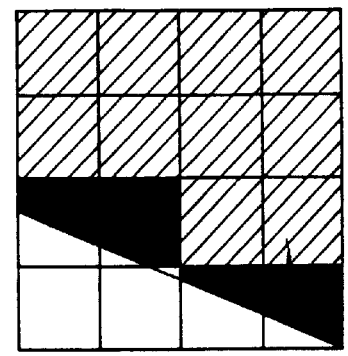
Figure 43B:
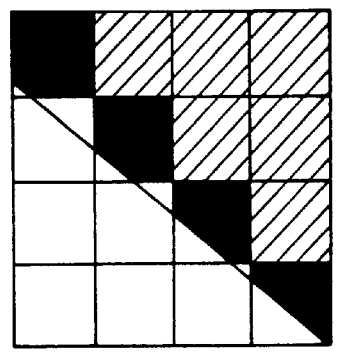
Figure 43E:
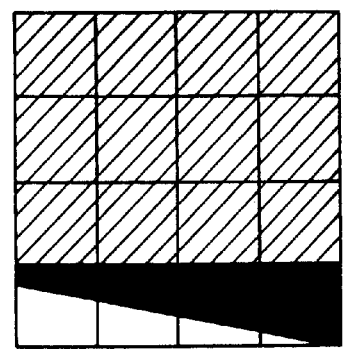
Figure 43C:
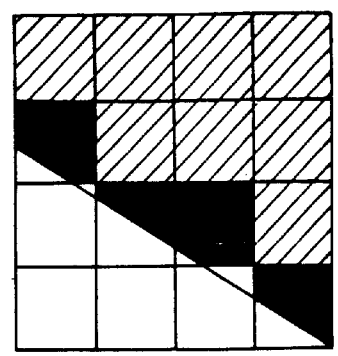
Figure 44A:
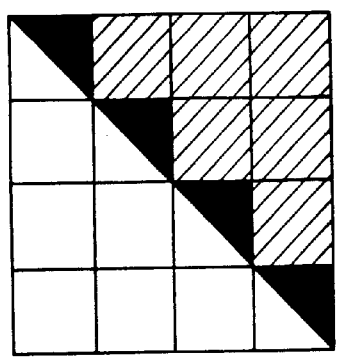
FIGS. 44A through 44E are illustrative drawings showing other examples of drawn polygons according to the first embodiment.
Figure 44D:
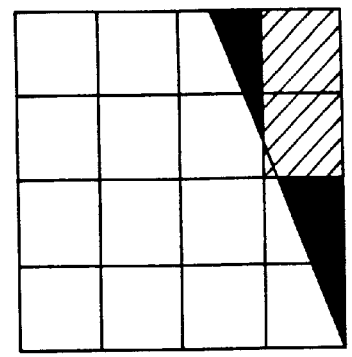
Figure 44B:
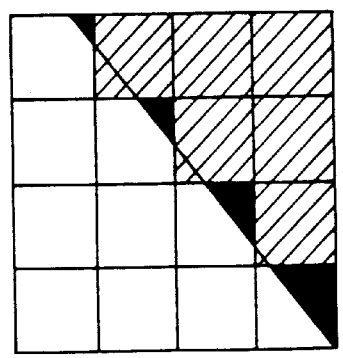
Figure 44E:
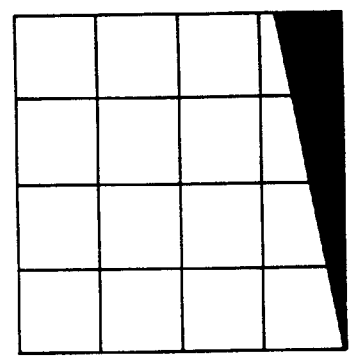
Figure 44C:
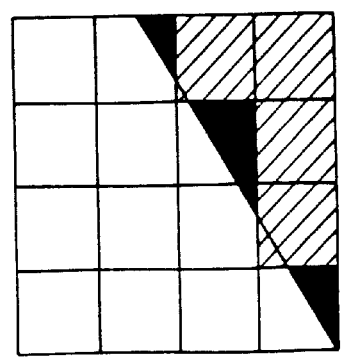
Figure 45A:
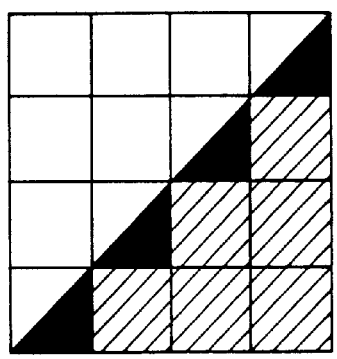
FIGS. 45A through 45E are illustrative drawings showing other examples of drawn polygons according to the first embodiment.
Figure 45D:
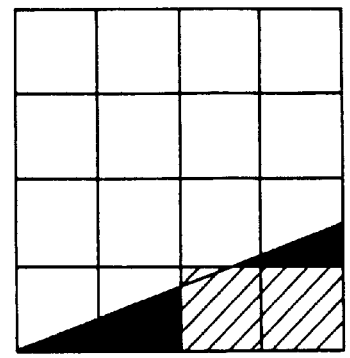
Figure 45B:
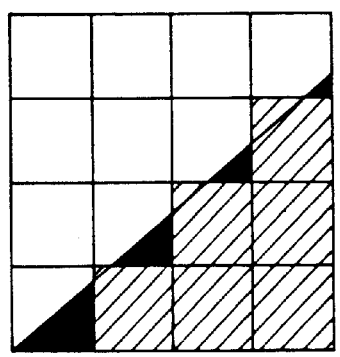
Figure 45E:
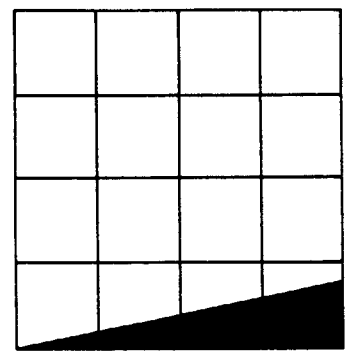
Figure 45C:
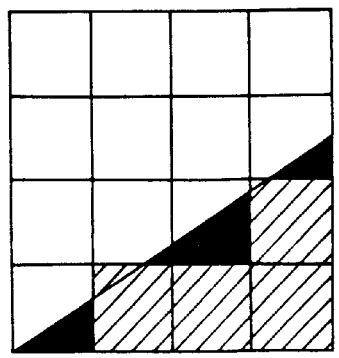
Figure 46A:
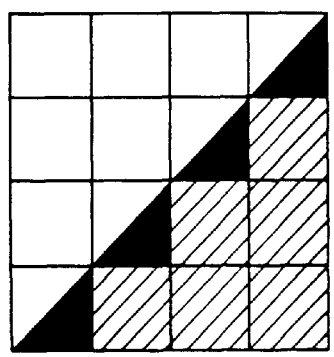
FIGS. 46A through 46E are illustrative drawings showing other examples of drawn polygons according to the first embodiment.
Figure 46D:
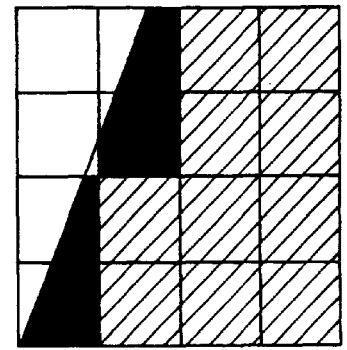
Figure 46B:
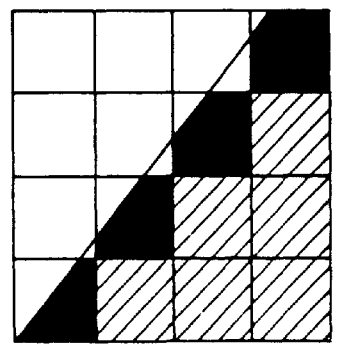
Figure 46E:
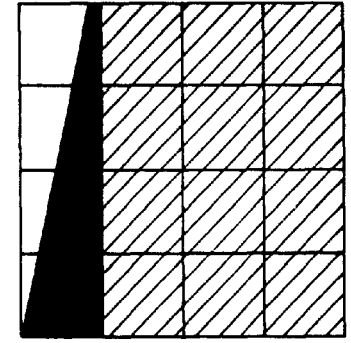
Figure 46C:
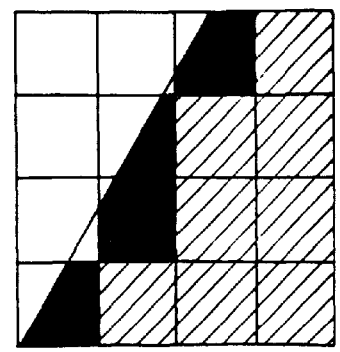

FIG. 38 is a circuit diagram of an example of the color calculating unit 63. The color calculating unit 63 includes registers 211 through 217, a subtracter 218, multipliers 219 and 220, an adder 221, a register 222, multipliers 223 and 224, an adder 225, a register 226, multipliers 227 and 228, an adder 229, and a register 230.

The register 211 stores color information R (red component) of the selected dot (of four adjacent dots) sent from the look-up table 64. The register 212 stores the area size of the current dot sent from the frame-memory-data inputting unit 61. The subtracter 218 receives the area size from the register 212 at one input thereof, and receives a value of 64 (8×8) at the other input thereof. The subtracter 218 subtracts the area size from the value of 64 to obtain an area size of the exterior region (as opposed to the polygon region). The register 213 stores color information R (red component) of the current dot sent from the look-up table 64.

The multiplier 219 receives the color information R of the selected dot from the register 211 at one input thereof, and receives the area size of the exterior region from the subtracter 218 at the other input thereof. The multiplier 219 multiplies the color information R of the selected dot by the area size of the exterior region to obtain a weight of the exterior-region color in the current dot. This weight is sent to the adder 221.

The multiplier 220 receives the color information R of the current dot from the register 213 at one input thereof, and receives the area size of the polygon region from the register 212 at the other input thereof. The multiplier 220 multiplies the color information R of the current dot by the area size of the polygon region to obtain a weight of the polygon-region color in the current dot. This weight is sent to the adder 221.

The adder 221 adds the weight of the exterior-region color to the weight of the polygon-region color to obtain the color information R (red component) of the current dot. The obtained color information R of the current dot is stored in the register 222.

The register 214 stores color information G (green component) of the selected dot sent from the look-up table 64. The register 215 stores color information G (green component) of the current dot sent from the look-up table 64.

The multiplier 223 receives the color information G of the selected dot from the register 214 at one input thereof, and receives the area size of the exterior region from the subtracter 218 at the other input thereof. The multiplier 223 multiplies the color information G of the selected dot by the area size of the exterior region to obtain a weight of the exterior-region color in the current dot. This weight is sent to the adder 225.

The multiplier 224 receives the color information G of the current dot from the register 215 at one input thereof, and receives the area size of the polygon region from the register 212 at the other input thereof. The multiplier 224 multiplies the color information G of the current dot by the area size of the polygon region to obtain a weight of the polygon-region color in the current dot. This weight is sent to the adder 225.

The adder 225 adds the weight of the exterior-region color to the weight of the polygon-region color to obtain the color information G (green component) of the current dot. The obtained color information G of the current dot is stored in the register 226.

The register 216 stores color information B (blue component) of the selected dot sent from the look-up table 64. The register 217 stores color information B (blue component) of the current dot sent from the look-up table 64.

The multiplier 227 receives the color information B of the selected dot from the register 216 at one input thereof, and receives the area size of the exterior region from the subtracter 218 at the other input thereof. The multiplier 227 multiplies the color information B of the selected dot by the area size of the exterior region to obtain a weight of the exterior-region color in the current dot. This weight is sent to the adder 229.

The multiplier 228 receives the color information B of the current dot from the register 217 at one input thereof, and receives the area size of the polygon region from the register 212 at the other input thereof. The multiplier 228 multiplies the color information B of the current dot by the area size of the polygon region to obtain a weight of the polygon-region color in the current dot. This weight is sent to the adder 229.

The adder 229 adds the weight of the exterior-region color to the weight of the polygon-region color to obtain the color information B (blue component) of the current dot. The obtained color information B of the current dot is stored in the register 230.

FIGS. 39A through 39E are illustrative drawings showing examples of drawn polygons according to the first embodiment. FIGS. 39A through 39E show cases in which a polygon edge has different directions falling within a range of the direction 0 of FIG. 5. In the figure, dotted regions show areas whose sizes are calculated for corresponding dots.

FIGS. 40A through 40E are illustrative 66 drawings showing other examples of drawn polygons according to the first embodiment. FIGS. 40A through 40E show cases in which a polygon edge has different directions falling within a range of the direction 1 of FIG. 5.

FIGS. 41A through 41E are illustrative drawings showing other examples of drawn polygons according to the first embodiment. FIGS. 41A through 41E show cases in which a polygon edge has different directions falling within a range of the direction 2 of FIG. 5.

FIGS. 42A through 42E are illustrative drawings showing other examples of drawn polygons according to the first embodiment. FIGS. 42A through 42E show cases in which a polygon edge has different directions falling within a range of the direction 3 of FIG. 5.

FIGS. 43A through 43E are illustrative drawings showing other examples of drawn polygons according to the first embodiment. FIGS. 43A through 43E show cases in which a polygon edge has different directions falling within a range of the direction 4 of FIG. 5.

FIGS. 44A through 44E are illustrative drawings showing other examples of drawn polygons according to the first embodiment. FIGS. 44A through 44E show cases in which a polygon edge has different directions falling within a range of the direction 5 of FIG. 5.

FIGS. 45A through 45E are illustrative drawings showing other examples of drawn polygons according to the first embodiment. FIGS. 45A through 45E show cases in which a polygon edge has different directions falling within a range of the direction 6 of FIG. 5.

FIGS. 46A through 46E are illustrative drawings showing other examples of drawn polygons according to the first embodiment. FIGS. 46A through 46E show cases in which a polygon edge has different directions falling within a range of the direction 7 of FIG. 5.

Figure 47:
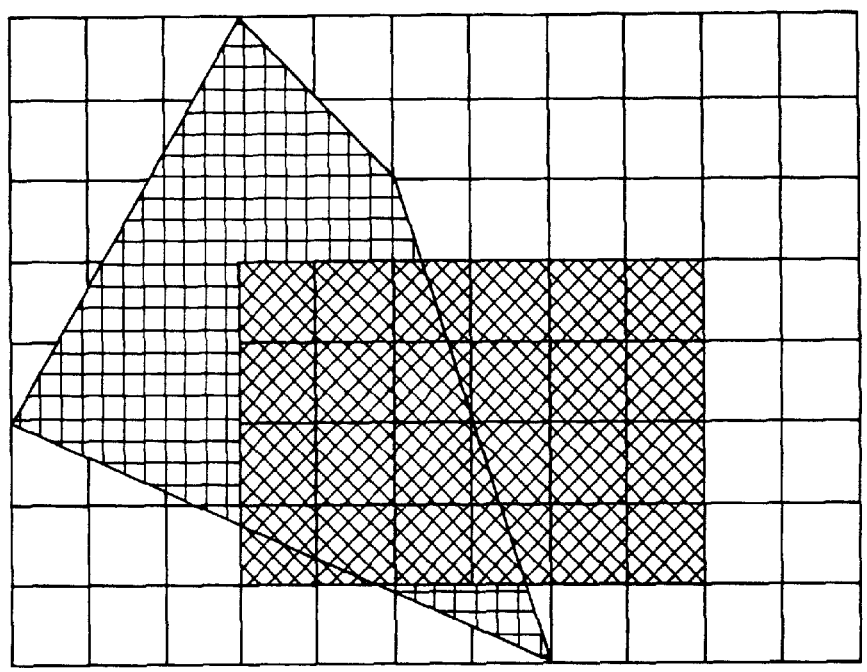
FIG. 47 is an illustrative drawing showing an example of hidden surface processing using the Z-buffer method.
Figure 48:
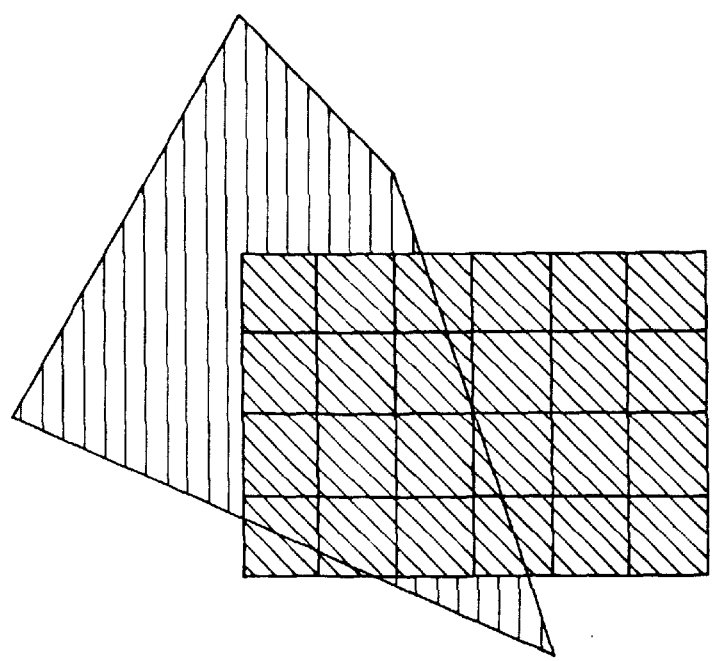
FIG. 48 is an illustrative drawing showing an example of a result of the hidden surface processing.

FIG. 47 is an illustrative drawing showing an example of the hidden surface processing using the Z-buffer method. In FIG. 47, a Z value of each dot is compared between a quadrilateral placed on the left, a rectangle placed on the right, and a background. A Z value closest to the view point is selected and stored. This is carried out by successively comparing a Z value stored in the Z buffer with a Z value of a polygon being processed, and by updating the Z value in the Z buffer if the Z value of the polygon being processed is closer to the view point. FIG. 48 is an illustrative drawing showing an example of a result of the hidden surface processing. As shown in FIG. 48, the rectangle is shown in front of the quadrilateral.

Figure 49:
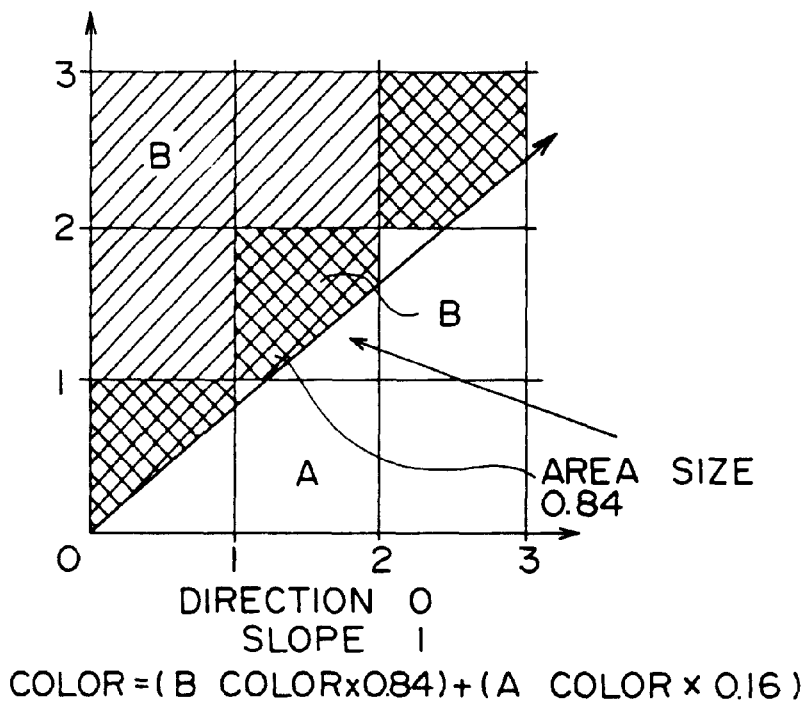
FIG. 49 is an illustrative drawing showing an example of the calculation of a dot color.

FIG. 49 is an illustrative drawing showing an example of the calculation of the dot color. In FIG. 49, the direction vector is 0 and the slope code is 1.

In the example of FIG. 49, a dot indicated by an arrow has an area size of 0.84 for a region B, and has an area size of 0.16 for a region A. Thus, the color of this dot is calculated as (color of region B×0.84)+(color of region A 0.16).

Figure 50:
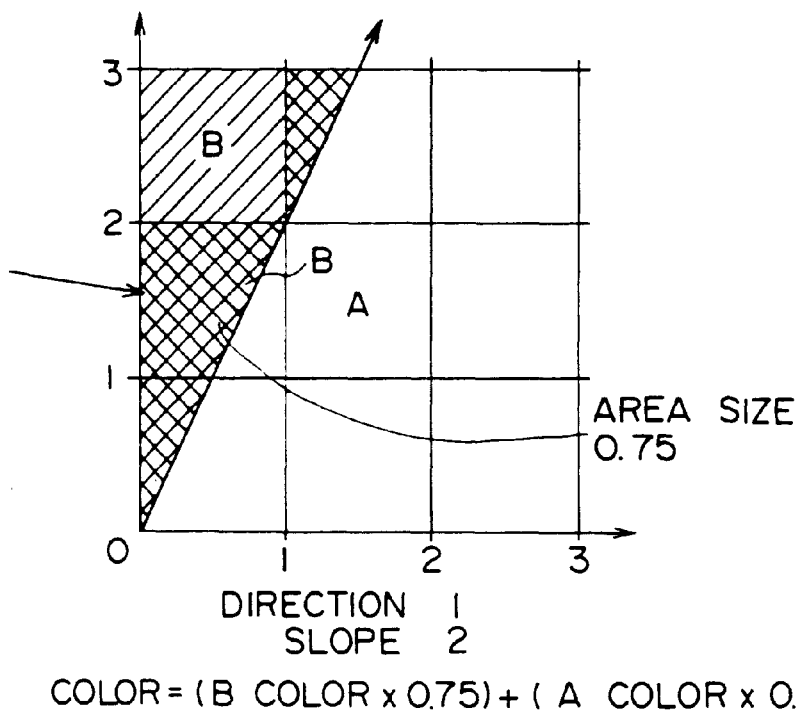
FIG. 50 is an illustrative drawing showing another example of the calculation of the dot color.

FIG. 50 is an illustrative drawing showing another example of the calculation of the dot color. In FIG. 50, the direction vector is 1 and the slope code is 2.

In the example of FIG. 50, a dot indicated by an arrow has an area size of 0.75 for a region B, and has an area size of 0.25 for a region A. Thus, the color of this dot is calculated as (color of region B×0.75)+(color of region A×0.25).

Figure 51:
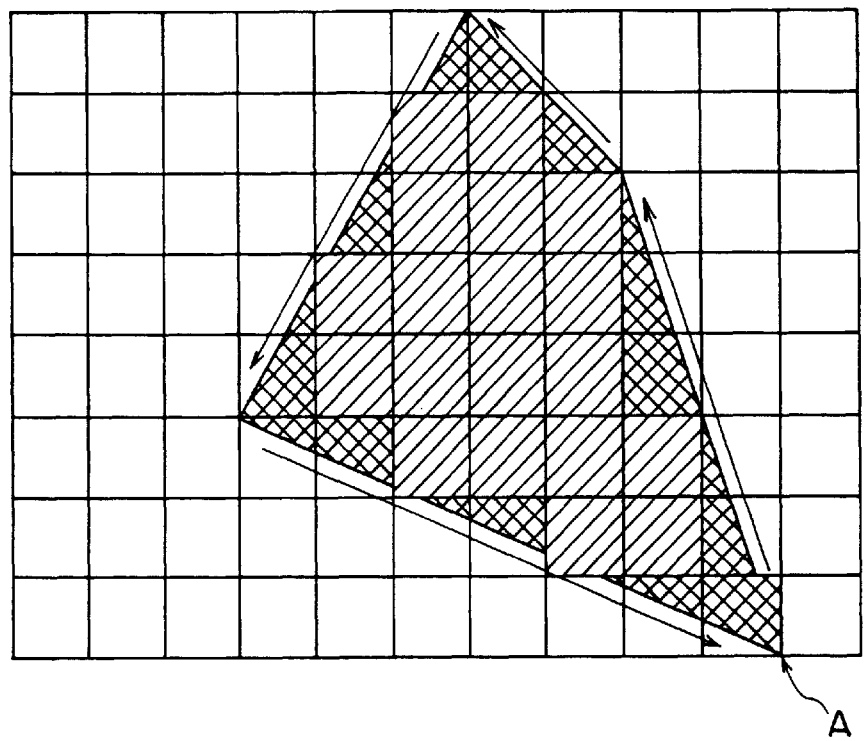
FIG. 51 is an illustrative drawing showing an example of the dot-area calculation for a polygon.
Figure 52:
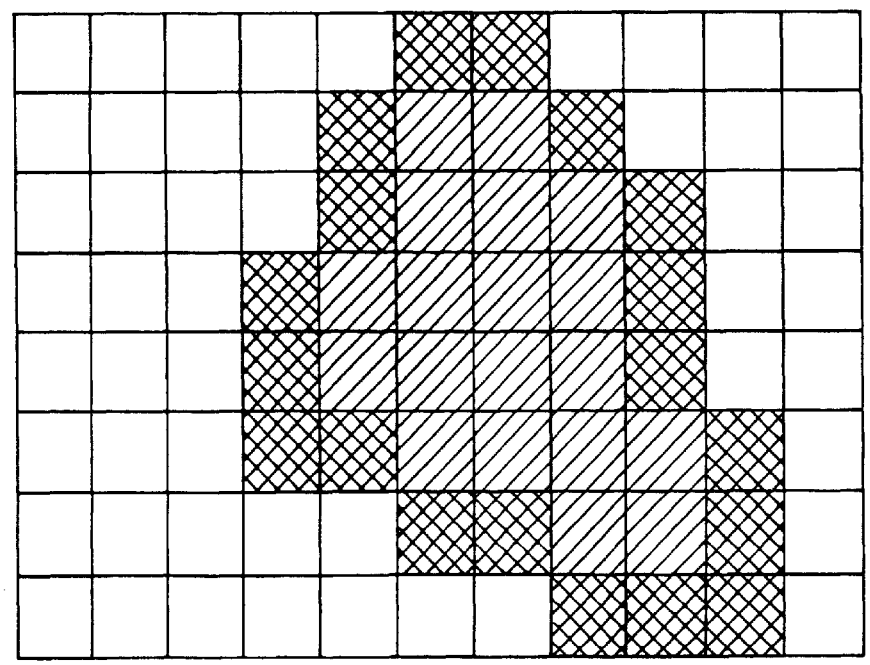
FIG. 52 is an illustrative drawing showing an example of a displayed polygon.

FIG. 51 is an illustrative drawing showing an example of the dot-area calculation for a polygon. In FIG. 51, cross-hatched areas are the areas whose sizes are calculated. As shown at a point A of FIG. 51, the calculation of an area size may fail when an apex is located within a dot. However, this failure has little effect on the entire drawing. FIG. 52 is an illustrative drawing showing an example of the displayed polygon. According to the anti-aliasing, cross-hatched dots have colors calculated by using the color of the polygon and the color of the surrounding region.

Figure 53:
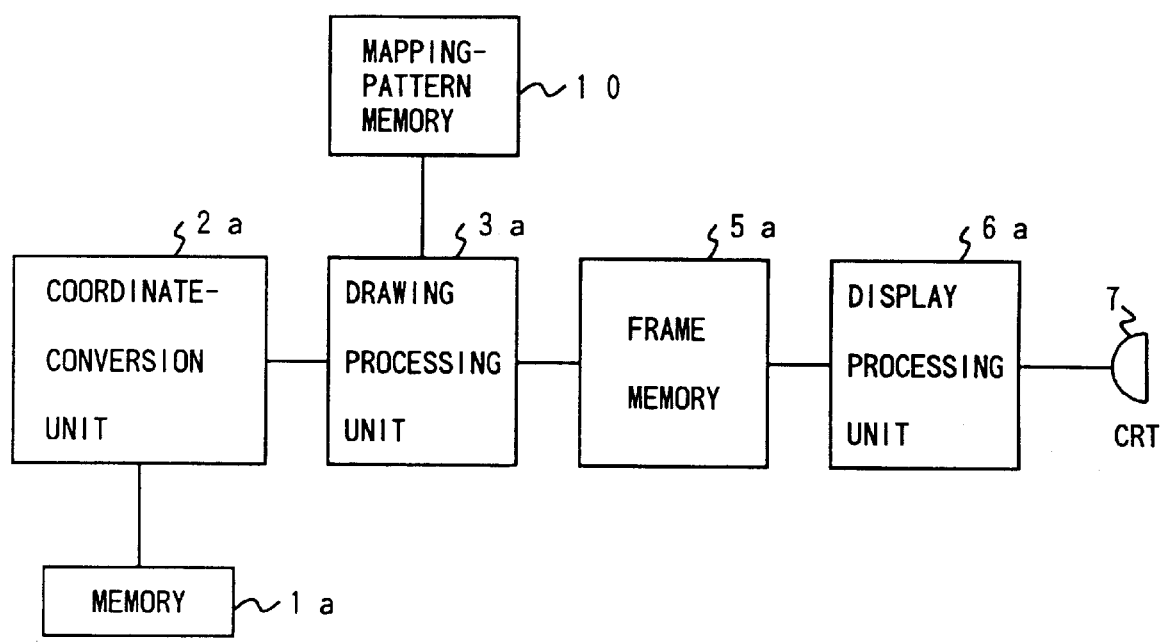
FIG. 53 is a block diagram of an image generation device according to a second embodiment of the present invention.

FIG. 53 is a block diagram of an image generation device according to a second embodiment of the present invention.

The image generation device of FIG. 53 includes a memory 1a, a coordinate-conversion unit 2a, a drawing processing unit 3a, a frame memory 5a, a display processing unit 6a, a CRT 7, and a mapping-pattern memory 10.

The memory 1a stores apexes of polygons constituting objects to be drawn, and stores apex information and a normal vector of a mapping pattern corresponding to a polygon. The data of the polygons and the mapping patterns is provided from the memory 1a to the coordinate-conversion unit 2a.

The coordinate-conversion unit 2a includes a CPU (central processing unit) or a DSP (digital signal processor), and calculates rotation, enlargement, contraction, etc., of the objects to arrange the objects in the world coordinates. Then, the coordinate-conversion unit 2a performs the view conversion to project the objects onto a screen. Then, X and Y values, X and Y coordinates (MX, MY) in the mapping-pattern memory 10, etc., of apexes of the polygons projected onto the screen by the coordinate-conversion unit 2a are supplied to the drawing processing unit 3a.

The drawing processing unit 3a calculates an area size occupied by the polygons in each dot and a color value (R, G, B) of each dot, and stores this data in the frame memory 5a. The drawing processing unit 3a uses N×N dots for one dot on the screen, and 2×2 dots are used in this embodiment. For a polygon surface, color values (R, G, B) for 2×2 dots are read from the mapping-pattern memory 10, and are averaged to obtain a color value (R, G, B) for one dot on the screen. The obtained color value (R, G, B) is stored in the frame memory 5a. For a polygon edge, how many dots of the 4×4 dots are included in the polygon are counted, and an area size occupied by the polygon in one dot on the screen is calculated as an approximation based on the count. The obtained area size is stored in the frame memory 5a.

The frame memory 5a stores a color value (R, G, B), an area size, and a direction code indicating a direction of the anti-aliasing for each dot in the same manner as in the first embodiment (FIG. 2). The direction code indicating a direction of the anti-aliasing is determined based on the direction vector of each edge.

The display processing unit 6a determines the color of a dot based on the colors, the dot-area size, and the direction code stored in the frame memory 5a, and sends the obtained color to the CRT 7. The CRT 7 displays an image.

Figure 54:
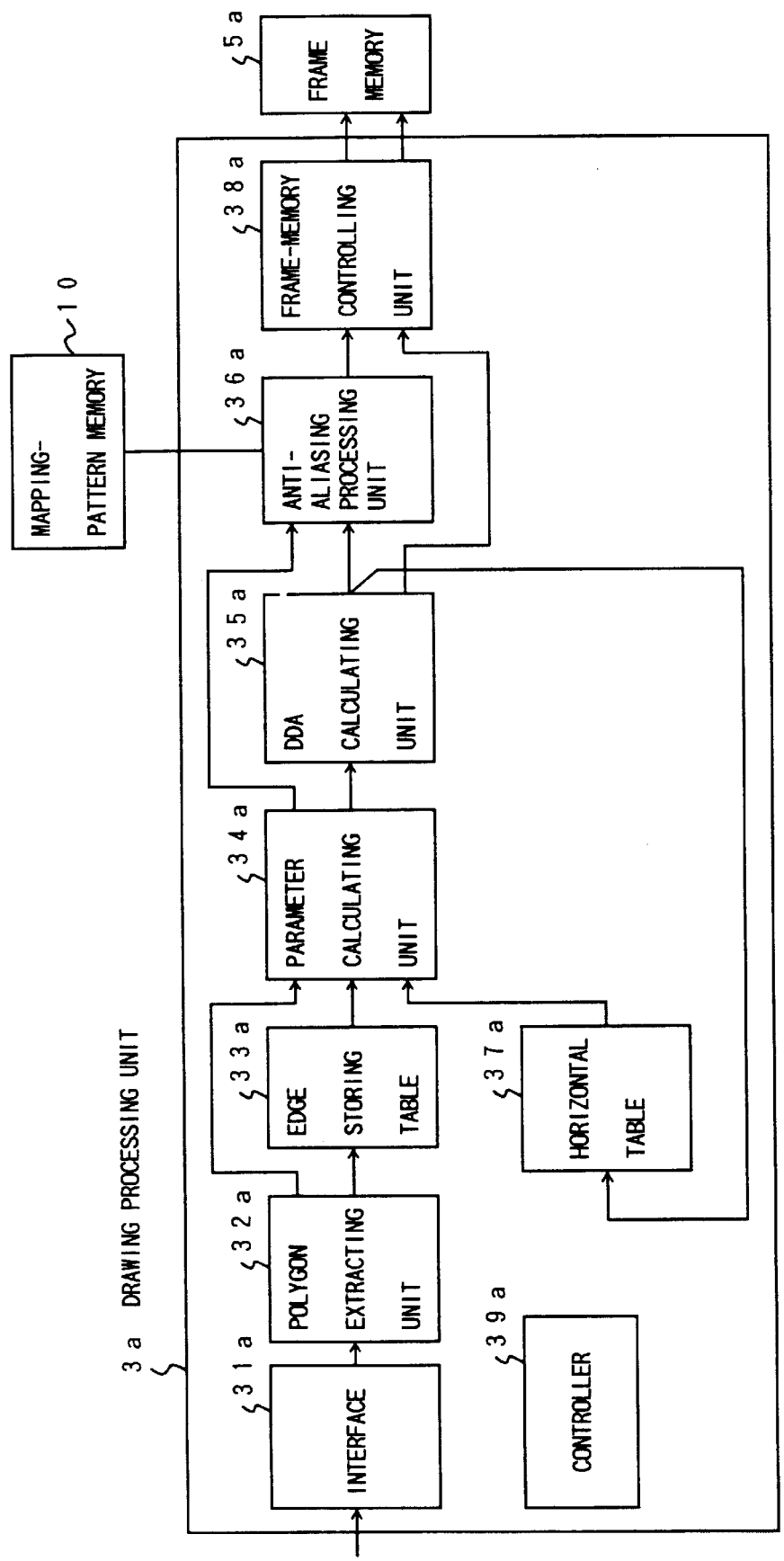
FIG. 54 is a block diagram of an example of a drawing processing unit of FIG. 53.

FIG. 54 is a block diagram of an example of the drawing processing unit 3a. The drawing processing unit 3a includes an interface 31a, a polygon extracting unit 32a, an edge storing table 33a, a parameter calculating unit 34a, a DDA calculating unit 35a, an anti-aliasing processing unit 36a, a horizontal table 37a, a frame-memory controlling unit 38a, and a controller 39a.

The interface 31a receives data such as X, Y, and Z coordinates of apexes of the polygons, X and Y coordinates (MX, MY) of the mapping pattern memory, etc., from the coordinate-conversion unit 2a. That is, the interface 31a handles the data transfer between the coordinate-conversion unit 2a and the drawing processing unit 3a. The data provided from the coordinate-conversion unit 2a is supplied to the polygon extracting unit 32a via the interface 31a.

The polygon extracting unit 32a modifies and rearranges information about the polygon edges for convenience of later processing, and stores the modified and rearranged information in the edge storing table 33a.

Figure 55:
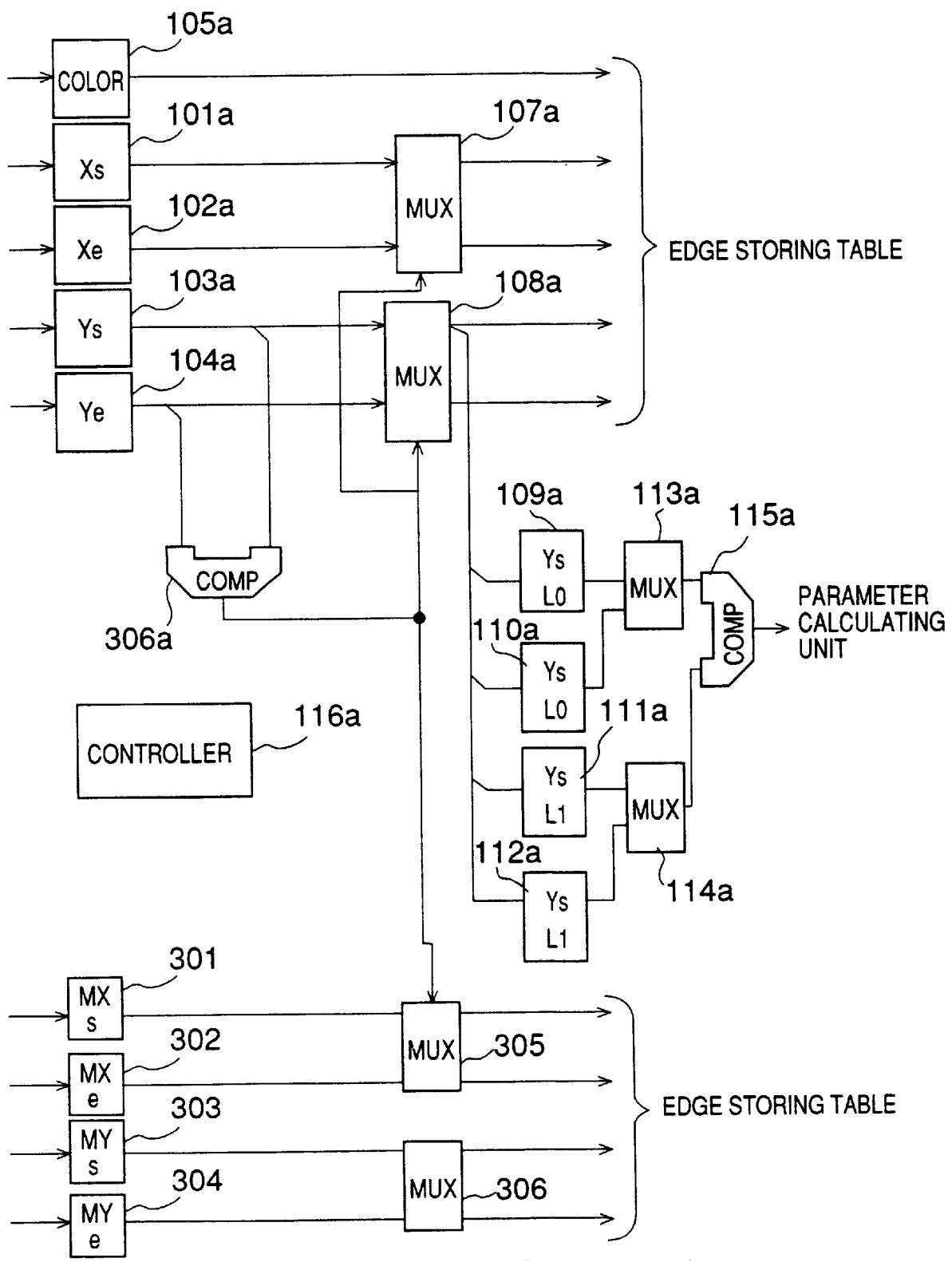
FIG. 55 is a circuit diagram of an example of a polygon extracting unit of FIG. 54.

FIG. 55 is a circuit diagram of an example of the polygon extracting unit 32a.

The polygon extracting unit 32a receives X and Y values, X and Y coordinates (MX, MY) of the mapping pattern memory, colors, attributes, etc., of the apexes of the polygons from the interface 31a. An X-start point Xs, an X-end point Xe, a Y-start point Ys, and a Y-end point Ye of a given edge are stored in registers 101a through 104a, respectively. Also, a color of the given edge is stored in a color register 105a.

Furthermore, a mapping-pattern-memory-X-start point MXs, a mapping-pattern-memory-X-end point MXe, a mapping-pattern-memory-Y-start point MYs, and a mapping-pattern-memory-Y-end point MXe are stored in registers 301 through 304, respectively.

A controller 116a determines, as in the first embodiment, which direction of FIG. 5 is indicated by a vector representing each edge of the polygon. Based on the direction of the vector, the controller 116a determines, as shown in FIG. 6, which one of the right edge and the left edge each edge of the polygon is.

In the second embodiment, processing is carried out with an assumption that all vectors are directed downward. Thus, polygons shown in FIGS. 7A and 7B are processed to obtain pairs of vectors shown in FIGS. 8A and 8B, with vectors directed upward being reversed. As for polygons as shown in FIG. 7C, the polygons are divided such that two pairs of vectors are obtained as shown in FIG. 8C, with vectors directed upward being reversed.

The reversing process of vectors is carried out as follows. Ys and Ye stored in the registers 103a and 104a, respectively, are provided to a comparator 106a. The comparator 106a compares Ys with Ye, and controls multiplexers 107a, 108a, 305, and 306 based on a result of the comparison. That is, the multiplexers 107a, 108a, 305, and 306 are controlled based on whether the edge should be reversed. When the edge should be reversed, the multiplexers 107a, 108a, 305, and 306 exchange the start point with the end point to send the data of the edge to the edge storing table 33a. When there is no need to reverse the edge, the multiplexers 107a, 108a, 305, and 306 send to the edge storing table 33a the data provided from the interface 31a without changing the data.

FIG. 56 is a chart showing a configuration of the edge storing table 33a. As shown in the figure, pairs of a left polygon edge and a right polygon edge are stored in the edge storing table 33a.

As in the first embodiment, even when a vector directed upward is reversed by exchanging the start point with the end point, the classification of either the right edge or the left edge will not change as shown in FIG. 9.

With reference to FIG. 55 again, the Y-start point Ys to be stored at left-edge address 0 in the edge storing table 33a is stored in a register 109a from the multiplexer 108a. The Y-start point Ys to be stored at right-edge address 0 in the edge storing table 33a is stored in a register 110a from the multiplexer 108a. The Y-start point Ys to be stored at left-edge address 1 in the edge storing table 33a is stored in a register 111a from the multiplexer 108a. Also, the Y-start point Ys to be stored at right-edge address 1 in the edge storing table 33a is stored in a register 112a from the multiplexer 108a.

The Y-start points stored in the registers 109a and 110a, which are stored in left-edge address 0 and right-edge address 0 of the edge storing table 33a, respectively, are supplied to a comparator 115a via a multiplexer 113a. Also, the Y-start points stored in the registers 111a and 112a, which are stored in left-edge address 1 and right-edge address 1 of the edge storing table 33a, respectively, are supplied to the comparator 115a via a multiplexer 114a. With respect to either one of the right edge or the left edge according to control of the multiplexers 113a and 114a, the comparator 115a compares the Y-start point of address 0 with the Y-start point of address 1. Thus, the comparator 115a determines which one of the two edges stored in address 0 and address 1 is higher in the Y coordinate, and provides a result of the comparison for the parameter calculating unit 34a. The above-mentioned elements of FIG. 55 are controlled by the controller 116a.

The parameter calculating unit 34a also receives data from the edge storing table 33a and the horizontal table 37a. A detailed description of the horizontal table 37a will be provided later.

Figure 57:
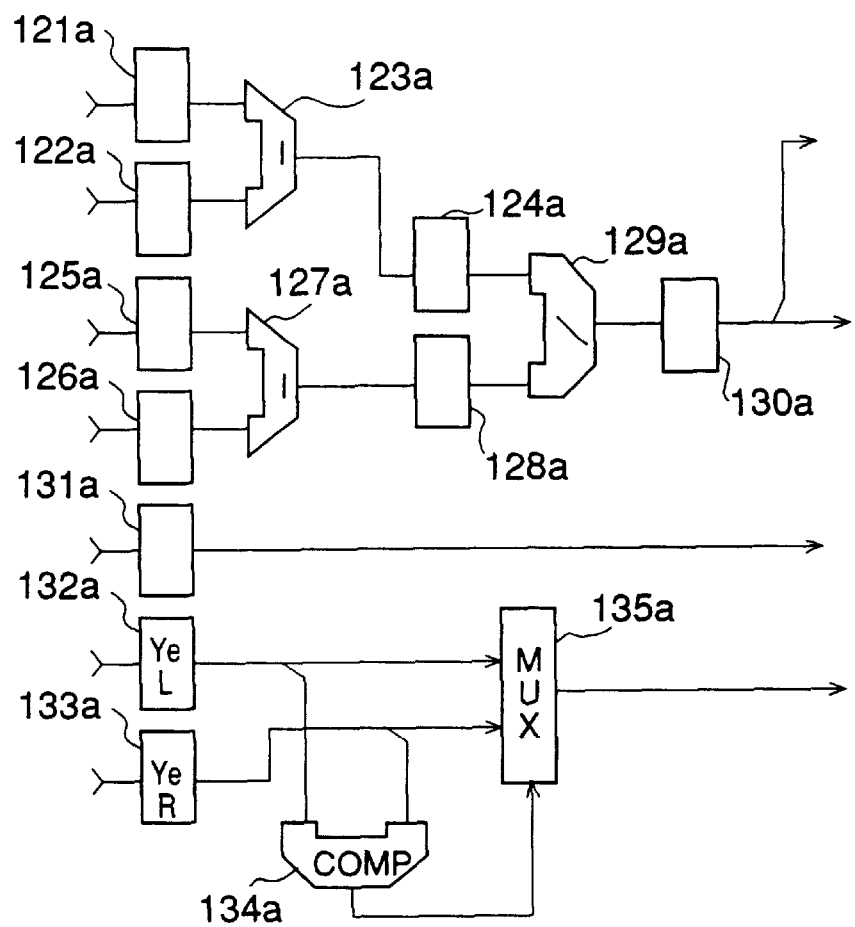
FIG. 57 is a circuit diagram of an example of a parameter calculating unit of FIG. 54.

The parameter calculating unit 34a calculates slopes of the right edges and the left edges of the polygons, slopes for MX and MY values of the mapping-pattern memory, etc. FIG. 57 is a circuit diagram of an example of the parameter calculating unit 34a.

The parameter calculating unit 34a obtains slopes of polygon edges as parameters used in the DDA (digital differential analysis). In the parameter calculating unit 34a of FIG. 57, registers 121a and 122a store a slope-axis coordinate of a start point and a slope-axis coordinate of an end point, respectively, of a given edge provided from the edge storing table 33a. A subtracter 123a receives the slope-axis coordinate of the start point and the slope-axis coordinate of the end point from the registers 121a and 122a, respectively, to calculate a difference between the two slope-axis coordinates. The difference of the given edge is supplied to a register 124a.

Registers 125a and 126a store a major-axis coordinate of the start point and a major-axis coordinate of the end point of the given edge provided from the edge storing table 33a. A subtracter 127a receives the major-axis coordinate of the start point and the major-axis coordinate of the end point from the registers 125a and 126a, respectively, to calculate a difference between the two major-axis coordinates. This difference is provided for a register 128a.

A divider 129a receives these differences from the register 124a and the register 128a, and divides the difference in the slope axis by the difference in the major axis to obtain a slope of the given edge. The slope thus obtained is stored in a register 130a, and, then, sent to the DDA calculating unit 35a.

A register 132a stores the Y-end point of a left edge, and a register 133a stores the Y-end point of a right edge. The Y-end points stored in the registers 132a and 133a are sent to a comparator 134a and a multiplexer 135a. The comparator 134a compares the Y-end points between the left edge and the right edge, and controls the multiplexer 135a based on a result of the comparison. The multiplexer 135a sends to the DDA calculating unit 35a the smallest one of the Y-end point of the left edge and the Y-end point of the right edge.

A register 131a stores various parameters sent from the edge storing table 33a. These parameters are supplied to the DDA calculating unit 35a.

Some of the parameters calculated by the parameter calculating unit 34a as described above are sent to the anti-aliasing processing unit 36a as well as to the DDA calculating unit 35a.

The DDA calculating unit 35a calculates screen-address values (X, Y) and mapping-pattern-memory-address values (MX, MY) of the right edge and the left edge through the digital differential analysis (DDA). For example, the DDA calculating unit 35a calculates X values, MX values, and MY values of a left edge and a right edge through the DDA each time a Y value is incremented (or decreased). After carrying out the DDA for the left edge, the DDA calculating unit 35a stores the X value, MX value, and MY value calculated for the left edge in the horizontal table 37a. Then, the DDA calculating unit 35a carries out the DDA for the right edge to store the X value, MX value, and MY value of the right edge in the horizontal table 37a.

Figure 58:
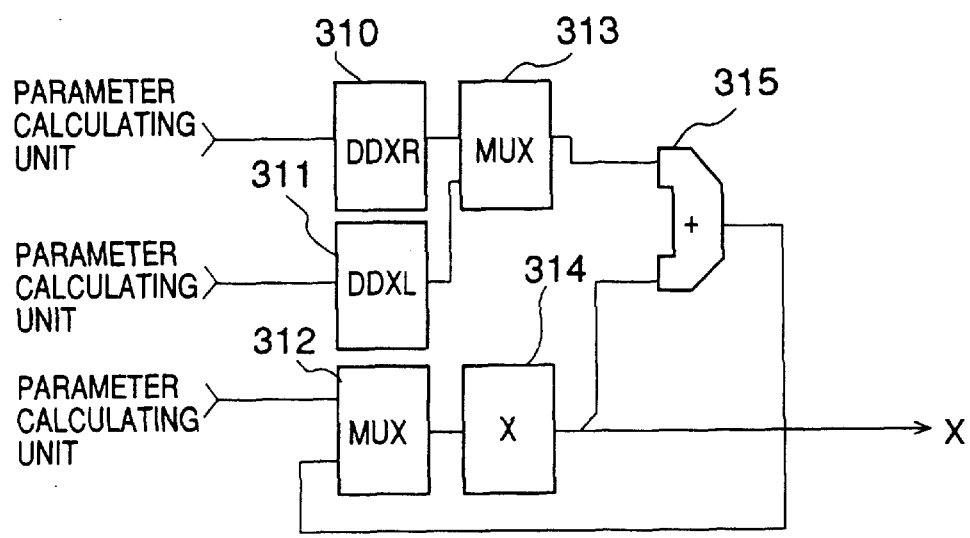
FIG. 58 is a circuit diagram of an example of a DDA calculating unit of FIG. 54 when an X value for an X slope axis is calculated.
Figure 59:
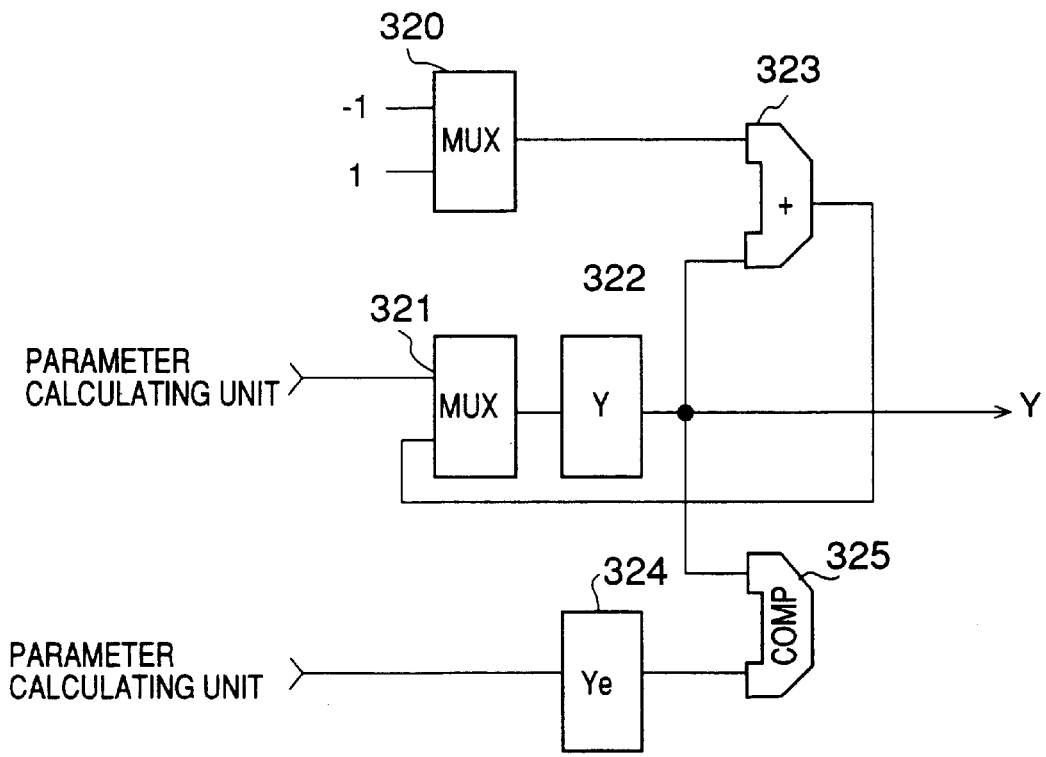
FIG. 59 is a circuit diagram of an example of the DDA calculating unit when a Y value for a Y major axis is calculated.
Figure 60:
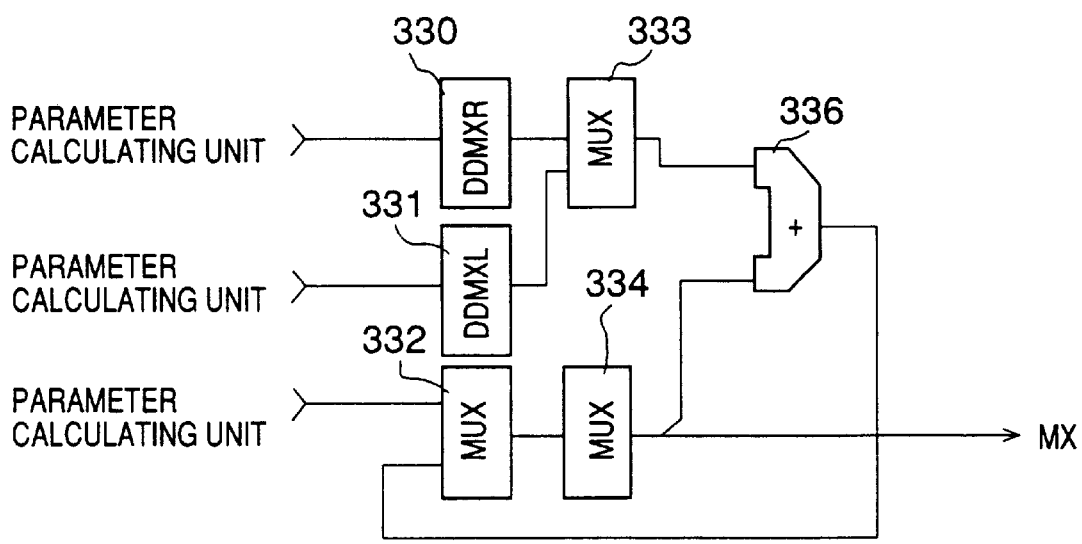
FIG. 60 is a circuit diagram of an example of the DDA calculating unit when a mapping-pattern-memory address MX is calculated.
Figure 61:
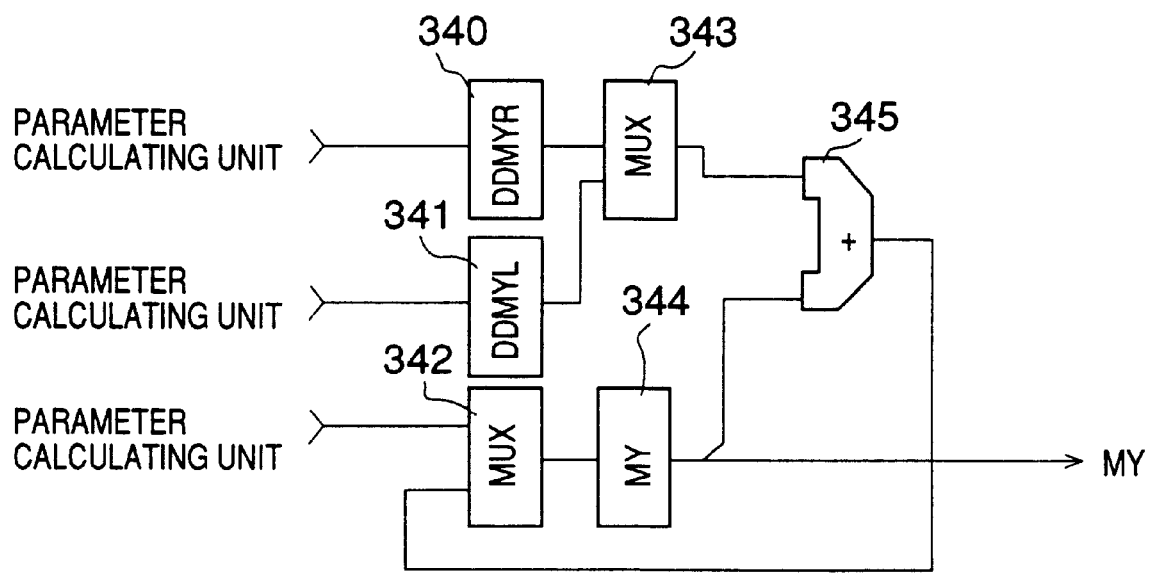
FIG. 61 is a circuit diagram of an example of the DDA calculating unit when a mapping-pattern-memory address MY is calculated.

FIG. 58 is a circuit diagram of an example of the DDA calculating unit 35a when an X value for an X slope axis is calculated. FIG. 59 is a circuit diagram of an example of the DDA calculating unit 35a when a Y value for a Y major axis is calculated. FIG. 60 is a circuit diagram of an example of the DDA calculating unit 35a when a mapping-pattern-memory address MX is calculated. FIG. 61 is a circuit diagram of an example of the DDA calculating unit 35a when a mapping-pattern-memory address MY is calculated.

In the DDA calculating unit 35a of FIG. 58 used for calculating an X value, a register 310 stores the X slope of a right edge provided from the parameter calculating unit 34a, and a register 311 stores the X slope of a left edge provided from the parameter calculating unit 34a. A multiplexer 313 selects one of the register 310 and the register 311 to supply an output thereof to an adder 315.

A multiplexer 312 receives an X value sent from the parameter calculating unit 34a and an X value calculated by the adder 315. One of these X values is selected by the multiplexer 312 to be stored in a register 314. The adder 315 adds the X slope provided from the multiplexer 313 to the X value stored in the register 314. In this manner, the X values of various points along the left edge or the right edge are calculated successively. The X value stored in the register 314 is supplied to the anti-aliasing processing unit 36a.

In the DDA calculating unit 35a of FIG. 59 used for calculating a Y value for a Y major axis, a multiplexer 320 is provided with data of −1 and 1. Either one of −1 or 1 is provided from the multiplexer 320 to an adder 323.

A multiplexer 321 receives a Y value sent from the parameter calculating unit 34a and a Y value calculated by the adder 323. One of these Y values is selected by the multiplexer 321 to be stored in a register 322. The adder 323 adds either one of 1 or −1 provided from the multiplexer 320 to the Y value stored in the register 322. The Y value stored in the register 322 is supplied to the anti-aliasing processing unit 36a.

A register 324 stores the Y value of the end point obtained by the parameter calculating unit 34a for a pair of the left edge and the right edge. A comparator 325 compares the Y value stored in the register 324 with the Y value stored in the register 322. A result of the comparison is sent to a controller for controlling the DDA process. Based on the result of the comparison, it is determined whether to continue or to end the DDA process.

In the DDA calculating unit 35a of FIG. 60 used for calculating a mapping-pattern-memory address MX, a register 330 stores the MX slope of a right edge provided from the parameter calculating unit 34a, and a register 331 stores the MX slope of a left edge provided from the parameter calculating unit 34a. A multiplexer 333 selects one of the register 330 and the register 331 to supply an output thereof to an adder 335.

A multiplexer 332 receives an MX value sent from the parameter calculating unit 34a and an MX value calculated by the adder 335. One of these MX values is selected by the multiplexer 332 to be stored in a register 334. The adder 335 adds the MX slope provided from the multiplexer 333 to the MX value stored in the register 334. In this manner, the MX values of various points along the left edge or the right edge are calculated successively. The MX value stored in the register 334 is supplied to the anti-aliasing processing unit 36a.

In the DDA calculating unit 35a of FIG. 61 used for calculating a mapping-pattern-memory address MY, a register 340 stores the MY slope of a right edge provided from the parameter calculating unit 34a, and a register 341 stores the MY slope of a left edge provided from the parameter calculating unit 34a. A multiplexer 343 selects one of the register 340 and the register 341 to supply an output thereof to an adder 345.

A multiplexer 342 receives an MY value sent from the parameter calculating unit 34a and an MY value calculated by the adder 345. One of these MY values is selected by the multiplexer 342 to be stored in a register 344. The adder 345 adds the MY slope provided from the multiplexer 343 to the MY value stored in the register 344. In this manner, the MY values of various points along the left edge or the right edge are calculated successively. The MY value stored in the register 344 is supplied to the anti-aliasing processing unit 36a.

FIG. 62 is a chart showing an example of a structure of the horizontal table 37a. As shown in the figure, the horizontal table 37a temporarily stores data such as an X value, an MX value, an MY value, and a direction vector of the left edge for an odd-number line and an even-number line, and stores data such as an X value, a Y value, an MX value, an MY value, a direction vector, and attributes of the right edge for an odd-number line and an even-number line. When all the data is stored in the horizontal table 37a, the data is sent to the parameter calculating unit 34a to calculate parameters needed for DDA calculations in a horizontal direction.

The anti-aliasing processing unit 36a receives the data calculated by the parameter calculating unit 34a and the DDA calculating unit 35a. The anti-aliasing processing unit 36a receives the mapping-pattern-memory address (MX, MY) from the DDA calculating unit 35a. Then, the anti-aliasing processing unit 36a accesses the mapping-pattern memory 10 by using the mapping-pattern-memory address (MX, MY) to read the mapping data for 2×2 dots. The anti-aliasing processing unit 36a also receives left-edge X values and right-edge X values on an odd-number line and on an even-number line from the parameter calculating unit 34a. Here, an odd-number line and an even-number line together constitute a scan line corresponding to a line of screen dots. Then, the anti-aliasing processing unit 36a counts, based on the X value being processed, how many dots of the 4×4 dots within a given screen pixel are included in the polygon. Based on this count, the mapping data for 2×2 dots is averaged for the anti-aliasing.

Furthermore, the anti-aliasing processing unit 36a receives the leftmost left-edge-X-value XL and the rightmost right-edge-X-value XR of a current line and the leftmost left-edge-X-value BXL and the rightmost right-edge-X-value BXR of a previous line to carry out edge determination and assignment of an anti-aliasing direction.

When a current X value is between XL and BXL, it can be known that an edge being processed is a left polygon edge. Thus, the direction of the anti-aliazing is set to that of the left edge. When a current X value is between XR and BXR, it can be known that an edge being processed is a right polygon edge. Thus, the direction of the anti-aliasing is set to that of the right edge. The RGB values, the area size, and the direction of the anti-aliasing are sent to the frame-memory controlling unit 38a.

Figure 63:
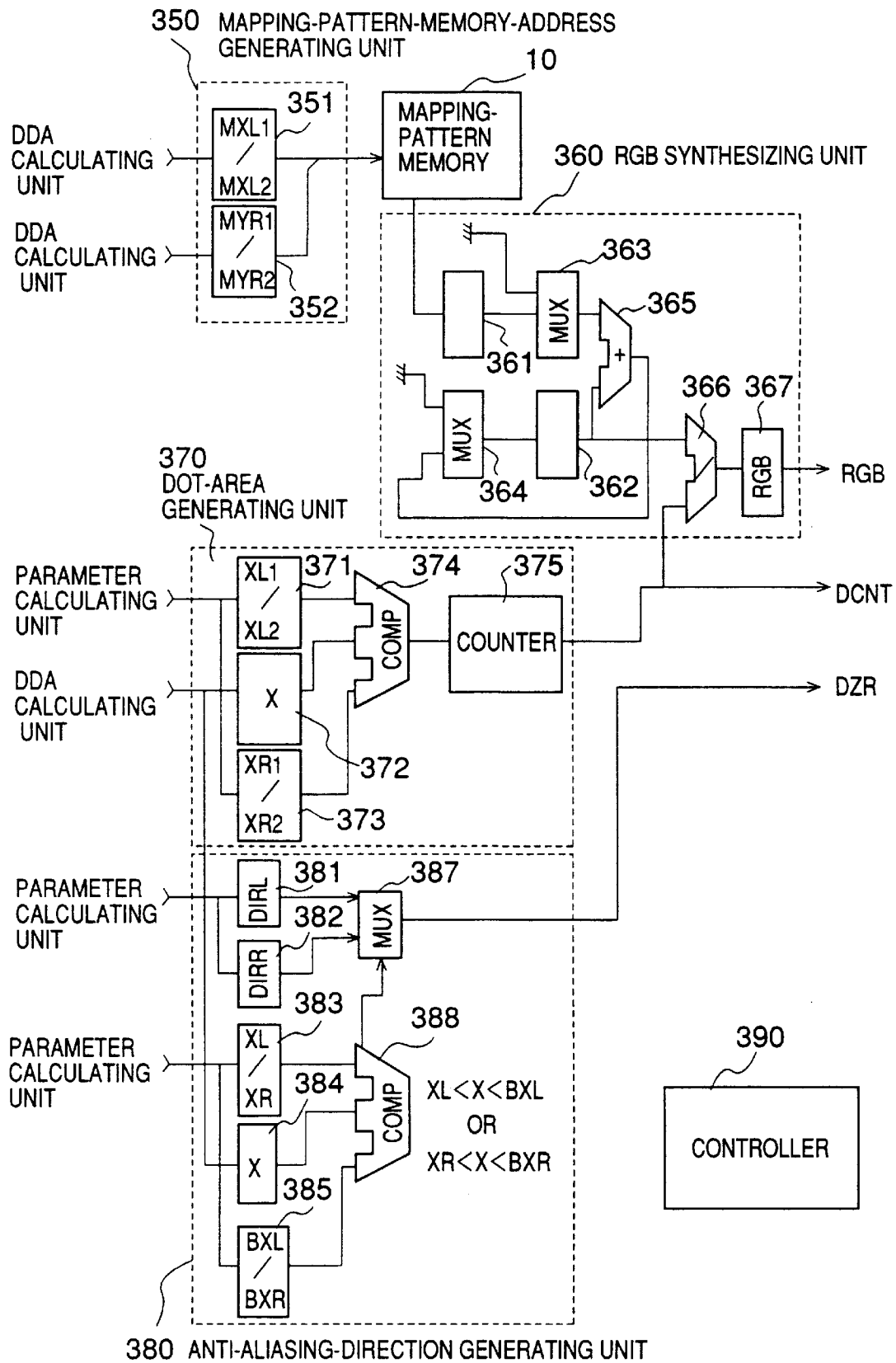
FIG. 63 is a circuit diagram of an example of an anti-aliasing processing unit of FIG. 54.

FIG. 63 is a circuit diagram of an example of the anti-aliasing processing unit 36a. The anti-aliasing processing unit 36a includes a mapping-pattern-memory-address generating unit 350, a RGB synthesizing unit 360, a dot-area generating unit 370, an anti-aliasing-direction generating unit 380, and a controller 390.

The mapping-pattern-memory-address generating unit 350 includes a register 351 and a register 352. The mapping-pattern-memory-address generating unit 350 receives the mapping-pattern-memory address (MX, MY) from the DDA calculating unit 35a, and generates an address to access the mapping-pattern memory 10. In the second embodiment, the register 351 stores the X address MXL1 on the odd-number line and the X address MXL2 on the even-number line, and the register 352 stores the Y address MYL1 on the odd-number line and the Y address MYL2 on the even-number line. Based on the X addresses and the Y addresses of the mapping-pattern memory 10 stored in the registers 351 and 352, respectively, RGB information is read from the mapping-pattern memory 10. The RGB information is supplied to the RGB synthesizing unit 360.

The RGB synthesizing unit 360 includes a register 361, a register 362, a multiplexer 363, a multiplexer 364, an adder 365, a divider 366, and a register 367. The RGB synthesizing unit 360 receives the RGB information read from the mapping-pattern memory 10, and adds the RGB information for the dots included in a given screen dot. Then, the RGB synthesizing unit 360 obtains an average of the RGB information for the anti-aliasing by using a count indicating the number of dots included in a polygon in the given screen dot.

The register 361 stores the RGB information sent from the mapping-pattern memory 10. The RGB information stored in the register 361 is sent to the adder 365 via the multiplexer 363. When there is no dot, the multiplexer 363 sends a value of 0 to the adder 365 instead of sending the data from the mapping-pattern memory 10.

Output data of the adder 365 is sent to the register 362 via the multiplexer 364. The multiplexer 364 sends a value of 0 to the register 362 at a time of initialization, and sends the data from the adder 365 to the register 362 otherwise. The adder 365 adds the data provided from the multiplexer 363 and the data provided from the register 362. The register 362 stores a result of the adding operation each time the RGB value read from the mapping-pattern memory 10 is added. The data stored in the register 362 is provided for the divider 366. The divider 366 divides the data from the register 362 by the dot count sent from the dot-area generating unit 370 to calculate an average of the RGB information. The averaged result is sent to the register 367. The averaged RGB data stored in the register 367 is sent to the frame-memory controlling unit 38a.

The dot-area generating unit 370 includes a register 371, a register 372, a register 373, a comparator 374, and a counter 375. The dot-area generating unit 370 counts the number of dots included in a polygon in the given screen dot.

The register 371 stores the left-edge X values XL1 and XL2 on the odd-number line and the even-number line, respectively, sent from the parameter calculating unit 34a. The register 373 stores the right-edge X values XR1 and XR2 on the odd-number line and the even-number line, respectively, sent from the parameter calculating unit 34a. The register 372 stores an X value being processed sent from the DDA calculating unit 35a. The data stored in the registers 371 through 373 are provided for the comparator 374. The comparator 374 makes a comparison to determine if XL<X<XR is satisfied, so as to decide whether the X value being processed is included in the polygon. A result of the comparison is sent to the counter 375.

The counter 375 counts how many dots of the 2×2 dots are included in the polygon for the given screen dot. The count is sent to the RGB synthesizing unit 360 and to the frame-memory controlling unit 38a.

The anti-aliasing-direction generating unit 380 includes registers 381 through 385, a comparator 386, and a multiplexer 387. The anti-aliasing-direction generating unit 380 determines whether a given dot on a current scan line belongs to a polygon edge. If it does, the anti-aliasing-direction generating unit 380 further determines whether this edge is a left edge or a right edge, in order to obtain a direction of the anti-aliasing.

The direction vector of the left edge provided from the parameter calculating unit 34a is stored in the register 381, and the direction vector of the right edge provided from the parameter calculating unit 34a is stored in the register 382. The direction vectors stored in the registers 381 and 382 are supplied to the multiplexer 387.

Figure 64:
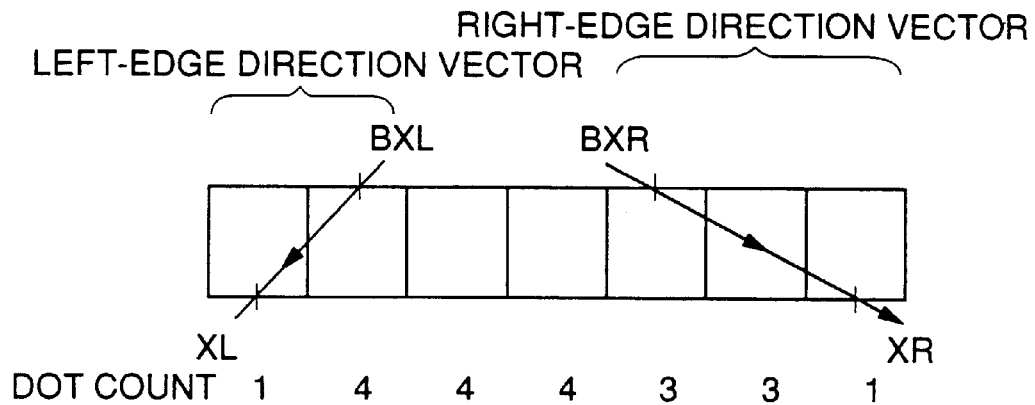
FIG. 64 is an illustrative drawing showing relations between XL, XR, BXL, and BXR.

The leftmost X value XL and the rightmost X value XR of the current line are stored in the register 383, and the leftmost X value BXL and the rightmost X value BXR of the previous line are stored in the register 385. FIG. 64 is an illustrative drawing showing relations between XL, XR, BXL, and BXR.

Still referring to FIG. 63, the X value being processed is provided from the DDA calculating unit 35a and stored in the register 384. The data stored in the registers 383 through 385 are supplied to the comparator 386. The comparator 386 makes a comparison as to whether X is between XL and BXL. If it is, the X value being processed belongs to a left edge. Thus, the comparator 386 controls the multiplexer 387 to output the direction vector of the left edge. If X is between XR and BXR, the X value being processed belongs to a right edge. Thus, the comparator 386 controls the multiplexer 387 to output the direction vector of the right edge. Each element of FIG. 63 described above is controlled by the controller 390.

The data from the DDA calculating unit 35a and the anti-aliasing processing unit 36a is provided for the frame-memory controlling unit 38a. The frame-memory controlling unit 38a receives the area size, the RGB information, and the edge direction of each dot from the anti-aliasing processing unit 36a, and obtains a frame-memory address to write the area size, the RGB information, the edge direction, and the direction code of each dot in the frame memory 5a.

Figure 65:
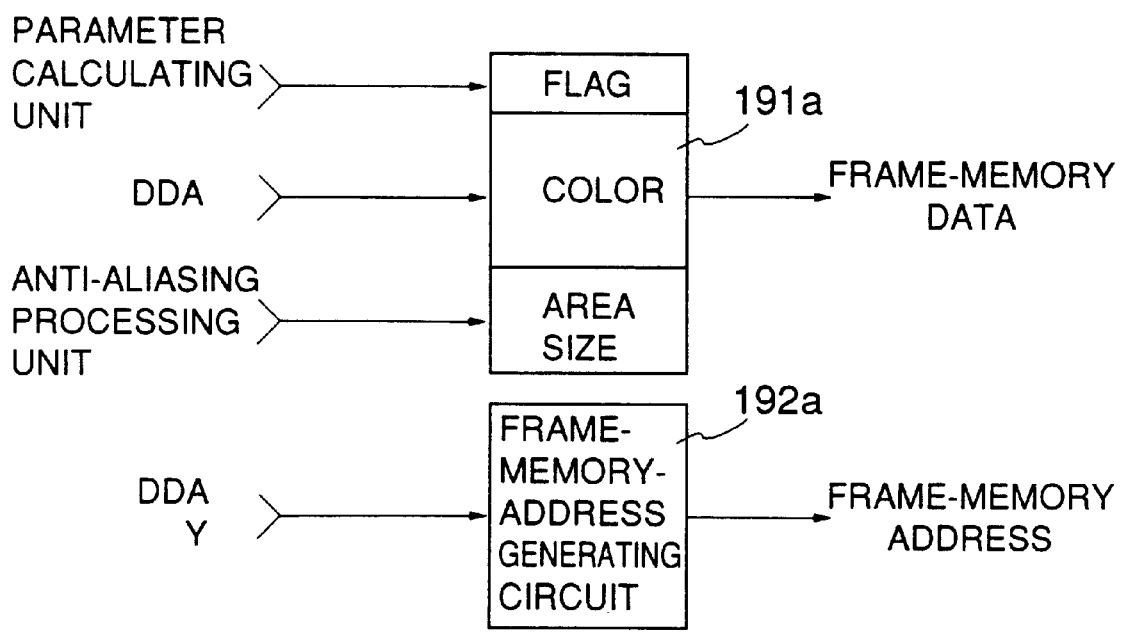
FIG. 65 is a block diagram of an example of a frame-memory controlling unit of FIG. 54.

FIG. 65 is a block diagram of an example of the frame-memory controlling unit 38a. The frame-memory controlling unit 38a includes a register 191a and a frame-memory-address generating circuit 192a.

The register 191 stores the data provided from the parameter calculating unit 34a in a flag area thereof, stores the color data provided from the DDA calculating unit 35a in a color area thereof, and stores the data provided from the anti-aliasing processing unit 36a in an area-size area thereof. All the data stored in the register 191 is sent to the frame memory 5a.

The Y values are provided for the frame-memory-address generating circuit 192a from the DDA calculating unit 35a. The frame-memory-address generating circuit 192a generates a frame-memory address, and provides it for the frame memory 5a as an address thereof.

Each unit of the drawing processing unit 3a described above is controlled by the controller 39a of FIG. 54. The control of each unit is carried out based on processes described below.

Figure 66A:
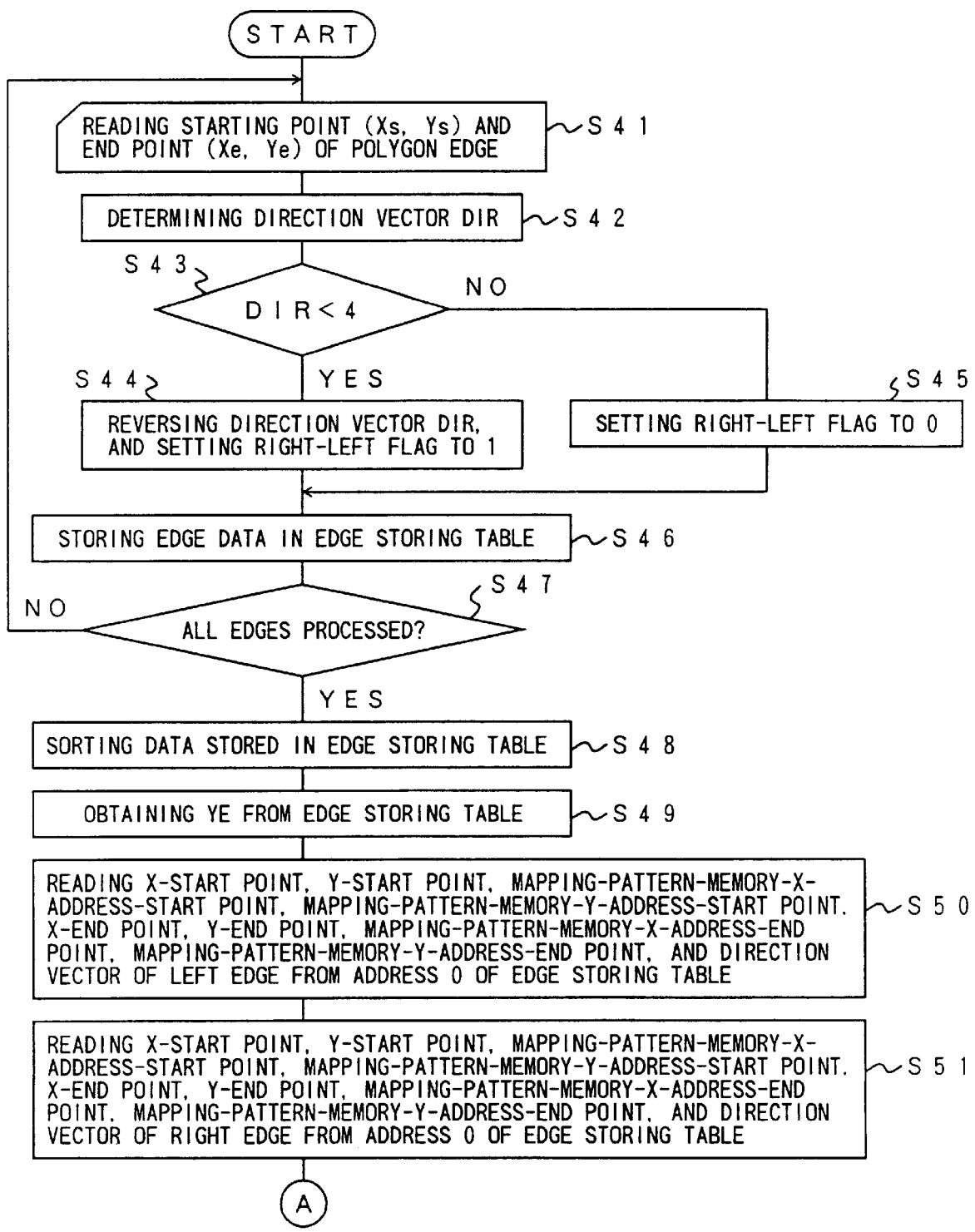
FIGS. 66A and 66B are a flowchart of a process of the anti-aliasing carried out by the drawing processing unit.
Figure 66B:
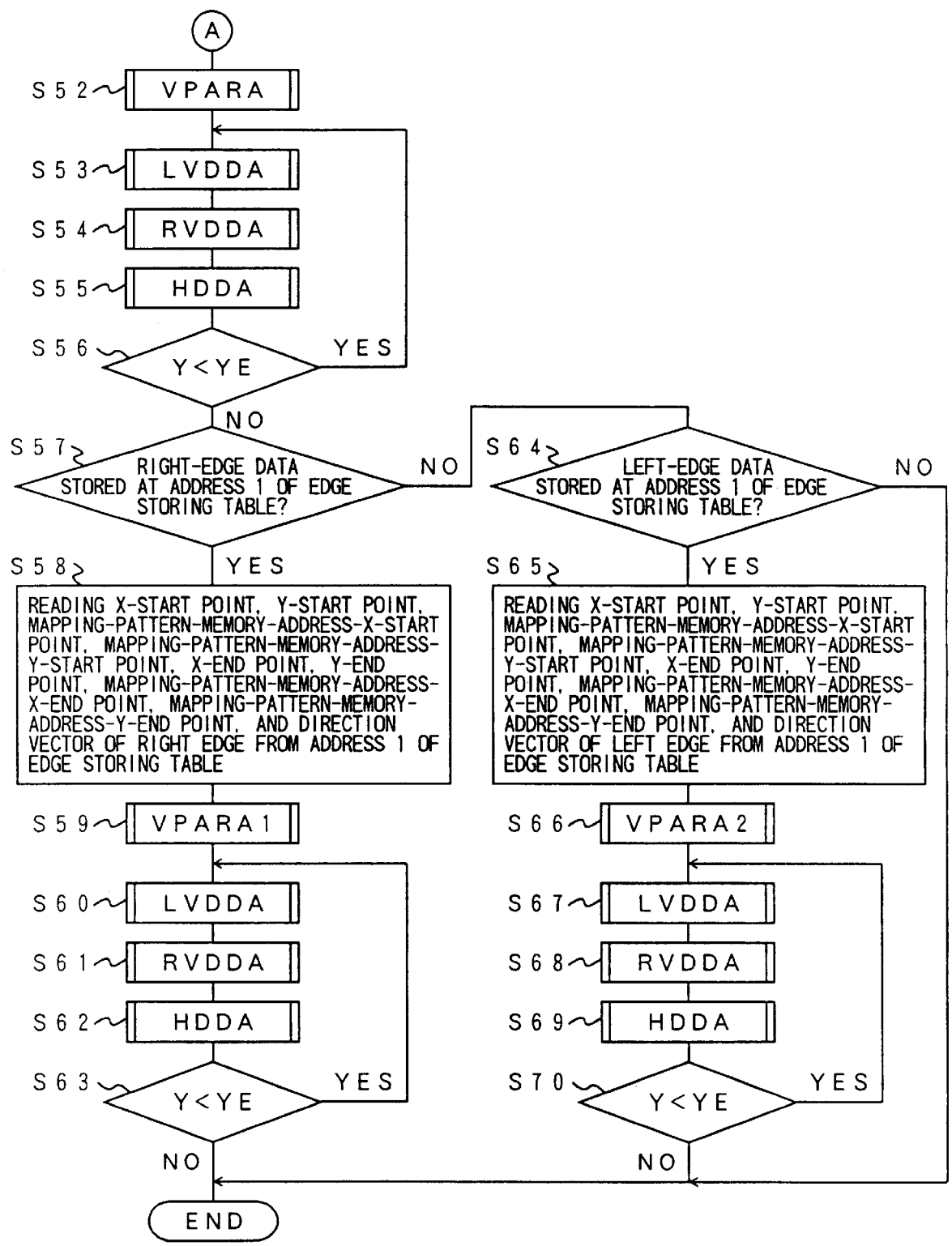

FIGS. 66A and 66B are a flowchart of a process of the anti-aliasing carried out by the drawing processing unit 3a.

At a step S41, a starting point (Xs, Ys) and an end point (Xe, Ye) of a polygon edge are read from the coordinate-conversion unit 2a.

At a step S42, it is examined in which direction a vector of the polygon edge is directed, and a direction vector DIR is determined.

At a step S43, a check is made whether the direction vector DIR is smaller than 4. In the second embodiment, as in the first embodiment, the process is carried out under a condition that all vectors are represented as vectors directed downward. This step is carried out to determine if the vector is directed downward. If the direction vector DIR is smaller than 4, the procedure goes to a step S44. If the direction vector is not smaller than 4, the procedure goes to a step S45.

At the step S44, the direction vector DIR is reversed since the vector is upward (see FIG. 5), and a right-left flag is set to 1. Here, the right-left flag indicates whether the edge is a right edge (i.e., the right-left flag being 1) or a left edge (i.e., the right-left flag being 0) (see FIG. 6).

At the step S45, the right-left flag is set to 0. Since the vector is downward (see FIG. 5), it is not reversed.

At a step S46, the data representing the edge is stored in the edge storing table 33a.

At a step S47, a check is made whether all the edges of all the polygons are processed. If they are, the procedure goes to a step S48. If there is an edge yet to be processed, the procedure goes back to the step S41 to repeat the above steps.

At the step S48, the data stored in the edge storing table 33a is sorted.

At a step S49, the Y coordinate which is to be at the end of the process is selected from the Y coordinates stored in the edge storing table 33a. Here, the Y coordinate thus obtained is denoted as YE.

At a step S50, an X-start point, a Y-start point, a mapping-pattern-memory-X-address-start point (MXs), a mapping-pattern-memory-Y-address-start point (MYs), an X-end point, a Y-end point, a mapping-pattern-memory-X-address-end point (MXe), a mapping-pattern-memory-Y-address-end point (MYE), and a direction vector of a left edge stored at address 0 of the edge storing table 33a are read.

At a step S51, an X-start point, a Y-start point, a mapping-pattern-memory-X-address-start point (MXs), a mapping-pattern-memory-Y-address-start point (MYs), an X-end point, a Y-end point, a mapping-pattern-memory-X-address-end point (MXe), a mapping-pattern-memory-Y-address-end point (MYE), and a direction vector of a right edge stored at address 0 of the edge storing table 33a are read.

Then, subroutine processes VPARA, LVDDA, RVDDA, and HDDA are carried out at steps S52, S53, S54 and S55. The subroutine process VPARA is a process for the parameter calculation. The subroutine process LVDDA is a process for the DDA calculation of the left edge. The subroutine process RVDDA is a process for the DDA calculation of the right edge. Finally, the subroutine process HDDA is a process for the DDA calculation in a horizontal direction parallel to the scan line.

These subroutine processes will be described below.

Figure 67:
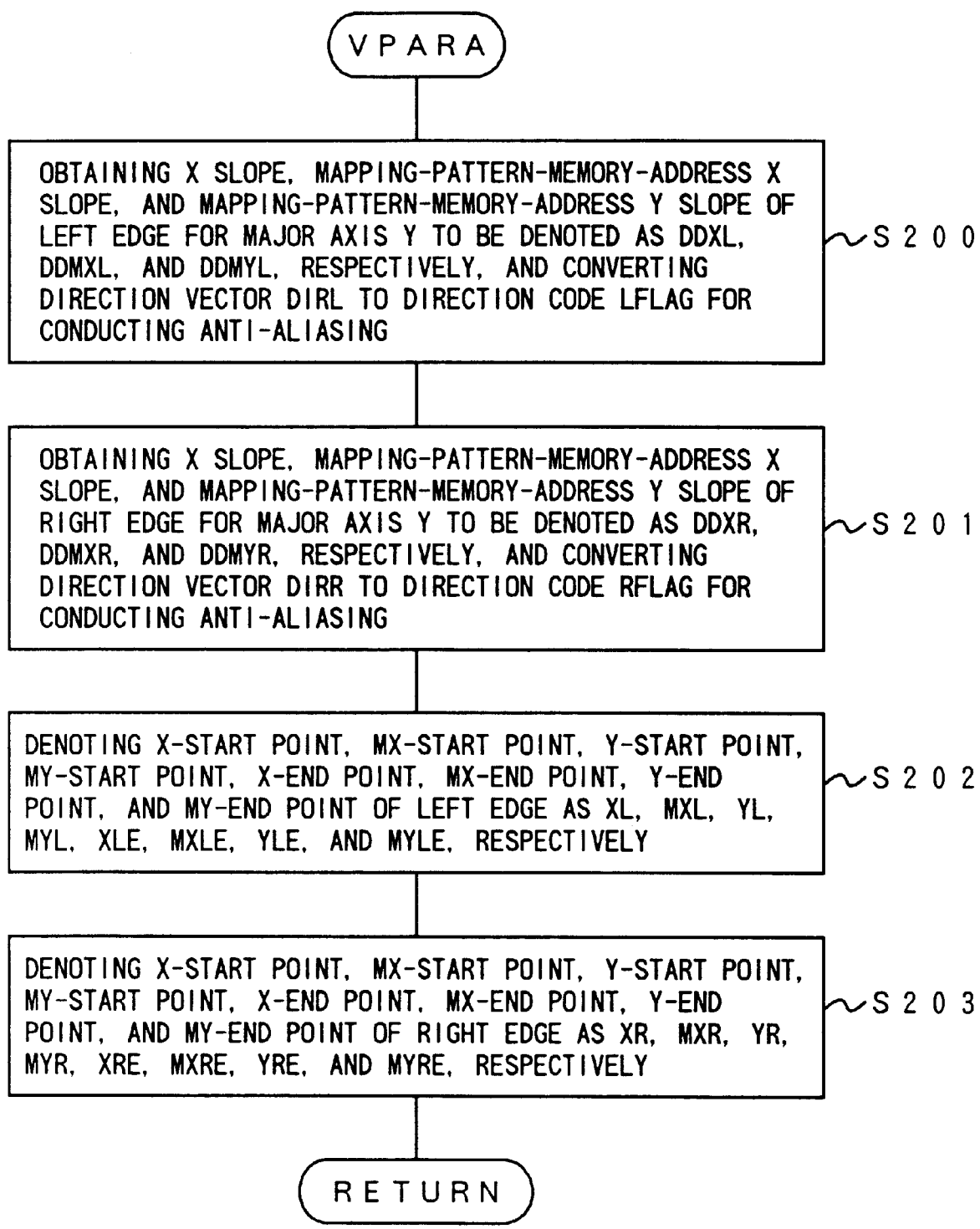
FIG. 67 is a flowchart of a subroutine process VPARA.

FIG. 67 is a flowchart of the subroutine process VPARA.

At the step S200, an X slope, a mapping-pattern-memory-address X slope, and a mapping-pattern-memory-address Y slope for a major axis Y are obtained for the left edge, and denoted as DDXL, DDMXL, and DDMYL. Also, the direction vector DIRL is converted into a direction code LFLAG for conducting the anti-aliasing.

In the second embodiment, as in the first embodiment, a direction of the anti-aliasing is determined based on the direction vector as shown in FIGS. 29A and 29B. The conversion of the direction vector DIRL into the direction code LFLAG is carried out by using the table of FIG. 30.

At the step S201, an X slope, a mapping-pattern-memory-address X slope, and a mapping-pattern-memory-address Y slope for a major axis Y are obtained for the right edge, and denoted as DDXR, DDMXR, and DDMYR. Also, the direction vector DIRR is converted into a direction code RFLAG for conducting the anti-aliasing.

At a step S202, the X-start point, the MX-start point, the Y-start point, the MY-start point, the X-end point, the MX-end point, the Y-end point, and the MY-end point of the left edge are denoted as XL, MXL, YL, MYL, XLE, MXLE, YLE, and MYLE, respectively.

At a step S203, the X-start point, the MX-start point, the Y-start point, the MY-start point, the X-end point, the MX-end point, the Y-end point, and the MY-end point of the right edge are denoted as XR, MXR, YR, MYR, XRE, MXRE, YRE, and MYRE, respectively. This ends the procedure for the subroutine process VPARA.

After the end of the subroutine process VPARA of the step S52, the subroutine process LVDDA of the DDA calculation of the left edge is carried out at the step S53.

Figure 68:
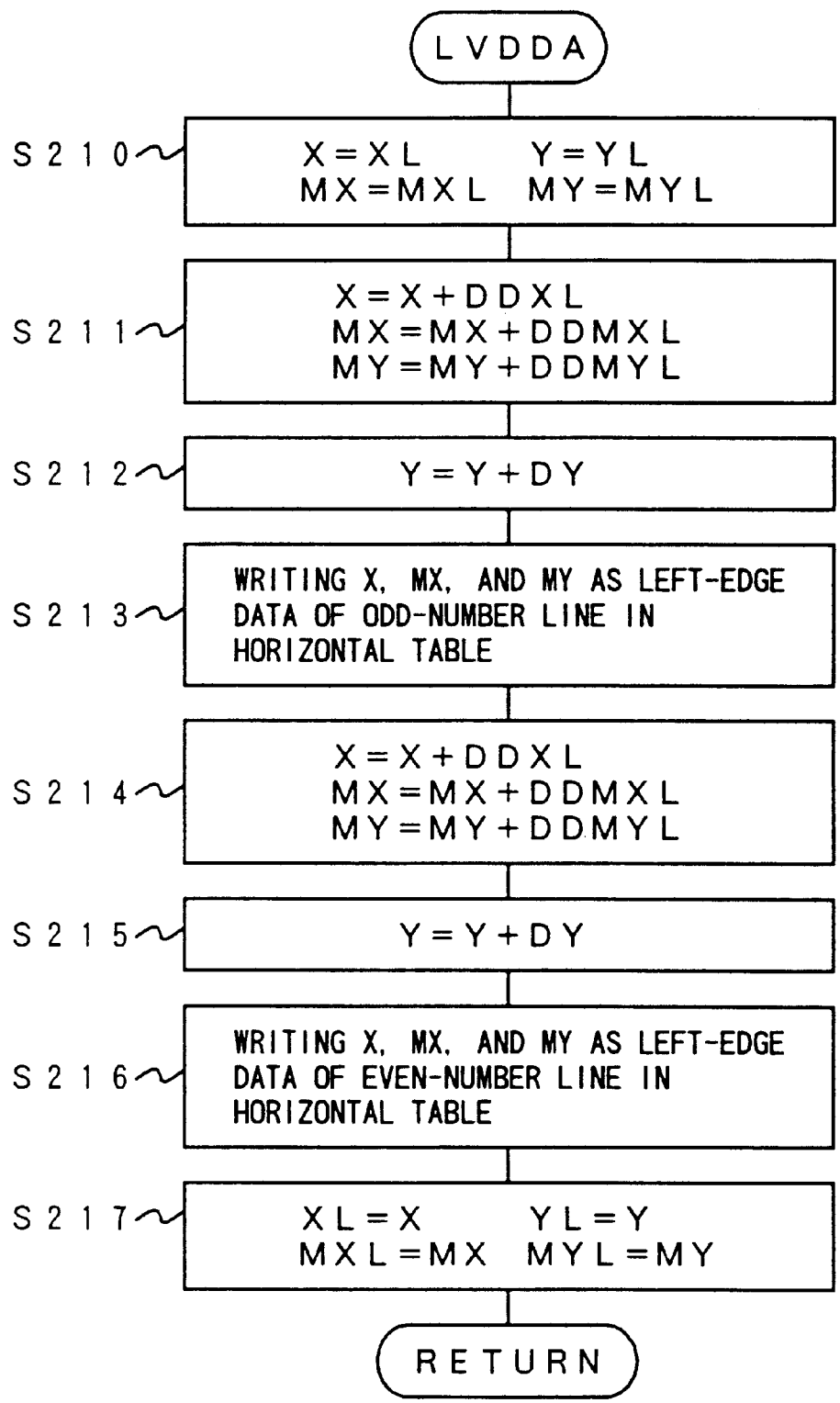
FIG. 68 is a flowchart of a subroutine process LVDDA for the DDA calculation of a left edge.

FIG. 68 is a flowchart of the subroutine process LVDDA for the DDA calculation of the left edge.

At a step S210, XL, YL, MXL, and MYL set by the subroutine process VPARA are denoted as X, Y, MX, and MY, respectively.

At a step S211, the DDA is applied to X, MX, and MY. That is, X=X+DDXL, MX=MX+DDMXL, and MY=MY+DDMYL are calculated.

At a step S212, Y=Y+DY is calculated.

At a step S213, X, MX, and MY are written as left-edge data of an odd-number line in the horizontal table 37a.

At a step S214, the DDA is applied to X, MX, and MY to obtain data of an even-number line. That is, X=X+DDXL, MX=MX+DDMXL, and MY=MY+DDMYL are further calculated.

At a step S215, Y=Y+DY is further calculated.

At a step S216, X, MX, and MY are written as left-edge data of the even-number line in the horizontal table 37a.

At a step S217, the obtained X, Y, MX, and MY are set for XL, YL, MXL, and MYL, respectively. This ends the procedure.

After the completion of the subroutine process LVDDA of the step S53, the subroutine process RVDDA is carried out at the step S54.

Figure 69:
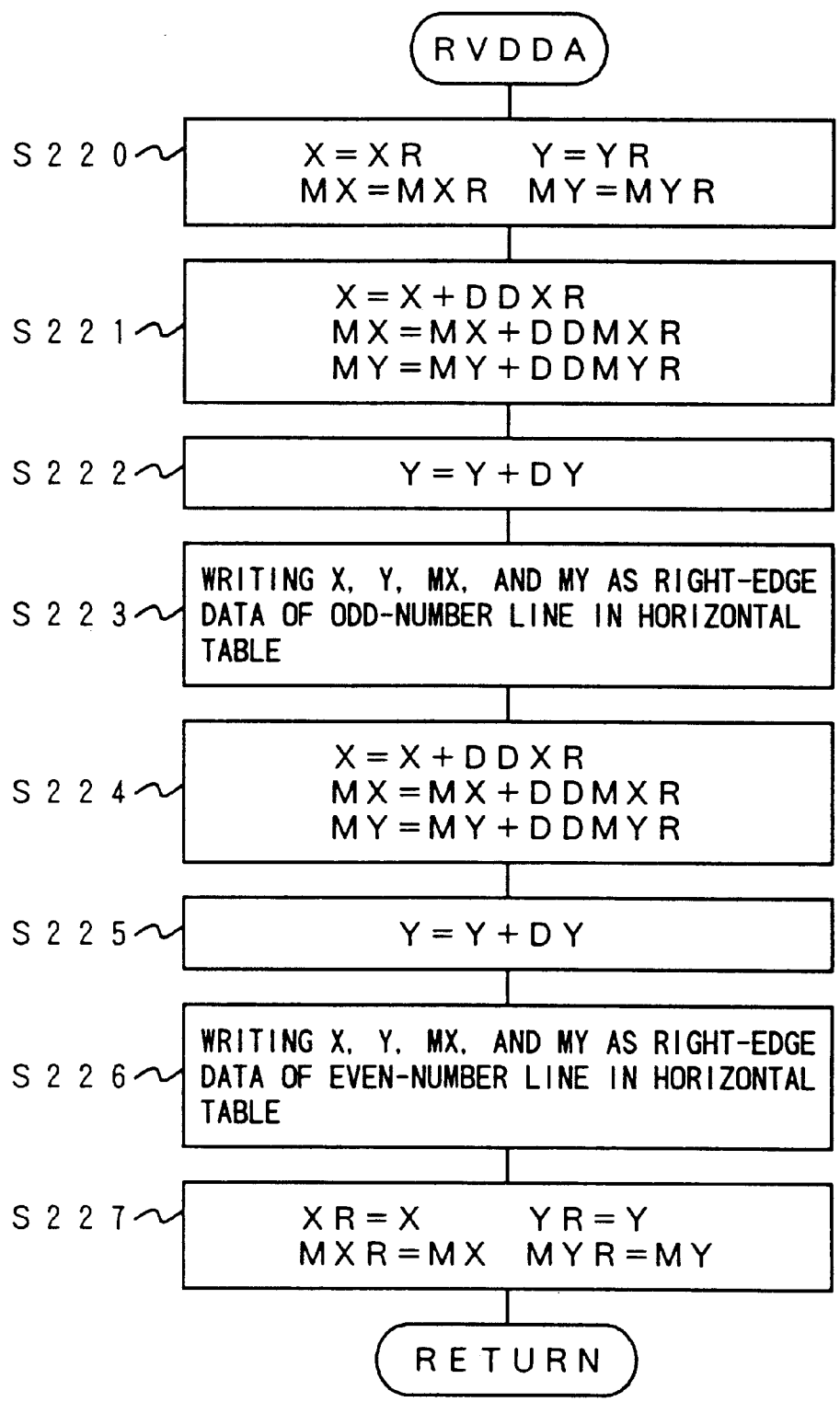
FIG. 69 is a flowchart of a subroutine process RVDDA for the DDA calculation of a right edge.

FIG. 69 is a flowchart of the subroutine process RVDDA for the DDA calculation of the right edge.

At a step S220, XR, YR, MXR, and MYR set by the subroutine process VPARA are denoted as X, Y, MX, and MY, respectively.

At a step S221, the DDA is applied to X, MX, and MY. That is, X=X+DDXR, MX=MX+DDMXR, and MY=MY+DDMYR are calculated.

At a step S222, Y=Y+DY is calculated.

At a step S223, X, Y, MX, and MY are written as right-edge data of an odd-number line in the horizontal table 37a.

At a step S224, the DDA is applied to X, MX, and MY to obtain data of an even-number line. That is, X=X+DDXR, MX=MX+DDMXR, and MY=MY+DDMYR are further calculated.

At a step S225, Y=Y+DY is further calculated.

At a step S226, X, Y, MX, and MY are written as right-edge data of the even-number line in the horizontal table 37a.

At a step S227, the obtained X, Y, MX, and MY are set for XR, YR, MXR, and MYR, respectively. This ends the procedure.

After the completion of the subroutine process RVDDA of the step S54, the subroutine process HDDA of the DDA calculation in a horizontal direction parallel to the scan line is carried out at the step S55.

Figure 70A:
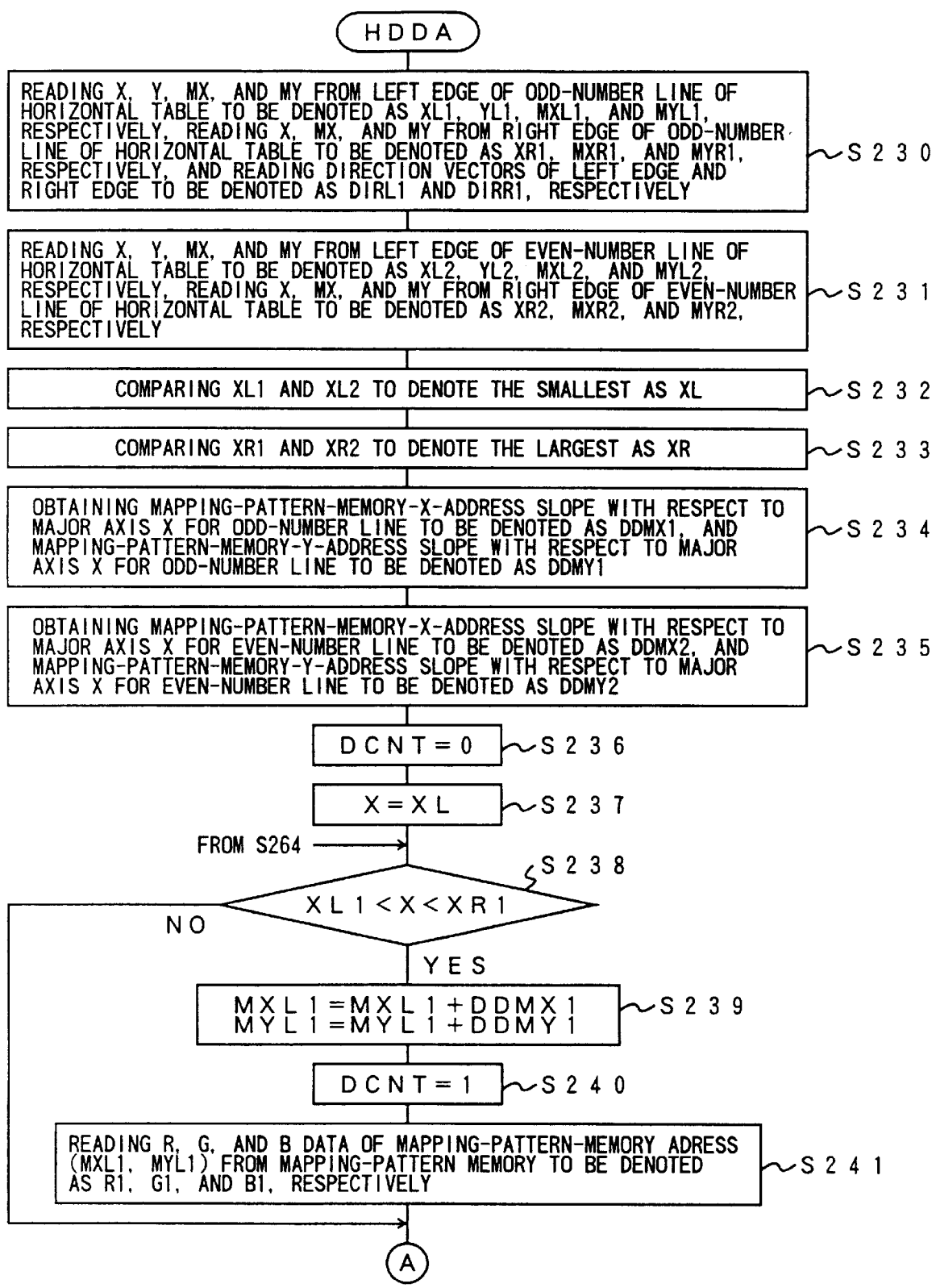
FIGS. 70A and 70B are a flowchart of a subroutine process HDDA for the DDA calculation in a horizontal direction parallel to a scan line.
Figure 70B:
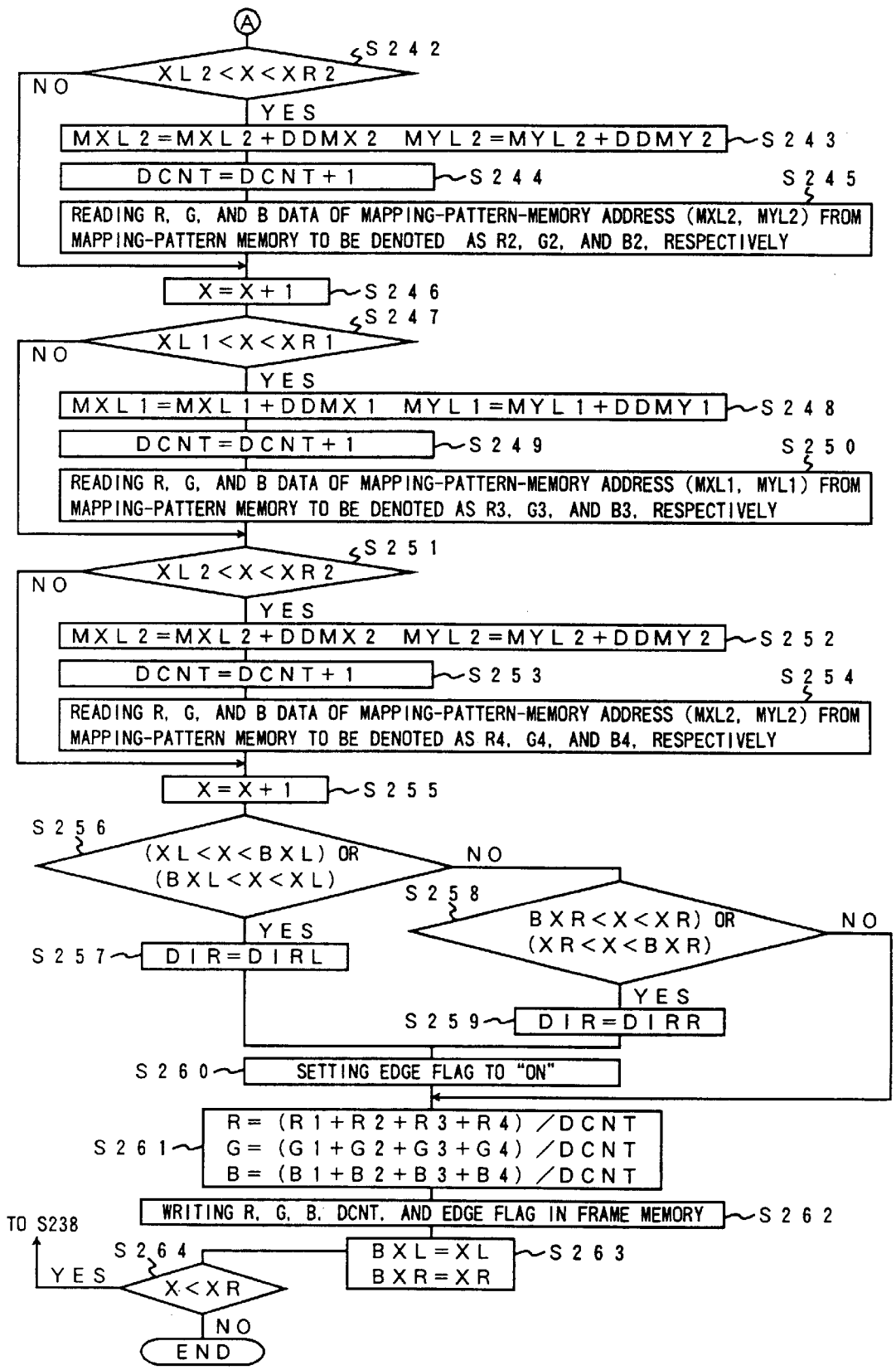

FIGS. 70A and 70B are a flowchart of the subroutine process HDDA for the DDA calculation in a horizontal direction parallel to the scan line.

At a step S230, X, Y, MX, and MY read from the left edge of the odd-number line of the horizontal table 37a are denoted as XL1, YL1, MXL1, and MYL1, respectively. Also, X, MX, and MY read from the right edge of the odd-number line of the horizontal table 37a are denoted as XR1, MXR1, and MYR1, respectively. Further, the direction vectors of the left edge and the right edge are denoted as DIRL1 and DIRR1, respectively.

At a step S231, X, Y, MX, and MY read from the left edge of the even-number line of the horizontal table 37a are denoted as XL2, YL2, MXL2, and MYL2, respectively. Also, X, MX, and MY read from the right edge of the even-number line of the horizontal table 37a are denoted as XR2, MXR2, and MYR2, respectively.

At a step S232, a comparison is made between XL1 and XL2 to denote the smallest of the two as XL.

At a step S233, a comparison is made between XR1 and XR2 to denote the largest of the two as XR.

At a step S234, a mapping-pattern-memory-X-address slope with respect to a major axis X is obtained for the odd-number line to be denoted as DDMX1, and a mapping-pattern-memory-Y-address slope with respect to the major axis X is obtained for the odd-number line to be denoted as DDMY1.

At a step S235, a mapping-pattern-memory-X-address slope with respect to a major axis X is obtained for the even-number line to be denoted as DDMX2, and a mapping-pattern-memory-Y-address slope with respect to the major axis X is obtained for the even-number line to be denoted as DDMY2.

At a step S236, a count DCNT is set to "0".

At a step S237, X (X value being processed) is initialized as XL.

At a step S238, a check is made whether X is placed between XL1 and XR1, i.e., whether XL1<X<XR1 is satisfied. If it is, the procedure goes to a step S239. If X is not between XL1 and XR1, the procedure goes to a step S242.

At the step S239, MXL1=MXL1+DDMX1 and MYL1= MYL1+DDMY1 are calculated.

At a step S240, DCNT is set to "1".

At a step S241, R, G, and B data of the mapping-pattern-memory address (MXL1, MYL1) is read from the mapping-pattern memory 10 to be denoted as R1, G1, and B1, respectively.

At the step S242, a check is made whether X is placed between XL2 and XR2, i.e., whether XL2<X<XR2 is satisfied. If it is, the procedure goes to a step S243. If X is not between XL2 and XR2, the procedure goes to a step S246.

At the step S243, MXL2=MXL2+DDMX2 and MYL2= MYL2+DDMY2 are calculated.

At a step S244, DCNT is incremented by 1.

At a step S245, R, G, and B data of the mapping-pattern-memory address (MXL2, MYL2) is read from the mapping-pattern memory 10 to be denoted as R2, G2, and B2, respectively.

At the step S246, X is incremented by 1.

At a step S247, a check is made whether X is placed between XL1 and XR1, i.e., whether XL1<X<XR1 is satisfied. If it is, the procedure goes to a step S248. If X is not between XL1 and XR1, the procedure goes to a step S251.

At the step S248, MXL1=MXL1+DDMX1 and MYL1= MYL1+DDMY1 are calculated.

At a step S249, DCNT is incremented by 1.

At a step S250, R, G, and B data of the mapping-pattern-memory address (MXL1, MYL1) is read from the mapping-pattern memory 10 to be denoted as R3, G3, and B3, respectively.

At the step S251, a check is made whether X is placed between XL2 and XR2, i.e., whether XL2<X<XR2 is satisfied. If it is, the procedure goes to a step S252. If X is not between XL2 and XR2, the procedure goes to a step S255.

At the step S252, MXL2=MXL2+DDMX2 and MYL2= MYL2+DDMY2 are calculated.

At a step S253, DCNT is incremented by 1.

At a step S254, R, G, and B data of the mapping-pattern-memory address (MXL2, MYL2) is read from the mapping-pattern memory 10 to be denoted as R4, G4, and B4, respectively.

At the step S255, X is incremented by 1.

At a step S256, a check is made whether X is between XL and BXL (XL of the previous line), i.e., whether either one of XL<X<BXL or BXL<X<XL is satisfied. If it is, the procedure goes to a step S257. If X is not between XL and BXL, the procedure goes to a step S258.

At the step S257, DIR is set to DIRL.

At the step S258, a check is made whether X is between XR and BXR (XR of the previous line), i.e., whether either one of XR<X<BXR or BXR<X<XR is satisfied. If it is, the procedure goes to a step S259. If X is not between XR and BXR, the procedure goes to a step S261.

At the step S259, DIR is set to DIRR.

At a step S260 after the step S257 or S259, an edge flag indicating whether a current processing point is positioned along an edge is set to "on".

At the step S261, R=(R1+R2+R3+R4)/DCNT, G=(G1+ G2+G3+G4)/DCNT, and B=(B1+B2+B3+B4)/DCNT are calculated.

At a step S262, R, G, and B obtained at the step S261, the count DCNT, and the edge flag are stored in the frame memory.

At a step S263, XL and XR are newly denoted as BXL and BXR, respectively.

At a step S264, a check is made whether X is smaller than XR. If it is, the procedure goes back to the step S238 to repeat the above-described steps. If X is greater than or equal to XR, this subroutine process ends.

With reference to FIG. 66B again, after the end of the subroutine process HDDA of step S55, the procedure goes to a step S56.

At the step S56, a check is made whether Y is smaller than YE. If it is smaller, the procedure goes back to the step S53 to repeat the subroutine processes LVDDA, RVDDA, and HDDA. It Y is greater than or equal to YE, the procedure goes to a step S57.

At the step S57, a check is made whether there is right-edge data stored at address 1 of the edge storing table. If there is, the procedure goes to a step S58. Otherwise, the procedure goes to a step S64.

At the step S58, an X-start point, a Y-start point, a mapping-pattern-memory-address-X-start point, a mapping-pattern-memory-address-Y-start point, an X-end point, a Y-end point, a mapping-pattern-memory-address-X-end point, a mapping-pattern-memory-address-Y-end point, and a direction vector of a right edge stored at address 1 of the edge storing table 33 are read.

Then, a subroutine process VPARA1, and the subroutine processes LVDDA, RVDDA, and HDDA are carried out at steps S59, S60, S61, and S62, respectively. The subroutine processes LVDDA, RVDDA, and HDDA have been already described with reference to FIGS. 68, 69, and 70A and 70B, respectively.

Figure 71:
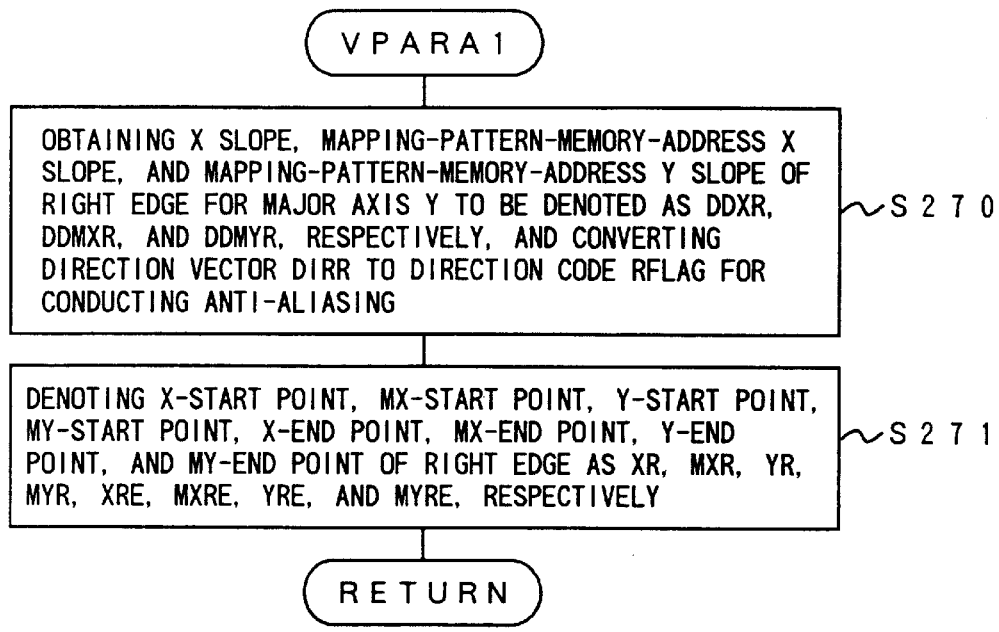
FIG. 71 is a flowchart of a subroutine process VPARA1.

FIG. 71 is a flowchart of the subroutine process VPARA1.

At the step S270, an X slope, a mapping-pattern-memory-address X slope, and a mapping-pattern-memory-address Y slope for a major axis Y are obtained for the right edge, and denoted as DDXR, DDMXR, and DDMYR. Also, the direction vector DIRR is converted into a direction code RFLAG for conducting the anti-aliasing.

At a step S271, the X-start point, the MX-start point, the Y-start point, the MY-start point, the X-end point, the MX-end point, the Y-end point, and the MY-end point of the right edge are denoted as XR, MXR, YR, MYR, XRE, MXRE, YRE, and MYRE, respectively. This ends the procedure for the subroutine process VPARA1.

With reference to FIG. 66B again, after the subroutine process VPARA1 of the step S59, the subroutine processes LVDDA, RVDDA, and HDDA are calculated at the steps S60 through S62 as described before.

At a step S63, a check is made whether Y is smaller than YE. If it is, the procedure goes back to the step S60 to repeat the subroutine processes LVDDA, RVDDA, and HDDA. If Y is greater than or equal to YE, the procedure ends.

At the step S64 following the step S57, a check is made whether there is left-edge data stored at address 1 of the edge storing table. If there is, the procedure goes to a step S65. Otherwise, the procedure ends.

At the step S65, an X-start point, a Y-start point, a mapping-pattern-memory-address-X-start point, a mapping-pattern-memory-address-Y-start point, an X-end point, a Y-end point, a mapping-pattern-memory-address-X-end point, a mapping-pattern-memory-address-Y-end point, and a direction vector of a left edge stored at address 1 of the edge storing table 33 are read.

Then, a subroutine process VPARA2, and the subroutine processes LVDDA, RVDDA, and HDDA are carried out at steps S66, S67, S68, and S69, respectively. The subroutine processes LVDDA, RVDDA, and HDDA have been already described with reference to FIGS. 68, 69, and 70A and 70B, respectively.

Figure 72:
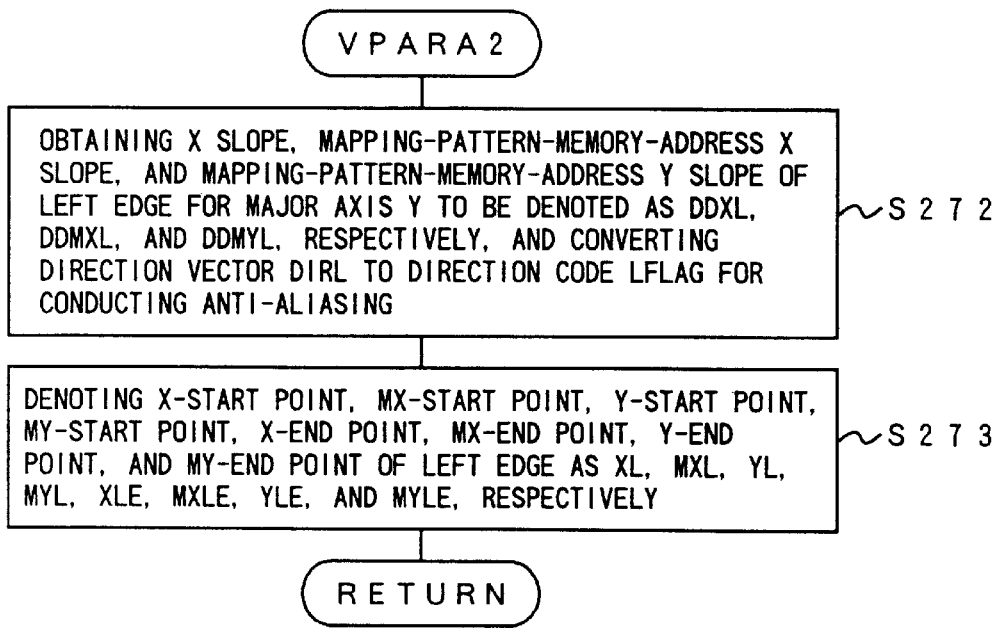
FIG. 72 is a flowchart of a subroutine process VPARA2.

FIG. 72 is a flowchart of the subroutine process VPARA2.

At the step S272, an X slope, a mapping-pattern-memory-address X slope, and a mapping-pattern-memory-address Y slope for a major axis Y are obtained for the left edge, and denoted as DDXL, DDMXL, and DDMYL. Also, the direction vector DIRL is converted into a direction code LFLAG for conducting the anti-aliasing.

At a step S273, the X-start point, the MX-start point, the Y-start point, the MY-start point, the X-end point, the MX-end point, the Y-end point, and the MY-end point of the left edge are denoted as XL, MXL, YL, MYL, XLE, MXLE, YLE, and MYLE, respectively. Then, this subroutine process ends.

With reference to FIG. 66B again, after the subroutine process VPARA2 of the step S66, the subroutine processes LVDDA, RVDDA, and HDDA are calculated at the steps S67 through S69 as described before.

At a step S70, a check is made whether Y is smaller than YE. If it is, the procedure goes back to the step S67 to repeat the subroutine processes LVDDA, RVDDA, and HDDA. If Y is greater than or equal to YE, the procedure ends.

The data processed by the drawing processing unit 3a is stored in the frame memory 5a.

Figure 73:
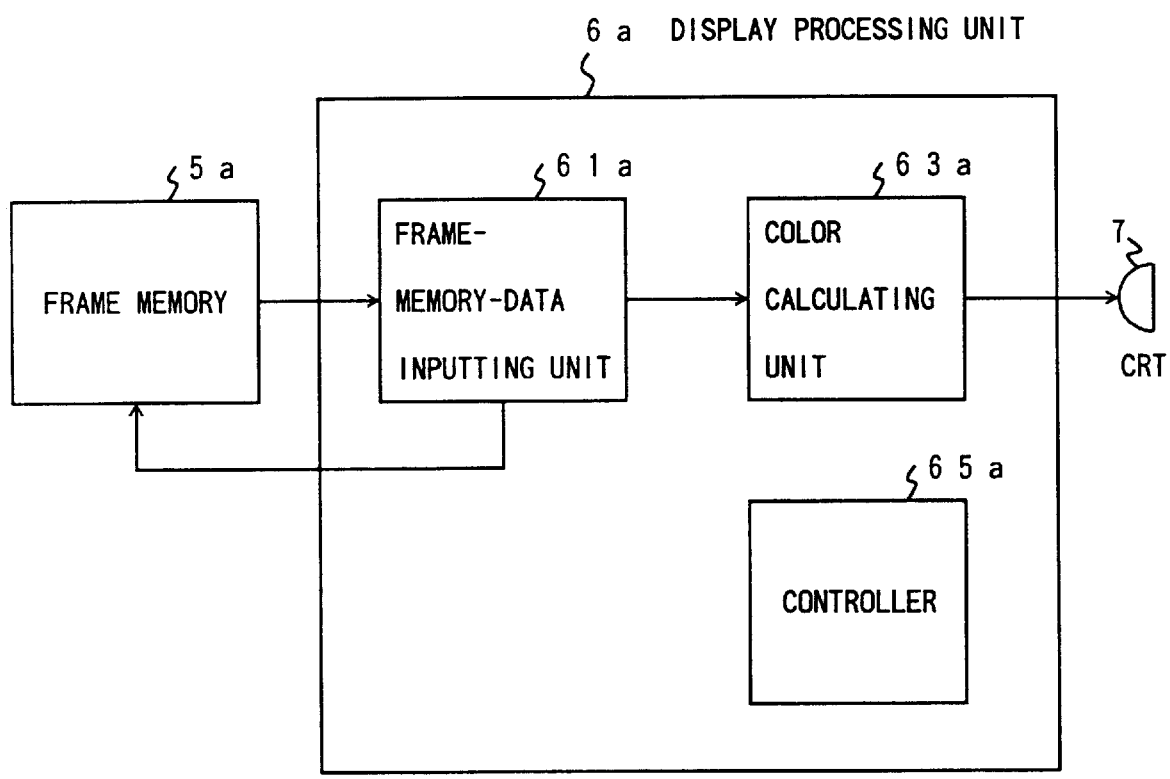
FIG. 73 is a block diagram showing an example of a configuration of a display processing unit of FIG. 53.

FIG. 73 is a block diagram showing an example of a configuration of the display processing unit 6a. The display processing unit 6a of FIG. 73 includes a frame-memory-data inputting unit 61a, a color calculating unit 63a, and a controller 65a controlling the above elements.

The display processing unit 6a reads the data of a dot to be displayed on the CRT 7 in synchronism with a display clock of the CRT 7. If the data is that of a polygon edge, data of an adjacent dot placed in an indicated direction is read from the frame memory 5a. Then, the display processing unit 6a generates a color of the dot by obtaining a weighted average of the colors of the dots based on the area sizes. The generated color is displayed on the CRT 7.

The frame-memory-data inputting unit 61a receives data of a given dot to be processed (current dot), and determines whether the current dot is part of a polygon edge based on the data of the current dot. If it is, the frame-memory-data inputting unit 61a reads data of an adjacent dot positioned in an indicated direction, and sends the RGB values of the current dot and the adjacent dot as well as the area size to the color calculating unit 63a.

When the frame memory 5a is to be accessed, an address of the frame memory 5a is generated by the frame-memory-data inputting unit 61a.

The color calculating unit 63a receives the area size, the RGB values of the current dot, and the RGB values of the adjacent dot from the frame-memory-data inputting unit 61a. Then, the color calculating unit 63 calculates a color of the current dot by obtaining a weighted average of the colors. Namely, the color of the current dot is calculated by combining the color of the current dot and the color of the adjacent dot with a ratio indicated by the area size. The color calculating unit 63a then sends the calculated color of the current dot to the CRT 7.

Figure 74:
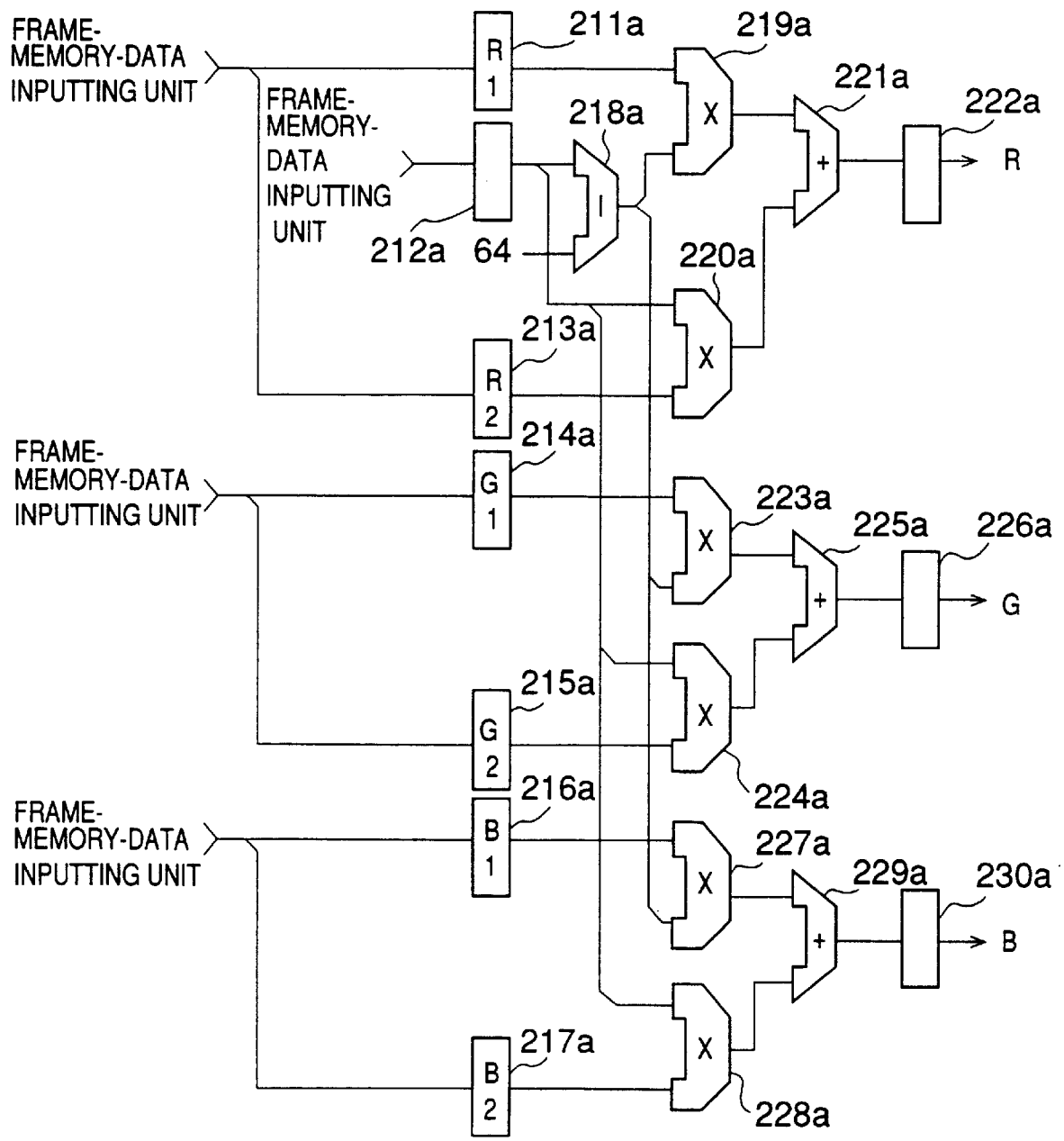
FIG. 74 is a circuit diagram of an example of a color calculating unit of FIG. 73.

FIG. 74 is a circuit diagram of an example of the color calculating unit 63a. The color calculating unit 63a includes registers 211a through 217a, a subtracter 218a, multipliers 219a and 220a, an adder 221a, a register 222a, multipliers 223a and 224a, an adder 225a, a register 226a, multipliers 227a and 228a, an adder 229a, and a register 230a.

The register 211a stores color information R (red component) of the adjacent dot sent from the frame-memory-data inputting unit 61a. The register 212a stores the area size of the current dot sent from the frame-memory-data inputting unit 61a. The subtracter 218a receives the area size from the register 212a at one input thereof, and receives a value of 64 (8×8) at the other input thereof. The subtracter 218a subtracts the area size from the value of 64 to obtain an area size of the exterior region (as opposed to the polygon region). The register 213a stores color information R (red component) of the current dot sent from the frame-memory-data inputting unit 61a.

The multiplier 219a receives the color information R of the adjacent dot from the register 211a at one input thereof, and receives the area size of the exterior region from the subtracter 218a at the other input thereof. The multiplier 219a multiplies the color information R of the adjacent dot by the area size of the exterior region to obtain a weight of the exterior-region color in the current dot. This weight is sent to the adder 221a.

The multiplier 220a receives the color information R of the current dot from the register 213a at one input thereof, and receives the area size of the polygon region from the register 212a at the other input thereof. The multiplier 220a multiplies the color information R of the current dot by the area size of the polygon region to obtain a weight of the polygon-region color in the current dot. This weight is sent to the adder 221a.

The adder 221a adds the weight of the exterior-region color to the weight of the polygon-region color to obtain the color information R (red component) of the current dot. The obtained color information R of the current dot is stored in the register 222a.

The register 214a stores color information G (green component) of the adjacent dot sent from the frame-memory-data inputting unit 61a. The register 215a stores color information G (green component) of the current dot sent from the frame-memory-data inputting unit 61a.

The multiplier 223a receives the color information G of the adjacent dot from the register 214a at one input thereof, and receives the area size of the exterior region from the subtracter 218a at the other input thereof. The multiplier 223a multiplies the color information G of the adjacent dot by the area size of the exterior region to obtain a weight of the exterior-region color in the current dot. This weight is sent to the adder 225a.

The multiplier 224a receives the color information G of the current dot from the register 215a at one input thereof, and receives the area size of the polygon region from the register 212a at the other input thereof. The multiplier 224a multiplies the color information G of the current dot by the area size of the polygon region to obtain a weight of the polygon-region color in the current dot. This weight is sent to the adder 225a.

The adder 225a adds the weight of the exterior-region color to the weight of the polygon-region color to obtain the color information G (green component) of the current dot. The obtained color information G of the current dot is stored in the register 226a.

The register 216a stores color information B (blue component) of the adjacent dot sent from the frame-memory-data inputting unit 61a. The register 217a stores color information B (blue component) of the current dot sent from the frame-memory-data inputting unit 61a.

The multiplier 227a receives the color information B of the adjacent dot from the register 216a at one input thereof, and receives the area size of the exterior region from the subtracter 218a at the other input thereof. The multiplier 227a multiplies the color information B of the adjacent dot by the area size of the exterior region to obtain a weight of the exterior-region color in the current dot. This weight is sent to the adder 229a.

The multiplier 228a receives the color information B of the current dot from the register 217a at one input thereof, and receives the area size of the polygon region from the register 212a at the other input thereof. The multiplier 228a multiplies the color information B of the current dot by the area size of the polygon region to obtain a weight of the polygon-region color in the current dot. This weight is sent to the adder 229a.

The adder 229a adds the weight of the exterior-region color to the weight of the polygon-region color to obtain the color information B (blue component) of the current dot. The obtained color information B of the current dot is stored in the register 230a.

Figure 75:
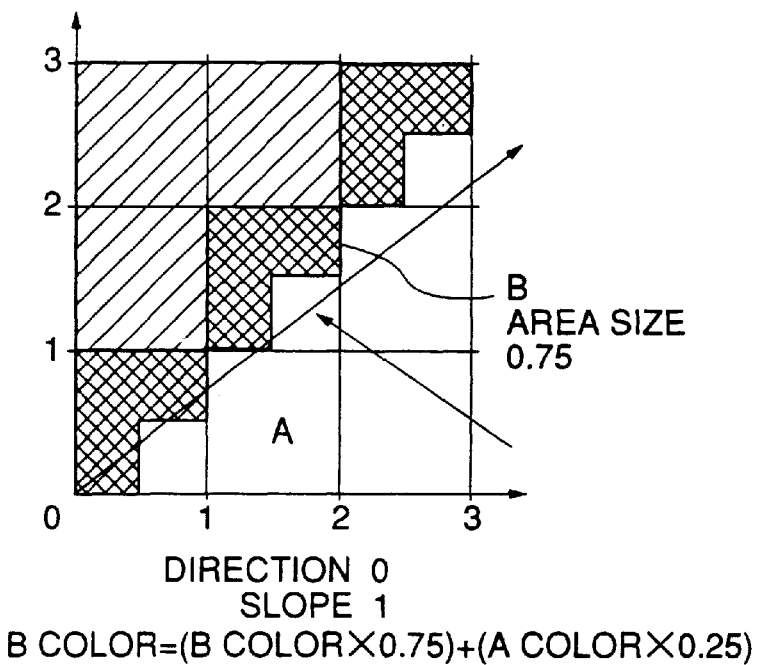
FIG. 75 is an illustrative drawing showing an example of a calculation of a dot color.

FIG. 75 is an illustrative drawing showing an example of the calculation of the dot color. In FIG. 75, the direction vector is 0 and the slope code is 1.

In the example of FIG. 75, a dot indicated by an arrow has an area size of 0.75 for a region B, and has an area size of 0.25 for a region A. Thus, the color of this dot is calculated as (color of region B×0.75)+(color of region A×0.25).

Figure 76:
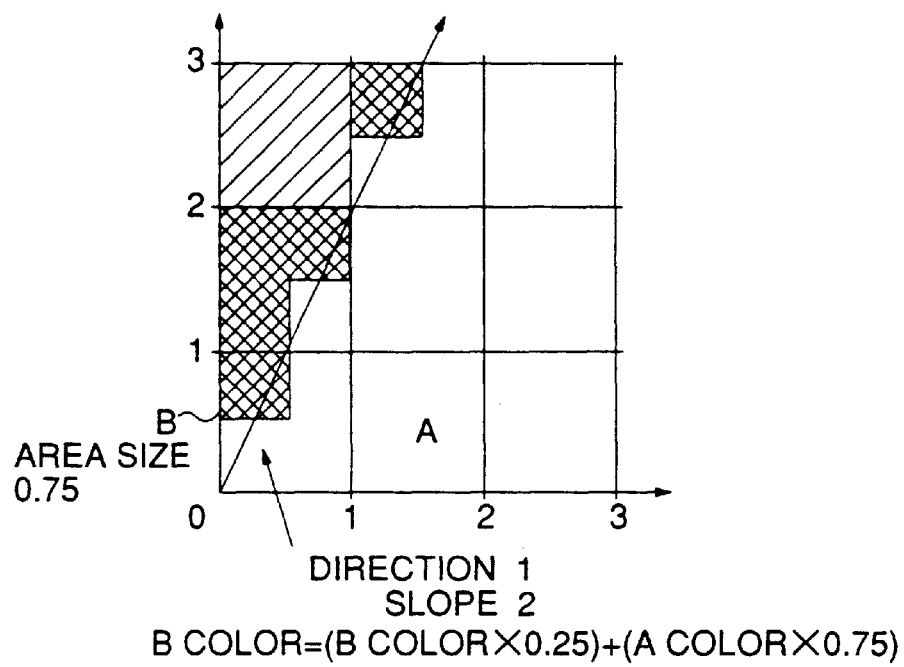
FIG. 76 is an illustrative drawing showing another example of the calculation of the dot color.

FIG. 76 is an illustrative drawing showing another example of the calculation of the dot color. In FIG. 76, the direction vector is 1 and the slope code is 2.

In the example of FIG. 76, a dot indicated by an arrow has an area size of 0.25 for a region B, and has an area size of 0.75 for a region A. Thus, the color of this dot is calculated as (color of region B×0.25)+(color of region A×0.75).

Figure 77:
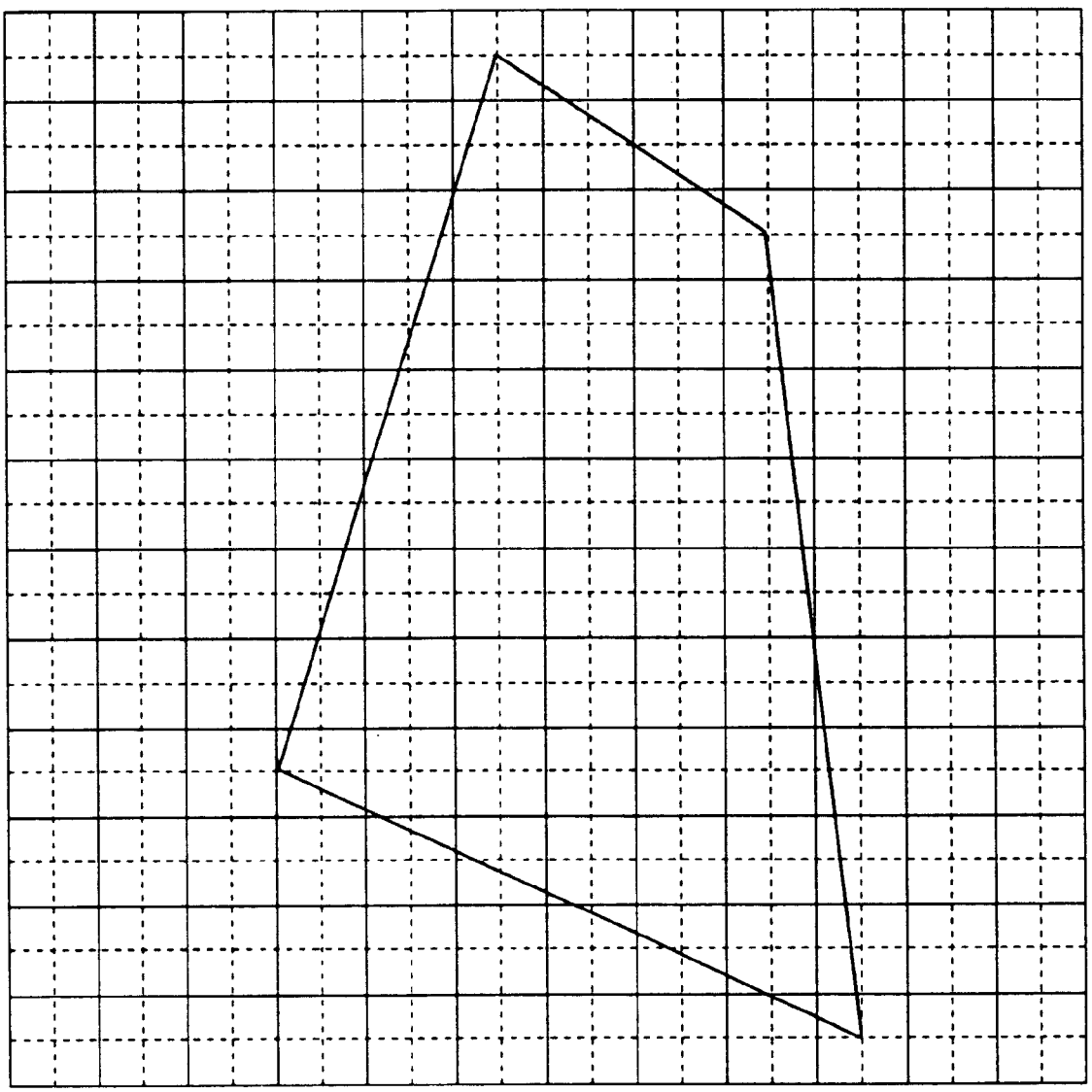
FIG. 77 is an illustrative drawing showing an example of a drawn polygon.

FIG. 77 is an illustrative drawing showing an example of a drawn polygon.

In the second embodiment described above, a description has been given without referring to the hidden-surface processing. The Z-sort method and the Z-buffer method are among those which can be used as the hidden-surface processing. When the Z-buffer method is used, for example, a Z buffer is provided as in the first embodiment. Z values are calculated by the drawing processing unit 3a, and the frame memory 5a stores data after the hidden-surface processing.

Also, the texture mapping by use of the mapping pattern in the second embodiment may be employed in the first embodiment to determine a color of each pixel. The use of the mapping pattern in the first embodiment is well within ordinary skills of the art.

As described above, according to the present invention, the anti-aliasing is applied to polygon edges without an undue increase in a memory volume and without a decrease in drawing speed.

Also, according to the second embodiment, mapping-pattern colors of a plurality of dots are obtained for one screen dot in a polygon interior as in the super-sampling method, and an averaging filtering process is carried out without using extra memory. On a polygon edge, the dot area calculated by adding up relevant dots is stored in a memory for each screen dot. Therefore, the anti-aliasing is carried out without requiring a large memory volume and without causing a drawing-speed decrease.

Furthermore, there is another problem relating to the present invention, and this problem will be described below.

In the related art, a texture-mapped polygon with a shade is obtained by using RGB data of the texture and RGB data of the shade. Namely, a red component Rtex of a texture, a green component Gtex of the texture, and a blue component Btex of the texture are prepared, and, also, a red component Ri of a shade, a green component Gi of the shade, and a blue component Bi of the shade are prepared. Then, the texture-mapped-shaded polygon is obtained by multiplying the texture pattern by the shade pattern for each dot. That is, RGB data (R, G, B) of the texture-mapped-shaded polygon is obtained by calculating R=Rtex×Ri, G=Gtex×Gi, and B=Btex×Bi for each dot.

However, this method of obtaining the texture-mapped-shaded polygon is not so effective when a polygon includes a white region and a black region caused by white-light illumination, for example. When there is a red-light illumination instead of the white-light illumination, the white region in the polygon must appear as a read region. This is another example where the above-described method of obtaining the texture-mapped-shaded polygon fails. This method is ineffective in these examples because the calculation of the shade pattern becomes prohibitively complicated.

Thus, there is a need for an image generation device which can generate a texture-mapped-shaded polygon without requiring a complicated computation.

In order to satisfy the above need, an image generation device according to the present invention sets two target points in the (R, G, B) space, one being the brightest point and the other being the darkest point. Hereinafter, the brightest point is represented as (Re, Ge, Be), and the darkest point is represented as (Rs, Gs, Bs).

Also, a luminance I is calculated for each dot inside the polygon. A color of a given dot inside the polygon is obtained by shifting a corresponding texture color (Rtex, Gtex, Btex) nearer to either the brightest point (Re, Ge, Be) or the darkest point (Rs, Gs, Bs) in proportion to the luminance I of the given point.

In this manner, a polygon having a white region and a black region generated by a white-light illumination, for example, can be properly drawn according to the present invention.

Figure 78:
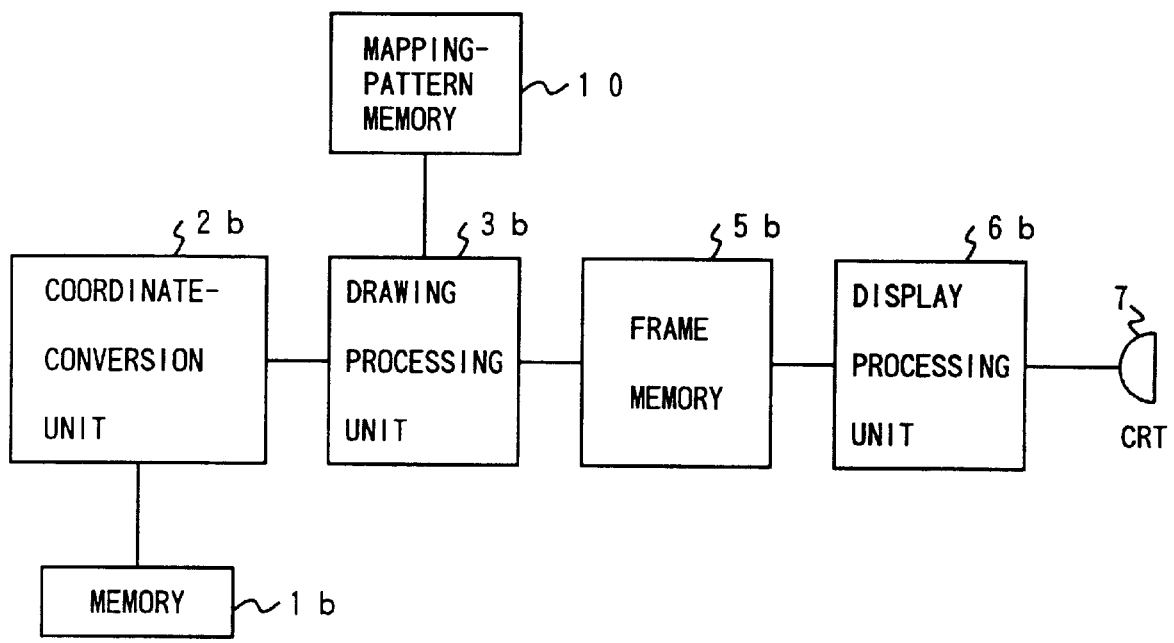
FIG. 78 is a block diagram of an image generation device according to a third embodiment of the present invention.

FIG. 78 is a block diagram of an image generation device according to a third embodiment of the present invention.

The image generation device of FIG. 78 includes a memory 1b, a coordinate-conversion unit 2b, a drawing processing unit 3b, a frame memory 5b, a display processing unit 6b, a CRT 7, and a mapping-pattern memory 10.

The memory 1b stores apexes of polygons constituting objects to be drawn, and stores apex information and a normal vector of a mapping pattern corresponding to a polygon. The data of the polygons and the mapping patterns is provided from the memory 1b to the coordinate-conversion unit 2b.

The coordinate-conversion unit 2b includes a CPU (central processing unit) or a DSP (digital signal processor), and calculates rotation, enlargement, contraction, etc., of the objects to arrange the objects in the world coordinates. Then, the coordinate-conversion unit 2b performs the view conversion to project the objects onto the screen. Then, X and Y values, luminances I,X and Y coordinates (MX, MY) in the mapping-pattern memory 10, etc., of apexes of the polygons projected on to the screen by the coordinate-conversion unit 2b are supplied to the drawing processing unit 3b.

The drawing processing unit 3b calculates an area size occupied by the polygons in each dot and a color value (R, G, B) of each dot, and stores this data in the frame memory 5b. The drawing processing unit 3b uses N×N dots for one dot on the screen, and 2×2 dots are used in this embodiment. For a polygon surface, color values (R, G, B) for 2×2 dots are read from the mapping-pattern memory 10, and are averaged to obtain a color value (R, G, B) for one dot on the screen. The obtained color value (R, G, B) is modified to reflect an effect of changes in the luminance I, and, then, stored in the frame memory 5b. For a polygon edge, how many dots of the 4×4 dots are included in the polygon are counted, and an area size occupied by the polygon in one dot on the screen is calculated as an approximation based on the count. The obtained area size is stored in the frame memory 5b.

The frame memory 5b stores a color value (R, G, B), an area size, and a direction code indicating a direction of the anti-aliasing for each dot in the same manner as in the first embodiment (FIG. 2). The direction code indicating a direction of the anti-aliasing is determined based on the direction vector of each edge.

The display processing unit 6b determines the color of a dot based on the colors, the dot-area size, and the direction code stored in the frame memory 5b, and sends the obtained color to the CRT 7. The CRT 7 displays an image.

Figure 79:
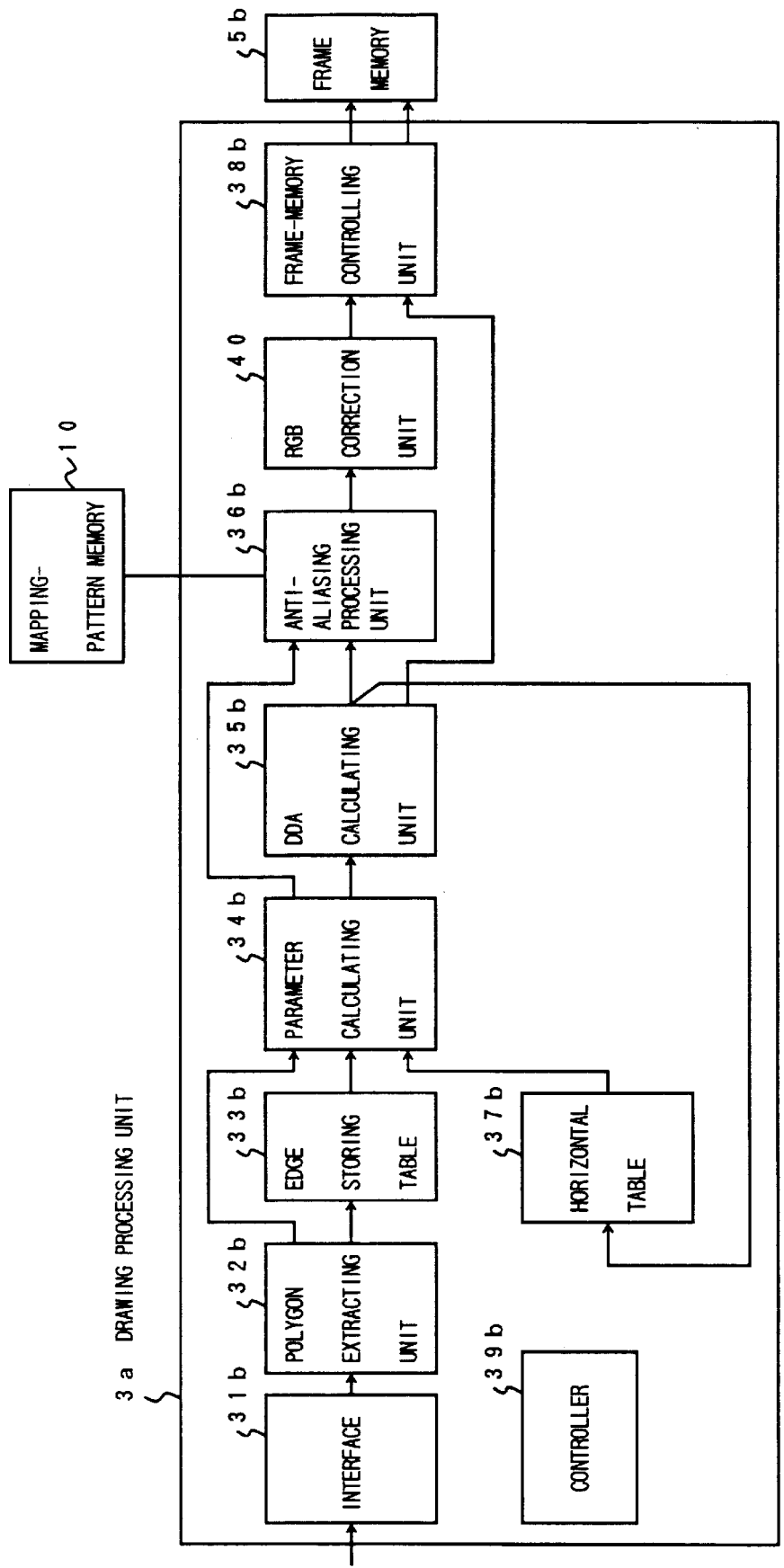
FIG. 79 is a block diagram of an example of a drawing processing unit of FIG. 78.

FIG. 79 is a block diagram of an example of the drawing processing unit 3b. The drawing processing unit 3b includes an interface 31b, a polygon extracting unit 32b, an edge storing table 33b, a parameter calculating unit 34b, a DDA calculating unit 35b, an anti-aliasing processing unit 36b, a horizontal table 37b, a frame-memory controlling unit 38b, a controller 39b, and a RGB correction unit 40.

The interface 31b receives data such as X, Y, and Z coordinates of apexes of the polygons, X and Y coordinates (MX, MY) of the mapping pattern memory, etc., from the coordinate-conversion unit 2b. That is, the interface 31b handles the data transfer between the coordinate-conversion unit 2b and the drawing processing unit 3b. The data provided from the coordinate-conversion unit 2b is supplied to the polygon extracting unit 32b via the interface 31b.

The polygon extracting unit 32b modifies and rearranges information about the polygon edges for convenience of later processing, and stores the modified and rearranged information in the edge storing table 33b.

Figure 80:
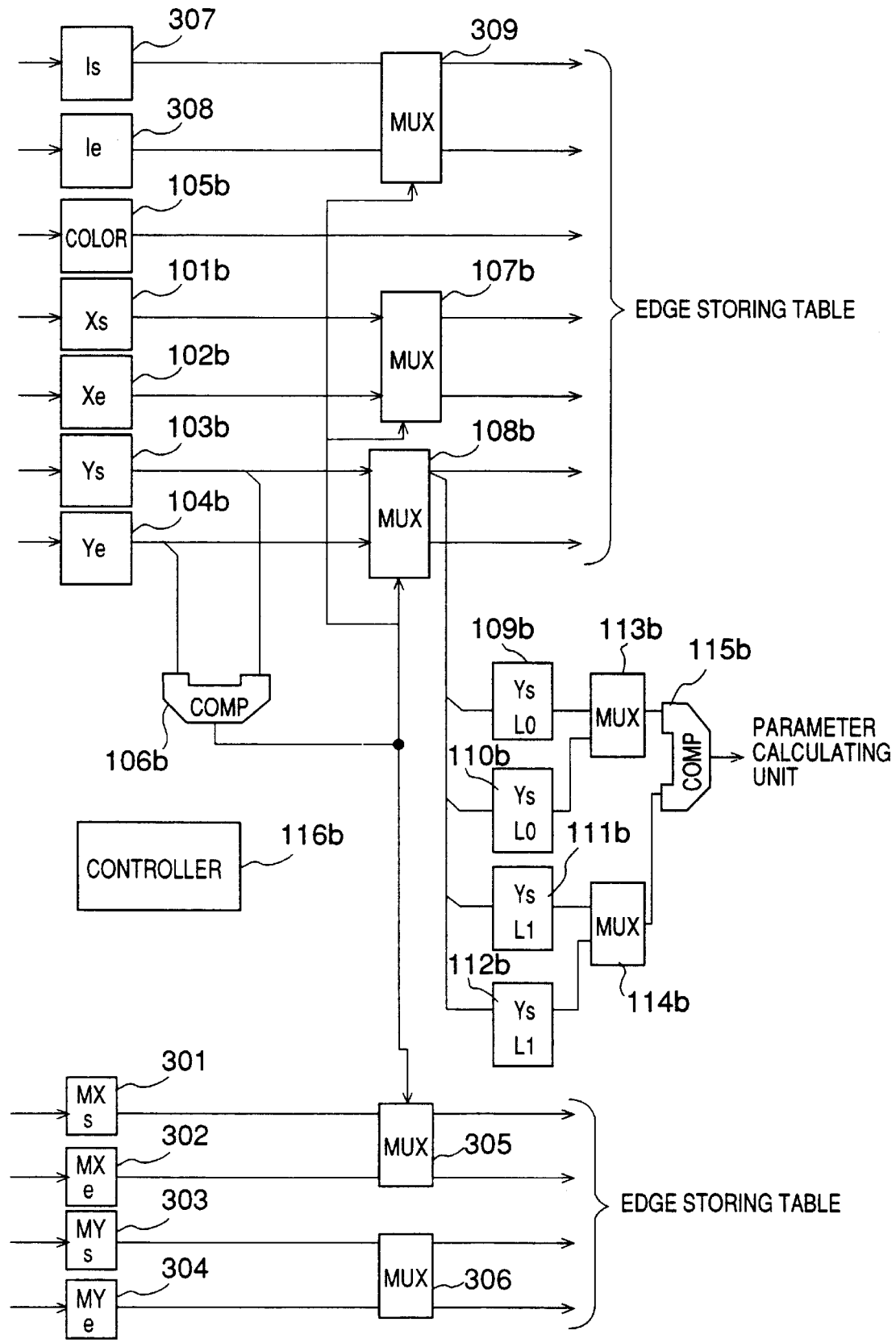
FIG. 80 is a circuit diagram of an example of a polygon extracting unit of FIG. 79.

FIG. 80 is a circuit diagram of an example of the polygon extracting unit 32b.

The polygon extracting unit 32b receives X and Y values, X and Y coordinates (MX, MY) of the mapping pattern memory, colors, luminance I, attributes, etc., of the apexes of the polygons from the interface 31b. An X-start point Xs, an X-end point Xe, a Y-start point Ys, and a Y-end point Ye of a given edge are stored in registers 101b through 104b, respectively. A color of the given edge is stored in a color register 105b. Also, an I-start point Is (luminance I at the start point of the edge) and an I-end point Ie (luminance I at the end point of the edge) are stored in registers 307 and 308, respectively.

Furthermore, a mapping-pattern-memory-X-start point MXs, a mapping-pattern-memory-X-end point MXe, a mapping-pattern-memory-Y-start point MYs, and a mapping-pattern-memory-Y-end point MXe are stored in registers 301 through 304, respectively.

A controller 116b determines, as in the first embodiment, which direction of FIG. 5 is indicated by a vector representing each edge of the polygon. Based on the direction of the vector, the controller 116b determines, as shown in FIG. 6, which one of the right edge and the left edge each edge of the polygon is.

In the third embodiment, processing is carried out with an assumption that all vectors are directed downward. Thus, polygons shown in FIGS. 7A and 7B are processed to obtain pairs of vectors shown in FIGS. 8A and 8B, with vectors directed upward being reversed. As for polygons as shown in FIG. 7C, the 5 polygons are divided such that two pairs of vectors are obtained as shown in FIG. 8C, with vectors directed upward being reversed.

The reversing process of vectors is carried out as follows. Ys and Ye stored in the registers 103b and 104b, respectively, are provided to a comparator 106b. The comparator 106b compares Ys with Ye, and controls multiplexers 107b, 108b, 305, 306, and 309 based on a result of the comparison. That is, the multiplexers 107b, 108b, 305, 306, and 309 are controlled based on whether the edge should be reversed. When the edge should be reversed, the multiplexers 107b, 108b, 305, 306, and 309 exchange the start point with the end point to send the data of the edge to the edge storing table 33b. When there is no need to reverse the edge, the multiplexers 107b, 108b, 305, 306, and 309 send to the edge storing table 33b the data provided from the interface 31b without changing the data.

FIG. 81 is a chart showing a configuration of the edge storing table 33b. As shown in the figure, pairs of a left polygon edge and a right polygon edge are stored in the edge storing table 33b.

As in the first embodiment, even when a vector directed upward is reversed by exchanging the start point with the end point, the classification of either the right edge or the left edge will not change as shown in FIG. 9.

With reference to FIG. 80 again, the Y-start point Ys to be stored at left-edge address 0 in the edge storing table 33b is stored in a register 109b from the multiplexer 108b. The Y-start point Ys to be stored at right-edge address 0 in the edge storing table 33b is stored in a register 10b from the multiplexer 108b. The Y-start point Ys to be stored at left-edge address 1 in the edge storing table 33b is stored in a register 111b from the multiplexer 108b. Also, the Y-start point Ys to be stored at right-edge address 1 in the edge storing table 33b is stored in a register 112b from the multiplexer 108b.

The Y-start points stored in the registers 109b and 110b, which are stored in left-edge address 0 and right-edge address 0 of the edge storing table 33b, respectively, are supplied to a comparator 115b via a multiplexer 113b. Also, the Y-start points stored in the registers 111b and 112b, which are stored in left-edge address 1 and right-edge address 1 of the edge storing table 33b, respectively, are supplied to the comparator 115b via a multiplexer 114b. With respect to either one of the right edge or the left edge according to control of the multiplexers 113b and 114b, the comparator 115b compares the Y-start point of address 0 with the Y-start point of address 1. Thus, the comparator 115b determines which one of the two edges stored in address 0 and address 1 is higher in the Y coordinate, and provides a result of the comparison for the parameter calculating unit 34b. The above-mentioned elements of FIG. 80 are controlled by the controller 116b.

The parameter calculating unit 34b also receives data from the edge storing table 33b and the horizontal table 37b. A detailed description of the horizontal table 37b will be provided later.

Figure 82:
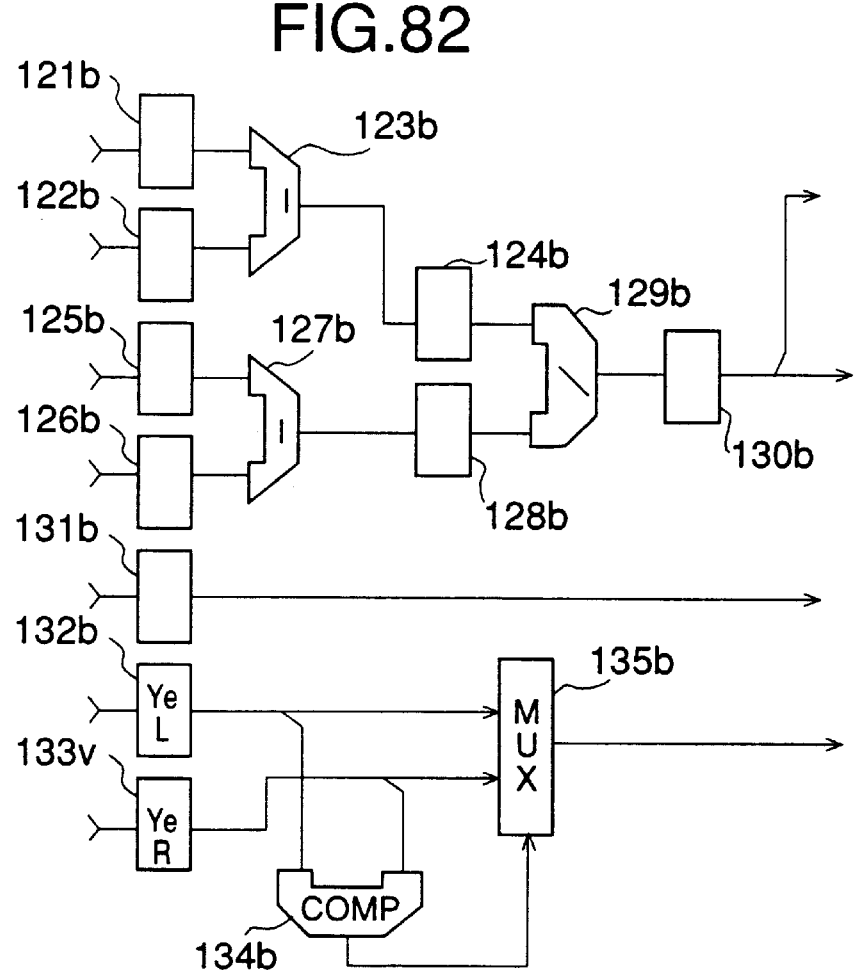
FIG. 82 is a circuit diagram of an example of a parameter calculating unit of FIG. 79.

The parameter calculating unit 34b calculates slopes of the right edges and the left edges of the polygons, slopes for MX and MY values of the mapping-pattern memory, etc. FIG. 82 is a circuit diagram of an example of the parameter calculating unit 34b.

The parameter calculating unit 34b obtains slopes of polygon edges as parameters used in the DDA (digital differential analysis). In the parameter calculating unit 34b of FIG. 82, registers 121b and 122b store a slope-axis coordinate of a start point and a slope-axis coordinate of an end point, respectively, of a given edge provided from the edge storing table 33b. A subtracter 123b receives the slope-axis coordinate of the start point and the slope-axis coordinate of the end point from the registers 121b and 122b, respectively, to calculate a difference between the two slope-axis coordinates. The difference of the given edge is supplied to a register 124b.

Registers 125b and 126b store a major-axis coordinate of the start point and a major-axis coordinate of the end point of the given edge provided from the edge storing table 33b. A subtracter 127b receives the major-axis coordinate of the start point and the major-axis coordinate of the end point from the registers 125b and 126b, respectively, to calculate a difference between the two major-axis coordinates. This difference is provided for a register 128b.

A divider 129b receives these differences from the register 124b and the register 128b, and divides the difference in the slope axis by the difference in the major axis to obtain a slope of the given edge. The slope thus obtained is stored in a register 130b, and, then, sent to the DDA calculating unit 35b.

A register 132b stores the Y-end point of a left edge, and a register 133b stores the Y-end point of a right edge. The Y-end points stored in the registers 132b and 133b are sent to a comparator 134b and a multiplexer 135b. The comparator 134b compares the Y-end points between the left edge and the right edge, and controls the multiplexer 135b based on a result of the comparison. The multiplexer 135b sends to the DDA calculating unit 35b the smallest one of the Y-end point of the left edge and the Y-end point of the right edge.

A register 131b stores various parameters sent from the edge storing table 33b. These parameters are supplied to the DDA calculating unit 35b.

Some of the parameters calculated by the parameter calculating unit 34b as described above are sent to the anti-aliasing processing unit 36b as well as to the DDA calculating unit 35b.

The DDA calculating unit 35b calculates screen-address values (X, Y), luminances I, and mapping-pattern-memory-address values (MX, MY) of the right edge and the left edge through the digital differential analysis (DDA). For example, the DDA calculating unit 35b calculates X values, luminance I, MX values, and MY values of a left edge and a right edge through the DDA each time a Y value is incremented (or decreased). After carrying out the DDA for the left edge, the DDA calculating unit 35b stores the X value, the luminance I, the MX value, and the MY value calculated for the left edge in the horizontal table 37b. Then, the DDA calculating unit 35b carries out the DDA for the right edge to store the X value, the luminance I, the MX value, and the MY value of the right edge in the horizontal table 37b.

Figure 83:
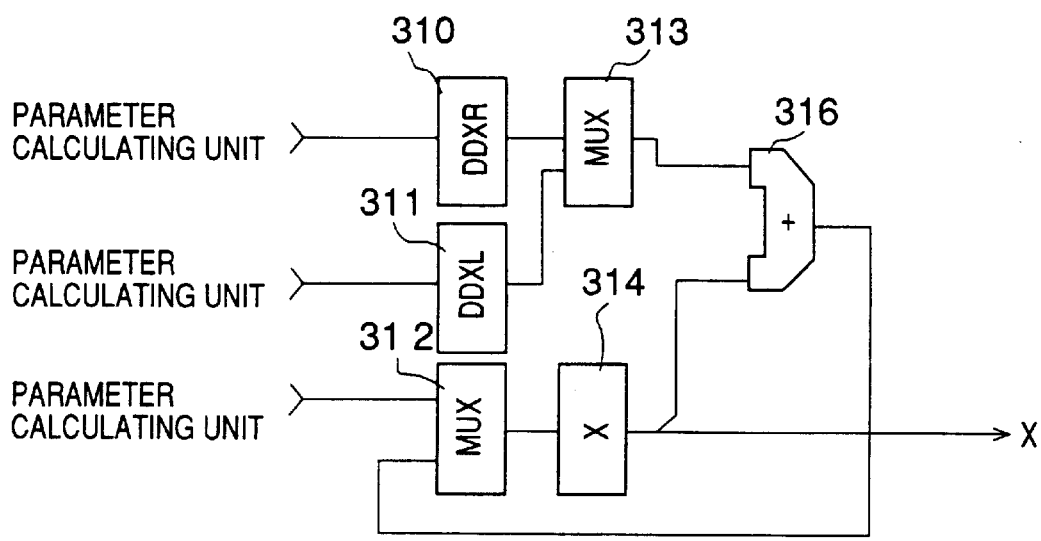
FIG. 83 is a circuit diagram of an example of a DDA calculating unit of FIG. 79 when an X value for an X slope axis is calculated.
Figure 84:
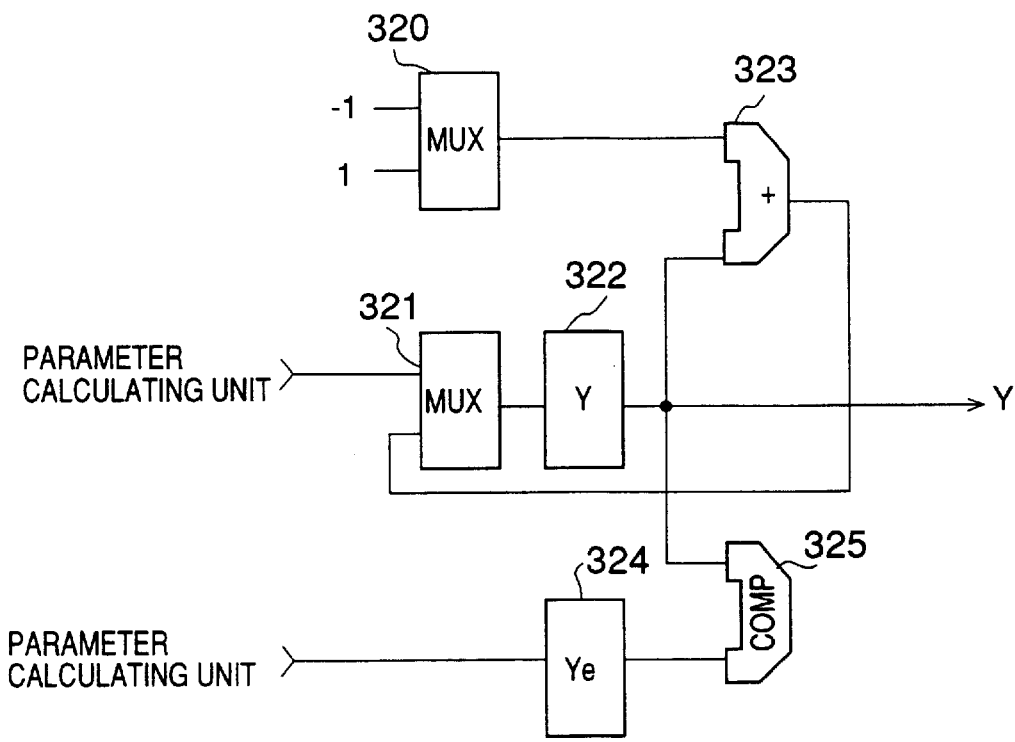
FIG. 84 is a circuit diagram of an example of the DDA calculating unit when a Y value for a Y major axis is calculated.
Figure 85:
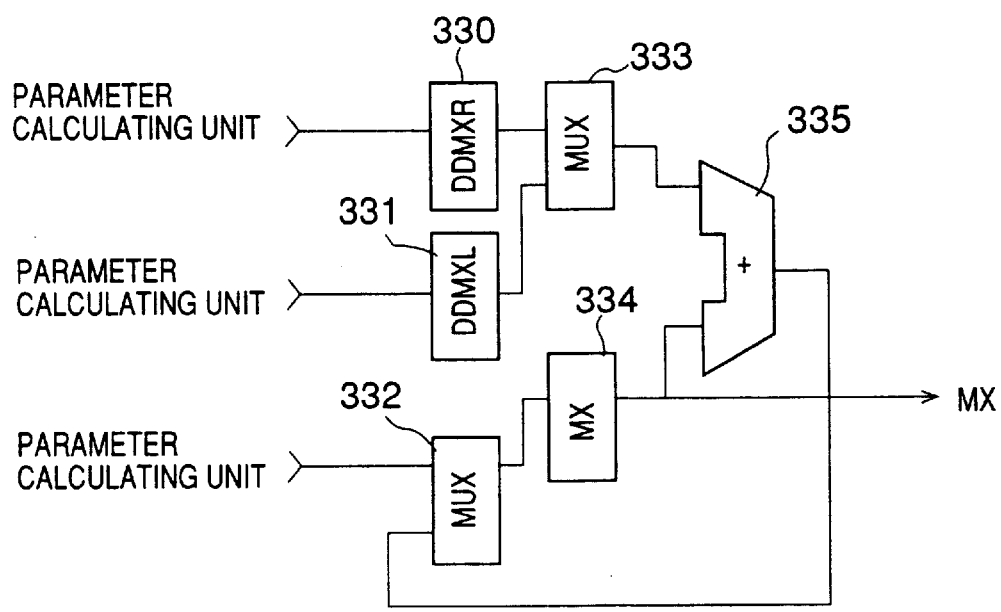
FIG. 85 is a circuit diagram of an example of the DDA calculating unit when a mapping-pattern-memory address MX is calculated.
Figure 86:
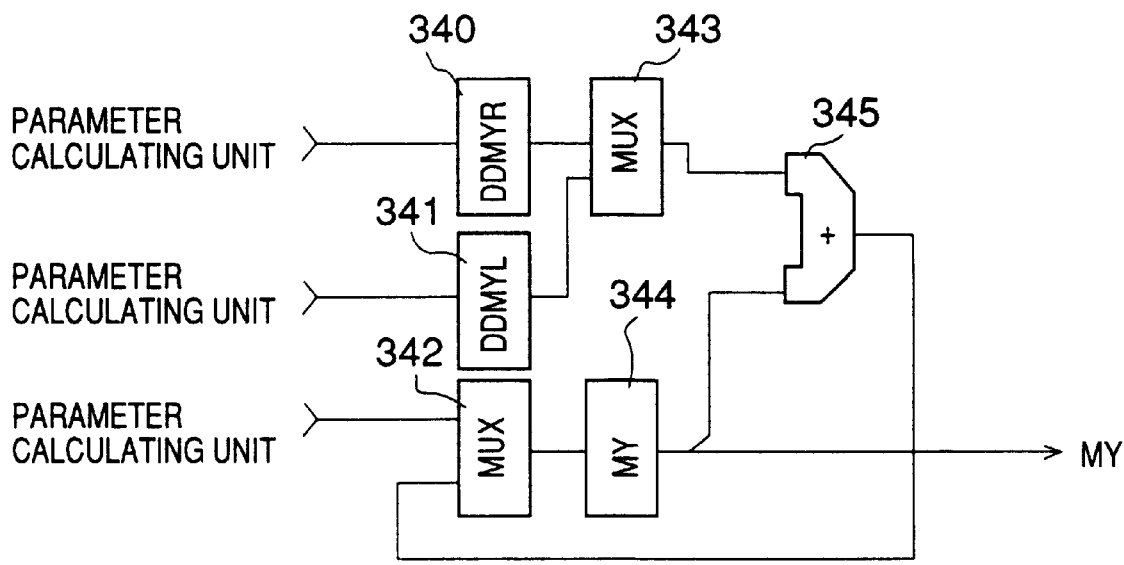
FIG. 86 is a circuit diagram of an example of the DDA calculating unit when a mapping-pattern-memory address MY is calculated.
Figure 87:
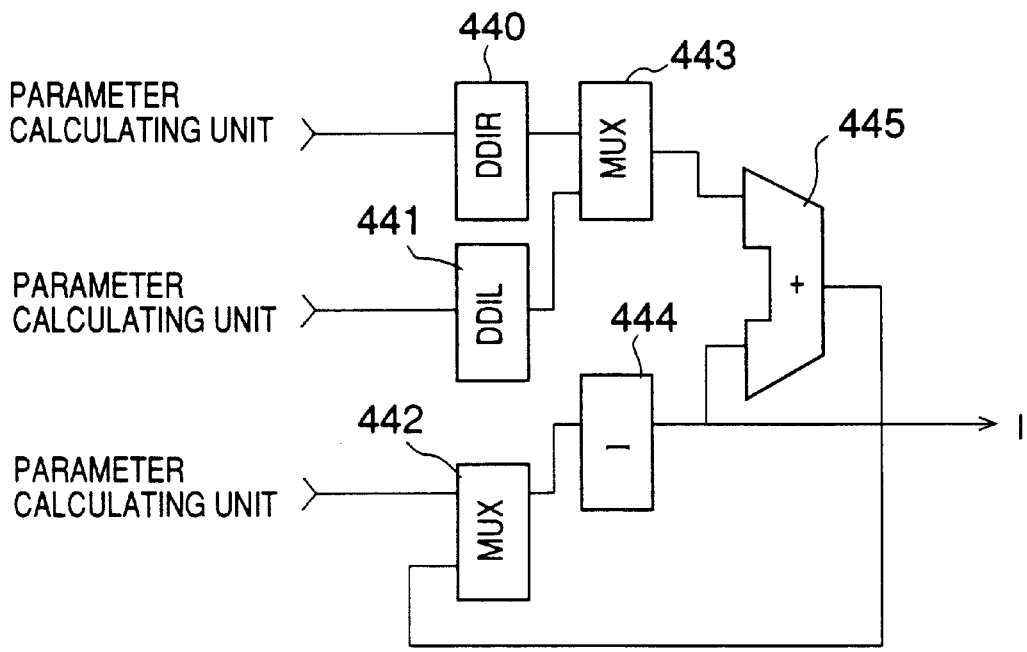
FIG. 87 is a circuit diagram of an example of the DDA calculating unit when a luminance I is calculated.

FIG. 83 is a circuit diagram of an example of the DDA calculating unit 35b when an X value for an X slope axis is calculated. FIG. 84 is a circuit diagram of an example of the DDA calculating unit 35b when a Y value for a Y major axis is calculated. FIG. 85 is a circuit diagram of an example of the DDA calculating unit 35b when a mapping-pattern-memory address MX is calculated. FIG. 86 is a circuit diagram of an example of the DDA calculating unit 35b when a mapping-pattern-memory address MY is calculated. Finally, FIG. 87 is a circuit diagram of an example of the DDA calculating unit 35b when a luminance I is calculated.

In the DDA calculating unit 35b of FIG. 83 used for calculating an X value, a register 310 stores the X slope of a right edge provided from the parameter calculating unit 34b, and a register 311 stores the X slope of a left edge provided from the parameter calculating unit 34b. A multiplexer 313 selects one of the register 310 and the register 311 to supply an output thereof to an adder 315.

A multiplexer 312 receives an X value sent from the parameter calculating unit 34b and an X value calculated by the adder 315. One of these X values is selected by the multiplexer 312 to be stored in a register 314. The adder 315 adds the X slope provided from the multiplexer 313 to the X value stored in the register 314. In this manner, the X values of various points along the left edge or the right edge are calculated successively. The X value stored in the register 314 is supplied to the anti-aliasing processing unit 36b.

In the DDA calculating unit 35b of FIG. 84 used for calculating a Y value for a Y major axis, a multiplexer 320 is provided with data of −1 and 1. Either one of −1 or 1 is provided from the multiplexer 320 to an adder 323.

A multiplexer 321 receives a Y value sent from the parameter calculating unit 34b and a Y value calculated by the adder 323. One of these Y values is selected by the multiplexer 321 to be stored in a register 322. The adder 323 adds either one of 1 or −1 provided from the multiplexer 320 to the Y value stored in the register 322. The Y value stored in the register 322 is supplied to the anti-aliasing processing unit 36b.

A register 324 stores the Y value of the end point obtained by the parameter calculating unit 34b for a pair of the left edge and the right edge. A comparator 325 compares the Y value stored in the register 324 with the Y value stored in the register 322. A result of the comparison is sent to a controller for controlling the DDA process. Based on the result of the comparison, it is determined whether to continue or to end the DDA process.

In the DDA calculating unit 35b of FIG. 85 used for calculating a mapping-pattern-memory address MX, a register 330 stores the MX slope of a right edge provided from the parameter calculating unit 34b, and a register 331 stores the MX slope of a left edge provided from the parameter calculating unit 34b. A multiplexer 333 selects one of the register 330 and the register 331 to supply an output thereof to an adder 335.

A multiplexer 332 receives an MX value sent from the parameter calculating unit 34b and an MX value calculated by the adder 335. One of these MX values is selected by the multiplexer 332 to be stored in a register 334. The adder 335 adds the MX slope provided from the multiplexer 333 to the MX value stored in the register 334. In this manner, the MX values of various points along the left edge or the right edge are calculated successively. The MX value stored in the register 334 is supplied to the anti-aliasing processing unit 36b.

In the DDA calculating unit 35b of FIG. 86 used for calculating a mapping-pattern-memory address MY, a register 340 stores the MY slope of a right edge provided from the parameter calculating unit 34b, and a register 341 stores the MY slope of a left edge provided from the parameter calculating unit 34b. A multiplexer 343 selects one of the register 340 and the register 341 to supply an output thereof to an adder 345.

A multiplexer 342 receives an MY value sent from the parameter calculating unit 34b and an MY value calculated by the adder 345. One of these MY values is selected by the multiplexer 342 to be stored in a register 344. The adder 345 adds the MY slope provided from the multiplexer 343 to the MY value stored in the register 344. In this manner, the MY values of various points along the left edge or the right edge are calculated successively. The MY value stored in the register 344 is supplied to the anti-aliasing processing unit 36b.

In the DDA calculating unit 35b of FIG. 87 used for calculating a luminance I, a register 440 stores the I slope of a right edge provided from the parameter calculating unit 34b, and a register 441 stores the I slope of a left edge provided from the parameter calculating unit 34b. A multiplexer 443 selects one of the register 440 and the register 441 to supply an output thereof to an adder 445.

A multiplexer 442 receives a luminance I sent from the parameter calculating unit 34b and a luminance I calculated by the adder 445. One of these luminances I is selected by the multiplexer 442 to be stored in a register 444. The adder 445 adds the I slope provided from the multiplexer 443 to the luminance I stored in the register 444. In this manner, the luminance I of various points along the left edge or the right edge are calculated successively. The luminance I stored in the register 444 is supplied to the anti-aliasing processing unit 36b.

FIG. 88 is a chart showing an example of a structure of horizontal table 37b. As shown in the figure, the horizontal table 37b temporarily stores data such as an X value, an MX value, an MY value, an I value, and a direction vector of the left edge for an odd-number line and an even-number line, and stores data such as an X value, a Y value, an MX value, an MY value, an I value, a direction vector, and attributes of the right edge for an odd-number line and an even-number line. When all the data is stored in the horizontal table 37b, the data is sent to the parameter calculating unit 34b to calculate parameters needed for DDA calculations in a horizontal direction.

The anti-aliasing processing unit 36b receives the data calculated by the parameter calculating unit 34b and the DDA calculating unit 35b. The anti-aliasing processing unit 36b receives the mapping-pattern-memory address (MX, MY) from the DDA calculating unit 35b. Then, the anti-aliasing processing unit 36b accesses the mapping-pattern memory 10 by using the mapping-pattern-memory address (MX, MY) to read the mapping data for 2×2 dots. The anti-aliasing processing unit 36b also receives left-edge X values and right-edge X values on an odd-number line and on an even-number line from the parameter calculating unit 34b. Here, an odd-number line and an even-number line together constitute a scan line corresponding to a line of screen dots. Then, the anti-aliasing processing unit 36b counts, based on the X value being processed, how many dots of the 4×4 dots within a given screen pixel are included in the polygon. Based on this count, the mapping data for 2×2 dots is averaged for the anti-aliasing.

Furthermore, the anti-aliasing processing unit 36b receives the leftmost left-edge-X-value XL and the rightmost right-edge-X-value XR of a current line and the leftmost left-edge-X-value BXL and the rightmost right-edge-X-value BXR of a previous line to carry out edge determination and assignment of an anti-aliasing direction.

When a current X value is between XL and BXL, it can be known that an edge being processed is a left polygon edge. Thus, the direction of the anti-aliazing is set to that of the left edge. When a current X value is between XR and BXR, it can be known that an edge being processed is a right polygon edge. Thus, the direction of the anti-aliasing is set to that of the right edge. The RGB values, the area size, and the direction of the anti-aliasing are sent to the frame-memory controlling unit 38b.

Figure 89:
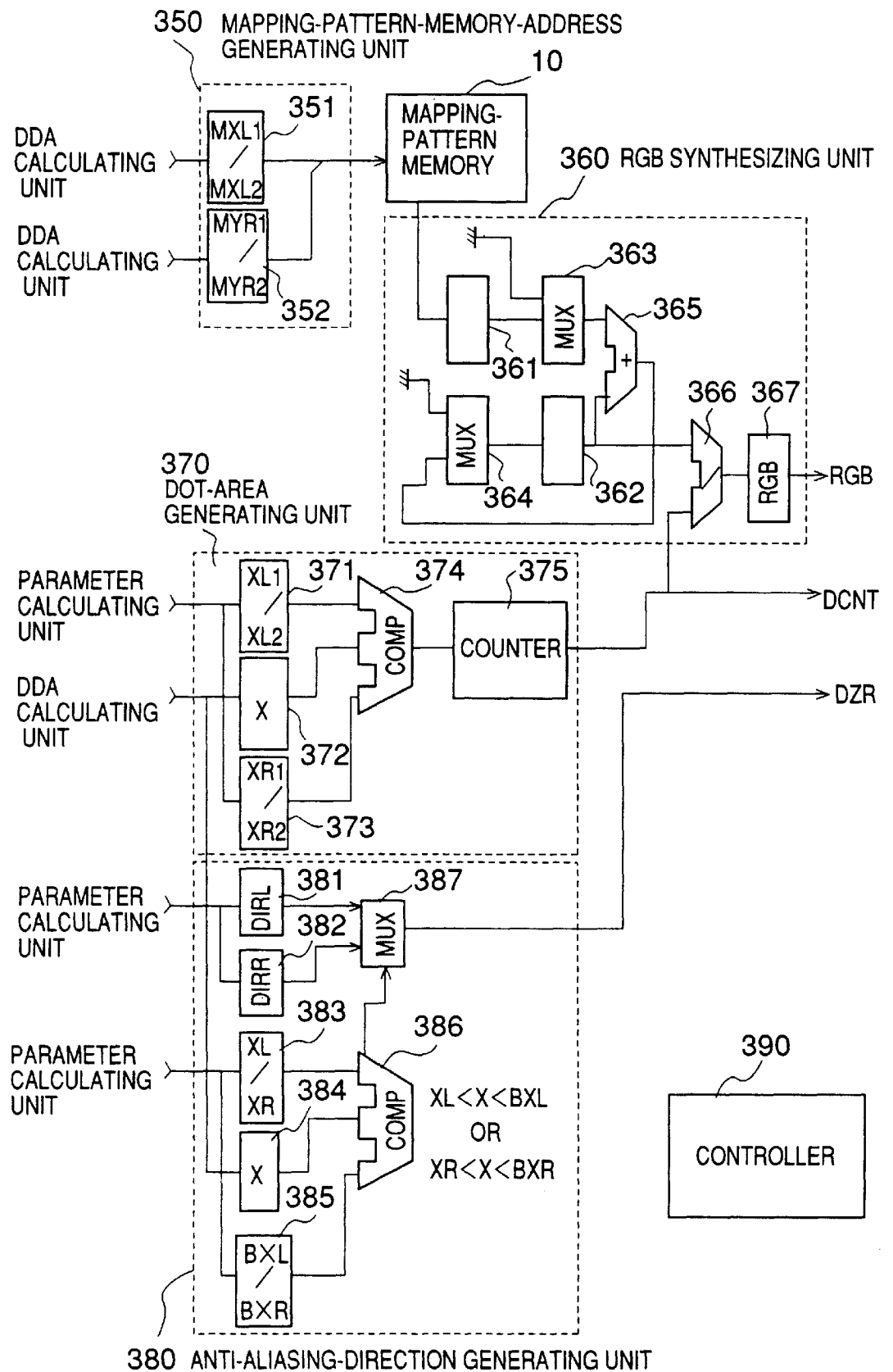
FIG. 89 is a circuit diagram of an example of an anti-aliasing processing unit of FIG. 79.

FIG. 89 is a circuit diagram of an example of the anti-aliasing processing unit 36b. The anti-aliasing processing unit 36b includes a mapping-pattern-memory-address generating unit 350, a RGB synthesizing unit 360, a dot-area generating unit 370, an anti-aliasing-direction generating unit 380, and a controller 390.

The mapping-pattern-memory-address generating unit 350 includes a register 351 and a register 352. The mapping-pattern-memory-address generating unit 350 receives the mapping-pattern-memory address (MX, MY) from the DDA calculating unit 35b, and generates an address to access the mapping-pattern memory 10. In the third embodiment, the register 351 stores the X address MXL1 on the odd-number line and the X address MXL2 on the even-number line, and the register 352 stores the Y address MYL1 on the odd-number line and the Y address MYL2 on the even-number line. Based on the X addresses and the Y addresses of the mapping-pattern memory 10 stored in the registers 351 and 352, respectively, RGB information is read from the mapping-pattern memory 10. The RGB information is supplied to the RGB synthesizing unit 360.

The RGB synthesizing unit 360 includes a register 361, a register 362, a multiplexer 363, a multiplexer 364, an adder 365, a divider 366, and a register 367. The RGB synthesizing unit 360 receives the RGB information read from the mapping-pattern memory 10, and adds the RGB information for the dots included in a given screen dot. Then, the RGB synthesizing unit 360 obtains an average of the RGB information for the anti-aliasing by using a count indicating the number of dots included in a polygon in the given screen dot.

The register 361 stores the RGB information sent from the mapping-pattern memory 10. The RGB information stored in the register 361 is sent to the adder 365 via the multiplexer 363. When there is no dot, the multiplexer 363 sends a value of 0 to the adder 365 instead of sending the data from the mapping-pattern memory 10.

Output data of the adder 365 is sent to the register 362 via the multiplexer 364. The multiplexer 364 sends a value of 0 to the register 362 at a time of initialization, and sends the data from the adder 365 to the register 362 otherwise. The adder 365 adds the data provided from the multiplexer 363 and the data provided from the register 362. The register 362 stores a result of the adding operation each time the RGB value read from the mapping-pattern memory 10 is added. The data stored in the register 362 is provided for the divider 366. The divider 366 divides the data from the register 362 by the dot count sent from the dot-area generating unit 370 to calculate an average of the RGB information. The averaged result is sent to the register 367. The averaged RGB data stored in the register 367 is sent to the frame-memory controlling unit 38b.

The dot-area generating unit 370 includes a register 371, a register 372, a register 373, a comparator 374, and a counter 375. The dot-area generating unit 370 counts the number of dots included in a polygon in the given screen dot.

The register 371 stores the left-edge X values XL1 and XL2 on the odd-number line and the even-number line, respectively, sent from the parameter calculating unit 34b. The register 373 stores the right-edge X values XR1 and XR2 on the odd-number line and the even-number line, respectively, sent from the parameter calculating unit 34b. The register 372 stores an X value being processed sent from the DDA calculating unit 35b. The data stored in the registers 371 through 373 are provided for the comparator 374. The comparator 374 makes a comparison to determine if XL<X<XR is satisfied, so as to decide whether the X value being processed is included in the polygon. A result of the comparison is sent to the counter 375.

The counter 375 counts how many dots of the 2×2 dots are included in the polygon for the given screen dot. The count is sent to the RGB synthesizing unit 360 and to the frame-memory controlling unit 38b.

The anti-aliasing-direction generating unit 380 includes registers 381 through 385, a comparator 386, and a multiplexer 387. The anti-aliasing-direction generating unit 380 determines whether a given dot on a current scan line belongs to a polygon edge. If it does, the anti-aliasing-direction generating unit 380 further determines whether this edge is a left edge or a right edge, in order to obtain a direction of the anti-aliasing.

The direction vector of the left edge provided from the parameter calculating unit 34b is stored in the register 381, and the direction vector of the right edge provided from the parameter calculating unit 34b is stored in the register 382. The direction vectors stored in the registers 381 and 382 are supplied to the multiplexer 387.

Figure 90:
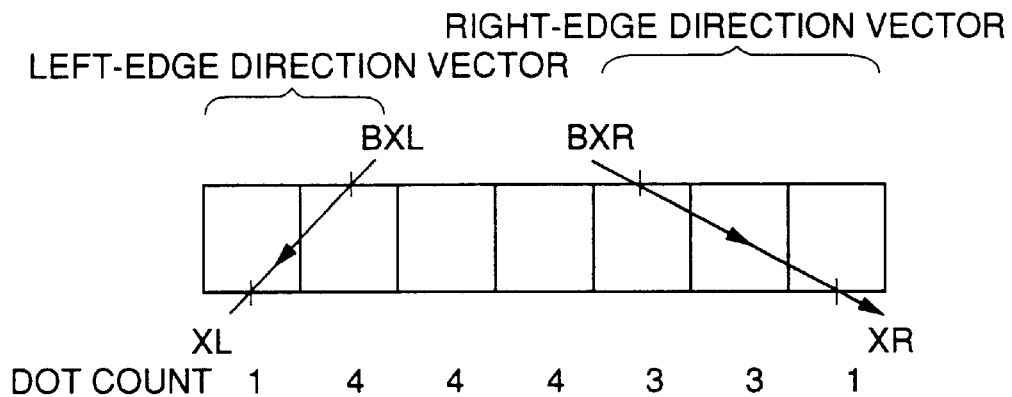
FIG. 90 is an illustrative drawing showing relations between XL, XR, BXL, and BXR.

The leftmost X value XL and the rightmost X value XR of the current line are stored in the register 383, and the leftmost X value BXL and the rightmost X value BXR of the previous line are stored in the register 385. FIG. 90 is an illustrative drawing showing relations between XL, XR, BXL, and BXR.

Still referring to FIG. 89, the X value being processed is provided from the DDA calculating unit 35b and stored in the register 384. The data stored in the registers 383 through 385 are supplied to the comparator 386. The comparator 386 makes a comparison as to whether X is between XL and BXL. If it is, the X value being processed belongs to a left edge. Thus, the comparator 386 controls the multiplexer 387 to output the direction vector of the left edge. If X is between XR and BXR, the X value being processed belongs to a right edge. Thus, the comparator 386 controls the multiplexer 387 to output the direction vector of the right edge. Each element of FIG. 89 described above is controlled by the controller 390.

The data from the DDA calculating unit 35b and the anti-aliasing processing unit 36b is provided for the frame-memory controlling unit 38b. The frame-memory controlling unit 38b receives the area size, the RGB information, and the edge direction of each dot from the anti-aliasing processing unit 36b, and obtains a frame-memory address to write the area size, the RGB information, the edge direction, and the direction code of each dot in the frame memory 5b.

Figure 91:
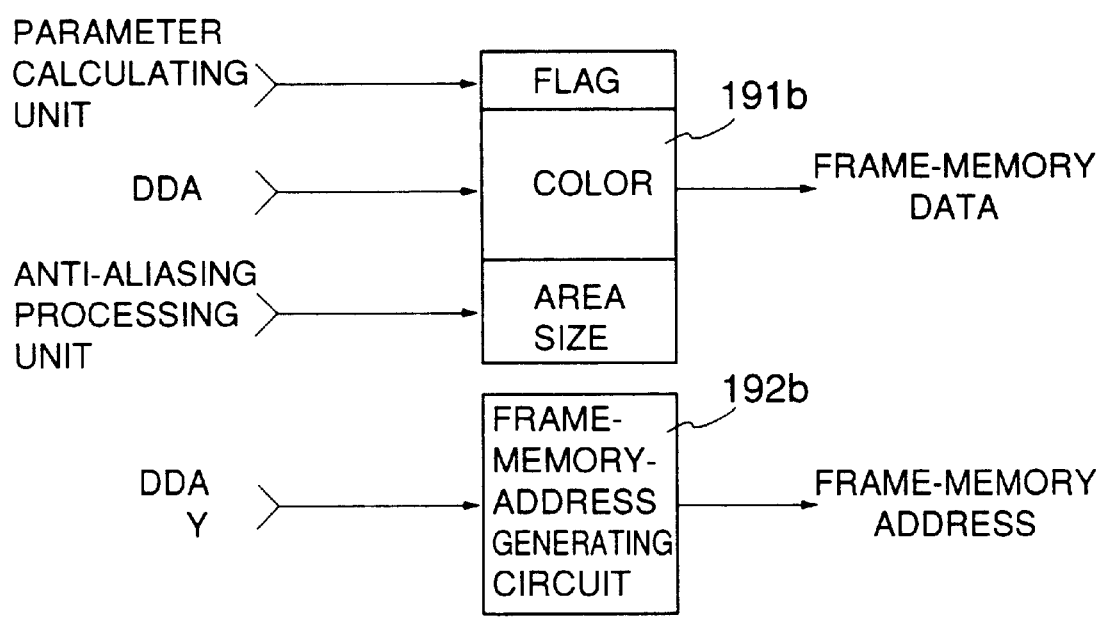
FIG. 91 is a block diagram of an example of a frame-memory controlling unit of FIG. 79.

FIG. 91 is a block diagram of an example of the frame-memory controlling unit 38b. The frame-memory controlling unit 38b includes a register 191b and a frame-memory-address generating circuit 192b.

The register 191 stores the data provided from the parameter calculating unit 34b in a flag area thereof, stores the color data provided from the DDA calculating unit 35b in a color area thereof, and stores the data provided from the anti-aliasing processing unit 36b in an area-size area thereof. All the data stored in the register 191 is sent to the frame memory 5b.

The Y values are provided for the frame-memory-address generating circuit 192b from the DDA calculating unit 35b. The frame-memory-address generating circuit 192b generates a frame-memory address, and provides it for the frame memory 5b as an address thereof.

Each unit of the drawing processing unit 3b described above is controlled by the controller 39b of FIG. 79. The control of each unit is carried out based on processes described below.

Figure 92A:
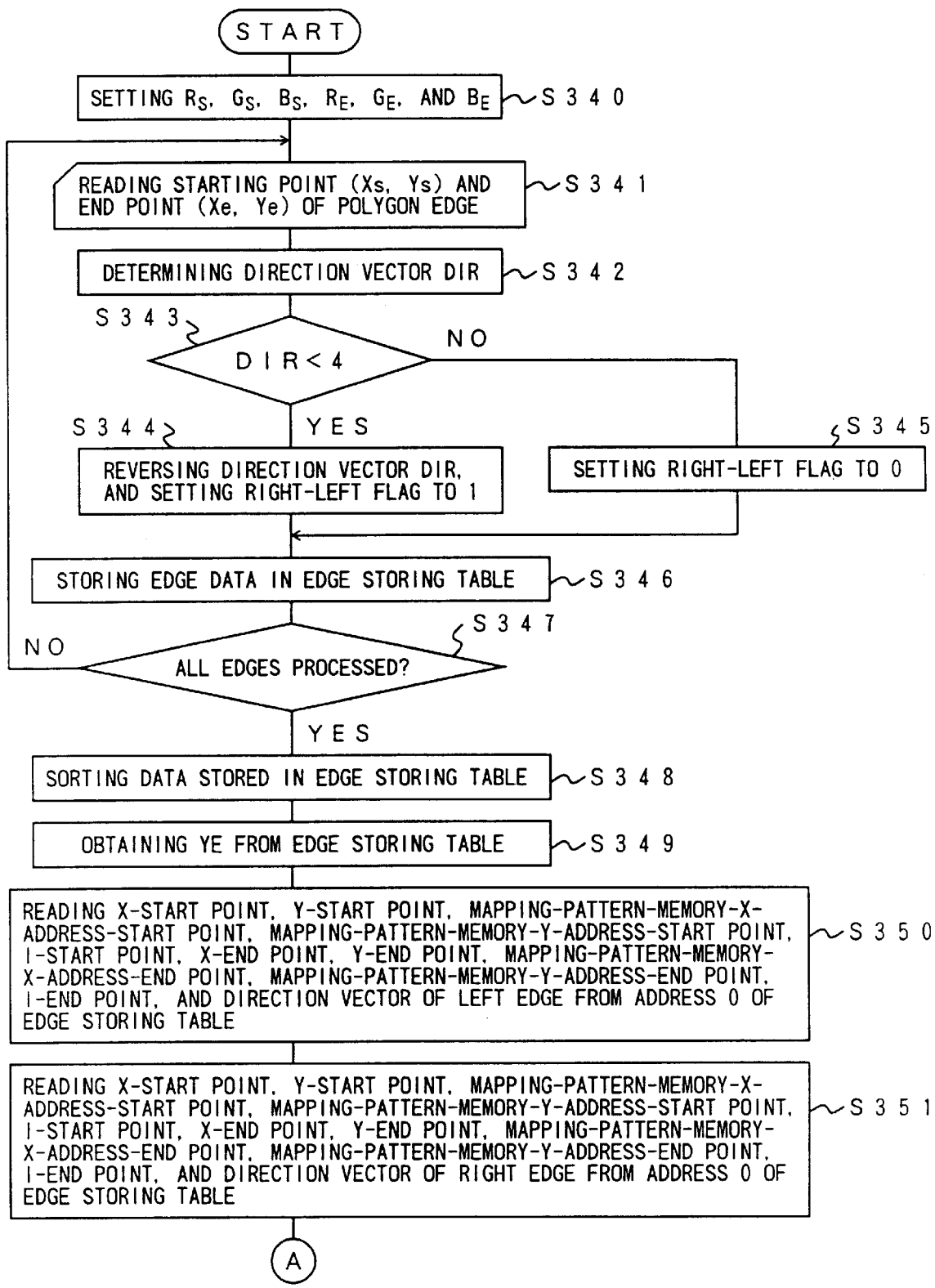
FIGS. 92A and 92B are a flowchart of a process of the anti-aliasing carried out by the drawing processing unit.
Figure 92B:
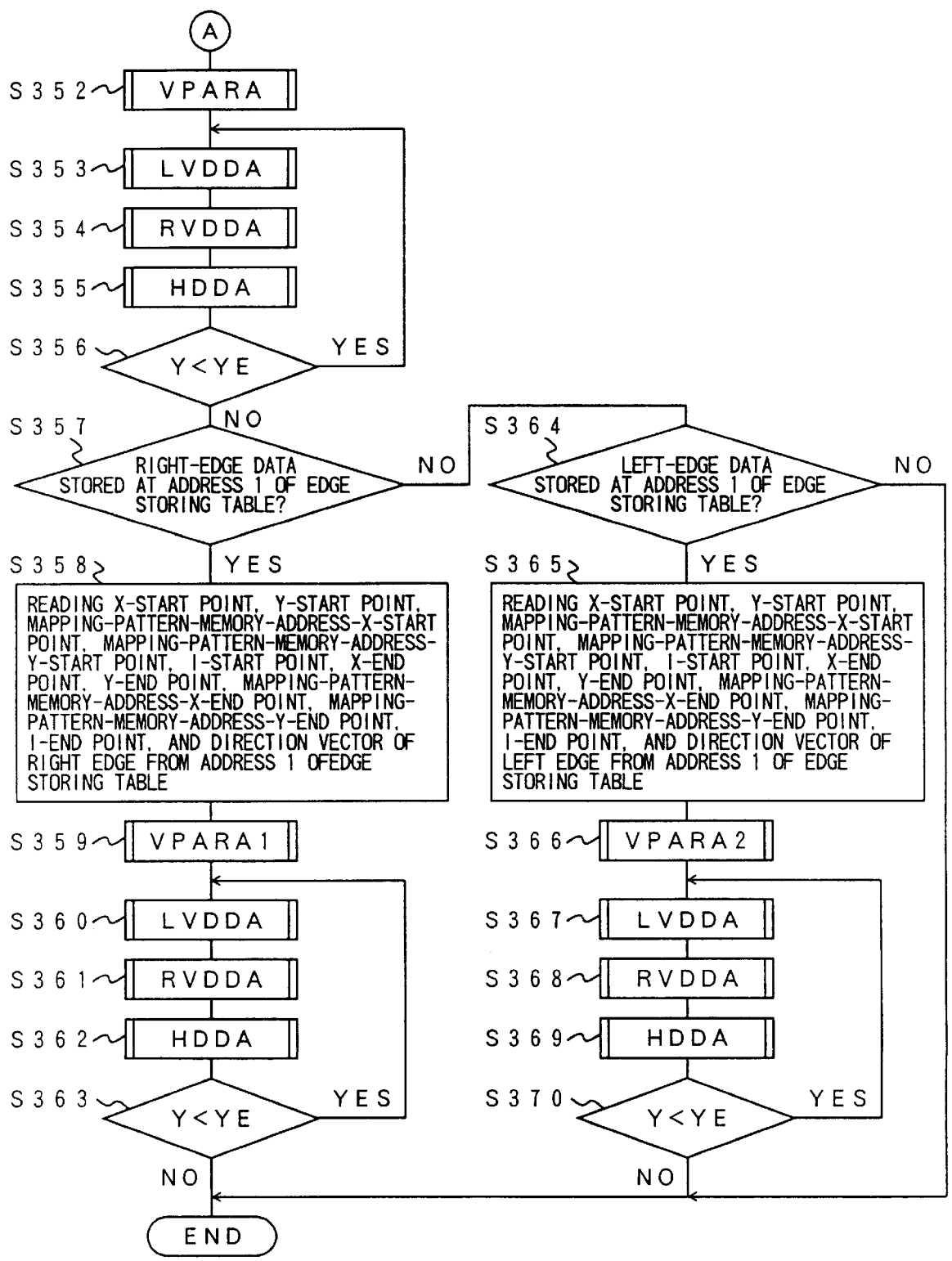

FIGS. 92A and 92B are a flowchart of a process of the anti-aliasing carried out by the drawing processing unit 3b.

At a step S340, the darkest color (Rs, Gs, Bs) and the brightest color (Re, Ge, Be) for the RGB correction calculation are set.

At a step S341, a starting point (Xs, Ys) and an end point (Xe, Ye) of a polygon edge are read from the coordinate-conversion unit 2b.

At a step S342, it is examined in which direction a vector of the polygon edge is directed, and a direction vector DIR is determined.

At a step S343, a check is made whether the direction vector DIR is smaller than 4. In the third embodiment, as in the first embodiment, the process is carried out under a condition that all vectors are represented as vectors directed downward. This step is carried out to determine if the vector is directed downward. If the direction vector DIR is smaller than 4, the procedure goes to a step S344. If the direction vector is not smaller than 4, the procedure goes to a step S345.

At the step S344, the direction vector DIR is reversed since the vector is upward (see FIG. 5), and a right-left flag is set to 1. Here, the right-left flag indicates whether the edge is a right edge (i.e., the right-left flag being 1) or a left edge (i.e., the right-left flag being 0) (see FIG. 6).

At the step S345, the right-left flag is set to 0. Since the vector is downward (see FIG. 5), it is not reversed.

At a step S346, the data representing the edge is stored in the edge storing table 33b.

At a step S347, a check is made whether all the edges of all the polygons are processed. If they are, the procedure goes to a step S348. If there is an edge yet to be processed, the procedure goes back to the step S341 to repeat the above steps.

At the step S348, the data stored in the edge storing table 33b is sorted.

At a step S349, the Y coordinate which is to be at the end of the process is selected from the Y coordinates stored in the edge storing table 33b. Here, the Y coordinate thus obtained is denoted as YE.

At a step S350, an X-start point, a Y-start point, a mapping-pattern-memory-X-address-start point (MXs), a mapping-pattern-memory-Y-address-start point (MYs), an I-start point (Is), an X-end point, a Y-end point, a mapping-pattern-memory-X-address-end point (MXe), a mapping-pattern-memory-Y-address-end point (MYE), an I-end point (Ie), and a direction vector of a left edge stored at address 0 of the edge storing table 33b are read.

At a step S351, an X-start point, a Y-start point, a mapping-pattern-memory-X-address-start point (MXs), a mapping-pattern-memory-Y-address-start point (MYs), an I-start point (Is), an X-end point, a Y-end point, a mapping-pattern-memory-X-address-end point (MXe), a mapping-pattern-memory-Y-address-end point (MYE), an I-end point (Ie), and a direction vector of a right edge stored at address 0 of the edge storing table 33b are read.

Then, subroutine processes VPARA, LVDDA, RVDDA, and HDDA are carried out at steps S352, S353, S354, and S355. The subroutine process VPARA is a process for the parameter calculation. The subroutine process LVDDA is a process for the DDA calculation of the left edge. The subroutine process RVDDA is a process for the DDA calculation of the right edge. Finally, the subroutine process HDDA is a process for the DDA calculation in a horizontal direction parallel to the scan line.

These subroutine processes will be described below.

Figure 93:
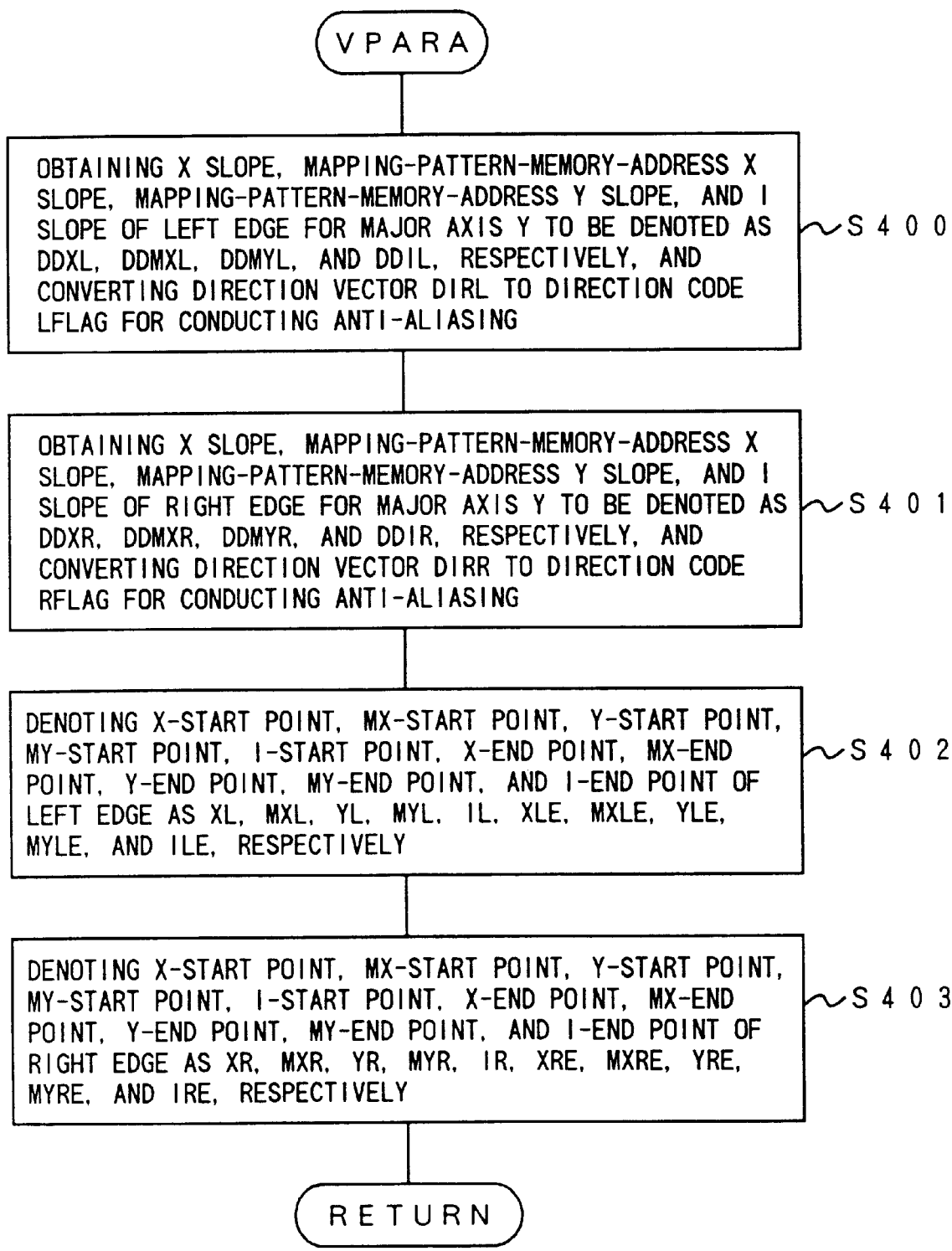
FIG. 93 is a flowchart of a subroutine process VPARA.

FIG. 93 is a flowchart of the subroutine process VPARA.

At the step S400, an X slope, a mapping-pattern-memory-address X slope, a mapping-pattern-memory-address Y slope, and an I slope for a major axis Y are obtained for the left edge, and denoted as DDXL, DDMXL, DDMYL, and DDIL. Also, the direction vector DIRL is converted into a direction code LFLAG for conducting the anti-aliasing.

In the third embodiment, as in the first embodiment, a direction of the anti-aliasing is determined based on the direction vector as shown in FIGS. 29A and 29B. The conversion of the direction vector DIRL into the direction code LFLAG is carried out by using the table of FIG. 30.

At the step S401, an X slope, a mapping-pattern-memory-address X slope, a mapping-pattern-memory-address Y slope, and an I slope for a major axis Y are obtained for the right edge, and denoted as DDXR, DDMXR, DDMYR, and DDIR. Also, the direction vector DIRR is converted into a direction code RFLAG for conducting the anti-aliasing.

At a step S402, the X-start point, the MX-start point, the Y-start point, the MY-start point, the I-start point, the X-end point, the MX-end point, the Y-end point, the MY-end point, and the I-end point of the left edge are denoted as XL, MXL, YL, MYL, IL, XLE, MXLE, YLE, MYLE, and ILE, respectively.

At a step S403, the X-start point, the MX-start point, the Y-start point, the MY-start point, the I-start point, the X-end point, the MX-end point, the Y-end point, the MY-end point, and the I-end point of the right edge are denoted as XR, MXR, YR, MYR, IR, XRE, MXRE, YRE, MYRE, and IRE, respectively. This ends the procedure for the subroutine process VPARA.

After the end of the subroutine process VPARA of the step S352, the subroutine process LVDDA of the DDA calculation of the left edge is carried out at the step S353.

Figure 94:
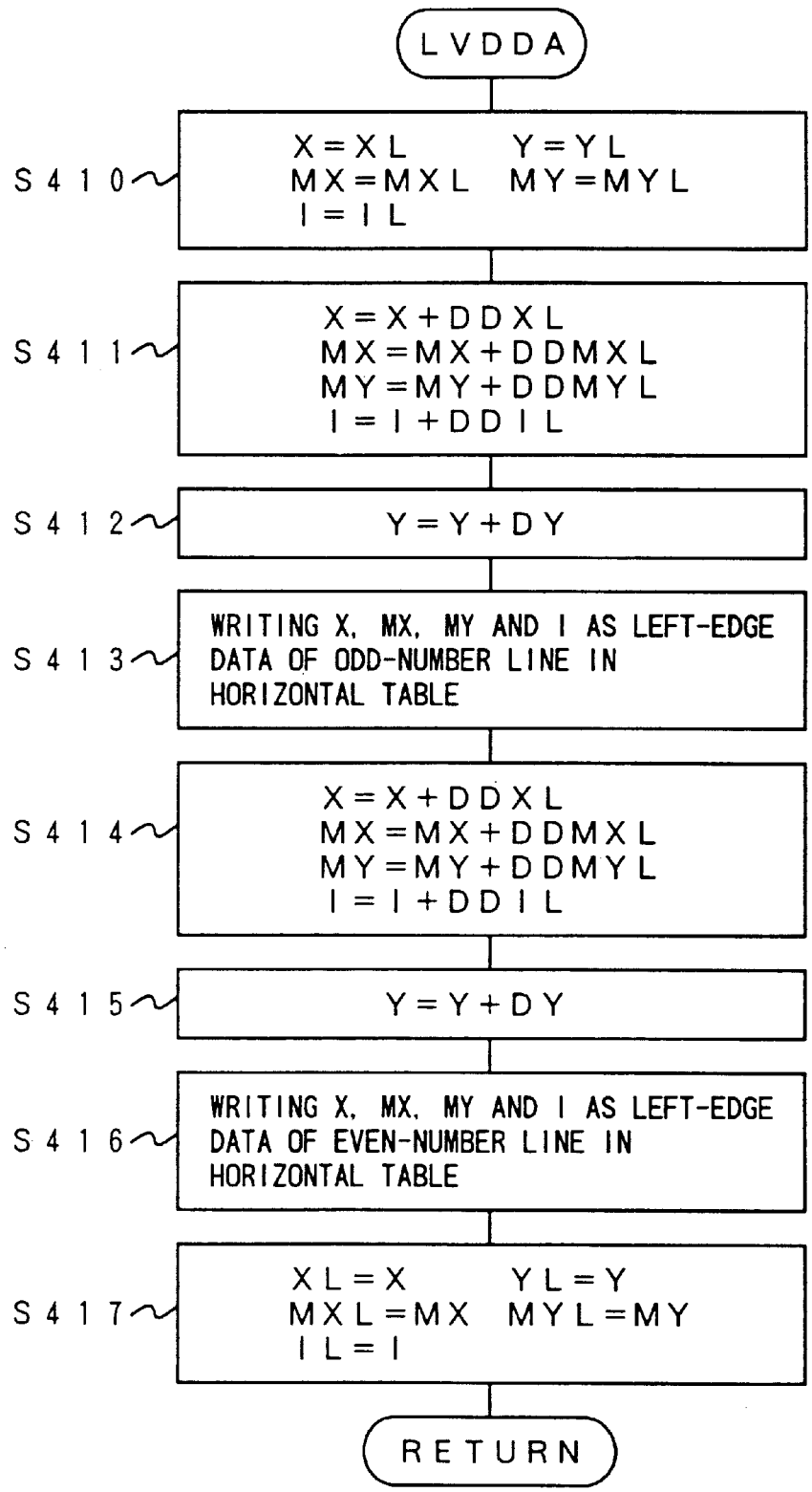
FIG. 94 is a flowchart of a subroutine process LVDDA for the DDA calculation of a left edge.

FIG. 94 is a flowchart of the subroutine process LVDDA for the DDA calculation of the left edge.

At a step S410, XL, YL, MXL, MYL, and IL set by the subroutine process VPARA are denoted as X, Y, MX, MY, and I, respectively.

At a step S411, the DDA is applied to X, MX, MY, and I. That is, X=X+DDXL, MX=MX+DDMXL, MY=MY+DDMYL, and I=I+DDIL are calculated.

At a step S412, Y=Y+DY is calculated.

At a step S413, X, MX, MY, and I are written as left-edge data of an odd-number line in the horizontal table 37b.

At a step S414, the DDA is applied to X, MX, MY, and I to obtain data of an even-number line. That is, X=X+DDXL, MX=MX+DDMXL, MY=MY+DDMYL, and I=I+DDIL are further calculated.

At a step S415, Y=Y+DY is further calculated.

At a step S416, X, MX, MY, and I are written as left-edge data of the even-number line in the horizontal table 37b.

At a step S417, the obtained X, Y, MX, MY, and I are set for XL, YL, MXL, MYL, and IL, respectively. This ends the procedure.

After the completion of the subroutine process LVDDA of the step S353, the subroutine process RVDDA is carried out at the step S354.

Figure 95:
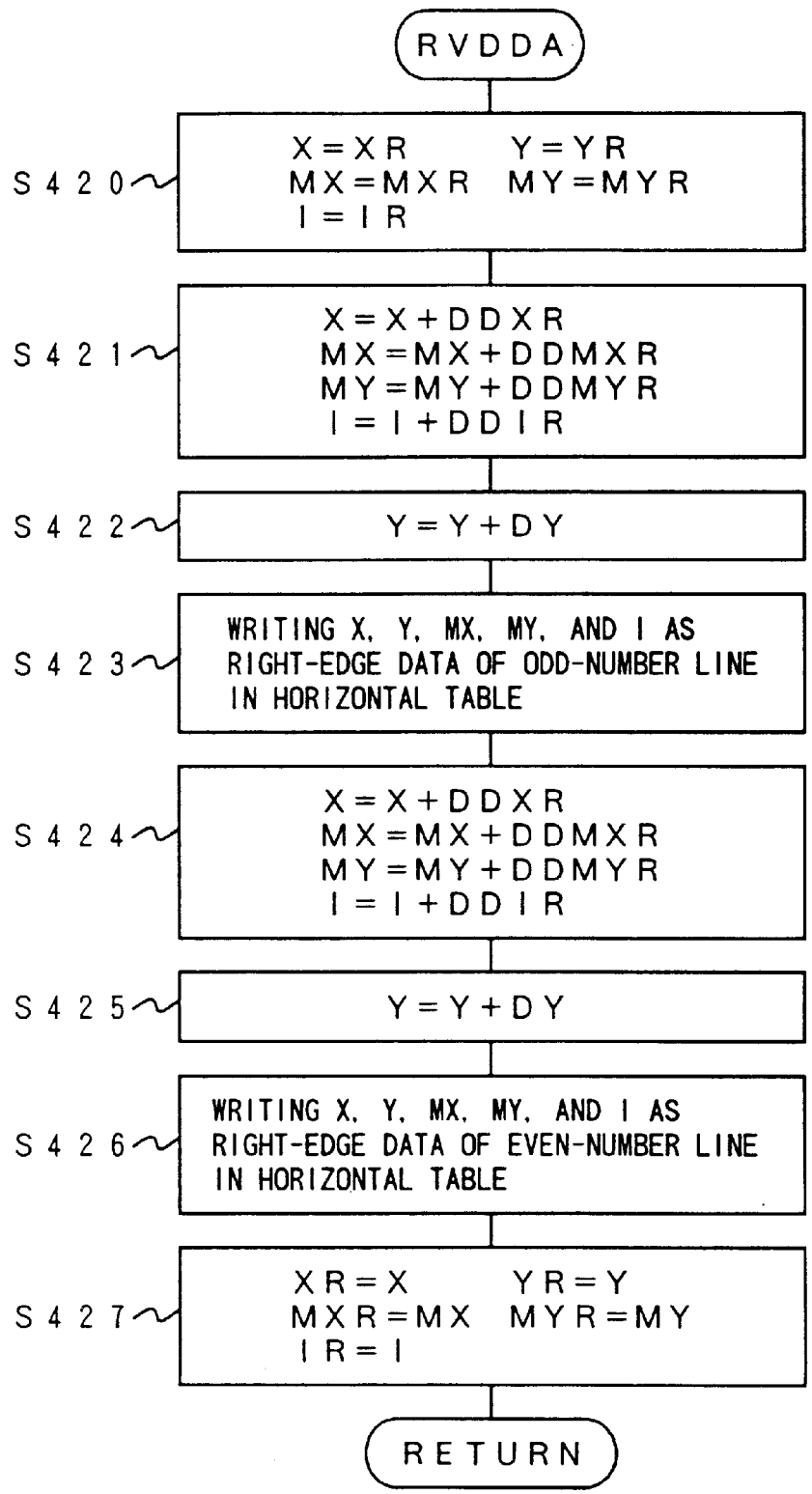
FIG. 95 is a flowchart of a subroutine process RVDDA for the DDA calculation of a right edge.

FIG. 95 is a flowchart of the subroutine process RVDDA for the DDA calculation of the right edge.

At a step S420, XR, YR, MXR, MYR, and IR set by the subroutine process VPARA are denoted as X, Y, MX, MY, and I, respectively.

At a step S421, the DDA is applied to X, MX, MY, and I. That is, X=X+DDXR, MX=MX+DDMXR, MY=MY+DDMYR, and I=I+DDIR are calculated.

At a step S422, Y=Y+DY is calculated.

At a step S423, X, Y, MX, MY, and I are written as right-edge data of an odd-number line in the horizontal table 37b.

At a step S424, the DDA is applied to X, MX, MY, and I to obtain data of an even-number line. That is, X=X+DDXR, MX=MX+DDMXR, MY=MY+DDMYR, and I=I+DDIR are further calculated.

At a step S425, Y=Y+DY is further calculated.

At a step S426, X, Y, MX, MY, and I are written as right-edge data of the even-number line in the horizontal table 37b.

At a step S427, the obtained X, Y, MX, MY, and I are set for XR, YR, MXR, MYR, and IR, respectively. This ends the procedure.

After the completion of the subroutine process RVDDA of the step S354, the subroutine process HDDA of the DDA calculation in a horizontal direction parallel to the scan line is carried out at the step S355.

Figure 96A:
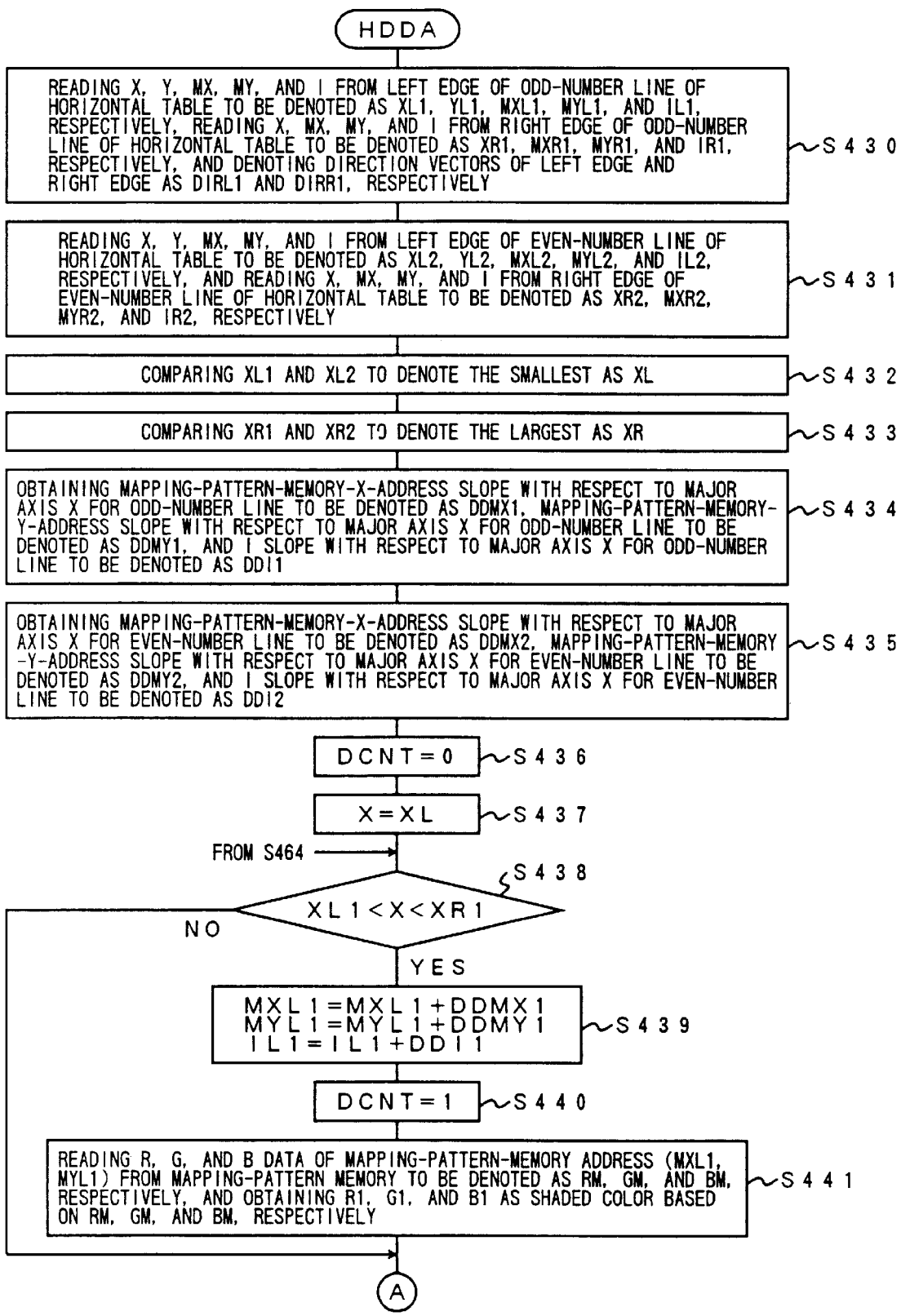
FIGS. 96A and 96B are a flowchart of a subroutine process HDDA for the DDA calculation in a horizontal direction parallel to a scan line.
Figure 96B:
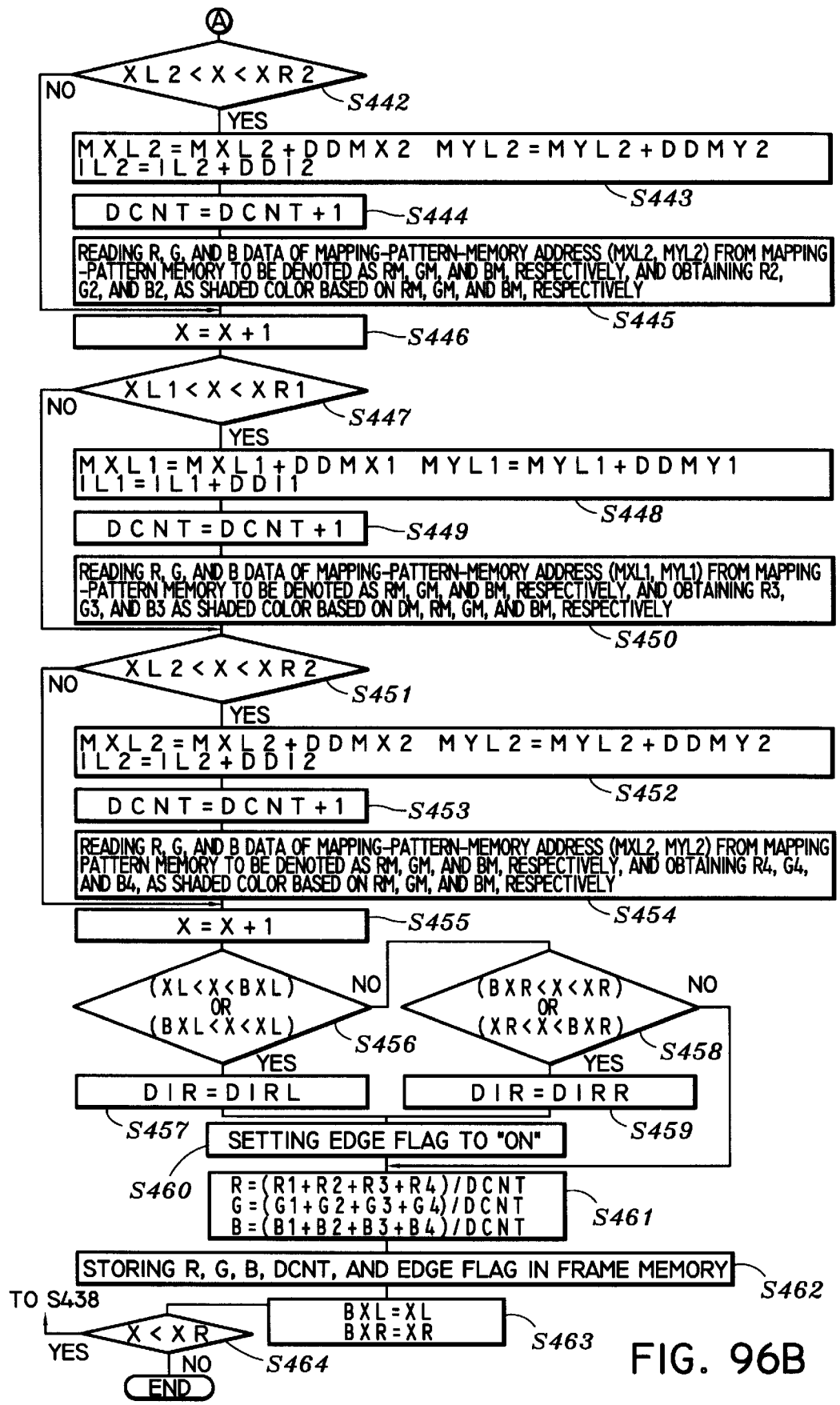

FIGS. 96A and 96B are a flowchart of the subroutine process HDDA for the DDA calculation in a horizontal direction parallel to the scan line.

At a step S430, X, Y, MX, MY, and I read from the left edge of the odd-number line of the horizontal table 37b are denoted as XL1, YL1, MXL1, MYL1, and IL1, respectively. Also, X, MX, MY, and I read from the right edge of the odd-number line of the horizontal table 37b are denoted as XR1, MXR1, MYR1, and IR1, respectively. Further, the direction vectors of the left edge and the right edge are denoted as DIRL1 and DIRR1, respectively.

At a step S431, X, Y, MX, MY, and I read from the left edge of the even-number line of the horizontal table 37b are denoted as XL2, YL2, MXL2, MYL2, and IL2, respectively. Also, X, MX, MY, and I read from the right edge of the even-number line of the horizontal table 37b are denoted as XR2, MXR2, MYR2, and IR2, respectively.

At a step S432, a comparison is made between XL1 and XL2 to denote the smallest of the two as XL.

At a step S433, a comparison is made between XR1 and XR2 to denote the largest of the two as XR.

At a step S434, a mapping-pattern-memory-X-address slope with respect to a major axis X is obtained for the odd-number line to be denoted as DDMX1, and a mapping-pattern-memory-Y-address slope with respect to the major axis X is obtained for the odd-number line to be denoted as DDMY1. Also, an I slope with respect to the major axis X is obtained for the odd-number line to be denoted as DDI1.

At a step S435, a mapping-pattern-memory-X-address slope with respect to a major axis X is obtained for the even-number line to be denoted as DDMX2, and a mapping-pattern-memory-Y-address slope with respect to the major axis X is obtained for the even-number line to be denoted as DDMY2. Also, an I slope with respect to the major axis X is obtained for the even-number line to be denoted as DDI2.

At a step S436, a count DCNT is set to "0".

At a step S437, X (X value being processed) is initialized as XL.

At a step S438, a check is made whether X is placed between XL1 and XR1, i.e., whether XL1<X<XR1 is satisfied. If it is, the procedure goes to a step S439. If X is not between XL1 and XR1, the procedure goes to a step S442.

At the step S439, MXL1=MXL1+DDMX1, MYL1=MYL1+DDMY1, and IL1=IL1+DDI1 are calculated.

At a step S440, DCNT is set to "1".

At a step S441, R, G, and B data of the mapping-pattern-memory address (MXL1, MYL1) is read from the mapping-pattern memory 10 to be denoted as Rm, Gm, and Bm, respectively. Also, the RGB correction unit 40 obtains R1, G1, and B1 as a shaded color based on Rm, Gm, and Bm, respectively.

At the step S442, a check is made whether X is placed between XL2 and XR2, i.e., whether XL2<X<XR2 is satisfied. If it is, the procedure goes to a step S443. If X is not between XL2 and XR2, the procedure goes to a step S446.

At the step S443, MXL2=MXL2+DDMX2, MYL2=MYL2+DDMY2, and IL2=IL2+DDI2 are calculated.

At a step S444, DCNT is incremented by 1.

At a step S445, R, G, and B data of the mapping-pattern-nemory address (MXL2, MYL2) is read from the mapping-pattern memory 10 to be denoted as Rm, Gm, and Bm, respectively. Also, the RGB correction unit 40 obtains R2, G2, and B2 as a shaded color based on Rm, Gm, and Bm, respectively.

At the step S446, X is incremented by 1.

At a step S447, a check is made whether X is placed between XL1 and XR1, i.e., whether XL1<X<XR1 is satisfied. If it is, the procedure goes to a step S448. If X is not between XL1 and XR1, the procedure goes to a step S451.

At the step S448, MXL1=MXL1+DDMX1, MYL1=MYL1+DDMY1, and IL1=IL1+DDI1 are calculated.

At a step S449, DCNT is incremented by 1.

At a step S450, R, G, and B data of the mapping-pattern-memory address (MXL1, MYL)is read from the mapping-pattern memory 10 to be denoted as Rm, Gm, and Bm, respectively. Also, the RGB correction unit 40 obtains R3, G3, and B3 as a shaded color based on Rm, Gm, and Bm, respectively.

At the step S451, a check is made whether X is placed between XL2 and XR2, i.e., whether XL2<X<XR2 is satisfied. If it is, the procedure goes to a step S452. If X is not between XL2 and XR2, the procedure goes to a step S455.

At the step S452, MXL2=MXL2+DDMX2, MYL2=MYL2+DDMY2, and IL2=IL2+DDI2 are calculated.

At a step S453, DCNT is incremented by 1.

At a step S454, R, G, and B data of the mapping-pattern-memory address (MXL2, MYL2) is read from the mapping-pattern memory 10 to be denoted as Rm, Gm, and Bm, respectively. Also, the RGB correction unit 40 obtains R4, G4, and B4 as a shaded color based on Rm, Gm, and Bm, respectively.

At the step S455, X is incremented by 1.

At a step S456, a check is made whether X is between XL and BXL (XL of the previous line), i.e., whether either one of XL<X<BXL or BXL<X<XL is satisfied. If it is, the procedure goes to a step S457. If X is not between XL and BXL, the procedure goes to a step S458.

At the step S457, DIR is set to DIRL.

At the step S458, a check is made whether X is between XR and BXR (XR of the previous line), i.e., whether either one of XR<X<BXR or BXR<X<XR is satisfied. If it is, the procedure goes to a step S459. If X is not between XR and BXR, the procedure goes to a step S461.

At the step S459, DIR is set to DIRR.

At a step S460 after the step S457 or S459, an edge flag indicating whether a current processing point is positioned along an edge is set to "on".

At the step S461, R=(R1+R2+R3+R4)/DCNT, G=(G1+G2+G3+G4)/DCNT, and B=(B1+B2+B3+B4)/DCNT are calculated.

At a step S462, R, G, and B obtained at the step S461, the count DCNT, and the edge flag are stored in the frame memory.

At a step S463, XL and XR are newly denoted as BXL and BXR, respectively.

At a step S464, a check is made whether X is smaller than XR. If it is, the procedure goes back to the step S438 to repeat the above-described steps. If X is greater than or equal to XR, this subroutine process ends.

With reference to FIG. 92B again, after the end of the subroutine process HDDA of step S355, the procedure goes to a step S356.

At the step S356, a check is made whether Y is smaller than YE. If it is smaller, the procedure goes back to the step S353 to repeat the subroutine processes LVDDA, RVDDA, and HDDA. It Y is greater than or equal to YE, the procedure goes to a step S357.

At the step S357, a check is made whether there is right-edge data stored at address 1 of the edge storing table. If there is, the procedure goes to a step S358. Otherwise, the procedure goes to a step S364.

At the step S358, an X-start point, a Y-start point, a mapping-pattern-memory-address-X-start point, a mapping-pattern-memory-address-Y-start point, an I-start point, an X-end point, a Y-end point, a mapping-pattern-memory-address-X-end point, a mapping-pattern-memory-address-Y-end point, an I-end point and a direction vector of a right edge stored at address 1 of the edge storing table 33 are read.

Then, a subroutine process VPARA1, and the subroutine processes LVDDA, RVDDA, and HDDA are carried out at steps S359, S360, S361, and S362, respectively. The subroutine processes LVDDA, RVDDA, and HDDA have been already described with reference to FIGS. 94, 95, and 96A and 96B, respectively.

Figure 97:
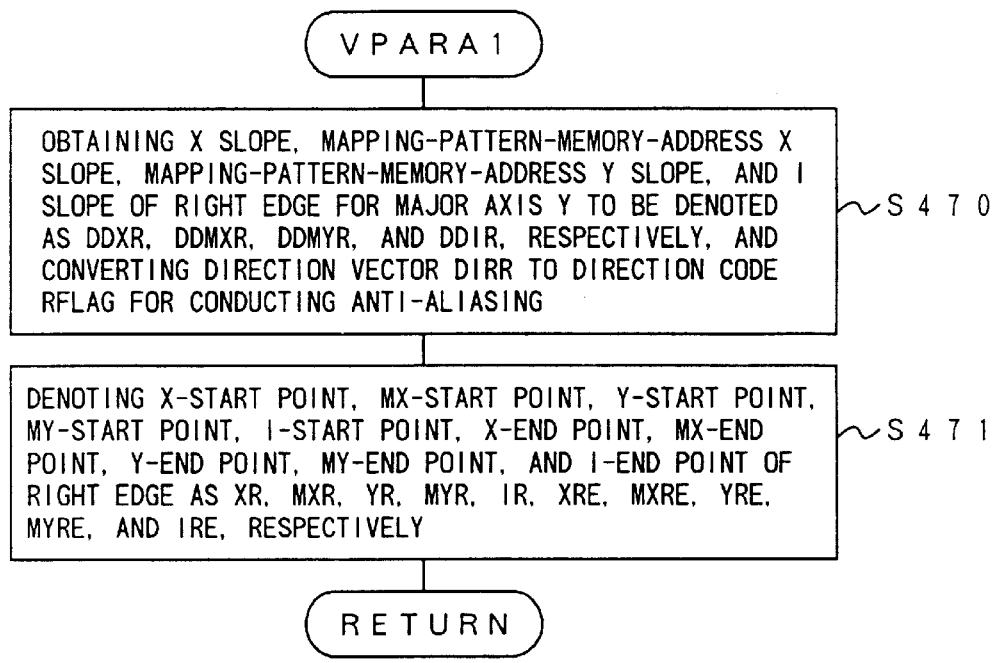
FIG. 97 is a flowchart of a subroutine process VPARA1.

FIG. 97 is a flowchart of the subroutine process VPARA1.

At the step S470, an X slope, a mapping-pattern-memory-address X slope, a mapping-pattern-memory-address Y slope, and an I slope for a major axis Y are obtained for the right edge, and denoted as DDXR, DDMXR, DDMYR, and DDIR. Also, the direction vector DIRR is converted into a direction code RFLAG for conducting the anti-aliasing.

At a step S471, the X-start point, the MX-start point, the Y-start point, the MY-start point, the I-start point, the X-end point, the MX-end point, the Y-end point, the MY-end point, and the I-end point of the right edge are denoted as XR, MXR, YR, MYR, IR, XRE, MXRE, YRE, MYRE, and IRE, respectively. This ends the procedure for the subroutine process VPARA1.

With reference to FIG. 92B again, after the subroutine process VPARA1 of the step S359, the subroutine processes LVDDA, RVDDA, and HDDA are calculated at the steps S360 through S362 as described before.

At a step S363, a check is made whether Y is smaller than YE. If it is, the procedure goes back to the step S360 to repeat the subroutine processes LVDDA, RVDDA, and HDDA. If Y is greater than or equal to YE, the procedure ends.

At the step S364 following the step S357, a check is made whether there is left-edge data stored at address 1 of the edge storing table. If there is, the procedure goes to a step S365. Otherwise, the procedure ends.

At the step S365, an X-start point, a Y-start point, a mapping-pattern-memory-address-X-start point, a mapping-pattern-menory-address-Y-start point, an I-start point, an X-end point, a Y-end point, a mapping-pattern-memory-address-X-end point, a mapping-pattern-memory-address-Y-end point, an I-end point, and a direction vector of a left edge stored at address 1 of the edge storing table 33 are read.

Then, a subroutine process VPARA2, and the subroutine processes LVDDA, RVDDA, and HDDA are carried out at steps S366, S367, S368, and S369, respectively. The subroutine processes LVDDA, RVDDA, and HDDA have been already described with reference to FIGS. 94, 95, and 96A and 96B, respectively.

Figure 98:
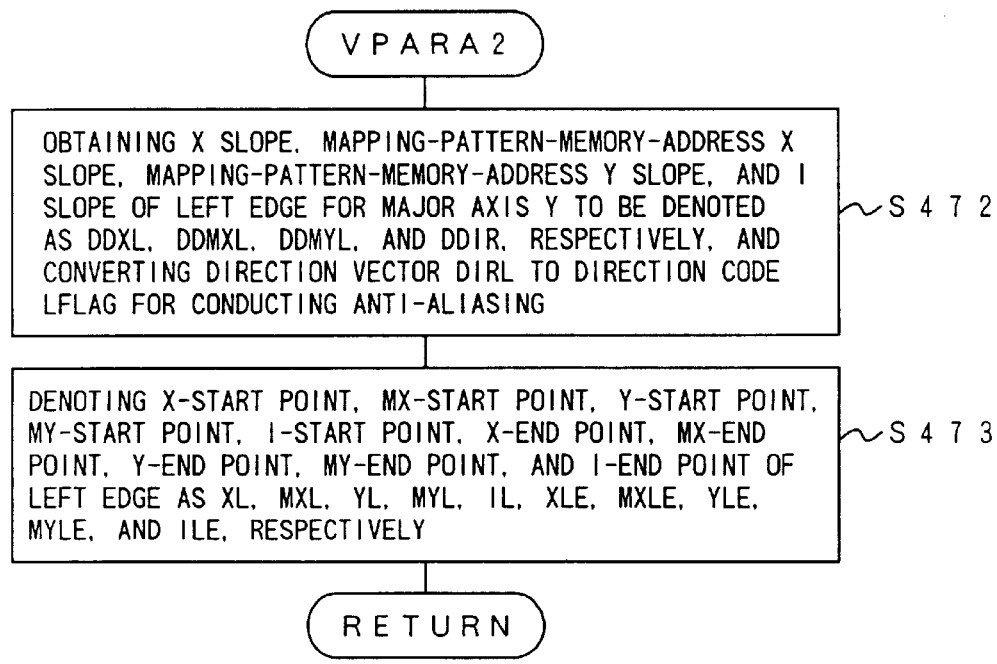
FIG. 98 is a flowchart of a subroutine process VPARA2.

FIG. 98 is a flowchart of the subroutine process VPARA2.

At the step S472, an X slope, a mapping-pattern-memory-address X slope, a mapping-pattern-memory-address Y slope, and an I slope for a major axis Y are obtained for the left edge, and denoted as DDXL, DDMXL, DDMYL, and DDIL. Also, the direction vector DIRL is converted into a direction code LFLAG for conducting the anti-aliasing.

At a step S473, the X-start point, the MX-start point, the Y-start point, the MY-start point, the I-start point, the X-end point, the MX-end point, the Y-end point, the MY-end point, and the I-end point of the left edge are denoted as XL, MXL, YL, MYL, IL, XLE, MXLE, YLE, MYLE, and ILE, respectively. Then, this subroutine process ends.

With reference to FIG. 92B again, after the subroutine process VPARA2 of the step S366, the subroutine processes LVDDA, RVDDA, and HDDA are calculated at the steps S367 through S369 as described before.

At a step S370, a check is made whether Y is smaller than YE. If it is, the procedure goes back to the step S367 to repeat the subroutine processes LVDDA, RVDDA, and HDDA. If Y is greater than or equal to YE, the procedure ends.

The data processed by the drawing processing unit 3b is stored in the frame memory 5b.

Figure 99:
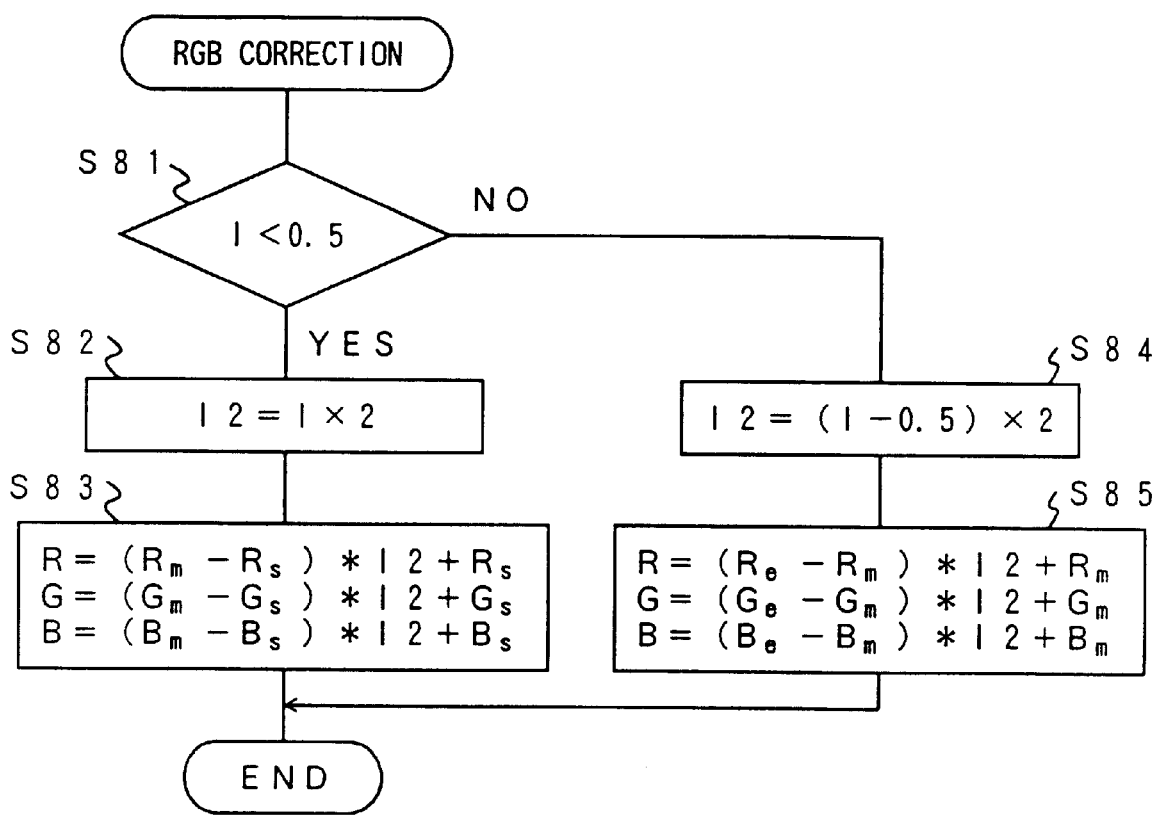
FIG. 99 is a flowchart of a process of a RGB correction unit of FIG. 79.

FIG. 99 is a flowchart of a process of the RGB correction unit 40. In the third embodiment, the luminance I ranges from 0.0 to 1.0. Rm, Gm, and Bm are color data of a given polygon dot when the luminance I is 0.5. Rs, Gs, and Bs are color data of the darkest point when the luminance I is 0.0. Re, Ge, and Be are color data of the brightest point when the luminance I is 1.0.

At a step S81, a check is made whether the luminance I of a given point is smaller than 0.5. If it is, the procedure goes to a step S82. If the luminance I is greater than or equal to 0.5, the procedure goes to a step S84.

At the step S82, I2=I×2 is calculated so that I2 ranges from 0.0 to 1.0.

At a step S83, color data R, G, and B of the given dot is obtained by using the color (Rm, Gm, Bm), the color (Rs, Gs, Bs), and I2. Namely, R=(Rm−Rs)×I2+Rs, G=(Gm−Gs)×I2+Gs, and B=(Bm−Bs)×I2+Bs are calculated.

At the step S84, I2=(I−0.5)×2 is calculated so that I2 ranges from 0.0 to 1.0.

At a step S85, color data R, G, and B of the given dot is obtained by using the color (Rm, Gm, Bm), the color (Re, Ge, Be), and I2. Namely, R=(Re−Rm)×I2+Rm, G=(Ge−Gm)×I2+Gm, and B=(Be−Bm)×I2+Bm are calculated. This ends the procedure.

In this manner, when the luminance I is relatively small, a color of a given dot is corrected to come nearer to the darkest point, thereby having a darker appearance. When the luminance I is relatively large, a color of a given dot is corrected to come closer to the brightest point, thereby having a brighter appearance.

Figure 100:
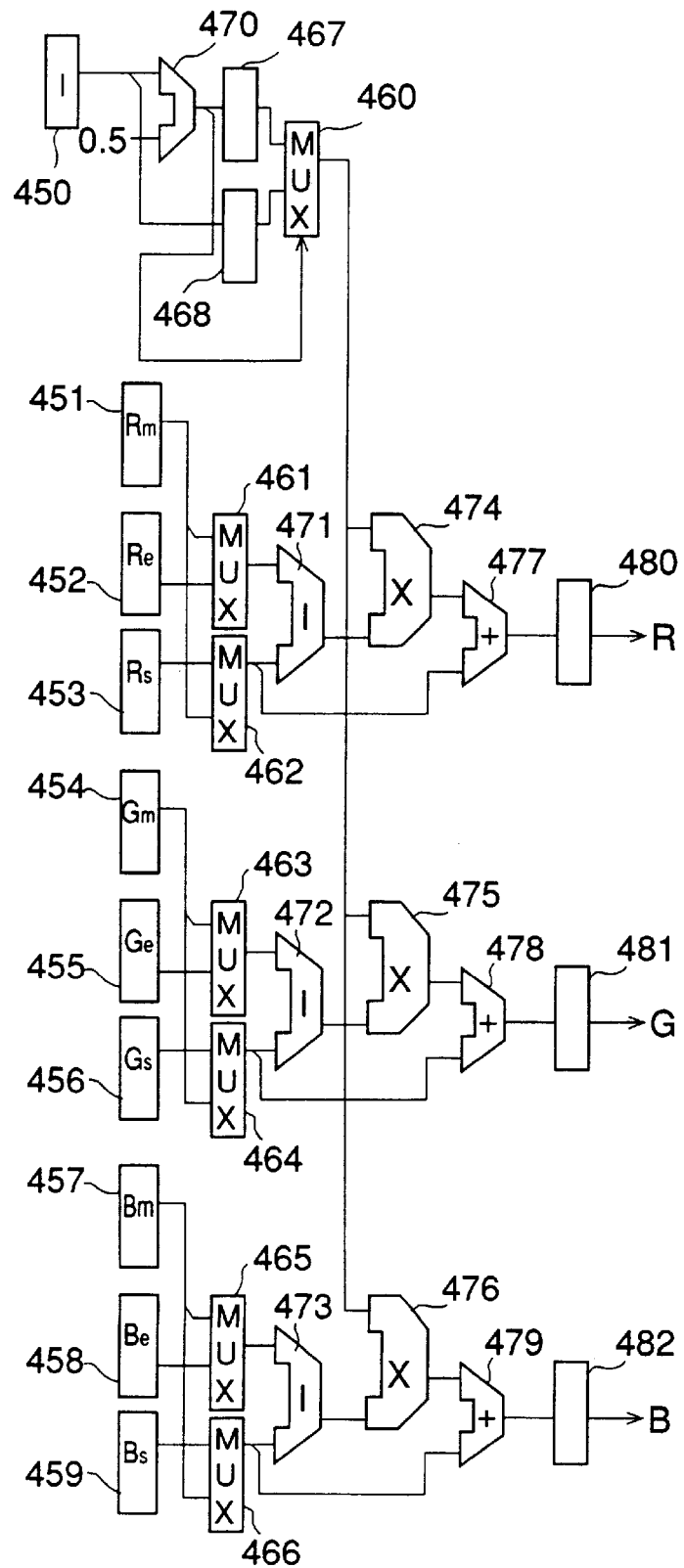
FIG. 100 is a circuit diagram of an example of the RGB correction unit.

FIG. 100 is a circuit diagram of an example of the RGB correction unit 40. The RGB correction unit 40 of FIG. 100 includes registers 450 through 459, multiplexers 460 through 466, shift registers 467 and 468, subtracters 470 through 473, multipliers 474 through 476, adders 477 through 479, and registers 480 through 482.

The register 450 stores the luminance I of a given dot. The subtracter 470 receives the luminance I from the register 450, and subtracts 0.5 from the luminance I. The shift register 467 receives a result of the subtraction operation, and the shift register 468 receives the luminance I. Both the shift register 467 and the shift register 468 shift bits of the received data to the left by one bit so that the receives data is doubled. The multiplexer 460 receives the outputs (luminance data) of the shift register 467 and the shift register 468 to select one of these two based on the output of the subtracter 470. Selected luminance data is sent to the multipliers 474 through 476.

The register 451 stores a red component Rm of the texture pattern for the given dot. The register 452 stores a red component Re of the brightest point for the given dot, and the register 453 stores a red component Rs of the darkest point for the given dot. The multiplexer 461 receives the red components from the register 451 and the register 452 to select one of the two red components based on the output of the subtracter 470. The multiplexer 462 receives the red components from the register 451 and the register 453 to select one of the two red components based on the output of the subtracter 470. The subtracter 471 subtracts an output of the multiplexer 462 from an output of the multiplexer 461. Thus, the subtracter 471 calculates either Rm−Rs or Re−Rm.

The multiplier 474 receives the luminance data (I2) from the multiplexer 460 and the color data (Rm−Rs or Re−Rm) from the subtracter 471, and multiplies the luminance data and the color data. The adder 477 adds a result of the multiplication operation provided from the multiplier 474 to the color data of Rs or Rm provided from the multiplexer 462 to obtain (Rm−Rs)×I2+Rs or (Re−Rm)×I2+Rm. The obtained color data is stored in the register 480.

The register 454 stores a green component Gm of the texture pattern for the given dot. The register 455 stores a green component Ge of the brightest point for the given dot, and the register 456 stores a green component Gs of the darkest point for the given dot. The multiplexer 463 receives the green components from the register 454 and the register 455 to select one of the two green components based on the output of the subtracter 470. The multiplexer 464 receives the green components from the register 454 and the register 456 to select one of the two green components based on the output of the subtracter 470. The subtracter 472 subtracts an output of the multiplexer 464 from an output of the multiplexer 463. Thus, the subtracter 472 calculates either Gm−Gs or Ge−Gm.

The multiplier 475 receives the luminance data (I2) from the multiplexer 460 and the color data (Gm−Gs or Ge−Gm) from the subtracter 472, and multiplies the luminance data and the color data. The adder 478 adds a result of the multiplication operation provided from the multiplier 475 to the color data of Gs or Gm provided from the multiplexer 464 to obtain (Gm−Gs)×I2+Gs or (Ge−Gm)×I2+Gm. The obtained color data is stored in the register 481.

The register 457 stores a blue component Bm of the texture pattern for the given dot. The register 458 stores a blue component Be of the brightest point for the given dot, and the register 459 stores a blue component Bs of the darkest point for the given dot. The multiplexer 465 receives the blue components from the register 457 and the register 458 to select one of the two blue components based on the output of the subtracter 470. The multiplexer 466 receives the blue components from the register 457 and the register 459 to select one of the two blue components based on the output of the subtracter 470. The subtracter 473 subtracts an output of the multiplexer 466 from an output of the multiplexer 465. Thus, the subtracter 473 calculates either Bm−Bs or Be−Bm.

The multiplier 476 receives the luminance data (I2) from the multiplexer 460 and the color data (Bm−Bs or Be−Bm) from the subtracter 473, and multiplies the luminance data and the color data. The adder 479 adds a result of the multiplication operation provided from the multiplier 476 to the color data of Bs or Bm provided from the multiplexer 466 to obtain (Bm−Bs)×I2+Bs or (Be−Bm)×I2+Bm. The obtained color data is stored in the register 482.

The frame-memory controlling unit 38b of FIG. 79 is the same as the frame-memory controlling unit 38a of FIG. 54, and a description thereof will be omitted. The display processing unit 6b of FIG. 78 is the same as the display processing unit 6a of FIG. 55, and a description thereof will be omitted.

As described above, according to the third embodiment of the present invention, the image generation device generates a texture-mapped-shaded polygon without requiring a complicated computation. Although an above description of the third embodiment has been given by including the anti-aliasing process, it is apparent that the calculation of the texture-mapped-shaded pattern according to the third embodiment can be performed without performing the anti-aliasing process.

Further, the present invention is not limited to these embodiments, but other variations and modifications may be made without departing from the scope of the present invention.

What is claimed is:

1. A device for generating an image comprising polygons, said polygons having polygon edges and a reduced aliasing effect on said polygon edges, said device comprising:

drawing processing means for obtaining a color of a given dot, an area size occupied by one of said polygons in said given dot, and a direction code indicating a direction of an adjacent dot relative to said given dot;

frame-memory means for storing said color, said area size, and said direction code for each dot of said image; and display processing means for combining said color of said given dot and a color of said adjacent dot indicated by said direction code with a ratio corresponding to said area size to obtain a color to be displayed for said given dot in said image.

2. The device as claimed in claim 1, wherein said drawing processing means comprises:

means for obtaining a slope and said direction code of one of said polygon edges;

DDA calculating means for obtaining a coordinate of an intersection where said one of said polygon edges crosses one of edges of said given dot; and dot-area processing means for obtaining said area size of said given dot based on said slope and said coordinate of said intersection.

3. The device as claimed in claim 2, wherein said dot-area processing means comprises:

a first memory storing slope codes to receive said slope and to provide a slope code indicating said slope;

a second memory storing intersection codes to receive a decimal number of said coordinate of said intersection and to provide an intersection code indicating said coordinate of said intersection; and a third memory storing area sizes to receive said slope code and said intersection code to provide said area size corresponding to said slope code and said intersection code.

4. The device as claimed in claim 2, wherein said display processing means comprises:

means for reading said color, said area size, and said direction code from said frame-memory means for said given dot and surrounding dots of said given dot;

means for selecting said adjacent dot from said surrounding dots based on said direction code of said given dot; and means for combining said color of said given dot and said color of said adjacent dot with a ratio corresponding to said area size of said given dot.

5. A device for generating an image comprising polygons, said polygons having polygon edges and a reduced aliasing effect on said polygon edges, said device comprising:

polygon-memory means for storing data of apexes of said polygons;

coordinate-conversion means for obtaining screen coordinates of said apexes of said polygons;

drawing processing means for obtaining, based on said data and said screen coordinates of said apexes of said polygons, a color of a given dot, an area size occupied by one of said polygons in said given dot, and a direction code indicating a direction of an adjacent dot relative to said given dot;

frame-memory means for storing said color, said area size, and said direction code for each dot of said image;

display processing means for combining said color of said given dot and a color of said adjacent dot indicated by said direction code with a ratio corresponding to said area size to obtain a screen color to be displayed for said given dot in said image; and display means for displaying said image on a screen.

6. The device as claimed in claim 5, wherein said drawing processing means comprises:

means for obtaining a polygon-edge pair based on said screen coordinates of said apexes;

means for obtaining slopes of said polygon-edge pair based on said screen coordinates of said apexes;

means for obtaining said direction code for each polygon edge of said polygon-edge pair based on said screen coordinates of said apexes;

DDA calculating means for carrying out DDA (digital differential analysis) calculations for said polygon-edge pair to obtain Z values of interposed dots between said polygon-edge pair and to obtain coordinates of intersections where said each polygon edge of said polygon-edge pair crosses edges of dots;

dot-area processing means for obtaining said area size for one of said dots based on one of said slopes and one of said coordinates of said intersections; and means for carrying out hidden-surface processing by using said Z values and a Z-buffer memory to determine said color, said area size, and said direction code for each dot of said image.

7. The device as claimed in claim 6, wherein said dot-area processing means comprises:

a first memory storing slope codes to receive said one of said slopes and to provide a slope code indicating said one of said slopes;

a second memory storing intersection codes to receive a decimal number of said one of said coordinates of said intersections and to provide an intersection code indicating said one of said coordinates of said intersections; and a third memory storing area sizes to receive said slope code and said intersection code to provide said area size corresponding to said slope code and said intersection code.

8. The device as claimed in claim 6, wherein said display processing means comprises:

means for reading said color, said area size, and said direction code from said frame-memory means for said given dot and surrounding dots of said given dot;

means for selecting said adjacent dot from said surrounding dots based on said direction code of said given dot; and means for combining said color of said given dot and said color of said adjacent dot with a ratio corresponding to said area size of said given dot.

9. A device for generating an image comprising polygons, said polygons having polygon edges and a reduced aliasing effect on said polygon edges, said device comprising:

mapping-pattern-memory means for storing mapping patterns having mapping-pattern colors;

drawing processing means for obtaining a color of a given dot by using said mapping-pattern colors of N×N (N:integer) dots corresponding to said given dot, an area size occupied by one of said polygons in said given dot by counting a number of said N×N dots included in said one of said polygons, and a direction code indicating a direction of an adjacent dot relative to said given dot;

frame-memory means for storing said color, said area size, and said direction code for each dot of said image; and display processing means for combining said color of said given dot and a color of said adjacent dot indicated by said direction code with a ratio corresponding to said area size to obtain a screen color to be displayed for said given dot in said image.

10. The device as claimed in claim 9, wherein said drawing processing means comprises:

means for obtaining a slope of one of said polygon edges and obtaining a direction code based on said slope;

DDA calculating means for obtaining memory positions of said mapping-pattern colors of said N×N dots for said given dot; and anti-aliasing processing means for obtaining said color of said given dot by averaging said mapping-pattern colors of said N×N dots included in said one of said polygons and for obtaining said area size of said given dot by counting said number of said N×N dots included in said one of said polygons.

11. A device for generating an image comprising polygons, said polygons having polygon edges and a reduced aliasing effect on said polygon edges, said device comprising:

polygon-memory means for storing data of apexes of said polygons;

coordinate-conversion means for obtaining screen coordinates of said apexes of said polygons;

mapping-pattern-memory means for storing mapping patterns having mapping-pattern colors;

drawing processing means for obtaining, based on said screen coordinates of said apexes of said polygons, a color of a given dot by using said mapping-pattern colors of N×N (N:integer) dots corresponding to said given dot, an area size occupied by one of said polygons in said given dot by counting a number of said N×N dots included in said one of said polygons, and a direction code indicating a direction of an adjacent dot relative to said given dot;

frame-memory means for storing said color, said area size, and said direction code for each dot of said image;

display processing means for combining said color of said given dot and a color of said adjacent dot indicated by said direction code with a ratio corresponding to said area size to obtain a screen color to be displayed for said given dot in said image; and display means for displaying said image on a screen.

12. The device as claimed in claim 11, wherein said drawing processing means comprises:

means for obtaining a polygon-edge pair based on said screen coordinates of said apexes;

means for obtaining slopes of said polygon-edge pair based on said screen coordinates of said apexes;

means for obtaining said direction code for each polygon edge of said polygon-edge pair based on said screen coordinates of said apexes;

DDA calculating means for carrying out DDA (digital differential analysis) calculations for said polygon-edge pair to obtain memory positions of said mapping-pattern colors of said N×N dots for interposed dots between said polygon-edge pair;

anti-aliasing processing means for obtaining said color of one of said interposed dots by averaging said mapping-pattern colors of said N×N dots included in one of said polygons within said one of said interposed dots and for obtaining said area size of said one of said interposed dots by counting said number of said N×N dots included in said one of said polygons within said one of said interposed dots.

13. A device for generating an image comprising polygons, said device comprising:

mapping-pattern-memory means for storing mapping patterns having mapping-pattern colors;

drawing processing means for obtaining a color of a given dot by using said mapping-pattern colors of N×N (N:integer) dots corresponding to said given dot, an area size occupied by one of said polygons in said given dot by counting a number of said N×N dots included in said one of said polygons, and a direction code indicating a direction of an adjacent dot relative to said given dot, said drawing processing means comprising correction means for correcting said color of said given dot by shifting said color toward one of the predetermined darkest color and the predetermined brightest color by a shift amount proportional to a luminance of said given dot;

frame-memory means for storing said color, said area size, and said direction code for each dot of said image; and display processing means for combining said color of said given dot and a color of said adjacent dot indicated by said direction code with a ratio corresponding to said area size to obtain a screen color to be displayed for said given dot in said image.

14. The device as claimed in claim 13, wherein said correction means comprises:

means for storing said luminance of said given dot, said luminance ranging from the lowest luminance to the highest luminance;

means for storing said predetermined darkest color corresponding to a color at said lowest luminance;

means for storing said predetermined brightest color corresponding to a color at said highest luminance;

means for storing said color of said given dot, wherein said color of said given dot corresponds to a color at a half level between the lowest luminance and the highest luminance;

means for comparing said luminance with said half level; and means for combining said color of said given dot with said predetermined darkest color by a ratio corresponding to said luminance of said given dot when said luminance of said given dot is lower than said half level, and for combining said color of said given dot with said predetermined brightest color by a ratio corresponding to said luminance of said given dot when said luminance of said given dot is higher than said half level.

15. A device for generating an image comprising polygons, said device comprising:

mapping-pattern-memory means for storing mapping patterns;

first means for mapping said mapping patterns to said polygons to determine colors of each dot of said image;

second means for correcting said color of each dot by shifting said color toward one of a predetermined darkest color and a predetermined brightest color by a shift amount proportional to luminance of a corresponding dot;

wherein said second means comprises:

means for storing said luminance of a given dot, said luminance ranging from a lowest luminance to a highest luminance;

means for storing said predetermined darkest color corresponding to a color at said lowest luminance;

means for storing said predetermined brightest color corresponding to a color at said highest luminance;

means for storing said color of said given dot, wherein said color of said given dot corresponds to a color at a half level between the lowest luminance and the highest luminance;

means for comparing said luminance with said half level; and means for combining said color of said given dot with said predetermined darkest color by a ratio corresponding to said luminance of said given dot when said luminance of said given dot is lower than said half level, and for combining said color of said given dot with said predetermined brightest color by a ratio corresponding to said luminance of said given dot when said luminance of said given dot is higher than said half level.

16. A device for generating an image comprising polygons, said polygons having polygon edges and a reduced aliasing effect on said polygon edges, said device comprising:

a drawing processing unit configured to obtain a color of a given dot, an area size occupied by one of said polygons in said given dot, and a direction code indicating a direction of an adjacent dot relative to said given dot;

a frame-memory configured to store said color, said area size, and said direction code for each dot of said image; and a display processing unit configured to combine said color of said given dot and a color of said adjacent dot indicated by said direction code with a ratio corresponding to said area size to obtain a color to be displayed for said given dot in said image.

17. The device as claimed in claim 16 wherein said drawing processing unit comprises:

a processor configured to obtain a slope and said direction code of one of said polygon edges;

a DDA obtaining unit configured to calculate a coordinate of an intersection where said one of said polygon edges crosses an edge of said given dot; and a dot-area processing unit configured to obtain said area size of said given dot based on said slope and said coordinate of said intersection.

18. The device as claimed in claim 17, wherein said dot-area processing unit comprises:

a first memory area configured to store slope codes to receive said slope and to provide a slope code indicating said slope;

a second memory area configured to store intersection codes to receive a decimal number of said coordinate of said intersection and to provide an intersection code indicating said coordinate of said intersection code indicating said coordinate of said intersection; and a third memory area configured to store area sizes to receive said slope code and said intersection code to provide said area size corresponding to said slope code and said intersection code.

19. The device as claimed in claim 17, wherein said display processing unit comprises:

a reading unit configured to read said color, said area size, and said direction code from said frame-memory for said given dot and surrounding dots of said given dot;

a selector configured to select said adjacent dot from said surrounding dots based on said direction code of said given dot; and a combining unit configured to combine said color of said given dot and said color of said adjacent dot with a ratio corresponding to said area size of said given dot.

20. A device for generating an image comprising polygons, said polygons having polygon edges and a reduced aliasing effect on said polygon edges, said device comprising:

a polygon-memory configured to store data of apexes of said polygons;

a coordinate-conversion unit configured to obtain screen coordinates of said apexes of said polygons;

a drawing processor configured to obtain, based on said data and said screen coordinates of said apexes of said polygons obtained by said coordinate-conversion unit, a color of a given dot, an area size occupied by one of said polygons in said given dot, and a direction code indicating a direction of an adjacent dot relative to said given dot;

a frame-memory configured to store said color, said area size, and said direction code for each dot of said image;

a display processor configured to combine said color of said given dot and a color of said adjacent dot indicated by said direction code with a ratio corresponding to said area size to obtain a screen color to be displayed for said given dot in said image; and a display configured to display said image on a screen.

21. The device as claimed in claim 20, wherein said drawing processor comprises:

an extracting unit configured to extract a polygon-edge pair based on said screen coordinates of said apexes;

a controller configured to obtain slopes of said polygon-edge pair based on said screen coordinates of said apexes and to obtain said direction code for each polygon edge of said polygon-edge pair based on said screen coordinates of said apexes;

a DDA calculator configured to perform DDA (digital differential analysis) calculations for said polygon-edge pair to obtain Z values of interposed dots between said polygon-edge pair and to obtain coordinates of intersections where said each polygon edge of said polygon-edge pair crosses edges of dots;

a dot-area processor configured to obtain said area size for one of said dots based on one of said slopes and one of said coordinates of said intersections; and a processor configured to carry out hidden-surface processing by using said Z values and a Z-buffer memory to determine said color, said area size, and said direction code for each dot of said image.

22. The device as claimed in claim 21, wherein said dot-area processor comprises:

a first memory area configured to store slope codes to receive said one of said slopes and to provide a slope code indicating said one of said slopes;

a second memory area configured to store intersection codes to receive a decimal number of said one of said coordinates of said intersections and to provide an intersection code indicating said one of said coordinates of said intersections; and a third memory area configured to store area sizes to receive said slope code and said intersection code to provide said area size corresponding to said slope code and said intersection code.

23. The device is claimed in claim 21, wherein said display processor comprises:

a unit configured to read said color, said area size, and said direction code from said frame-memory for said given dot and surrounding dots of said given dot;

a selector configured to select said adjacent dot from said surrounding dots based on said direction code of said given dot; and a combiner configured to combine said color of said given dot and said color of said adjacent dot with a ratio corresponding to said area size of said given dot.

24. A device for generating an image comprising polygons, said polygons having polygon edges and a reduced aliasing effect on said polygon edges, said device comprising:

mapping-pattern-memory configured to store mapping patterns having mapping-pattern colors;

a drawing processor configured to obtain a color of a given dot by using said mapping-pattern colors of N×N (N: integer) dots corresponding to said given dot, an area size occupied by one of said polygons in said given dot by counting a number of said N×N dots included in said one of said polygons, and a direction code indicating a direction of an adjacent dot relative to said given dot;

a frame-memory configured to store said color, said area size, and said direction code for each dot of said image; and a display processor configured to combine said color of said given dot and a color of said adjacent dot indicated by said direction code with a ratio corresponding to said area size to obtain a screen color to be displayed for said given dot in said image.

25. The device as claimed in claim 24, wherein said drawing processor comprises:

a controller configured to obtain a slope of one of said polygon edges and to obtain a direction code based on said slope;

a DDA calculator configured to calculate memory positions of said mapping-pattern colors of said N×N dots for said given dot; and an anti-aliasing processor configured to obtain said color of said given dot by averaging said mapping-pattern colors of said N×N dots included in said one of said polygons and to obtain said area size of said given dot by counting said number of said N×N dots included in said one of said polygons.

26. A device for generating an image comprising polygons, said polygons having polygon edges and a reduced aliasing effect on said polygon edges, said device comprising:

a polygon-memory configured to store data of apexes of said polygons;

a coordinate-convertor configured to obtain screen coordinates of said apexes of said polygons;

a mapping-pattern-memory configured to store mapping patterns having mapping-pattern colors;

a drawing processor configured to obtain, based on said screen coordinates of said apexes of said polygons, a color of a given dot by using said mapping-pattern colors of N×N (N: integer) dots corresponding to said given dot, an area size occupied by one of said polygons in said given dot by counting a number of said N×N dots included in said one of said polygons, and a direction code indicating a direction of an adjacent dot relative to said given dot;

a frame-memory configured to store said color, said area size, and said direction code for each dot of said image;

a display processor configured to combine said color of said given dot and a color of said adjacent dot indicated by said direction code with a ratio corresponding to said area size to obtain a screen color to be displayed for said given dot in said image; and a display configured to display said image on a screen.

27. The device as claimed in claim 26, wherein said drawing processor comprises:

an extracting unit configured to extract a polygon-edge pair based on said screen coordinates of said apexes;

a controller configured to obtain slopes of said polygon-edge pair based on said screen coordinates of said apexes and to obtain said direction code for each polygon edge of said polygon-edge pair based on said screen coordinates of said apexes;

a DDA calculator configured to perform DDA (digital differential analysis) calculations for said polygon-edge pair to obtain memory positions of said mapping-pattern colors of said N×N dots for interposed dots between said polygon-edge pair; and an anti-aliasing processor configured to obtain said color of one of said interposed dots by averaging said mapping-pattern colors of said N×N dots included in one of said polygons within said one of said interposed dots and to obtain said area size of said one of said interposed dots by counting said number of said N×N dots included in said one of said polygons within said one of said interposed dots.

28. A device for generating an image comprising polygons, said device comprising:

a mapping-pattern-memory configured to store mapping patterns having mapping-pattern colors;

a drawing processor configured to obtain a color of a given dot by using said mapping-pattern colors of N×N (N: integer) dots corresponding to said given dot, an area size occupied by one of said polygons in said given dot by counting a number of said N×N dots included in said one of said polygons, and a direction code indicating a direction of an adjacent dot relative to said given dot, said drawing processor comprising a correction unit configured to correct said color of said given dot by shifting said color toward one of the predetermined darkest color and the predetermined brightest color by a shift amount proportional to a luminance of said given dot;

a frame-memory configured to store said color, said area size, and said direction code for each dot of said image; and a display processor configured to combine said color of said given dot and a color of said adjacent dot indicated by said direction code with a ratio corresponding to said area size to obtain a screen color to be displayed for said given dot in said image.

29. The device as claimed in claim 28, wherein said correction unit comprises:

a first memory area configured to store said luminance of said given dot, said luminance ranging from the lowest luminance to the highest luminance;

a second memory area configured to store said predetermined darkest color corresponding to a color at said lowest luminance;

a third memory area configured to store said predetermined brightest color corresponding to a color at said highest luminance;

a fourth memory area configured to store said color of said given dot, said color of said given dot corresponding to a color at a half level between the lowest luminance and the highest luminance;

a comparitor configured to compare said luminance with said half level; and a combiner configured to combine said color of said given dot with said predetermined darkest color by a ratio corresponding to said luminance of said given dot when said luminance of said given dot is lower than said half level, and to combine said color of said given dot with said predetermined brightest color by a ratio corresponding to said luminance of said given dot when said luminance of said given dot is higher than said half level.

30. A device for generating an image comprising polygons, said device comprising:

a mapping-pattern-memory configured to store mapping patterns;

a first unit configured to map said mapping patterns to said polygons to determine colors of each dot of said image;

a second unit configured to correct said color of each dot by shifting said color toward one of a predetermined darkest color and a predetermined brightest color by a shift amount proportional to a luminance of a corresponding dot;

wherein said second unit comprises:

a first memory configured to store said luminance of a given dot, said luminance ranging from a lowest luminance to a highest luminance;

a second memory area configured to store said predetermined darkest color corresponding to a color at said lowest luminance;

a third memory area configured to store said predetermined brightest color corresponding to a color at said highest luminance;

a fourth memory area configured to store said color of said given dot, said color of said given dot corresponding to a color at a half level between the lowest luminance and the highest luminance;

a comparitor configured to compare said luminance with said half level and a combiner configured to combine said color of said given dot with said predetermined darkest color by a ratio corresponding to said luminance of said given dot when said luminance of said given dot is lower than said half level, and to combine said color of said given dot with said predetermined brightest color by a ratio corresponding to said luminance of said given dot when said luminance of said given dot is higher than said half level.

31. A method for generating an image comprising polygons, said polygons having polygon edges and a reduced aliasing effect on said polygon edges, said method comprising:

obtaining a color of a given dot, an area size occupied by one of said polygons in said given dot, and a direction code indicating a direction of an adjacent dot relative to said given dot; and combining said color of said given dot and a color of said adjacent dot indicated by said direction code with a ratio corresponding to said area size to obtain a color to be displayed for said given dot in said image.

32. The method as claimed in claim 31, wherein said obtaining step comprises:

obtaining a slope and said direction code of one of said polygon edges;

calculating a coordinate of an intersection where said one of said polygon edges crosses an edge of said given dot; and obtaining said area size of said given dot based on said slope and said coordinate of said intersection.

33. The method as claimed in claim 32, where in said step of obtaining said area size comprises:

storing slope codes to receive said slope and to provide a slope code indicating said slope;

storing intersection codes to receive a decimal number of said coordinate of said intersection and to provide an intersection code indicating said coordinate of said intersection; and storing area sizes to receive said slope code and said intersection code to provide said area size corresponding to said slope code and said intersection code.

34. The method as claimed in claim 32, wherein said combining step comprises:

reading said stored color, said area size, and said direction code for said given dot and surrounding dots of said given dot;

selecting said adjacent dot from said surrounding dots based on said direction code of said given dot; and combining said color of said given dot and said color of said adjacent dot with a ratio corresponding to said area size of said given dot.

35. A method for generating an image comprising polygons, said polygons having polygon edges and a reduced aliasing effect on said polygon edges, said method comprising:

storing data of apexes of said polygons;

obtaining screen coordinates of said apexes of said polygons;

obtaining, based on said data and said screen coordinates of said apexes of said polygons, a color of a given dot, an area size occupied by one of said polygons in said given dot, and a direction code indicating a direction of an adjacent dot relative to said given dot;

storing said color, said area size, and said direction code for each dot of said image;

combining said color of said given dot and a color of said adjacent dot indicated by said direction code with a ratio corresponding to said area size to obtain a screen color to be displayed for said given dot in said image; and displaying said image on a screen.

36. The method as claimed in claim 35, wherein said step of obtaining a color of a given dot comprises:

extracting a polygon-edge pair based on said screen coordinates of said apexes;

obtaining slopes of said polygon-edge pair based on said screen coordinates of said apexes;

obtaining said direction code for each polygon edge of said polygon-edge pair based on said screen coordinates of said apexes;

performing DDA (digital differential analysis) calculations for said polygon-edge pair to obtain Z values of interposed dots between said polygon-edge pair to obtain coordinates of intersections where said each polygon edge of said polygon-edge pair crosses edges of dots;

obtaining said area size for one of said dots based on one of said slopes and one of said coordinates of said intersections; and performing hidden-surface processing by using said Z values and a Z-buffer memory to determine said color, said area size, and said direction code for each dot of said image.

37. The method as claimed in claim 36, wherein said step of obtaining said area size comprises:

storing slope codes to receive said one of said slopes and to provide a slope code indicating said one of said slopes;

storing intersection codes to receive a decimal number of said one of said coordinates of said intersections and to provide an intersection code indicating said one of said coordinates of said intersections; and storing area sizes to receive said slope code and said intersection code to provide said area size corresponding to said slope code and said intersection code.

38. The method as claimed in claim 36, wherein said combining step comprises:

reading said stored color, said area size, and said direction code for said given dot and surrounding dots of said given dot;

selecting said adjacent dot from said surrounding dots based on said direction code of said given dot; and combining said color of said given dot and said color of said adjacent dot with a ratio corresponding to said area size of said given dot.

39. A method for generating an image comprising polygons, said polygons having polygon edges and a reduced aliasing effect on said polygon edges, said method comprising:

storing mapping patterns having mapping-pattern colors;

obtaining a color of a given dot by using said mapping-pattern colors of N×N (N: integer) dots corresponding to said given dot, an area size occupied by one of said polygons in said given dot by counting a number of said N×N dots included in said one of said polygons, and a direction code indicating a direction of an adjacent dot relative to said given dot;

storing said color, said area size, and said direction code for each dot of said image; and combining said color of said given dot and a color of said adjacent dot indicated by said direction code with a ratio corresponding to said area size to obtain a screen color to be displayed for said given dot in said image.

40. The method as claimed in claim 39, wherein said obtaining step comprises:

obtaining a slope of one of said polygon edges and obtaining a direction code based on said slope;

calculating memory positions of said mapping-pattern colors of said N×N dots for said given dot; and obtaining said color of said given dot by averaging said mapping-pattern colors of said N×N dots included in said one of said polygons and correcting said area size of said given dot by counting said number of said N×N dots included in said one of said polygons.

41. A method for generating an image comprising polygons, said polygons having polygon edges and a reduced aliasing effect on said polygon edges, said method comprising:

storing data of apexes of said polygons;

obtaining screen coordinates of said apexes of said polygons;

storing mapping patterns having mapping-pattern colors;

a processing step for obtaining, based on said screen coordinates of said apexes of said polygons, a color of a given dot by using said mapping-pattern colors of N×N (N: integer) dots corresponding to said given dot, an area size occupied by one of said polygons in said given dot by counting a number of said N×N dots included in said one of said polygons, and a direction code indicating a direction of an adjacent dot relative to said given dot;

storing said color, said area size, and said direction code for each dot of said image;

combining said color of said given dot and a color of said adjacent dot indicated by said direction code with a ratio corresponding to said area size to obtain a screen color to be displayed for said given dot in said image; and displaying said image on a screen.

42. The method as claimed in claim 41, wherein said processing step comprises:

extracting a polygon-edge pair based on said screen coordinates of said apexes;

obtaining slopes of said polygon-edge pair based on said screen coordinates of said apexes;

obtaining said direction code for each polygon edge of said polygon-edge pair based on said screen coordinates of said apexes;

performing DDA (digital differential analysis) calculations for said polygon-edge pair to obtain memory positions of said mapping-pattern colors of said N×N dots for interposed dots between said polygon-edge pair; and obtaining said color of one of said interposed dots by averaging said mapping-pattern colors of said N×N dots included in one of said polygons within said one of said interposed dots and for obtaining said area size of said one of said interposed dots by counting said number of said N×N dots included in said one of said polygons within said one of said interposed dots.

43. A method for generating an image comprising polygons, said method comprising:

storing mapping patterns having mapping-pattern colors;

obtaining a color of a given dot by using said mapping-pattern colors of N×N (N: integer) dots corresponding to said given dot, an area size occupied by one of said polygons in said given dot by counting a number of said N×N dots included in said one of said polygons, and a direction code indicating a direction of an adjacent dot relative to said given dot, said obtaining step further comprising correcting said color of said given dot by shifting said color toward one of the predetermined darkest color and the predetermined brightest color by a shift amount proportional to a luminance of said given dot;

storing said color, said area size, and said direction code for each dot of said image; and combining said color of said given dot and a color of said adjacent dot indicated by said direction code with a ratio corresponding to said area size to obtain a screen color to be displayed for said given dot in said image.

44. The method as claimed in claim 43, wherein said correcting step comprises:

storing said luminance of said given dot, said luminance ranging from the lowest luminance to the highest luminance;

storing said predetermined darkest color corresponding to a color at said lowest luminance;

storing said predetermined brightest color corresponding to a color at said highest luminance;

storing said color of said given dot, said color of said given dot corresponding to a color at a half level between the lowest luminance and the highest luminance;

comparing said luminance with said half level; and combining said color of said given dot with said predetermined darkest color by a ratio corresponding to said luminance of said give dot when said luminance of said given dot is lower than said half level, and for combining said color of said given dot with said predetermined brightest color by a ratio corresponding to said luminance of said given dot when said luminance of said given dot is higher than said half level.

45. A method for generating an image comprising polygons, said method comprising:

storing mapping patterns;

mapping said mapping patterns to said polygons to determine colors of each dot of said image;

correcting said color of each dot by shifting said color toward one of a predetermined darkest color and a predetermined brightest color by a shift amount proportional to a luminance of a corresponding dot;

wherein said correcting step comprises:

storing said luminance of a given dot, said luminance ranging from a lowest luminance to a highest luminance;

storing said predetermined darkest color corresponding to a color at said lowest luminance;

storing said predetermined brightest color corresponding to a color at said highest luminance;

storing said color of said given dot, said color of said given dot corresponding to a color at a half level between the lowest luminance and the highest luminance;

comparing said luminance with said half level; and combining said color of said given dot with said predetermined darkest color by a ratio corresponding to said luminance of said given dot when said luminance of said given dot is lower than said half level, and for combining said color of said given dot with said predetermined brightest color by a ratio corresponding to said luminance of said given dot when said luminance of said given dot is higher than said half level.

* * * * *